(12) United States Patent
Cohen et al.

(10) Patent No.: US 10,201,803 B2
(45) Date of Patent: Feb. 12, 2019

(54) POLYMER-METAL ORGANIC FRAMEWORK MATERIALS AND METHODS OF USING THE SAME

(71) Applicant: The Regents of the University of California, Oakland, CA (US)

(72) Inventors: Seth M. Cohen, Carlsbad, CA (US); Zhenjie Zhang, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 25 days.

(21) Appl. No.: 15/178,498

(22) Filed: Jun. 9, 2016

(65) Prior Publication Data

US 2016/0361702 A1    Dec. 15, 2016

Related U.S. Application Data

(60) Provisional application No. 62/173,267, filed on Jun. 9, 2015.

(51) Int. Cl.
| | |
|---|---|
| *B01J 20/26* | (2006.01) |
| *B01J 20/22* | (2006.01) |
| *C08G 83/00* | (2006.01) |
| *B01J 31/16* | (2006.01) |
| *B01J 31/22* | (2006.01) |
| *B01D 53/04* | (2006.01) |
| *B01D 53/02* | (2006.01) |
| *C01B 32/50* | (2017.01) |

(52) U.S. Cl.
CPC ............ *B01J 20/262* (2013.01); *B01D 53/02* (2013.01); *B01D 53/04* (2013.01); *C01B 32/50* (2017.08); *C08G 83/001* (2013.01); *B01D 2253/204* (2013.01); *B01D 2257/504* (2013.01); *Y02C 10/08* (2013.01); *Y02P 20/152* (2015.11)

(58) Field of Classification Search
None
See application file for complete search history.

(56) References Cited

U.S. PATENT DOCUMENTS

| 7,196,210 B2 | 3/2007 | Yaghi et al. |
| 2005/0192175 A1 | 9/2005 | Yaghi et al. |

FOREIGN PATENT DOCUMENTS

| WO | WO-02/088148 A1 | 11/2002 |
| WO | WO-02/088148 B1 | 11/2002 |

OTHER PUBLICATIONS

Budd, P.M. et al. (Jan. 21, 2004, e-published Dec. 5, 2003). "Polymers of intrinsic microporosity (PIMs): robust, solution-processable, organic nanoporous materials," *Chem Commun (Camb)* 2:230-231.

Carta, M. et al. (Jan. 18, 2013). "An efficient polymer molecular sieve for membrane gas separations," *Science* 339(6117):303-307.

Carne-Sanchez, A. et al. (Mar. 2013, e-published Feb. 10, 2013). "A spray-drying strategy for synthesis of nanoscale metal-organic frameworks and their assembly into hollow superstructures," *Nat Chem* 5(3):203-211.

(Continued)

*Primary Examiner* — Daniel Berns
(74) *Attorney, Agent, or Firm* — Anson M. Nomura; Mintz, Levin, Cohn, Ferris, Glovsky and Popeo, P.C.

(57) ABSTRACT

Disclosed herein, inter alia, are polymerized metal organic framework compositions and polymer compositions, and methods of making and using the same.

19 Claims, 51 Drawing Sheets

(56) References Cited

OTHER PUBLICATIONS

Distefano, G. et al. (Apr. 2013, e-published Feb. 24, 2013). "Highly ordered alignment of a vinyl polymer by host-guest cross-polymerization," *Nat Chem* 5(4):335-341.

Eddaoudi, M. et al. (May 9, 2001). "Porous metal-organic polyhedra: 25 A cuboctahedron constructed from 12 Cu2(CO2)4 paddle-wheel building blocks," *J Am Chem Soc* 123(18):4368-4369.

Foster, J.A. et al. (Aug. 5, 2015, e-published Jul. 23, 2015). "Differentially Addressable Cavities within Metal-Organic Cage-Cross-Linked Polymeric Hydrogels," *J Am Chem Soc* 137(30):9722-9729.

Furukawa, H. et al. (Jul. 5, 2006). "Crystal structure, dissolution, and deposition of a 5 nm functionalized metal-organic great rhombicuboctahedron," *J Am Chem Soc* 128(26):8398-8399.

Furukawa, Y. et al. (Oct. 15, 2012, e-published Sep. 23, 2012). "Nano- and microsized cubic gel particles from cyclodextrin metal-organic frameworks," *Angew Chem Int Ed Engl* 51(42):10566-10569.

Henke, S. et al. (Feb. 23, 2011, e-published Jan. 28, 2011). "Gated channels in a honeycomb-like zinc-dicarboxylate-bipyridine framework with flexible alkyl ether side chains," *J Am Chem Soc* 133(7):2064-2067.

Ishiwata, T. et al. (Apr. 10, 2013, e-published Mar. 29, 2013). "Transformation of metal-organic framework to polymer gel by cross-linking the organic ligands preorganized in metal-organic framework," *J Am Chem Soc* 135(14):5427-5432.

Li, H. et al. (Nov. 18, 1999). "Design and synthesis of an exceptionally stable and highly porous metal-organic framework," *Nature* 402(6750):276-279.

Pawar, G.M. et al. (2015). "ROMP-Derived Pyridylborate Block Copolymers:Self-Assembly, pH-Responsive Properties, and Metal-Containing Nanostructures," *Macromolecules* 48:6508-6515.

Qiu, X. et al. (Feb. 3, 2016, e-published Jan. 22, 2016). "Encapsulation of a Metal-Organic Polyhedral in the Pores of a Metal-Organic Framework," *J Am Chem Soc* 138(4):1138-1141.

Shao, S. et al. (Jan. 23, 2013, e-published Jan. 11, 2013). "Enhanced performance of inverted polymer solar cells by using poly(ethylene oxide)-modified ZnO as an electron transport layer," *ACS Appl Mater Interfaces* 5(2):380-385.

Song, Q. et al. (2014). "Controlled thermal oxidative crosslinking of polymers of intrinsic microporosity towards tunable molecular sieve membranes," *Nature Communications* 5:1-12.

Sun, L.B. et al. (Sep. 26, 2012, e-published Sep. 11, 2012). "Confinement of metal-organic polyhedra in silica nanopores," *J Am Chem Soc* 134(38):15923-159238.

Tsotsalas, M. et al. (Jan. 8, 2014, e-published Dec. 16, 2013). "Fabrication of highly uniform gel coatings by the conversion of surface-anchored metal-organic frameworks," *J Am Chem Soc* 136(1):8-11.

Uemura, T. et al. (2013). "Controlled Synthesis of Anisotropic Polymer Particles Templated by Porous Coordination Polymers," *Chemistry of Materials* 25:3772-3776.

Zhang, Z. et al. (May 18, 2015, e-published Apr. 29, 2015). "polyMOFs: A Class of Interconvertible Polymer-Metal-Organic-Framework Hybrid Materials," *Angew Chem Int Ed Engl* 54(21):6152-6157.

Zhang, Z. et al. (Jan. 27, 2016, e-published Jan. 13, 2016). "Polymer-Metal-Organic Frameworks (polyMOFs) as Water Tolerant Materials for Selective Carbon Dioxide Separations," *J Am Chem Soc* 138(3):920-925.

Zhukhovitskiy, A.V. et al. (Jan. 2016, e-published Nov. 16, 2015). "Highly branched and loop-rich gels via formation of metal-organic cages linked by polymers," *Nat Chem* 8(1):33-41.

FIG. 48
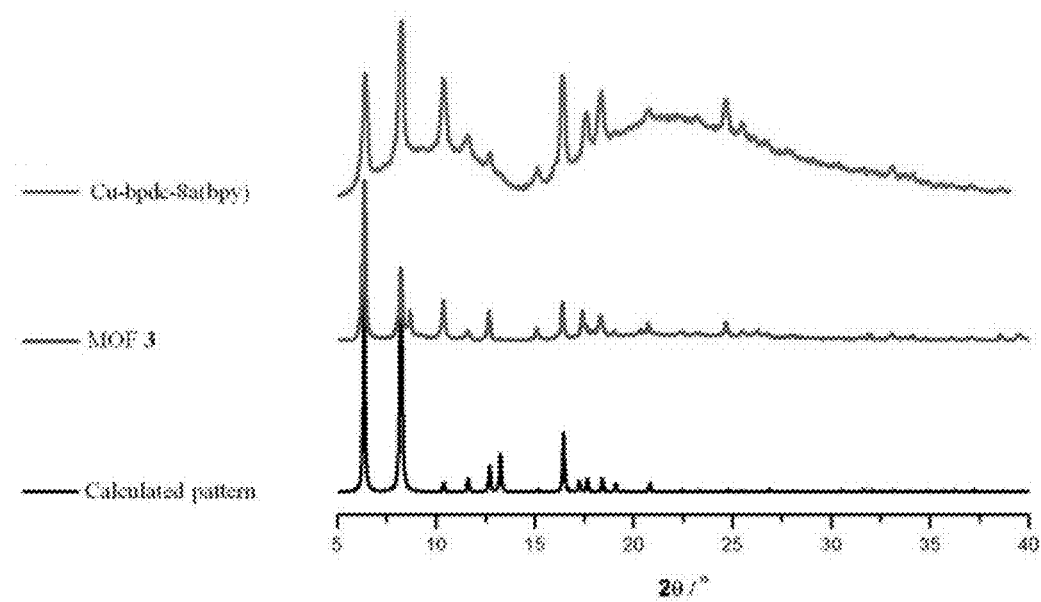
FIG. 49A          FIG. 49B
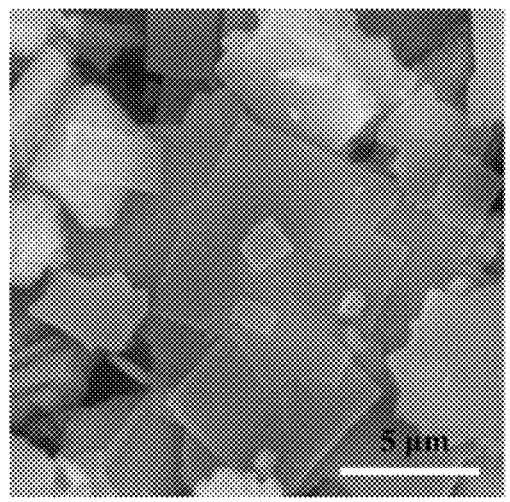 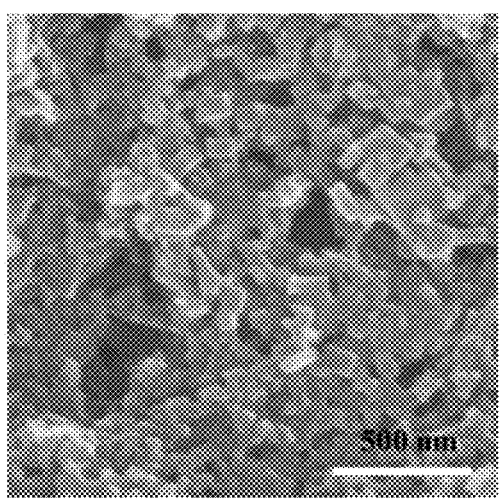

POLYMER-METAL ORGANIC FRAMEWORK MATERIALS AND METHODS OF USING THE SAME

CROSS-REFERENCES TO RELATED APPLICATIONS

This application claims the benefit of U.S. Provisional Application No. 62/173,267, filed Jun. 9, 2015, which is incorporated herein by reference in its entirety and for all purposes.

STATEMENT AS TO RIGHTS TO INVENTIONS MADE UNDER FEDERALLY SPONSORED RESEARCH AND DEVELOPMENT

This invention was made with government support under grant number DE FG02-08ER46519 awarded by the Department of Energy. The government has certain rights in the invention.

BACKGROUND

Porous materials with well-defined size-selective channels and or pores have attracted great attention for a wide range of applications, for example ion exchange, catalysis, gas sorption, and drug delivery. These porous materials include both inorganic and organic materials such as zeolites, metal organic frameworks (MOFs), and covalent organic frameworks (COFs), among others. Combining the advantages of polymers such as the facile fabrication of films, good processability, and chemical stability, with desirable traits of porous materials (e.g., MOFs) including crystallinity, well-determined structures, and permanent porosity is a major challenge in the field. Disclosed herein, inter alia, are solutions to these and other problems in the art.

BRIEF SUMMARY OF THE INVENTION

In an aspect is provided a polymerized metal organic framework including a plurality of metal organic framework linkers bound together by a plurality of covalent linker moieties, wherein each metal organic framework linker includes at least 2 metal binding ligand moieties or at least 2 metal donor atoms; and each of the metal binding ligand moieties is bound to a metal atom or each of the metal donor atoms is bound to a metal atom.

In an aspect is provided a polymer composition including a plurality of ligands bound together by a plurality of polymerized monomers, wherein each ligand includes at least 2 metal binding ligand moieties or at least 2 metal donor atoms.

In an aspect is provided a method of isolating carbon dioxide from a gas, wherein the method includes contacting a polymerized metal organic framework with a gas including carbon dioxide, and allowing the carbon dioxide within the gas to adsorb to the polymerized metal organic framework, thereby isolating carbon dioxide from a gas.

BRIEF DESCRIPTION OF THE DRAWINGS

(FIG. 20A) MOP-H and (FIG. 20B) polyMOP-H. Filled symbols: adsorption; open symbols: desorption.

FIG. 24. SEM images of Zn-pbdc-xa particles prepared at 100° C.: (top left) Zn-pbdc-5a; (top right) Zn-pbdc-6a; (bottom left) Zn-pbdc-7a; and (bottom right) Zn-pbdc-8a.

FIG. 25. The film morphology of Zn-pbdc-xa prepared at 80° C.: (left) Zn-pbdc-7a; (right) Zn-pbdc-8a.

FIG. 27. EDX spectrum for the spherical particles of Zn-pbdc-5a.

(FIG. 31A); after incubating at 60° C. for 1 h (FIG. 31B).

FIG. 48. PXRD patterns of as-synthesized Cu-bpdc-8a (bpy), MOF 3 and calculated pristine MOF based on non-interpenetrated $[Zn_2(bdc)_2(bpy)]_n$.

FIGS. 49A-49B. SEM images of MOF 3 (FIG. 49A) and Cu-bpdc-8a(bpy) (FIG. 49B).

Figure 67A:
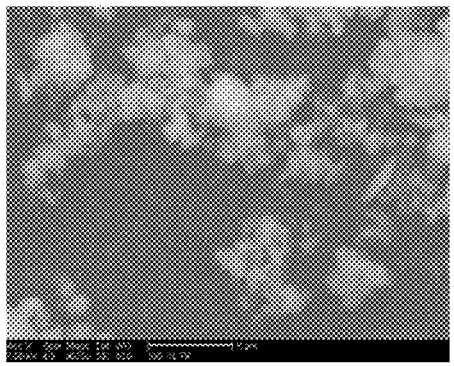
FIGS. 67A-67C. SEM images of Zn-pbdc-12a(bpe) treated with water at room temperature for 1 d (FIG. 67A)
Figure 67B:
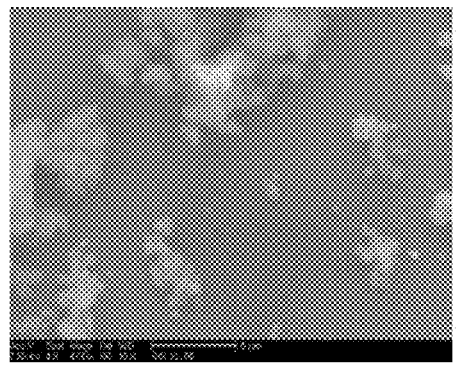
Figure 67C:
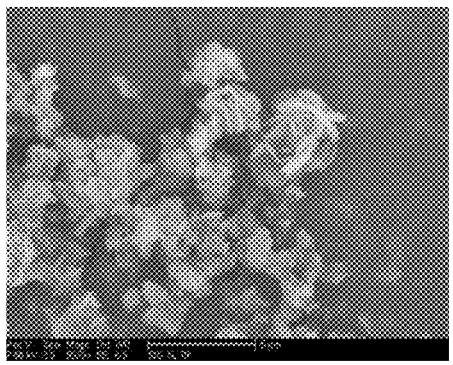

Zn-pbdc-12a(bpe) treated with boiling water for 1 d (FIG. 67B); Zn-pbdc-12a(bpe) exposed to 90% relative humidity at room temperature for 7 d (FIG. 67C).

Figure 68A:
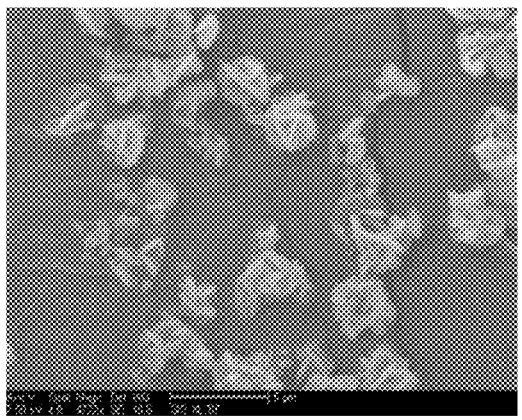
Figure 68B:
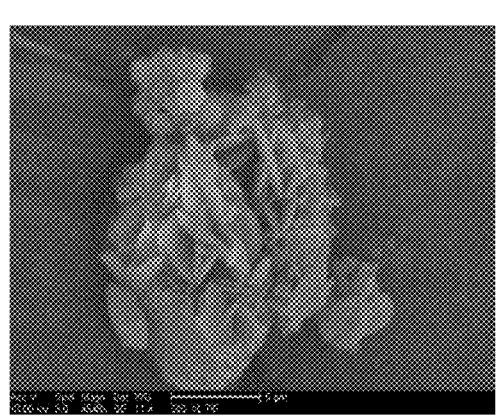

FIGS. 68A-68B. SEM images of Zn-pbdc-8a(bpy) treated with water at room temperature for 1 d (FIG. 68A); Zn-pbdc-8a(bpy) treated with boiling water for 1 d (FIG. 68B).

Figure 69A:
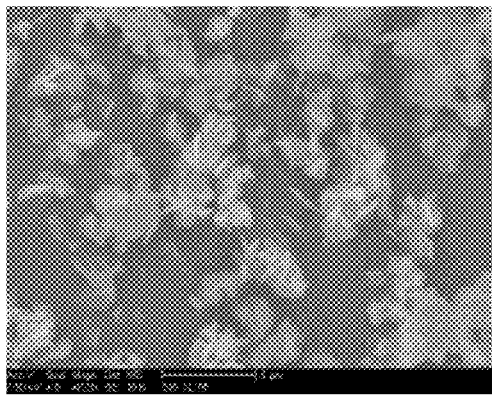
Figure 69B:
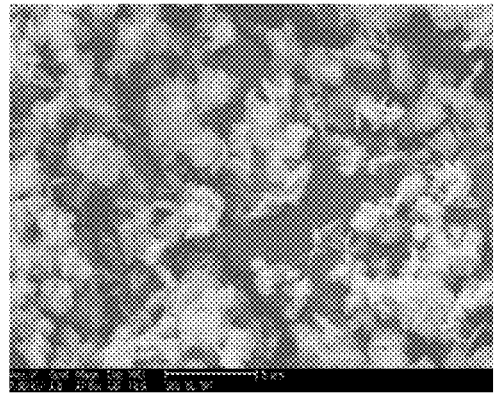

FIGS. 69A-69B. SEM images of Zn-pbdc-9a(bpy) treated with water at room temperature for 1 d (FIG. 69A); Zn-pbdc-9a(bpy) treated with boiling water for 1 d (FIG. 69B).

Figure 70A:
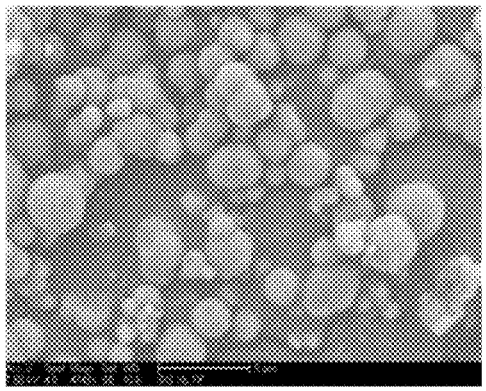
Figure 70B:
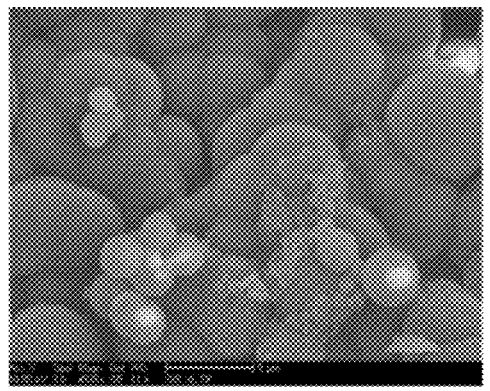
Figure 70C:
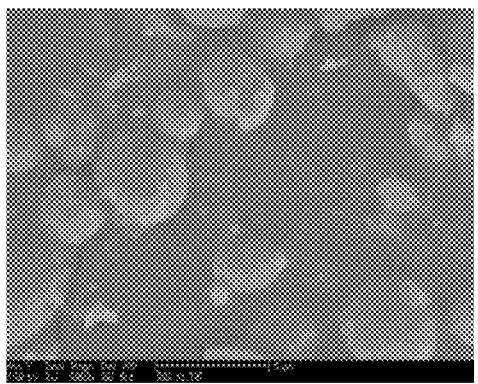

FIGS. 70A-70C. SEM images of Zn-pbdc-12a(bpy) treated with water at room temperature for 1 d (FIG. 70A); Zn-pbdc-12a(bpy) treated with boiling water for 1 d (FIG. 70B); Zn-pbdc-12a(bpy) exposed to 90% relative humidity at room temperature for 7 d (FIG. 70C).

Figure 71:
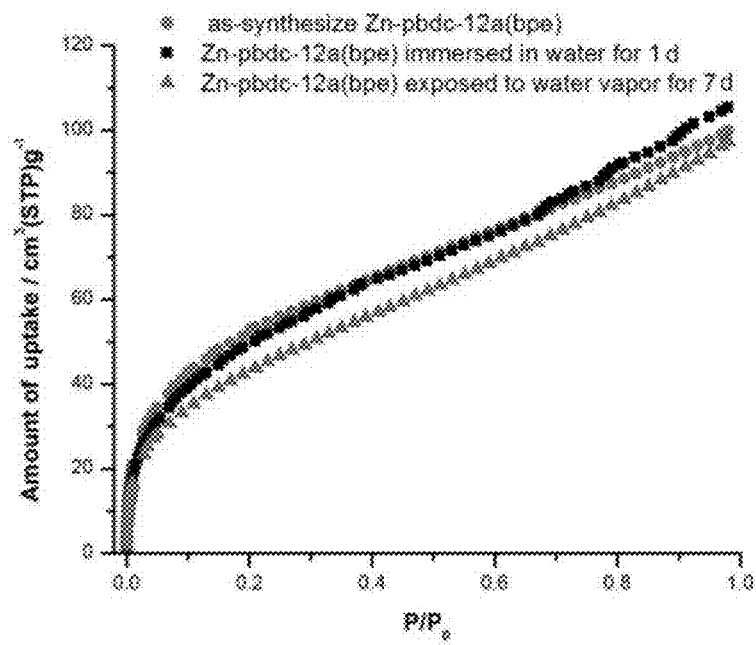

FIG. 71. $CO_2$ adsorption isotherms (at 195 K) for as-synthesized, room temperature water treated and water vapor treated Zn-pbdc-12a(bpe).

Figure 72:
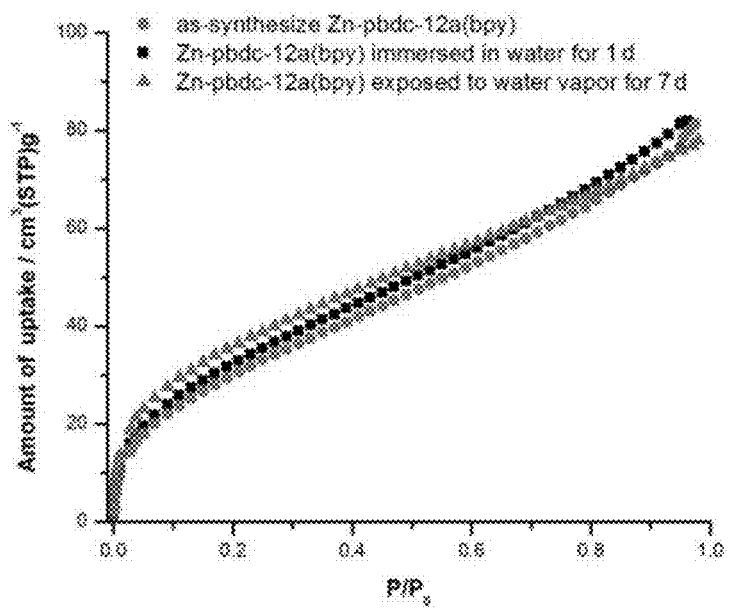

FIG. 72. $CO_2$ adsorption isotherms (at 195 K) for as-synthesized, room temperature water treated and water vapor treated Zn-pbdc-12a(bpy).

Figure 73:
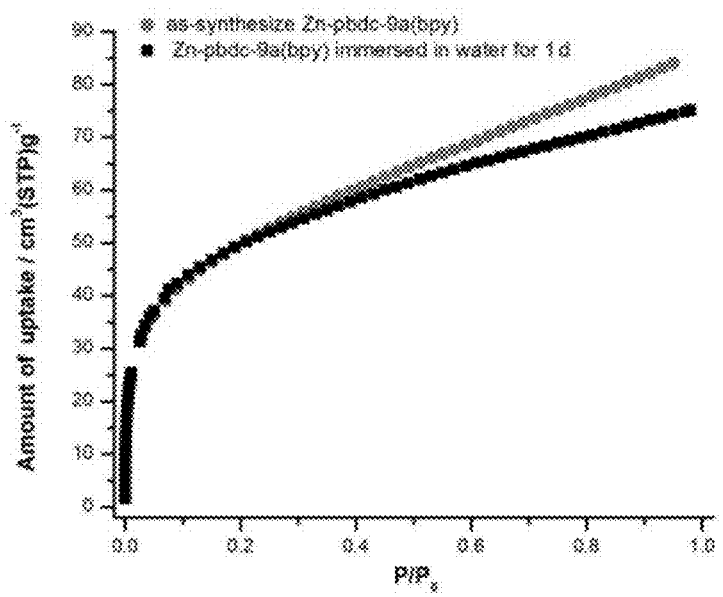

FIG. 73. $CO_2$ adsorption isotherms (at 195 K) for as-synthesized and room temperature water treated Zn-pbdc-9a(bpy).

Figure 74:
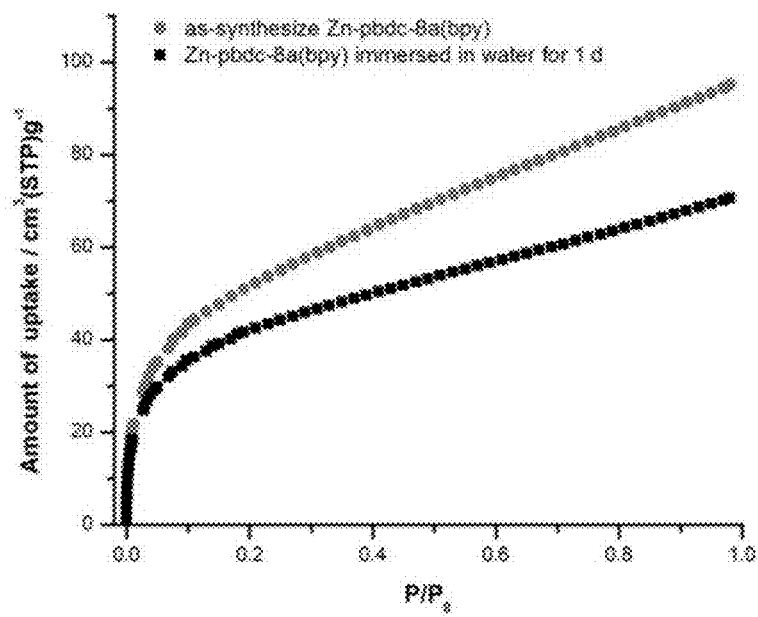

FIG. 74. $CO_2$ adsorption isotherms (at 195 K) for as-synthesized and room temperature water treated Zn-pbdc-8a(bpy).

Figure 75:
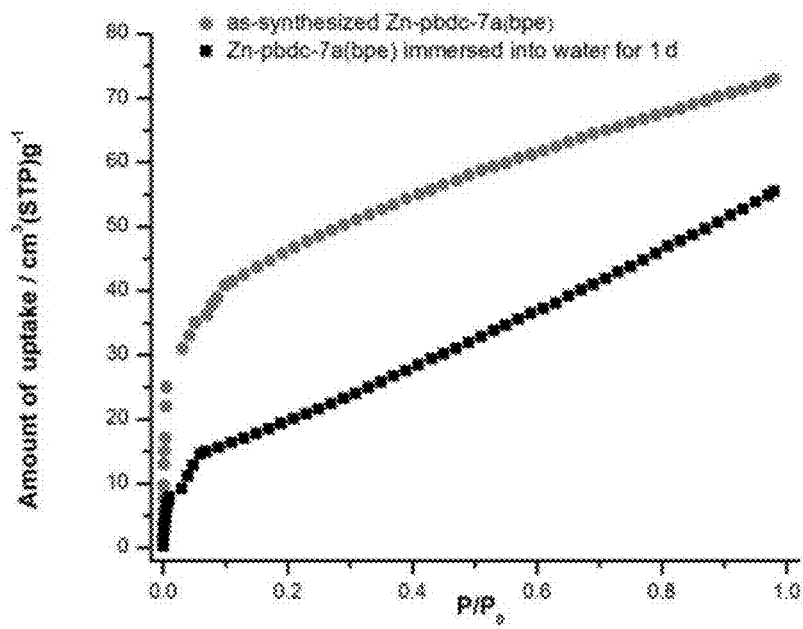

FIG. 75. $CO_2$ adsorption isotherms (at 195 K) for as-synthesized and room temperature water treated Zn-pbdc-7a(bpe).

Figure 76:
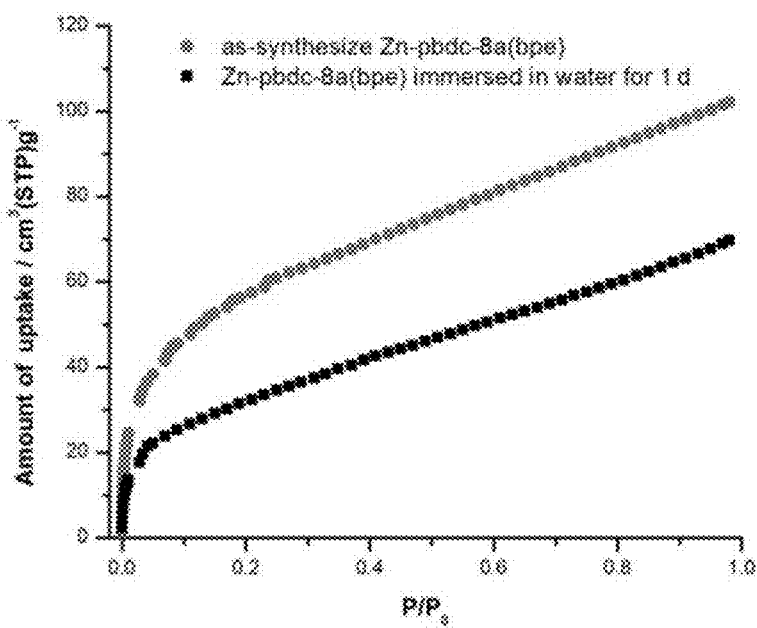

FIG. 76. $CO_2$ adsorption isotherms (at 195 K) for as-synthesized and room temperature water treated Zn-pbdc-8a(bpe).

Figure 77:
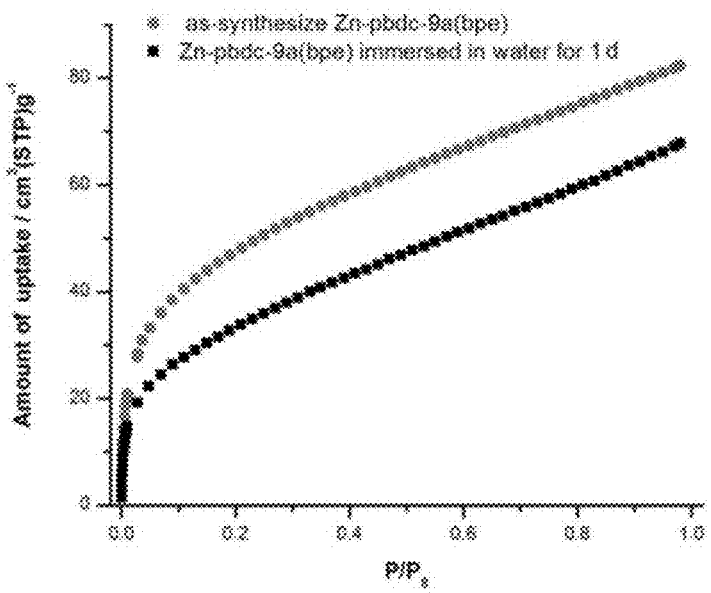

FIG. 77. $CO_2$ adsorption isotherms (at 195 K) for as-synthesized and room temperature water treated Zn-pbdc-9a(bpe).

Figure 78:
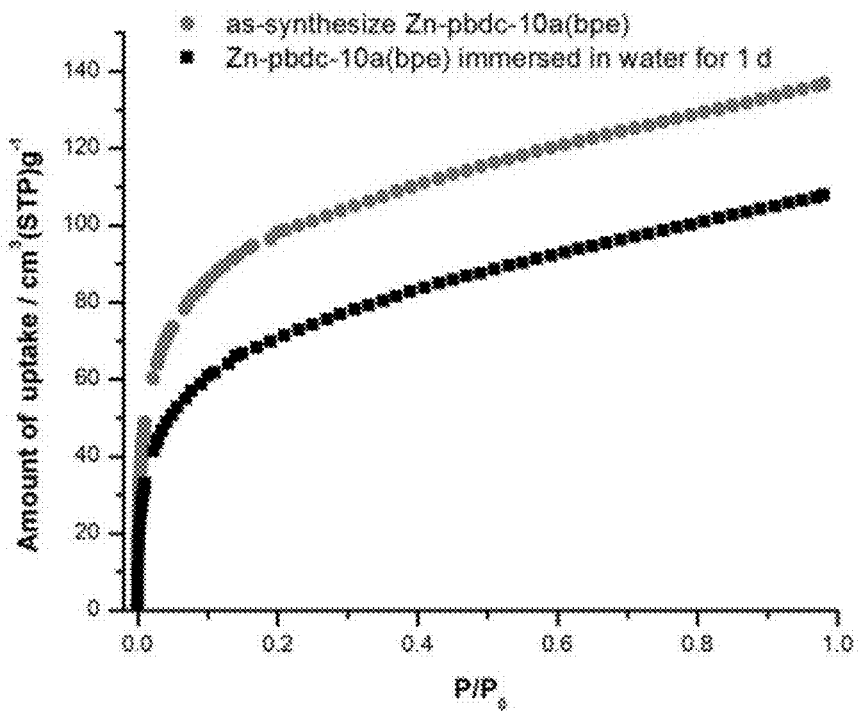

FIG. 78. $CO_2$ adsorption isotherms (at 195 K) for as-synthesized and room temperature water treated Zn-pbdc-10a(bpe).

Figure 79:
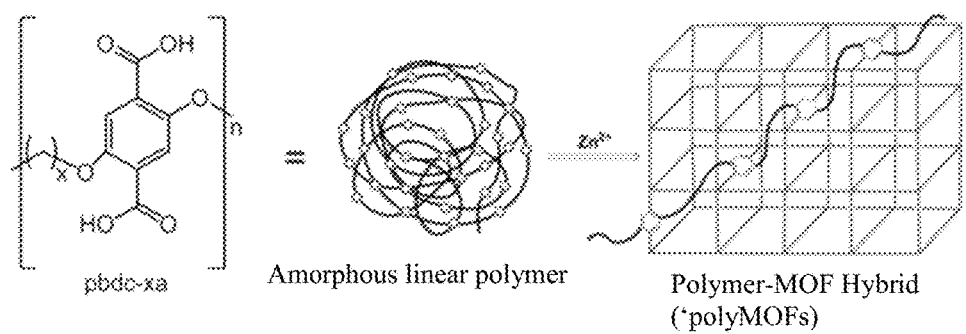

FIG. 79. Illustration of a strategy described herein to convert a 1-dimensional (linear), non-porous, mostly amorphous polymer into a 3-dimensional, porous, crystalline polyMOF hybrid material.

DETAILED DESCRIPTION

Disclosed herein are inventions of polymerized metal organic frameworks (polyMOFs). In embodiments, amorphous, linear, and non-porous polymer ligands were shown to coordinate with metal ions to form highly crystalline, 3-dimensional, porous framework materials. This approach upends conventional wisdom in both polymer and MOF chemistry, as linear polymers are not easily organized into 3-dimensional, crystalline solids, and MOFs are not readily prepared from long, flexible ligands. The incorporation of polymers into MOFs was shown to harness advantages of both materials in embodiments, including hydrophobicity and permanent porosity. In addition, by selecting certain polymer-ligands at specific annealing temperatures, polyMOF materials exhibit morphologies ranging from spherical superstructures to crystalline films. polyMOFs show the potential to harness not only the advantage of polymers such as the facile fabrication of films, good processability, and chemical stability, but also the advantageous traits of MOFs including crystallinity, functionality, well-determined structures, and permanent porosity.

I. Definitions

The abbreviations used herein have their conventional meaning within the chemical and biological arts. The chemical structures and formulae set forth herein are constructed according to the standard rules of chemical valency known in the chemical arts.

Where substituent groups are specified by their conventional chemical formulae, written from left to right, they equally encompass the chemically identical substituents that would result from writing the structure from right to left, e.g., —$CH_2O$— is equivalent to —$OCH_2$—.

The term "alkyl," by itself or as part of another substituent, means, unless otherwise stated, a straight (i.e., unbranched) or branched carbon chain (or carbon), or combination thereof, which may be fully saturated, mono- or polyunsaturated and can include mono-, di- and multivalent radicals, having the number of carbon atoms designated (i.e., $C_1$-$C_{10}$ means one to ten carbons). Alkyl is an uncyclized chain. Examples of saturated hydrocarbon radicals include, but are not limited to, groups such as methyl, ethyl, n-propyl, isopropyl, n-butyl, t-butyl, isobutyl, sec-butyl, (cyclohexyl) methyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. An alkoxy is an alkyl attached to the remainder of the molecule via an oxygen linker (—O—).

The term "alkylene," by itself or as part of another substituent, means, unless otherwise stated, a divalent radical derived from an alkyl, as exemplified, but not limited by, —$CH_2CH_2CH_2CH_2$—. Typically, an alkyl (or alkylene) group will have from 1 to 24 carbon atoms, with those groups having 10 or fewer carbon atoms being preferred herein. A "lower alkyl" or "lower alkylene" is a shorter chain alkyl or alkylene group, generally having eight or fewer carbon atoms. The term "alkenylene," by itself or as part of another substituent, means, unless otherwise stated, a divalent radical derived from an alkene.

The term "heteroalkyl," by itself or in combination with another term, means, unless otherwise stated, a stable straight or branched chain, or combinations thereof, including at least one carbon atom and at least one heteroatom (e.g., O, N, P, Si, and S), and wherein the nitrogen and sulfur atoms may optionally be oxidized, and the nitrogen heteroatom may optionally be quaternized. The heteroatom(s) (e.g., N, S, Si, or P) may be placed at any interior position of the heteroalkyl group or at the position at which the alkyl group is attached to the remainder of the molecule. Heteroalkyl is an uncyclized chain. Examples include, but are not limited to: —$CH_2$—$CH_2$—O—$CH_3$, —$CH_2$—$CH_2$—NH—$CH_3$, —$CH_2$—$CH_2$—N($CH_3$)—$CH_3$, —$CH_2$—S—$CH_2$—$CH_3$, —$CH_2$—$CH_2$, —S(O)—$CH_3$, —$CH_2$—$CH_2$—S(O)$_2$—$CH_3$, —CH=CH—O—$CH_3$, —Si($CH_3$)$_3$, —$CH_2$—CH=N—$OCH_3$, —CH=CH—N($CH_3$)—$CH_3$, —O—$CH_3$, —O—$CH_2$—$CH_3$, and —CN. Up to two or three heteroatoms may be consecutive, such as, for example, —$CH_2$—NH—$OCH_3$ and —$CH_2$—O—Si($CH_3$)$_3$. A heteroalkyl moiety may include one heteroatom (e.g., O, N, S, Si, or P). A heteroalkyl moiety may include two optionally different heteroatoms (e.g., O, N, S, Si, or P). A heteroalkyl moiety may include three optionally different heteroatoms (e.g., O, N, S, Si, or P). A heteroalkyl moiety may include four optionally different heteroatoms (e.g., O, N, S, Si, or P). A heteroalkyl moiety may include five optionally different heteroatoms (e.g., O, N, S, Si, or P). A heteroalkyl moiety may include up to 8 optionally different heteroatoms (e.g., O, N, S, Si, or P).

Similarly, the term "heteroalkylene," by itself or as part of another substituent, means, unless otherwise stated, a divalent radical derived from heteroalkyl, as exemplified, but not limited by, —$CH_2$—$CH_2$—S—$CH_2$—$CH_2$— and —$CH_2$—S—$CH_2$—$CH_2$—NH—$CH_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —$C(O)_2$R'— represents both —$C(O)_2$R'— and —R'$C(O)_2$—. As described above, heteroalkyl groups, as used herein, include those groups that are attached to the remainder of the molecule through a heteroatom, such as —C(O)R', —C(O)NR', —NR'R", —OR', —SR', and/or —$SO_2$R'. Where "heteroalkyl" is recited, followed by recitations of specific heteroalkyl groups, such as —NR'R" or the like, it will be understood that the terms heteroalkyl and —NR'R" are not redundant or mutually exclusive. Rather, the specific heteroalkyl groups are recited to add clarity. Thus, the term "heteroalkyl" should not be interpreted herein as excluding specific heteroalkyl groups, such as —NR'R" or the like.

The terms "cycloalkyl" and "heterocycloalkyl," by themselves or in combination with other terms, mean, unless otherwise stated, cyclic versions of "alkyl" and "heteroalkyl," respectively. Cycloalkyl and heterocycloalkyl are not aromatic. Additionally, for heterocycloalkyl, a heteroatom can occupy the position at which the heterocycle is attached to the remainder of the molecule. Examples of cycloalkyl include, but are not limited to, cyclopropyl, cyclobutyl, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like. A "cycloalkylene" and a "heterocycloalkylene," alone or as part of another substituent, means a divalent radical derived from a cycloalkyl and heterocycloalkyl, respectively.

The terms "halo" or "halogen," by themselves or as part of another substituent, mean, unless otherwise stated, a fluorine, chlorine, bromine, or iodine atom. Additionally, terms such as "haloalkyl" are meant to include monohaloalkyl and polyhaloalkyl. For example, the term "halo($C_1$-$C_4$)alkyl" includes, but is not limited to, fluoromethyl, difluoromethyl, trifluoromethyl, 2,2,2-trifluoroethyl, 4-chlorobutyl, 3-bromopropyl, and the like.

The term "acyl" means, unless otherwise stated, —C(O)R where R is a substituted or unsubstituted alkyl, substituted or unsubstituted cycloalkyl, substituted or unsubstituted heteroalkyl, substituted or unsubstituted heterocycloalkyl, substituted or unsubstituted aryl, or substituted or unsubstituted heteroaryl.

The term "aryl" means, unless otherwise stated, a polyunsaturated, aromatic, hydrocarbon substituent, which can be a single ring or multiple rings (preferably from 1 to 3 rings) that are fused together (i.e., a fused ring aryl) or linked covalently. A fused ring aryl refers to multiple rings fused together wherein at least one of the fused rings is an aryl ring. The term "heteroaryl" refers to aryl groups (or rings) that contain at least one heteroatom such as N, O, or S, wherein the nitrogen and sulfur atoms are optionally oxidized, and the nitrogen atom(s) are optionally quaternized. Thus, the term "heteroaryl" includes fused ring heteroaryl groups (i.e., multiple rings fused together wherein at least one of the fused rings is a heteroaromatic ring). A 5,6-fused ring heteroarylene refers to two rings fused together, wherein one ring has 5 members and the other ring has 6 members, and wherein at least one ring is a heteroaryl ring. Likewise, a 6,6-fused ring heteroarylene refers to two rings fused together, wherein one ring has 6 members and the other ring has 6 members, and wherein at least one ring is a heteroaryl ring. And a 6,5-fused ring heteroarylene refers to two rings fused together, wherein one ring has 6 members and the other ring has 5 members, and wherein at least one ring is a heteroaryl ring. A heteroaryl group can be attached to the remainder of the molecule through a carbon or heteroatom. Non-limiting examples of aryl and heteroaryl groups include phenyl, naphthyl, pyrrolyl, pyrazolyl, pyridazinyl, triazinyl, pyrimidinyl, imidazolyl, pyrazinyl, purinyl, oxazolyl, isoxazolyl, thiazolyl, furyl, thienyl, pyridyl, pyrimidyl, benzothiazolyl, benzoxazoyl benzimidazolyl, benzofuran, isobenzofuranyl, indolyl, isoindolyl, benzothiophenyl, isoquinolyl, quinoxalinyl, quinolyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below. An "arylene" and a "heteroarylene," alone or as part of another substituent, mean a divalent radical derived from an aryl and heteroaryl, respectively. A heteroaryl group substituent may be —O— bonded to a ring heteroatom nitrogen.

Spirocyclic rings are two or more rings wherein adjacent rings are attached through a single atom. The individual rings within spirocyclic rings may be identical or different. Individual rings in spirocyclic rings may be substituted or unsubstituted and may have different substituents from other individual rings within a set of spirocyclic rings. Possible substituents for individual rings within spirocyclic rings are the possible substituents for the same ring when not part of spirocyclic rings (e.g. substituents for cycloalkyl or heterocycloalkyl rings). Spirocyclic rings may be substituted or unsubstituted cycloalkyl, substituted or unsubstituted cycloalkylene, substituted or unsubstituted heterocycloalkyl or substituted or unsubstituted heterocycloalkylene and individual rings within a spirocyclic ring group may be any of the immediately previous list, including having all rings of one type (e.g. all rings being substituted heterocycloalkylene wherein each ring may be the same or different substituted heterocycloalkylene). When referring to a spirocyclic ring system, heterocyclic spirocyclic rings means a spirocyclic rings wherein at least one ring is a heterocyclic ring and wherein each ring may be a different ring. When referring to a spirocyclic ring system, substituted spirocyclic rings means that at least one ring is substituted and each substituent may optionally be different.

The symbol "⌇" denotes the point of attachment of a chemical moiety to the remainder of a molecule or chemical formula. In embodiments, the symbol "⸹" is the attachment point of a covalent linker moiety. In embodiments, ⸹ is the attachment point of a terminal moiety.

The term "oxo," as used herein, means an oxygen that is double bonded to a carbon atom.

The term "alkylarylene" as an arylene moiety covalently bonded to an alkylene moiety (also referred to herein as an alkylene linker). In embodiments, the alkylarylene group has the formula:

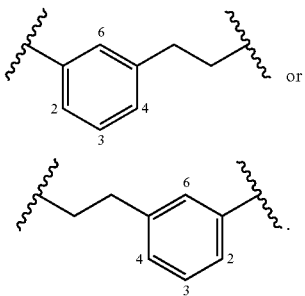

or

An alkylarylene moiety may be substituted (e.g. with a substituent group) on the alkylene moiety or the arylene linker (e.g. at carbons 2, 3, 4, or 6) with halogen, oxo, —N$_3$, —CF$_3$, —CCl$_3$, —CBr$_3$, —CI$_3$, —CN, —CHO, —OH, —NH$_2$, —COOH, —CONH$_2$, —NO$_2$, —SH, —SO$_2$CH$_3$ —SO$_3$H, —OSO$_3$H, —SO$_2$NH$_2$, —NHNH$_2$, —ONH$_2$, —NHC(O)NHNH$_2$, substituted or unsubstituted C$_1$-C$_5$ alkyl or substituted or unsubstituted 2 to 5 membered heteroalkyl). In embodiments, the alkylarylene is unsubstituted.

Each of the above terms (e.g., "alkyl," "heteroalkyl," "cycloalkyl," "heterocycloalkyl," "aryl," and "heteroaryl") includes both substituted and unsubstituted forms of the indicated radical. Preferred substituents for each type of radical are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) can be one or more of a variety of groups selected from, but not limited to, —OR', =O, =NR', =N—OR', —NR'R", —SR', -halogen, —SiR'R"R''', —OC(O)R', —C(O)R', —CO$_2$R', —CONR'R", —OC(O)NR'R", —NR"C(O)R', —NR'—C(O)NR"R''', —NR"C(O)$_2$R', —NR—C(NR'R"R''')=NR"", —NR—C(NR'R")=NR''', —S(O)R', —S(O)$_2$R', —S(O)$_2$NR'R", —NRSO$_2$R', —NR'NR"R''', —ONR'R", —NR'C(O)NR"NR'''R"", —CN, —NO$_2$, —NR'SO$_2$R", —NR'C(O)R", —NR'C(O)—OR", —NR'OR", in a number ranging from zero to (2m'+1), where m' is the total number of carbon atoms in such radical. R, R', R", R''', and R"" each preferably independently refer to hydrogen, substituted or unsubstituted heteroalkyl, substituted or unsubstituted cycloalkyl, substituted or unsubstituted heterocycloalkyl, substituted or unsubstituted aryl (e.g., aryl substituted with 1-3 halogens), substituted or unsubstituted heteroaryl, substituted or unsubstituted alkyl, alkoxy, or thioalkoxy groups, or arylalkyl groups. When a compound described herein includes more than one R group, for example, each of the R groups is independently selected as are each R', R", R''', and R"" group when more than one of these groups is present. When R' and R" are attached to the same nitrogen atom, they can be combined with the nitrogen atom to form a 4-, 5-, 6-, or 7-membered ring. For example, —NR'R" includes, but is not limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like).

Similar to the substituents described for the alkyl radical, substituents for the aryl and heteroaryl groups are varied and are selected from, for example: —OR', —NR'R", —SR', -halogen, —SiR'R"R''', —OC(O)R', —C(O)R', —CO$_2$R', —CONR'R", —OC(O)NR'R", —NR"C(O)R', —NR'—C(O)NR"R''', —NR"C(O)$_2$R', —NR—C(NR'R"R''')=NR"", —NR—C(NR'R")=NR''', —S(O)R', —S(O)$_2$R', —S(O)$_2$NR'R", —NRSO$_2$R', —NR'NR"R''', —ONR'R", —NR'C(O)NR"NR'''R"", —CN, —NO$_2$, —R', —N$_3$, —CH(Ph)$_2$, fluoro(C$_1$-C$_4$)alkoxy, and fluoro(C$_1$-C$_4$)alkyl, —NR'SO$_2$R", —NR'C(O)R", —NR'C(O)—OR", —NR'OR", in a number ranging from zero to the total number of open valences on the aromatic ring system; and where R', R", R''', and R"" are preferably independently selected from hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl. When a compound described herein includes more than one R group, for example, each of the R groups is independently selected as are each R', R", R''', and R"" groups when more than one of these groups is present.

Substituents for rings (e.g. cycloalkyl, heterocycloalkyl, aryl, heteroaryl, cycloalkylene, heterocycloalkylene, arylene, or heteroarylene) may be depicted as substituents on the ring rather than on a specific atom of a ring (commonly referred to as a floating substituent). In such a case, the substituent may be attached to any of the ring atoms (obeying the rules of chemical valency) and in the case of fused rings or spirocyclic rings, a substituent depicted as associated with one member of the fused rings or spirocyclic rings (a floating substituent on a single ring), may be a substituent on any of the fused rings or spirocyclic rings (a floating substituent on multiple rings). When a substituent is attached to a ring, but not a specific atom (a floating substituent), and a subscript for the substituent is an integer greater than one, the multiple substituents may be on the same atom, same ring, different atoms, different fused rings, different spirocyclic rings, and each substituent may optionally be different. Where a point of attachment of a ring to the remainder of a molecule is not limited to a single atom (a floating substituent), the attachment point may be any atom of the ring and in the case of a fused ring or spirocyclic ring, any atom of any of the fused rings or spirocyclic rings while obeying the rules of chemical valency. Where a ring, fused rings, or spirocyclic rings contain one or more ring heteroatoms and the ring, fused rings, or spirocyclic rings are shown with one more floating substituents (including, but not limited to, points of attachment to the remainder of the molecule), the floating substituents may be bonded to the heteroatoms. Where the ring heteroatoms are shown bound to one or more hydrogens (e.g. a ring nitrogen with two bonds to ring atoms and a third bond to a hydrogen) in the structure or formula with the floating substituent, when the heteroatom is bonded to the floating substituent, the substituent will be understood to replace the hydrogen, while obeying the rules of chemical valency.

Two or more substituents may optionally be joined to form aryl, heteroaryl, cycloalkyl, or heterocycloalkyl groups. Such so-called ring-forming substituents are typically, though not necessarily, found attached to a cyclic base structure. In one embodiment, the ring-forming substituents are attached to adjacent members of the base structure. For example, two ring-forming substituents attached to adjacent members of a cyclic base structure create a fused ring structure. In another embodiment, the ring-forming substituents are attached to a single member of the base structure. For example, two ring-forming substituents attached to a single member of a cyclic base structure create a spirocyclic structure. In yet another embodiment, the ring-forming substituents are attached to non-adjacent members of the base structure.

Two of the substituents on adjacent atoms of the aryl or heteroaryl ring may optionally form a ring of the formula -T-C(O)—(CRR')$_q$—U—, wherein T and U are independently —NR—, —O—, —CRR'—, or a single bond, and q is an integer of from 0 to 3. Alternatively, two of the substituents on adjacent atoms of the aryl or heteroaryl ring may optionally be replaced with a substituent of the formula -A-(CH$_2$)$_r$—B—, wherein A and B are independently —CRR'—, —O—, —NR—, —S—, —S(O)—, —S(O)$_2$—, —S(O)$_2$NR'—, or a single bond, and r is an integer of from 1 to 4. One of the single bonds of the new ring so formed may optionally be replaced with a double bond. Alternatively, two of the substituents on adjacent atoms of the aryl or heteroaryl ring may optionally be replaced with a substituent of the formula —(CRR')$_s$—X'—(C"R"R''')$_d$—, where s and d are independently integers of from 0 to 3, and X' is —O—, —NR'—, —S—, —S(O)—, —S(O)$_2$—, or —S(O)$_2$NR'—. The substituents R, R', R", and R''' are preferably independently selected from hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl.

As used herein, the terms "heteroatom" or "ring heteroatom" are meant to include oxygen (O), nitrogen (N), sulfur (S), phosphorus (P), and silicon (Si).

A "substituent group," as used herein, means a group selected from the following moieties:
(A) oxo, halogen, —CF$_3$, —CN, —OH, —NH$_2$, —COOH, —CONH$_2$, —NO$_2$, —SH, —SO$_3$H, —SO$_4$H, —SO$_2$NH$_2$, —NHNH$_2$, —ONH$_2$, —NHC=(O)NHNH$_2$, —NHC=(O) NH$_2$, —NHSO$_2$H, —NHC=(O)H, —NHC(O)—OH, —NHOH, —OCF$_3$, —OCHF$_2$, unsubstituted alkyl, unsubstituted heteroalkyl, unsubstituted cycloalkyl, unsubstituted heterocycloalkyl, unsubstituted aryl, unsubstituted heteroaryl, and
(B) alkyl, heteroalkyl, cycloalkyl, heterocycloalkyl, aryl, heteroaryl, substituted with at least one substituent selected from:
(i) oxo, halogen, —CF$_3$, —CN, —OH, —NH$_2$, —COOH, —CONH$_2$, —NO$_2$, —SH, —SO$_3$H, —SO$_4$H, —SO$_2$NH$_2$, —NHNH$_2$, —ONH$_2$, —NHC=(O)NHNH$_2$, —NHC=(O) NH$_2$, —NHSO$_2$H, —NHC=(O)H, —NHC(O)—OH, —NHOH, —OCF$_3$, —OCHF$_2$, unsubstituted alkyl, unsubstituted heteroalkyl, unsubstituted cycloalkyl, unsubstituted heterocycloalkyl, unsubstituted aryl, unsubstituted heteroaryl, and
(ii) alkyl, heteroalkyl, cycloalkyl, heterocycloalkyl, aryl, heteroaryl, substituted with at least one substituent selected from:
(a) oxo, halogen, —CF$_3$, —CN, —OH, —NH$_2$, —COOH, —CONH$_2$, —NO$_2$, —SH, —SO$_3$H, —SO$_4$H, —SO$_2$NH$_2$, —NHNH$_2$, —ONH$_2$, —NHC=(O)NHNH$_2$, —NHC=(O) NH$_2$, —NHSO$_2$H, —NHC=(O)H, —NHC(O)—OH, —NHOH, —OCF$_3$, —OCHF$_2$, unsubstituted alkyl, unsubstituted heteroalkyl, unsubstituted cycloalkyl, unsubstituted heterocycloalkyl, unsubstituted aryl, unsubstituted heteroaryl, and
(b) alkyl, heteroalkyl, cycloalkyl, heterocycloalkyl, aryl, heteroaryl, substituted with at least one substituent selected from: oxo, halogen, —CF$_3$, —CN, —OH, —NH$_2$, —COOH, —CONH$_2$, —NO$_2$, —SH, —SO$_3$H, —SO$_4$H, —SO$_2$NH$_2$, —NHNH$_2$, —ONH$_2$, —NHC=(O)NHNH$_2$, —NHC=(O) NH$_2$, —NHSO$_2$H, —NHC=(O)H, —NHC(O)—OH, —NHOH, —OCF$_3$, —OCHF$_2$, unsubstituted alkyl, unsubstituted heteroalkyl, unsubstituted cycloalkyl, unsubstituted heterocycloalkyl, unsubstituted aryl, unsubstituted heteroaryl.

A "size-limited substituent" or "size-limited substituent group," as used herein, means a group selected from all of the substituents described above for a "substituent group," wherein each substituted or unsubstituted alkyl is a substituted or unsubstituted $C_1$-$C_{20}$ alkyl, each substituted or unsubstituted heteroalkyl is a substituted or unsubstituted 2 to 20 membered heteroalkyl, each substituted or unsubstituted cycloalkyl is a substituted or unsubstituted $C_3$-$C_8$ cycloalkyl, each substituted or unsubstituted heterocycloalkyl is a substituted or unsubstituted 3 to 8 membered heterocycloalkyl, each substituted or unsubstituted aryl is a substituted or unsubstituted $C_6$-$C_{10}$ aryl, and each substituted or unsubstituted heteroaryl is a substituted or unsubstituted 5 to 10 membered heteroaryl.

A "lower substituent" or "lower substituent group," as used herein, means a group selected from all of the substituents described above for a "substituent group," wherein each substituted or unsubstituted alkyl is a substituted or unsubstituted $C_1$-$C_8$ alkyl, each substituted or unsubstituted heteroalkyl is a substituted or unsubstituted 2 to 8 membered heteroalkyl, each substituted or unsubstituted cycloalkyl is a substituted or unsubstituted $C_3$-$C_7$ cycloalkyl, each substituted or unsubstituted heterocycloalkyl is a substituted or unsubstituted 3 to 7 membered heterocycloalkyl, each substituted or unsubstituted aryl is a substituted or unsubstituted $C_6$-$C_{10}$ aryl, and each substituted or unsubstituted heteroaryl is a substituted or unsubstituted 5 to 9 membered heteroaryl.

In some embodiments, each substituted group described in the compounds herein is substituted with at least one substituent group. More specifically, in some embodiments, each substituted alkyl, substituted heteroalkyl, substituted cycloalkyl, substituted heterocycloalkyl, substituted aryl, substituted heteroaryl, substituted alkylene, substituted heteroalkylene, substituted cycloalkylene, substituted heterocycloalkylene, substituted arylene, and/or substituted heteroarylene described in the compounds herein are substituted with at least one substituent group. In other embodiments, at least one or all of these groups are substituted with at least one size-limited substituent group. In other embodiments, at least one or all of these groups are substituted with at least one lower substituent group.

In other embodiments of the compounds herein, each substituted or unsubstituted alkyl may be a substituted or unsubstituted $C_1$-$C_{20}$ alkyl, each substituted or unsubstituted heteroalkyl is a substituted or unsubstituted 2 to 20 membered heteroalkyl, each substituted or unsubstituted cycloalkyl is a substituted or unsubstituted $C_3$-$C_8$ cycloalkyl, each substituted or unsubstituted heterocycloalkyl is a substituted or unsubstituted 3 to 8 membered heterocycloalkyl, each substituted or unsubstituted aryl is a substituted or unsubstituted $C_6$-$C_{10}$ aryl, and/or each substituted or unsubstituted heteroaryl is a substituted or unsubstituted 5 to 10 membered heteroaryl. In some embodiments of the compounds herein, each substituted or unsubstituted alkylene is a substituted or unsubstituted $C_1$-$C_{20}$ alkylene, each substituted or unsubstituted heteroalkylene is a substituted or unsubstituted 2 to 20 membered heteroalkylene, each substituted or unsubstituted cycloalkylene is a substituted or unsubstituted $C_3$-$C_8$ cycloalkylene, each substituted or unsubstituted heterocycloalkylene is a substituted or unsubstituted 3 to 8 membered heterocycloalkylene, each substituted or unsubstituted arylene is a substituted or unsubstituted $C_6$-$C_{10}$ arylene, and/or each substituted or unsubstituted heteroarylene is a substituted or unsubstituted 5 to 10 membered heteroarylene.

In some embodiments, each substituted or unsubstituted alkyl is a substituted or unsubstituted $C_1$-$C_8$ alkyl, each substituted or unsubstituted heteroalkyl is a substituted or unsubstituted 2 to 8 membered heteroalkyl, each substituted or unsubstituted cycloalkyl is a substituted or unsubstituted $C_3$-$C_7$ cycloalkyl, each substituted or unsubstituted heterocycloalkyl is a substituted or unsubstituted 3 to 7 membered heterocycloalkyl, each substituted or unsubstituted aryl is a substituted or unsubstituted $C_6$-$C_{10}$ aryl, and/or each substituted or unsubstituted heteroaryl is a substituted or unsubstituted 5 to 9 membered heteroaryl. In some embodiments, each substituted or unsubstituted alkylene is a substituted or unsubstituted $C_1$-$C_8$ alkylene, each substituted or unsubstituted heteroalkylene is a substituted or unsubstituted 2 to 8 membered heteroalkylene, each substituted or unsubstituted cycloalkylene is a substituted or unsubstituted $C_3$-$C_7$ cycloalkylene, each substituted or unsubstituted heterocycloalkylene is a substituted or unsubstituted 3 to 7 membered heterocycloalkylene, each substituted or unsubstituted arylene is a substituted or unsubstituted $C_6$-$C_{10}$ arylene, and/or each substituted or unsubstituted heteroarylene is a substituted or unsubstituted 5 to 9 membered heteroarylene. In some embodiments, the compound is a chemical species set forth in the Examples section, figures, or tables below.

Certain compounds of the present invention possess asymmetric carbon atoms (optical or chiral centers) or double bonds; the enantiomers, racemates, diastereomers, tautomers, geometric isomers, stereoisometric forms that may be defined, in terms of absolute stereochemistry, as (R)- or (S)- or, as (D)- or (L)- for amino acids, and individual isomers are encompassed within the scope of the present invention. The compounds of the present invention do not include those that are known in art to be too unstable to synthesize and/or isolate. The present invention is meant to include compounds in racemic and optically pure forms. Optically active (R)- and (S)-, or (D)- and (L)-isomers may be prepared using chiral synthons or chiral reagents, or resolved using conventional techniques. When the compounds described herein contain olefinic bonds or other centers of geometric asymmetry, and unless specified otherwise, it is intended that the compounds include both E and Z geometric isomers.

As used herein, the term "isomers" refers to compounds having the same number and kind of atoms, and hence the same molecular weight, but differing in respect to the structural arrangement or configuration of the atoms.

The term "tautomer," as used herein, refers to one of two or more structural isomers which exist in equilibrium and which are readily converted from one isomeric form to another.

It will be apparent to one skilled in the art that certain compounds of this invention may exist in tautomeric forms, all such tautomeric forms of the compounds being within the scope of the invention.

Unless otherwise stated, structures depicted herein are also meant to include all stereochemical forms of the structure; i.e., the R and S configurations for each asymmetric center. Therefore, single stereochemical isomers as well as enantiomeric and diastereomeric mixtures of the present compounds are within the scope of the invention.

Unless otherwise stated, structures depicted herein are also meant to include compounds which differ only in the presence of one or more isotopically enriched atoms. For example, compounds having the present structures except for the replacement of a hydrogen by a deuterium or tritium, or the replacement of a carbon by $^{13}$C- or $^{14}$C-enriched carbon are within the scope of this invention.

The compounds of the present invention may also contain unnatural proportions of atomic isotopes at one or more of the atoms that constitute such compounds. For example, the compounds may be radiolabeled with radioactive isotopes, such as for example tritium ($^3$H), iodine-125 ($^{125}$I), or carbon-14 ($^{14}$C). All isotopic variations of the compounds of the present invention, whether radioactive or not, are encompassed within the scope of the present invention.

It should be noted that throughout the application that alternatives are written in Markush groups, for example, each amino acid position that contains more than one possible amino acid. It is specifically contemplated that each member of the Markush group should be considered separately, thereby comprising another embodiment, and the Markush group is not to be read as a single unit.

"Analog," or "analogue" is used in accordance with its plain ordinary meaning within Chemistry and Biology and refers to a chemical compound that is structurally similar to another compound (i.e., a so-called "reference" compound) but differs in composition, e.g., in the replacement of one atom by an atom of a different element, or in the presence of a particular functional group, or the replacement of one functional group by another functional group, or the absolute stereochemistry of one or more chiral centers of the reference compound. Accordingly, an analog is a compound that is similar or comparable in function and appearance but not in structure or origin to a reference compound.

The terms "a" or "an," as used in herein means one or more. In addition, the phrase "substituted with a[n]," as used herein, means the specified group may be substituted with one or more of any or all of the named substituents. For example, where a group, such as an alkyl or heteroaryl group, is "substituted with an unsubstituted $C_1$-$C_{20}$ alkyl, or unsubstituted 2 to 20 membered heteroalkyl," the group may contain one or more unsubstituted $C_1$-$C_{20}$ alkyls, and/or one or more unsubstituted 2 to 20 membered heteroalkyls.

Moreover, where a moiety is substituted with an R substituent, the group may be referred to as "R-substituted." Where a moiety is R-substituted, the moiety is substituted with at least one R substituent and each R substituent is optionally different. Where a particular R group is present in the description of a chemical genus (such as Formula (I)), a Roman alphabetic symbol may be used to distinguish each appearance of that particular R group. For example, where multiple $R^{13}$ substituents are present, each $R^{13}$ substituent may be distinguished as $R^{13A}$, $R^{13B}$, $R^{13C}$, $R^{13D}$, etc., wherein each of $R^{13A}$, $R^{13B}$, $R^{13C}$, $R^{13D}$, etc. is defined within the scope of the definition of $R^{13}$ and optionally differently.

Descriptions of compounds of the present invention are limited by principles of chemical bonding known to those skilled in the art. Accordingly, where a group may be substituted by one or more of a number of substituents, such substitutions are selected so as to comply with principles of chemical bonding and to give compounds which are not inherently unstable and/or would be known to one of ordinary skill in the art as likely to be unstable under ambient conditions, such as aqueous, neutral, and several known physiological conditions. For example, a heterocycloalkyl or heteroaryl is attached to the remainder of the molecule via a ring heteroatom in compliance with principles of chemical bonding known to those skilled in the art thereby avoiding inherently unstable compounds.

The neutral forms of the compounds are preferably regenerated by contacting the salt with a base or acid and isolating the parent compound in the conventional manner. The parent form of the compound may differ from the various salt forms in certain physical properties, such as solubility in polar solvents.

Certain compounds (e.g., metal organic framework linkers, metal binding ligand moieties, polymer composition) of the present invention can exist in unsolvated forms as well as solvated forms, including hydrated forms. In general, the solvated forms are equivalent to unsolvated forms and are encompassed within the scope of the present invention. Certain compounds of the present invention may exist in multiple crystalline or amorphous forms. In general, all physical forms are equivalent for the uses contemplated by the present invention and are intended to be within the scope of the present invention.

"Contacting" is used in accordance with its plain ordinary meaning and refers to the process of allowing at least two distinct species (e.g. polymerized metal organic framework, metal, metal organic framework linker, gas molecules) to become sufficiently proximal to react, interact or physically touch. It should be appreciated; however, the resulting reaction product can be produced directly from a reaction between the added reagents or from an intermediate from one or more of the added reagents that can be produced in the reaction mixture.

The term "contacting" may include allowing two species to react, interact, or physically touch, wherein the two species may be a polymerized metal organic framework as described herein and a gas (e.g., carbon dioxide). In some embodiments contacting includes allowing a polymerized metal organic framework described herein to interact (e.g., bind, adsorb) with a gas molecule. In some embodiments contacting includes allowing a metal described herein to interact (e.g., bind, adsorb) with a gas molecule. In some embodiments contacting includes allowing a metal organic framework linker described herein to interact (e.g., bind, adsorb) with a gas molecule.

"Control" or "control experiment" is used in accordance with its plain ordinary meaning and refers to an experiment in which the subjects or reagents of the experiment are treated as in a parallel experiment except for omission of a procedure, reagent, or variable of the experiment. In some instances, the control is used as a standard of comparison in evaluating experimental effects. In some embodiments, a control is the measurement of the activity of a protein in the absence of a compound as described herein (including embodiments and examples).

The terms "metal organic framework" and "MOF" are used in accordance with their ordinary meaning in chemistry and refer to a composition including metal atoms coordinated to organic ligands (e.g., metal organic framework linkers). Metal organic frameworks are periodic coordinated networks of metal nodes connected via ligands. Organic ligands (e.g., metal organic framework linkers), metal ion nodes, and optionally additional ions (e.g., $O^{2-}$), may be referred to collectively as secondary building units (SBUs). A non-limiting example of an SBU is [Zn4O(M)x], where M is a metal organic framework ligand and x is an integer from 1 to 6. Examples of SBUs may be found in U.S. Pat. No. 7,196,210, Eddaoudi et al. (Acc. Chem. Res. 2001, 34, 319-330) or Tranchemontagne et al. (Chem. Soc. Rev., 2009, 38, 1257-1283), which are herein incorporated by reference in their entirety. In embodiments, the SBU includes the metal (e.g., Zn) and the metal binding ligands (e.g., —COOH). In embodiments, the SBU includes the metal and the metal organic framework linkers. In embodiments, the SBU includes the metal ion node. In embodiments, the SBU includes a solvent molecule (e.g., water, dimethylformamide, methanol, ethanol).

These crystalline frameworks are porous one-, two-, or three-dimensional structures which may possess high Brunauer-Emmett-Teller (BET) surface areas (e.g., 2000 to 7000 $m^2\ g^{-1}$). In embodiments, the BET surface area is about 200 to about 1000 $m^2\ g^{-1}$. In embodiments, a metal organic framework includes a plurality of metal organic framework linkers, the linkers being the same or optionally different. The terms "polymerized metal organic framework" and "polyMOF" as used herein refer to a composition including metal atoms coordinated to ligands (e.g., a MOF), wherein the ligands are bound together. In embodiments, a polymerized metal organic framework includes a plurality of metal organic framework linkers bound (e.g., covalently bonded) together by a plurality of covalent linker moieties. Non-limiting examples of MOFs may be found in Roswell et al. (Microporous and Mesoporous Materials 73 (2004) 3-14), US2005/0192175, or WO 02/088148, which are herein incorporated by reference in their entirety. In embodiments, a MOF may retain the basic building blocks (i.e. SBUs) and connectivity of their crystalline counterparts, though they lack any long-range periodic order, and may be referred to as amorphous metal organic frameworks. In embodiments, a metal organic framework forms a crystal.

The term "metal organic framework linker" or "ligand" is used in accordance with its ordinary meaning in chemistry and MOF chemistry and refers to the organic ligand capable of connecting a metal (e.g., metal atom, metal ion nodes within SBUs, metal ion nodes) in a MOF via metal binding ligand moieties or metal binding atom. In embodiments, the metal organic framework linker is covalently connected (e.g., directly or indirectly) to a different metal organic framework linker. In embodiments, a first metal organic framework linker is covalently connected to a second metal organic framework linker via a covalent linker moiety (e.g., a polymer). In embodiments, a first metal organic framework linker is covalently connected to a second identical metal organic framework linker. In embodiments, a metal organic framework linker is divalent. In embodiments, a metal organic framework linker is substituted terephtalic acid. In embodiments, a metal organic framework linker includes ditopic or polytopic metal binding ligand moieties. Exemplary metal organic framework linkers may be found in U.S. Pat. No. 7,196,210, which is herein incorporated by reference in its entirety.

The term "covalent linker moiety" refers to a divalent chemical moiety covalently bonded to at least one metal organic framework linker (e.g., one or two) or a terminal moiety. In embodiments, a covalent linker moiety covalently binds a first metal organic framework linker to a second metal organic framework linker. In embodiments, a covalent linker moiety covalently binds a terminal moiety to a metal organic framework linker. In embodiments, a covalent linker moiety is a monomer that covalently binds to other monomer molecules (such as other covalent linker moieties that are the same or different) to form a polymer (e.g., branched polymer, unbranched polymer). In embodiments, a plurality of covalent linker moieties includes a first block of covalent linker moieties bonded to a second block of covalent linker moieties (e.g., -PEG-) which is bonded to at least one metal organic framework linker (e.g., one or two) or a terminal moiety. In embodiments, a covalent linker includes a block of alkylene moieties connected to a second block of heteroalkylene moieties.

The term "polymer" refers to a molecule including repeating subunits (e.g., polymerized monomers). For example, polymeric molecules may be based upon polyethylene glycol (PEG), tetraethylene glycol (TEG), polyvinylpyrrolidone (PVP), poly(xylene), or poly(p-xylylene).

The term "block copolymer" is used in accordance with its ordinary meaning and refers to two or more portions (e.g., blocks) of polymerized monomers linked by a covalent bond. In embodiments, a block copolymer is a repeating pattern of polymers. For example, a block copolymer has the formula: -B-B-B-B-B-B-A-A-A-A-A-, where 'B' is a first subunit and 'A' is a second subunit covalently bound together.

The term "polymerizable monomer" is used in accordance with its meaning in the art of polymer chemistry and refers to a compound that may covalently bind chemically to other monomer molecules (such as other polymerizable monomers that are the same or different) to form a polymer.

The term "isostructural" is used in accordance with its plain ordinary meaning and refers to two or more substances (e.g., polymerized metal organic framework, metal organic framework, compound) that have the same or a corresponding atomic positions. In embodiments, a polymerized metal organic framework is isostructural with a metal organic framework when the atomic positions of the polymerized metal organic framework are greater than 99% in alignment (e.g., the individual MOF ligands of the polyMOF are in a spatial relationship to each other that is identical to the spatial relationship of the individual MOF ligands in the MOF) with the atomic positions of the metal organic framework. In embodiments, the atomic positions are about 60%, 65%, 70%, 75%, 80%, 85%, 90%, 91%, 92%, 93%, 94%, 95%, 96%, 97%, 98%, 99%, or higher in alignment. In embodiments, two or more substances are isostructural if they have the same crystal structure.

The term "metal binding ligand moiety" as used herein refers to a chemical moiety capable of coordinating (e.g., bonding) to a metal. Non limiting examples of a metal binding ligand moiety include —COOH, —OH, —NH$_2$, —SH, and —CN.

The term "plurality" is used in accordance with its ordinary meaning and refers to more than one. In embodiments, a plurality may be expressed using brackets and an integer (e.g., n). In embodiments, a plurality is more than one of the same.

The terms "crystal" or "crystalline" are used in accordance with their ordinary meaning and refer a solid material wherein constituents, (e.g., atoms) are arranged in a highly ordered (e.g., repetitive, periodic) lattice. A crystal face, as used herein, refers to an external plane (e.g. surface) of the crystal.

The term "crystal habit" is used in accordance with its ordinary meaning in mineralogy, and refers to the characteristic external shape of a crystalline material (e.g., polymerized metal organic framework). Specific crystal habits may be found within Hammond, C. The Basics of Crystallography and Diffraction. New York Oxford University Press, 2001, which is herein incorporated by reference in its entirety The term "space group" is used in accordance with its ordinary meaning in crystallography and refers to the symmetry of a crystalline substance (e.g., polymerized metal organic framework). A comprehensive list of the crystallographic space groups may be found at "The 230 3-Dimensional Space Groups" http://pd.chem.ucl.ac.uk/pdnn/symm3/allsgp.htm, which is herein incorporated by reference in its entirety.

II. Compounds

In an aspect is provided a polymerized metal organic framework including a plurality of metal organic framework linkers bound together by a plurality of covalent linker moieties, wherein each metal organic framework linker includes at least 2 metal binding ligand moiety of each metal organic framework linker or at least 2 metal donor atoms of each metal organic framework linker; and at least 1 metal binding ligand moieties is bound to a metal atom or at least 1 of the metal donor atoms is bound to a metal atom. In embodiments, the polymerized metal organic framework includes multiple metal atoms. In embodiments, each of the metal binding ligand moieties of each metal organic framework linker is bound to a metal atom or each of the metal donor atoms is bound to a metal atom. In embodiments, only 1 moiety of each metal organic framework linker is bound to a metal atom. In embodiments, only 1 of the metal donor atoms is bound to a metal atom. In embodiments, each metal organic framework linker is identical. In embodiments, each metal organic framework linker is optionally different. In embodiments, the plurality of metal organic framework linkers is uniformly distributed throughout the polymerized metal organic framework. In embodiments, the plurality of metal organic framework linkers is periodically repeated throughout the polymerized metal organic framework. In embodiments, the polymerized metal organic framework is crystalline. In embodiments, the polymerized metal organic framework forms a crystal. In embodiments, the polymerized metal organic framework is partially crystalline (e.g., 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 99.9%).

In embodiments, the polymerized metal organic framework includes a first block of a plurality metal organic framework linkers covalently bound to a second block of a plurality metal organic framework linkers by a plurality of covalent linker moieties. In embodiments, the first block includes identical metal organic framework linkers as the second block of metal organic framework linkers. In embodiments, the first block includes different metal organic framework linkers from the second block of metal organic framework linkers.

In embodiments, the plurality of metal organic framework linkers and the plurality of covalent linker moieties together form an unbranched polymer. In embodiments, the plurality of metal organic framework linkers and the plurality of covalent linker moieties together form a linear polymer. In embodiments, the plurality of metal organic framework linkers and the plurality of covalent linker moieties together form a linear polymer which is integrated throughout the polymerized metal organic framework. In embodiments, the plurality of metal organic framework linkers and the plurality of covalent linker moieties together form a branched polymer.

In embodiments, each metal organic framework linker includes 2 metal binding ligand moieties. In embodiments, each metal binding ligand moiety is the same. In embodiments, each metal binding ligand moiety is optionally different. In embodiments, each metal organic framework linker includes 3 metal binding ligand moieties. In embodiments, each metal organic framework linker includes 2 metal donor atoms. In embodiments, each metal organic framework linker includes 3 metal donor atoms. In embodiments, each metal organic framework linker includes 4 metal donor atoms. In embodiments, the metal and metal binding ligand moieties contacting (e.g., bonded to, interacting with, liganded to) the metal form a secondary building unit of the polymerized metal organic framework. In embodiments, the metal and metal donor atoms contacting (e.g., bonded to, interacting with, liganded to) the metal form a secondary building unit of the polymerized metal organic framework.

In embodiments, the plurality of metal organic framework linkers and the plurality of covalent linker moieties are connected in series. In embodiments, the plurality of metal organic framework linkers is connected in series by a plurality of covalent linker moieties. In embodiments, the plurality of metal organic framework linkers and the plurality of covalent linker moieties have the formula:

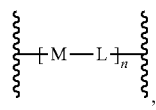

wherein M is a metal organic framework linker, L is a covalent linker moiety, n is an integer from 2 to 1000. In embodiments, § is the attachment point of a covalent linker moiety. In embodiments, § is the attachment point of a terminal moiety. In embodiments, polymerized metal organic framework have the formula:

$$Z^1 \text{-}\!\!\!-\!\!\!\text{-} M \text{-}\!\!\!\text{-} L \text{-}\!\!\!\text{-}_n Z^2,$$

wherein $Z^1$ and $Z^2$ are independently a monovalent terminal moiety.

The terminal moiety is a hydrogen, halogen, —CF$_3$, —CI$_3$, —CI$_3$, —CBr$_3$, —CHF$_2$, —CHCl$_2$, —CHI$_2$, —CHBr$_2$, —OCH$_2$F, —OCH$_2$Cl, —OCH$_2$I, —OCH$_2$Br, —OCHF$_2$, —CHCl$_2$, —OCHI$_2$, —OCHBr$_2$, —OCF$_3$, —OCl$_3$, —OCI$_3$, —OCBr$_3$, —CN, —OH, —NH$_2$, —COOH, —CONH$_2$, —NO$_2$, —SH, —SO$_3$H, —SO$_4$H, —SO$_2$NH$_2$, —NHNH$_2$, —ONH$_2$, —NHC=(O)NHNH$_2$, —NHC=(O)NH$_2$, —NHSO$_2$H, —NHC=(O)H, —NHC(O)—OH, —NHOH, substituted or unsubstituted alkyl (e.g., C$_1$-C$_8$, C$_1$-C$_6$, or C$_1$-C$_4$), substituted or unsubstituted heteroalkyl (e.g., 2 to 8 membered, 2 to 6 membered, or 2 to 4 membered), substituted or unsubstituted cycloalkyl (e.g., C$_3$-C$_8$, C$_3$-C$_6$, or C$_5$-C$_6$), substituted or unsubstituted heterocycloalkyl (e.g., 3 to 8 membered, 3 to 6 membered, or 5 to 6 membered), substituted or unsubstituted aryl (e.g., C$_6$-C$_{10}$, C$_{10}$, or phenyl), or substituted or unsubstituted heteroaryl (e.g., 5 to 10 membered, 5 to 9 membered, or 5 to 6 membered).

The terminal moiety is a hydrogen, halogen, —CF$_3$, —CI$_3$, —CI$_3$, —CBr$_3$, —CHF$_2$, —CHCl$_2$, —CHI$_2$, —CHBr$_2$, —OCH$_2$F, —OCH$_2$Cl, —OCH$_2$I, —OCH$_2$Br, —OCHF$_2$, —CHCl$_2$, —OCHI$_2$, —OCHBr$_2$, —OCF$_3$, —OCl$_3$, —OCI$_3$, —OCBr$_3$, —CN, —OH, —NH$_2$, —COOH, —CONH$_2$, —NO$_2$, —SH, —SO$_3$H, —SO$_4$H, —SO$_2$NH$_2$, —NHNH$_2$, —ONH$_2$, —NHC=(O)NHNH$_2$, —NHC=(O)NH$_2$, —NHSO$_2$H, —NHC=(O)H, —NHC(O)—OH, —NHOH, unsubstituted alkyl (e.g., C$_1$-C$_8$, C$_1$-C$_6$, or C$_1$-C$_4$), unsubstituted heteroalkyl (e.g., 2 to 8 membered, 2 to 6 membered, or 2 to 4 membered), unsubstituted cycloalkyl (e.g., C$_3$-C$_8$, C$_3$-C$_6$, or C$_5$-C$_6$), unsubstituted heterocycloalkyl (e.g., 3 to 8 membered, 3 to 6 membered, or 5 to 6 membered), unsubstituted aryl (e.g., C$_6$-C$_{10}$, C$_{10}$, or phenyl), or unsubstituted heteroaryl (e.g., 5 to 10 membered, 5 to 9 membered, or 5 to 6 membered).

In embodiments, the terminal moiety is hydrogen, -L-H, or -M', wherein M' is a monovalent metal organic framework linker, where hydrogen or -L-H are attached to the -M- of

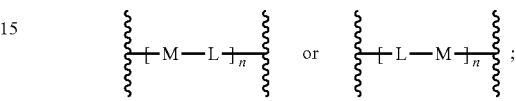

or where -M' is attached to the -L- of

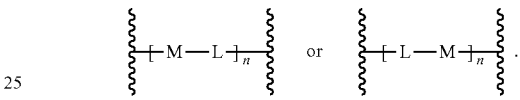

In embodiments, the plurality of metal organic framework linkers, the plurality of covalent linker moieties, and the terminal moiety have the formula:

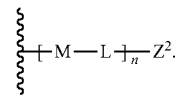

In embodiments, the plurality of metal organic framework linkers, the plurality of covalent linker moieties, and the terminal moiety have the formula:

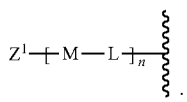

In embodiments, the plurality of metal organic framework linkers, the plurality of covalent linker moieties, and the terminal moiety have the formula:

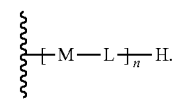

In embodiments, the plurality of metal organic framework linkers, the plurality of covalent linker moieties and the terminal moiety have the formula:

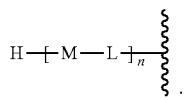

In embodiments, the plurality of metal organic framework linkers, the plurality of covalent linker moieties, and the terminal moiety have the formula:

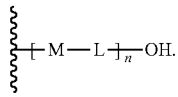

In embodiments, the plurality of metal organic framework linkers, the plurality of covalent linker moieties, and the terminal moiety have the formula:

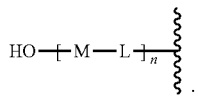

In embodiments, the plurality of metal organic framework linkers, the plurality of covalent linker moieties, and the terminal moiety have the formula:

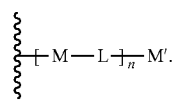

In embodiments, the plurality of metal organic framework linkers, the plurality of covalent linker moieties, and the terminal moiety have the formula:

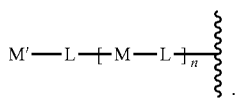

In embodiments, the terminal moiety is hydrogen, -L-H, or -M', wherein M' is a monovalent metal organic framework linker, where hydrogen or -L-H are attached to the -M- of

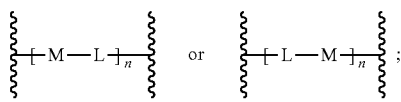

or n or where -M' is attached to the -L- of

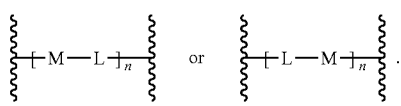

In embodiments, the terminal moiety has the formula:

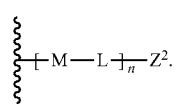

In embodiments, the terminal moiety has the formula:

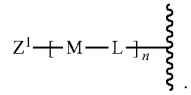

In embodiments, the terminal moiety has the formula:

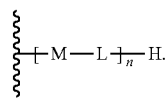

In embodiments, the terminal moiety has the formula:

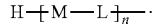

In embodiments, the terminal moiety has the formula:

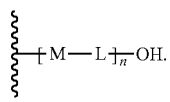

In embodiments, the terminal moiety has the formula:

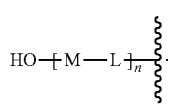

In embodiments, the terminal moiety has the formula:

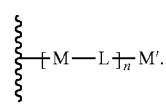

In embodiments, the terminal moiety has the formula:

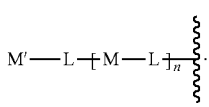

In embodiments, the first block of metal organic framework linkers is covalently bound to a terminal moiety. In embodiments, the second block of metal organic framework linkers is covalently bound to a terminal moiety. In embodiments, the terminal moiety is a monovalent metal organic framework linker (e.g., -M').

In embodiments the plurality of metal organic framework linkers and the plurality of covalent linker moieties is a polymer. In embodiments the plurality of covalent linker moieties includes a polymer. In embodiments the plurality of covalent linker moieties is a block copolymer. In embodiments each covalent linker moiety includes polyethylene glycol (PEG), tetraethylene glycol (TEG), polyvinylpyrrolidone (PVP), poly(xylene), or poly(p-xylylene). In embodiments each of covalent linker moiety are bound to the same metal organic framework linker. In embodiments each covalent linker moiety is bound to a different metal organic framework linker.

In embodiments, the metal atom is an element in Group 1, Group 2, Group 13, or a transition metal, lanthanide, or actinide found in the IUPAC Periodic Table of the Elements. Non-limiting metal atoms are those from chemical elements in the following groups: alkali metals (e.g., Li, Na, K, Rb, Cs, Fr), alkaline earth metals (e.g., Be, Mg, Ca, Sr, Ba, Ra), transition metals (e.g., Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg) and post-transition metals (e.g., Al, Ga, In, Tl, Sn, Pb, Bi), metalloids (e.g., B, Si, Ge, As, Sb, Te, Po), lanthanides (e.g., La, Ce, Pr, Nd, Pm, Sm, Eu, Gd, Tb, Dy, Ho, Er, Tm, Yb, Lu) and actinides (e.g., Ac, Th, Pa, U, Np, Pu, Am, Cm, Bk, Cf, Es, Fm, Md, No, Lr). In embodiments, the metal atom is Li, Na, Rb, Mg, Ca, Sr, Ba, Sc, Ti, Zr, Ta, Cr, Mo, W, Mn, Fe, Ru, Os, Co, Ni, Pd, Pt, Cu, Au, Zn, Al, Ga, In, Si, Ge, Sn, Bi, Cd, Mn, Tb, Gd, Ce, La, and Cr. In embodiments, the metal atom is Zn, Cu, Ti, V, Cr, Mn, or Fe. In embodiments, the metal atom is Zn or Cu. In embodiments, the metal atom is Zn. In embodiments, the metal atom is Cu.

In embodiments, the metal atom is a metal ion. In embodiments, the metal atom is Li+, Na+, K+, Rb+, Be2+, Mg2+, Ca2+, Sr2+, Ba2+, Sc3+, Y3+, Ti4+, Zr4+, Hf4+, V4+, V3+, V2+, Nb3+, Ta3+, Cr3+, Mo3+, W3+, Mn3+, Mn2+, Re3+, Re2+, Fe3+, Fe2+, Ru3+, Ru2+, Os3+, Os2+, Co3+, Co2+, Rh2+, Rh+, Ir2+, Ir+, Ni2+, Ni+, Pd2+, Pd+, Pt2+, Pt+, Cu2+, Cu+, Ag+, Au+, Zn2+, Cd2+, Hg2+, B3+, B5+, Al3+, Ga3+, In3+, Tl3+, Si4+, Si2+, Ge4+, Ge2+, Sn4+, Sn2+, Pb4+, Pb2+, As5+, As3+, As+, Sb5+, Sb3+, Sb+, Bi5+, Bi3+, or Bi+.

In embodiments, the metal organic framework linker has the formula:

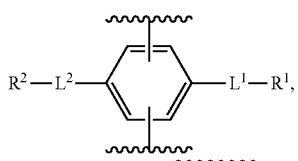

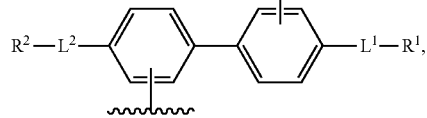

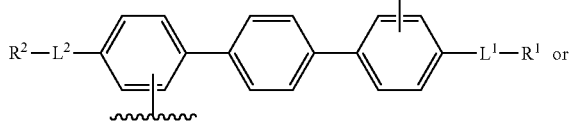 or

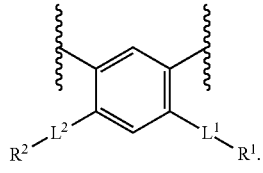

$L^1$ and $L^2$ are independently a bond, substituted or unsubstituted alkylene (e.g., $C_1$-$C_8$, $C_1$-$C_6$, or $C_1$-$C_4$), substituted or unsubstituted heteroalkylene (e.g., 2 to 8 membered, 2 to 6 membered, or 2 to 4 membered), substituted or unsubstituted cycloalkylene (e.g., $C_3$-$C_8$, $C_3$-$C_6$, or $C_5$-$C_6$), substituted or unsubstituted heterocycloalkylene (e.g., 3 to 8 membered, 3 to 6 membered, or 5 to 6 membered), substituted or unsubstituted arylene (e.g., $C_6$-$C_{10}$, $C_{10}$, or phenylene), or substituted or unsubstituted heteroarylene (e.g., 5 to 10 membered, 5 to 9 membered, or 5 to 6 membered). $R^1$ and $R^2$ are independently a metal binding ligand moiety. In embodiments, the symbol '§' is the attachment point of a covalent linker moiety.

In embodiments, $L^1$ and $L^2$ are independently a bond, substituted or unsubstituted alkylene, or substituted or unsubstituted heteroalkylene.

In another aspect is provided a polymer composition including a plurality of ligands bound together by a plurality of polymerized monomers, wherein each ligand comprises at least 2 metal binding ligand moieties or at least 2 metal donor atoms. In embodiments, the ligand has the formula:

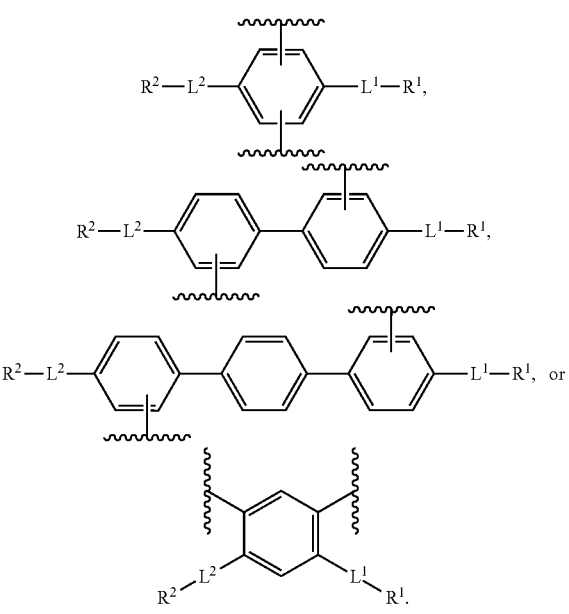

In embodiments, the metal organic framework linker has the formula:

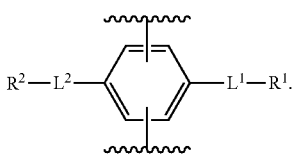

In embodiments, the metal organic framework linker has the formula:

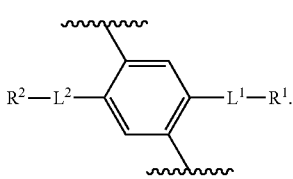

In embodiments, the metal organic framework linker has the formula:

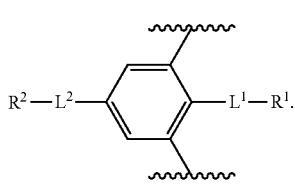

In embodiments, the metal organic framework linker has the formula:

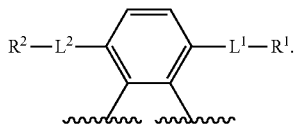

In embodiments, the metal organic framework linker has the formula:

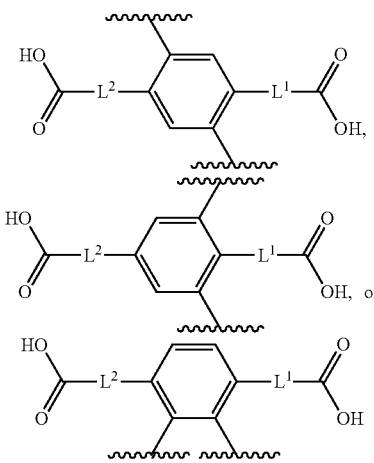

In embodiments, the metal organic framework linker has the formula:

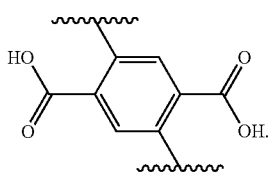 [SMILES: *c1cc(C(=O)O)c(*)cc1C(=O)O]

In embodiments, the metal organic framework linker has the formula:

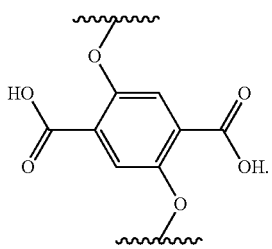 [SMILES: *Oc1cc(C(=O)O)c(O*)cc1C(=O)O]

In embodiments, the metal organic framework linker has the formula:

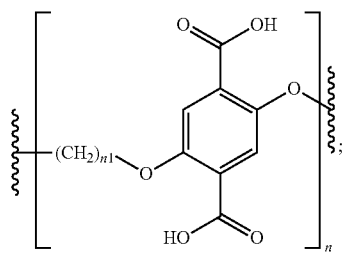

wherein, n1 is independently an integer from 1 to 20 and n is an integer from 2 to 1000.

In embodiments, the metal organic framework linker has the formula:

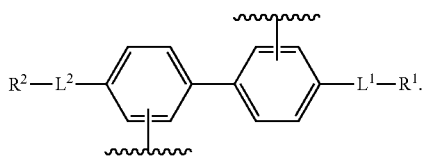

In embodiments, the metal organic framework linker has the formula:

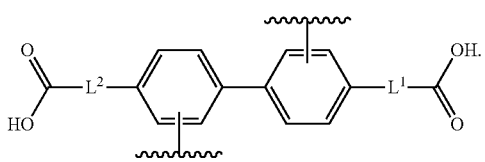

In embodiments, the metal organic framework linker has the formula:

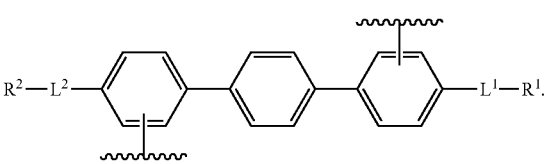

In embodiments, the metal organic framework linker has the formula:

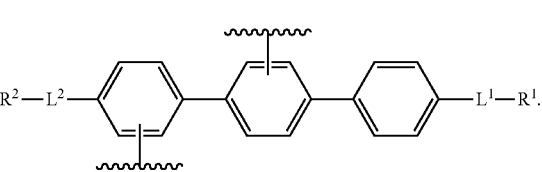

In embodiments, the metal organic framework linker has the formula:

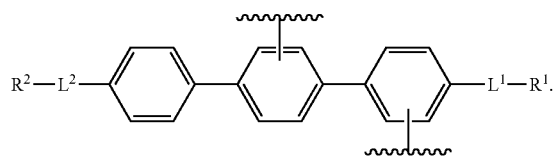

In embodiments, the metal organic framework linker has the formula:

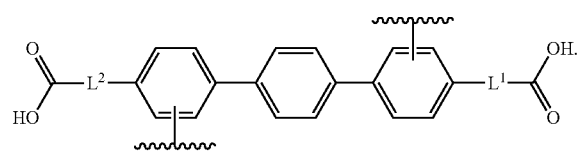

In embodiments, the metal organic framework linker has the formula:

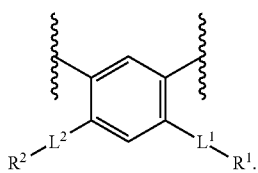

In embodiments, the metal organic framework linker has the formula:

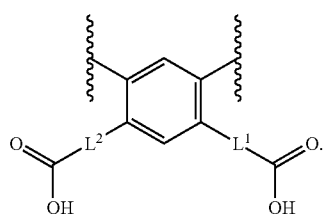

In embodiments, the metal organic framework linker has the formula:

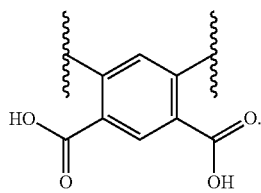 [SMILES: *c1cc(*)c(C(=O)O)cc1C(=O)O]

In embodiments, the metal organic framework linker has the formula:

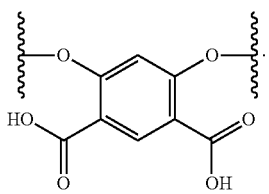

In embodiments, the metal organic framework linker has the formula:

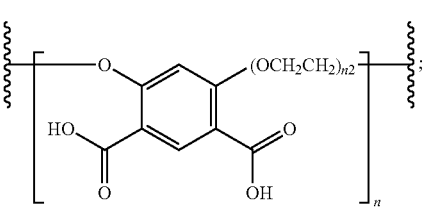

wherein, n2 is an integer from 1 to 20 and n is an integer from 2 to 1000.

In embodiments, the terminal moiety is referred to herein as $Z^1$ or $Z^2$. In embodiments, the terminal moiety is hydrogen, halogen, —OH, —NH$_2$, or —COOH. In embodiments, the terminal moiety is hydrogen or —OH. In embodiments, the terminal moiety is hydrogen. In embodiments, the terminal moiety is —OH. In embodiments, the terminal moiety has the formula:

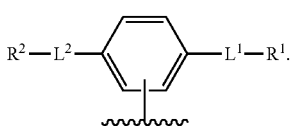

The terminal moiety with the formula

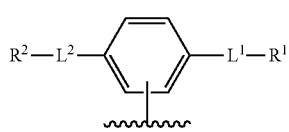

may be referred to herein as M'. The terminal moiety with the formula

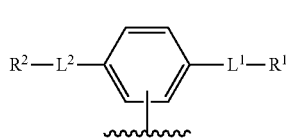

may be referred to herein as M-H. In embodiments, the terminal moiety has the formula:

29

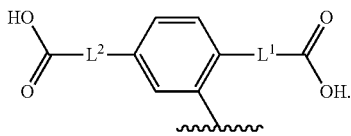

In embodiments, the terminal moiety has the formula:

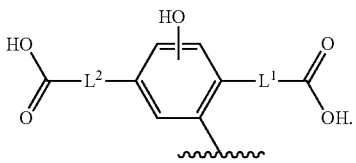

In embodiments, the terminal moiety has the formula:

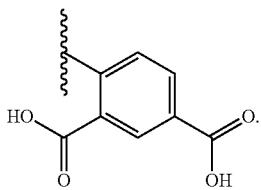 [SMILES: *c1ccc(C(=O)O)cc1C(=O)O]

In embodiments, the terminal moiety has the formula:

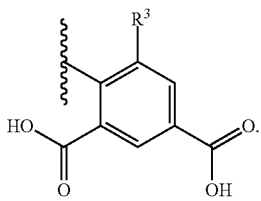

In embodiments, the terminal moiety has the formula:

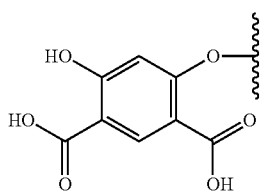 [SMILES: *Oc1cc(O)c(C(=O)O)cc1C(=O)O]

In embodiments, the terminal moiety has the formula HO

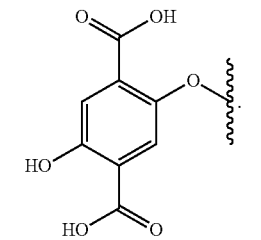 [SMILES: *Oc1cc(C(=O)O)c(O)cc1C(=O)O]

In embodiments, the metal organic framework linker has the formula:

30

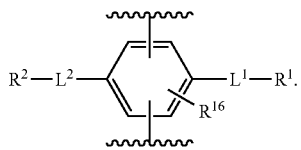

$R^{16}$ is halogen, —$CF_3$, —$Cl_3$, —$CI_3$, —$CBr_3$, —$CHF_2$, —$CHCl_2$, —$CHI_2$, —$CHBr_2$, —$OCH_2F$, —$OCH_2Cl$, —$OCH_2I$, —$OCH_2Br$, —$OCHF_2$, —$CHCl_2$, —$OCHI_2$, —$OCHBr_2$, —$OCF_3$, —$OCl_3$, —$OCI_3$, —$OCBr_3$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC=(O)$NHNH_2$, —NHC=(O)$NH_2$, —$NHSO_2H$, —NHC=(O)H, —NHC(O)—OH, —NHOH, substituted or unsubstituted alkyl (e.g., $C_1$-$C_8$, $C_1$-$C_6$, or $C_1$-$C_4$), substituted or unsubstituted heteroalkyl (e.g., 2 to 8 membered, 2 to 6 membered, or 2 to 4 membered), substituted or unsubstituted cycloalkyl (e.g., $C_3$-$C_8$, $C_3$-$C_6$, or $C_5$-$C_6$), substituted or unsubstituted heterocycloalkyl (e.g., 3 to 8 membered, 3 to 6 membered, or 5 to 6 membered), substituted or unsubstituted aryl (e.g., $C_6$-$C_{10}$, $C_{10}$, or phenyl), or substituted or unsubstituted heteroaryl (e.g., 5 to 10 membered, 5 to 9 membered, or 5 to 6 membered). In embodiments, $R^{16}$ is unsubstituted alkyl (e.g., $C_1$-$C_8$, $C_1$-$C_6$, or $C_1$-$C_4$), unsubstituted heteroalkyl (e.g., 2 to 8 membered, 2 to 6 membered, or 2 to 4 membered), unsubstituted cycloalkyl (e.g., $C_3$-$C_8$, $C_3$-$C_6$, or $C_5$-$C_6$), unsubstituted heterocycloalkyl (e.g., 3 to 8 membered, 3 to 6 membered, or 5 to 6 membered), unsubstituted aryl (e.g., $C_6$-$C_{10}$, $C_{10}$, or phenyl), or unsubstituted heteroaryl (e.g., 5 to 10 membered, 5 to 9 membered, or 5 to 6 membered).

In embodiments, $R^{16}$ is independently halogen, —$CF_3$, —$Cl_3$, —$CI_3$, —$CBr_3$, —$CHF_2$, —$CHCl_2$, —$CHI_2$, —$CHBr_2$, —$OCH_2F$, —$OCH_2Cl$, —$OCH_2I$, —$OCH_2Br$, —$OCHF_2$, —$CHCl_2$, —$OCHI_2$, —$OCHBr_2$, —$OCF_3$, —$OCl_3$, —$OCI_3$, —$OCBr_3$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC=(O)$NHNH_2$, —NHC=(O)$NH_2$, —$NHSO_2H$, —NHC=(O)H, —NHC(O)—OH, —NHOH, substituted or unsubstituted $C_1$-$C_8$ alkyl, substituted or unsubstituted 2 to 8 membered heteroalkyl, substituted or unsubstituted $C_3$-$C_8$ cycloalkyl, substituted or unsubstituted 3 to 6 membered heterocycloalkyl, substituted or unsubstituted phenyl, or substituted or unsubstituted 5 to 6 membered heteroaryl.

In embodiments, $R^{16}$ is independently halogen, —$CF_3$, —$Cl_3$, —$CI_3$, —$CBr_3$, —$CHF_2$, —$CHCl_2$, —$CHI_2$, —$CHBr_2$, —$OCH_2F$, —$OCH_2Cl$, —$OCH_2I$, —$OCH_2Br$, —$OCHF_2$, —$CHCl_2$, —$OCHI_2$, —$OCHBr_2$, —$OCF_3$, —$OCl_3$, —$OCI_3$, —$OCBr_3$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC=(O)$NHNH_2$, —NHC=(O)$NH_2$, —$NHSO_2H$, —NHC=(O)H, —NHC(O)—OH, —NHOH, $R^{17}$-substituted or unsubstituted alkyl (e.g., $C_1$-$C_8$ alkyl, $C_1$-$C_6$ alkyl, or $C_1$-$C_4$ alkyl), $R^{17}$-substituted or unsubstituted heteroalkyl (e.g., 2 to 8 membered heteroalkyl, 2 to 6 membered heteroalkyl, or 2 to 4 membered heteroalkyl), $R^{17}$-substituted or unsubstituted cycloalkyl (e.g., $C_3$-$C_8$ cycloalkyl, $C_3$-$C_6$ cycloalkyl, or $C_5$-$C_6$ cycloalkyl), $R^{17}$-substituted or unsubstituted heterocycloalkyl (e.g., 3 to 8 membered heterocycloalkyl, 3 to 6 membered heterocycloalkyl, or 5 to 6 membered heterocycloalkyl), $R^{17}$-substituted or unsubstituted aryl (e.g., $C_6$-$C_{10}$ aryl, $C_{10}$ aryl, or phenyl), or $R^{17}$-substituted or unsubstituted heteroaryl (e.g., 5 to 10 membered heteroaryl, 5 to 9 membered heteroaryl, or 5 to 6 membered heteroaryl).

In embodiments, each ligand or each metal organic framework linker is substituted or unsubstituted trimethylenedipiperidine. In embodiments, each ligand or each metal organic framework linker is substituted or unsubstituted phthalic acid. In embodiments, each ligand or each metal organic framework linker is substituted or unsubstituted isophthalic acid. In embodiments, each ligand or each metal organic framework linker is substituted or unsubstituted terephthalic acid. In embodiments, each ligand or each metal organic framework linker is substituted or unsubstituted trimesic acid.

In embodiments, the metal organic framework linker has the formula:

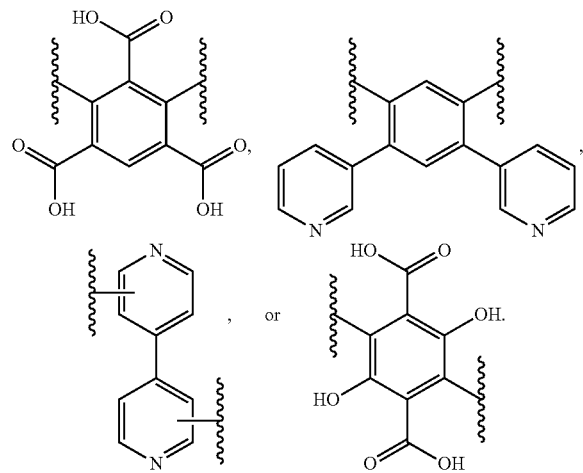

In embodiments, $L^1$ is a bond. $L^1$ is a bond, $R^6$-substituted or unsubstituted alkylene (e.g., $C_1$-$C_8$, $C_1$-$C_6$, or $C_1$-$C_4$), $R^6$-substituted or unsubstituted heteroalkylene (e.g., 2 to 8 membered, 2 to 6 membered, or 2 to 4 membered), $R^6$-substituted or unsubstituted cycloalkylene (e.g., $C_3$-$C_8$, $C_3$-$C_6$, or $C_5$-$C_6$), $R^6$-substituted or unsubstituted heterocycloalkylene (e.g., 3 to 8 membered, 3 to 6 membered, or 5 to 6 membered), $R^6$-substituted or unsubstituted arylene (e.g., $C_6$-$C_{10}$, $C_{10}$, or phenylene), or $R^6$-substituted or unsubstituted heteroarylene (e.g., 5 to 10 membered, 5 to 9 membered, or 5 to 6 membered).

In embodiments, $L^1$ is a bond, substituted or unsubstituted alkylene (e.g., $C_1$-$C_8$, $C_1$-$C_6$, or $C_1$-$C_4$), or substituted or unsubstituted heteroalkylene (e.g., 2 to 8 membered, 2 to 6 membered, or 2 to 4 membered). In embodiments, $L^1$ is a bond, $R^6$-substituted or unsubstituted alkylene (e.g., $C_1$-$C_8$, $C_1$-$C_6$, or $C_1$-$C_4$), or $R^6$-substituted or unsubstituted heteroalkylene (e.g., 2 to 8 membered, 2 to 6 membered, or 2 to 4 membered). In embodiments, $L^1$ is a bond, unsubstituted alkylene (e.g., $C_1$-$C_8$, $C_1$-$C_6$, or $C_1$-$C_4$), or unsubstituted heteroalkylene (e.g., 2 to 8 membered, 2 to 6 membered, or 2 to 4 membered). In embodiments, $L^1$ is an unsubstituted alkylene (e.g., $C_1$-$C_8$, $C_1$-$C_6$, or $C_1$-$C_4$). In embodiments, $L^1$ is an unsubstituted ethylene. In embodiments, $L^1$ is an unsubstituted methylene.

$R^6$ is independently halogen, —$CF_3$, —$Cl_3$, —$CI_3$, —$CBr_3$, —$CHF_2$, —$CHCl_2$, —$CHI_2$, —$CHBr_2$, —$OCH_2F$, —$OCH_2Cl$, —$OCH_2I$, —$OCH_2Br$, —$OCHF_2$, —$OCHCl_2$, —$OCHI_2$, —$OCHBr_2$, —$OCF_3$, —$OCl_3$, —$OCI_3$, —$OCBr_3$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC=(O)$NHNH_2$, —NHC=(O)$NH_2$, —$NHSO_2H$, —NHC=(O)H, —NHC(O)—OH, —NHOH, substituted or unsubstituted alkyl (e.g., $C_1$-$C_8$, $C_1$-$C_6$, or $C_1$-$C_4$), substituted or unsubstituted heteroalkyl (e.g., 2 to 8 membered, 2 to 6 membered, or 2 to 4 membered), substituted or unsubstituted cycloalkyl (e.g., $C_3$-$C_8$, $C_3$-$C_6$, or $C_5$-$C_6$), substituted or unsubstituted heterocycloalkyl (e.g., 3 to 8 membered, 3 to 6 membered, or 5 to 6 membered), substituted or unsubstituted aryl (e.g., $C_6$-$C_{10}$, $C_{10}$, or phenyl), or substituted or unsubstituted heteroaryl (e.g., 5 to 10 membered, 5 to 9 membered, or to 6 membered). In embodiments, $R^6$ is unsubstituted alkyl (e.g., $C_1$-$C_8$, $C_1$-$C_6$, or $C_1$-$C_4$), unsubstituted heteroalkyl (e.g., 2 to 8 membered, 2 to 6 membered, or 2 to 4 membered), unsubstituted cycloalkyl (e.g., $C_3$-$C_8$, $C_3$-$C_6$, or $C_5$-$C_6$), unsubstituted heterocycloalkyl (e.g., 3 to 8 membered, 3 to 6 membered, or 5 to 6 membered), unsubstituted aryl (e.g., $C_6$-$C_{10}$, $C_{10}$, or phenyl), or unsubstituted heteroaryl (e.g., 5 to 10 membered, 5 to 9 membered, or 5 to 6 membered).

In embodiments, $R^6$ is independently halogen, —$CF_3$, —$Cl_3$, —$CI_3$, —$CBr_3$, —$CHF_2$, —$CHCl_2$, —$CHI_2$, —$CHBr_2$, —$OCH_2F$, —$OCH_2Cl$, —$OCH_2I$, —$OCH_2Br$, —$OCHF_2$, —$CHCl_2$, —$OCHI_2$, —$OCHBr_2$, —$OCF_3$, —$OCl_3$, —$OCI_3$, —$OCBr_3$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC=(O)$NHNH_2$, —NHC=(O)$NH_2$, —$NHSO_2H$, —NHC=(O)H, —NHC(O)—OH, —NHOH, substituted or unsubstituted $C_1$-$C_8$ alkyl, substituted or unsubstituted 2 to 8 membered heteroalkyl, substituted or unsubstituted $C_3$-$C_8$ cycloalkyl, substituted or unsubstituted 3 to 6 membered heterocycloalkyl, substituted or unsubstituted phenyl, or substituted or unsubstituted 5 to 6 membered heteroaryl.

In embodiments, $R^6$ is independently halogen, —$CF_3$, —$Cl_3$, —$CI_3$, —$CBr_3$, —$CHF_2$, —$CHCl_2$, —$CHI_2$, —$CHBr_2$, —$OCH_2F$, —$OCH_2Cl$, —$OCH_2I$, —$OCH_2Br$, —$OCHF_2$, —$CHCl_2$, —$OCHI_2$, —$OCHBr_2$, —$OCF_3$, —$OCl_3$, —$OCI_3$, —$OCBr_3$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC=(O)$NHNH_2$, —NHC=(O)$NH_2$, —$NHSO_2H$, —NHC=(O)H, —NHC(O)—OH, —NHOH, $R^7$-substituted or unsubstituted alkyl (e.g., $C_1$-$C_8$ alkyl, $C_1$-$C_6$ alkyl, or $C_1$-$C_4$ alkyl), $R^7$-substituted or unsubstituted heteroalkyl (e.g., 2 to 8 membered heteroalkyl, 2 to 6 membered heteroalkyl, or 2 to 4 membered heteroalkyl), $R^7$-substituted or unsubstituted cycloalkyl (e.g., $C_3$-$C_8$ cycloalkyl, $C_3$-$C_6$ cycloalkyl, or $C_5$-$C_6$ cycloalkyl), $R^7$-substituted or unsubstituted heterocycloalkyl (e.g., 3 to 8 membered heterocycloalkyl, 3 to 6 membered heterocycloalkyl, or 5 to 6 membered heterocycloalkyl), $R^7$-substituted or unsubstituted aryl (e.g., $C_6$-$C_{10}$ aryl, $C_{10}$ aryl, or phenyl), or $R^7$-substituted or unsubstituted heteroaryl (e.g., 5 to 10 membered heteroaryl, 5 to 9 membered heteroaryl, or 5 to 6 membered heteroaryl).

In embodiments, $L^2$ is a bond. $L^2$ is a bond, $R^8$-substituted or unsubstituted alkylene (e.g., $C_1$-$C_8$, $C_1$-$C_6$, or $C_1$-$C_4$), $R^8$-substituted or unsubstituted heteroalkylene (e.g., 2 to 8 membered, 2 to 6 membered, or 2 to 4 membered), $R^8$-substituted or unsubstituted cycloalkylene (e.g., $C_3$-$C_8$, $C_3$-$C_6$, or $C_5$-$C_6$), $R^8$-substituted or unsubstituted heterocycloalkylene (e.g., 3 to 8 membered, 3 to 6 membered, or 5 to 6 membered), $R^8$-substituted or unsubstituted arylene (e.g., $C_6$-$C_{10}$, $C_{10}$, or phenylene), or $R^8$-substituted or unsubstituted heteroarylene (e.g., 5 to 10 membered, 5 to 9 membered, or 5 to 6 membered).

In embodiments, $L^2$ is a bond, substituted or unsubstituted alkylene (e.g., $C_1$-$C_8$, $C_1$-$C_6$, or $C_1$-$C_4$), or substituted or unsubstituted heteroalkylene (e.g., 2 to 8 membered, 2 to 6 membered, or 2 to 4 membered). In embodiments, $L^2$ is a bond, $R^8$-substituted or unsubstituted alkylene (e.g., $C_1$-$C_8$, $C_1$-$C_6$, or $C_1$-$C_4$), or $R^8$-substituted or unsubstituted heteroalkylene (e.g., 2 to 8 membered, 2 to 6 membered, or 2 to 4 membered). In embodiments, $L^2$ is a bond, unsubstituted alkylene (e.g., $C_1$-$C_8$, $C_1$-$C_6$, or $C_1$-$C_4$), or unsubstituted heteroalkylene (e.g., 2 to 8 membered, 2 to 6 membered, or 2 to 4 membered). In embodiments, $L^2$ is an unsubstituted alkylene (e.g., $C_1$-$C_8$, $C_1$-$C_6$, or $C_1$-$C_4$). In embodiments, $L^2$ is an unsubstituted ethylene. In embodiments, $L^2$ is an unsubstituted methylene. In embodiments, $L^1$ is the same as $L^2$. In embodiments, $L^1$ is different than $L^2$.

$R^8$ is independently halogen, —$CF_3$, —$Cl_3$, —$CI_3$, —$CBr_3$, —$CHF_2$, —$CHCl_2$, —$CHI_2$, —$CHBr_2$, —$OCH_2F$, —$OCH_2Cl$, —$OCH_2I$, —$OCH_2Br$, —$OCHF_2$, —$CHCl_2$, —$OCHI_2$, —$OCHBr_2$, —$OCF_3$, —$OCl_3$, —$OCI_3$, —$OCBr_3$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC=(O)$NHNH_2$, —NHC=(O)$NH_2$, —$NHSO_2H$, —NHC=(O)H, —NHC(O)—OH, —NHOH, substituted or unsubstituted alkyl (e.g., $C_1$-$C_8$, $C_1$-$C_6$, or $C_1$-$C_4$), substituted or unsubstituted heteroalkyl (e.g., 2 to 8 membered, 2 to 6 membered, or 2 to 4 membered), substituted or unsubstituted cycloalkyl (e.g., $C_3$-$C_8$, $C_3$-$C_6$, or $C_5$-$C_6$), substituted or unsubstituted heterocycloalkyl (e.g., 3 to 8 membered, 3 to 6 membered, or 5 to 6 membered), substituted or unsubstituted aryl (e.g., $C_6$-$C_{10}$, $C_{10}$, or phenyl), or substituted or unsubstituted heteroaryl (e.g., 5 to 10 membered, 5 to 9 membered, or 5 to 6 membered). In embodiments, $R^8$ is unsubstituted alkyl (e.g., $C_1$-$C_8$, $C_1$-$C_6$, or $C_1$-$C_4$), unsubstituted heteroalkyl (e.g., 2 to 8 membered, 2 to 6 membered, or 2 to 4 membered), unsubstituted cycloalkyl (e.g., $C_3$-$C_8$, $C_3$-$C_6$, or $C_5$-$C_6$), unsubstituted heterocycloalkyl (e.g., 3 to 8 membered, 3 to 6 membered, or 5 to 6 membered), unsubstituted aryl (e.g., $C_6$-$C_{10}$, $C_{10}$, or phenyl), or unsubstituted heteroaryl (e.g., 5 to 10 membered, 5 to 9 membered, or 5 to 6 membered).

In embodiments, $R^8$ is independently halogen, —$CF_3$, —$Cl_3$, —$CI_3$, —$CBr_3$, —$CHF_2$, —$CHCl_2$, —$CHI_2$, —$CHBr_2$, —$OCH_2F$, —$OCH_2Cl$, —$OCH_2I$, —$OCH_2Br$, —$OCHF_2$, —$CHCl_2$, —$OCHI_2$, —$OCHBr_2$, —$OCF_3$, —$OCl_3$, —$OCI_3$, —$OCBr_3$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC=(O)$NHNH_2$, —NHC=(O)$NH_2$, —$NHSO_2H$, —NHC=(O)H, —NHC(O)—OH, —NHOH, substituted or unsubstituted $C_1$-$C_8$ alkyl, substituted or unsubstituted 2 to 8 membered heteroalkyl, substituted or unsubstituted $C_3$-$C_8$ cycloalkyl, substituted or unsubstituted 3 to 6 membered heterocycloalkyl, substituted or unsubstituted phenyl, or substituted or unsubstituted 5 to 6 membered heteroaryl.

In embodiments, $R^8$ is independently halogen, —$CF_3$, —$Cl_3$, —$CI_3$, —$CBr_3$, —$CHF_2$, —$CHCl_2$, —$CHI_2$, —$CHBr_2$, —$OCH_2F$, —$OCH_2Cl$, —$OCH_2I$, —$OCH_2Br$, —$OCHF_2$, —$CHCl_2$, —$OCHI_2$, —$OCHBr_2$, —$OCF_3$, —$OCl_3$, —$OCI_3$, —$OCBr_3$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC=(O)$NHNH_2$, —NHC=(O)$NH_2$, —$NHSO_2H$, —NHC=(O)H, —NHC(O)—OH, —NHOH, $R^9$-substituted or unsubstituted alkyl (e.g., $C_1$-$C_8$ alkyl, $C_1$-$C_6$ alkyl, or $C_1$-$C_4$ alkyl), $R^9$-substituted or unsubstituted heteroalkyl (e.g., 2 to 8 membered heteroalkyl, 2 to 6 membered heteroalkyl, or 2 to 4 membered heteroalkyl), $R^9$-substituted or unsubstituted cycloalkyl (e.g., $C_3$-$C_8$ cycloalkyl, $C_3$-$C_6$ cycloalkyl, or $C_5$-$C_6$ cycloalkyl), $R^9$-substituted or unsubstituted heterocycloalkyl (e.g., 3 to 8 membered heterocycloalkyl, 3 to 6 membered heterocycloalkyl, or 5 to 6 membered heterocycloalkyl), $R^9$-substituted or unsubstituted aryl (e.g., $C_6$-$C_{10}$ aryl, $C_{10}$ aryl, or phenyl), or $R^9$-substituted or unsubstituted heteroaryl (e.g., 5 to 10 membered heteroaryl, 5 to 9 membered heteroaryl, or 5 to 6 membered heteroaryl).

In embodiments, the covalent linker moiety includes a polymer (e.g., PEG). In embodiments, the covalent linker moiety is a block polymer. In embodiments, the covalent linker moiety is a substituted or unsubstituted alkylene, substituted or unsubstituted heteroalkylene, substituted or unsubstituted cycloalkylene, substituted or unsubstituted heterocycloalkylene, substituted or unsubstituted arylene, or substituted or unsubstituted heteroarylene. In embodiments, the covalent linker moiety is substituted or unsubstituted alkylene (e.g., $C_1$-$C_8$, $C_1$-$C_6$, or $C_1$-$C_4$), substituted or unsubstituted heteroalkylene (e.g., 2 to 8 membered, 2 to 6 membered, or 2 to 4 membered), substituted or unsubstituted cycloalkylene (e.g., $C_3$-$C_8$, $C_3$-$C_6$, or $C_5$-$C_6$), substituted or unsubstituted heterocycloalkylene (e.g., 3 to 8 membered, 3 to 6 membered, or 5 to 6 membered), substituted or unsubstituted arylene (e.g., $C_6$-$C_{10}$, $C_{10}$, or phenylene), or substituted or unsubstituted heteroarylene (e.g., 5 to 10 membered, 5 to 9 membered, or 5 to 6 membered). In embodiments, the covalent linker moiety is a substituted or unsubstituted alkylene. In embodiments, the covalent linker moiety is a substituted or unsubstituted heteroalkylene. In embodiments, the covalent linker moiety is a substituted or unsubstituted —O-(alkylene). In embodiments, the covalent linker moiety is a substituted or unsubstituted —O—($C_1$-$C_8$ alkylene).

In embodiments, the covalent linker moiety is —O$(CH_2)_{n1}$—, —O$(CH_2CH_2)_{n1}$—, $(CH_2CH_2)_{n1}$—, —[$CH_2(C_6H_4)CH_2$]$_{n1}$—, —[O($C_6H_4$)$CH_2$]$_{n1}$—, —[$CH_2(C_6H_4)$]$_{n1}$—, —[($C_6H_4$)]$_{n1}$—, or —O[$CH_2(C_6H_4)CH_2$]$_{n1}$—, and n3 is an integer from 2 to 1000. In embodiments, the covalent linker moiety is —O$(CH_2)_{n1}$—. In embodiments, the covalent linker moiety is —O$(CH_2CH_2)_{n1}$—. In embodiments, the covalent linker moiety is —$(CH_2CH_2)_{n1}$—. In embodiments, the covalent linker moiety is —[$CH_2(C_6H_4)CH_2$]$_{n1}$—. In embodiments, the covalent linker moiety is —[O($C_6H_4$)]$_{n1}$—. In embodiments, the covalent linker moiety is —[($C_6H_4$)$CH_2$]$_{n1}$—. In embodiments, the covalent linker moiety is —[($C_6H_4$)]$_{n1}$—. In embodiments, the covalent linker moiety is —O[$CH_2(C_6H_4)CH_2$]$_{n3}$—. In embodiments, the covalent linker moiety is tetraethylene glycol (TEG), polyethylene glycol, polyvinylpyrrolidone (PVP), poly(xylene), or poly(p-xylylene). In embodiments, the covalent linker moiety is TEG, polyethylene glycol with an average molecular weight 400 Da (PEG-400), or polyethylene glycol with average molecular weight of 4,000 Da (PEG-4,000).

In embodiments, the covalent linker moiety is a substituted or unsubstituted alkylene (e.g. $C_1$-$C_8$, $C_1$-$C_6$, or $C_1$-$C_4$), substituted or unsubstituted heteroalkylene (e.g. 2 to 10 membered, 2 to 8 membered, 4 to 8 membered, 2 to 6 membered heteroalkylene, or 2 to 4 membered), substituted or unsubstituted cycloalkylene (e.g. $C_3$-$C_8$, $C_4$-$C_8$, or $C_5$-$C_6$), substituted or unsubstituted heterocycloalkylene (e.g. 3 to 8 membered, 4 to 8 membered, or 5 to 6 membered), substituted or unsubstituted arylene (e.g. $C_6$-$C_{10}$ or $C_6$), or substituted or unsubstituted heteroarylene (e.g. 5 to 10 membered, 5 to 9 membered, or 5 to 6 membered).

In embodiments, the covalent linker moiety is a $R^{10}$-substituted or unsubstituted alkylene (e.g. $C_1$-$C_8$, $C_1$-$C_6$, or $C_1$-$C_4$), $R^{10}$-substituted or unsubstituted heteroalkylene (e.g.

2 to 10 membered, 2 to 8 membered, 4 to 8 membered, 2 to 6 membered, or 2 to 4 membered), $R^{10}$-substituted or unsubstituted cycloalkylene (e.g. $C_3$-$C_8$, $C_4$-$C_8$, or $C_5$-$C_6$), $R^{10}$-substituted or unsubstituted heterocycloalkylene (e.g. 3 to 8 membered, 4 to 8 membered, or 5 to 6 membered), $R^{10}$-substituted or unsubstituted arylene (e.g. $C_6$-$C_{10}$ or $C_6$), or $R^{10}$-substituted or unsubstituted heteroarylene (e.g. 5 to 10 membered, 5 to 9 membered, or 5 to 6 membered). In embodiments, the covalent linker moiety is an unsubstituted alkylene (e.g. $C_1$-$C_8$, $C_1$-$C_6$, or $C_1$-$C_4$), unsubstituted heteroalkylene (e.g. 2 to 10 membered, 2 to 8 membered, 4 to 8 membered, 2 to 6 membered, or 2 to 4 membered), unsubstituted cycloalkylene (e.g. $C_3$-$C_8$, $C_4$-$C_8$, or $C_5$-$C_6$), unsubstituted heterocycloalkylene (e.g. 3 to 8 membered, 4 to 8 membered, or 5 to 6 membered), unsubstituted arylene (e.g. $C_6$-$C_{10}$ or $C_6$), or unsubstituted heteroarylene (e.g. 5 to 10 membered, 5 to 9 membered, or 5 to 6 membered).

$R^{10}$ is independently halogen, —$CF_3$, —$Cl_3$, —$CI_3$, —$CBr_3$, —$CHF_2$, —$CHCl_2$, —$CHI_2$, —$CHBr_2$, —$OCH_2F$, —$OCH_2Cl$, —$OCH_2I$, —$OCH_2Br$, —$OCHF_2$, —$CHCl_2$, —$OCHI_2$, —$OCHBr_2$, —$OCF_3$, —$OCl_3$, —$OCI_3$, —$OCBr_3$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC=(O)$NHNH_2$, —NHC=(O)$NH_2$, —$NHSO_2H$, —NHC=(O)H, —NHC(O)—OH, —NHOH, $R^{11}$-substituted or unsubstituted alkyl (e.g. $C_1$-$C_8$, $C_1$-$C_6$, or $C_1$-$C_4$), $R^{11}$-substituted or unsubstituted heteroalkyl (e.g. 2 to 10 membered, 2 to 8 membered, 4 to 8 membered, 2 to 6 membered, or 2 to 4 membered), $R^{11}$-substituted or unsubstituted cycloalkyl (e.g. $C_3$-$C_8$, $C_4$-$C_8$, or $C_5$-$C_6$), $R^{11}$-substituted or unsubstituted heterocycloalkyl (e.g. 3 to 8 membered, 4 to 8 membered, or 5 to 6 membered), $R^{11}$-substituted or unsubstituted aryl (e.g. $C_6$-$C_{10}$ or $C_6$), or $R^{11}$-substituted or unsubstituted heteroaryl (e.g. 5 to 10 membered, 5 to 9 membered, or 5 to 6 membered). In embodiments, $R^{10}$ is an unsubstituted alkyl (e.g. $C_1$-$C_8$, $C_1$-$C_6$, or $C_1$-$C_4$), unsubstituted heteroalkyl (e.g. 2 to 10 membered, 2 to 8 membered, 4 to 8 membered, 2 to 6 membered, or 2 to 4 membered), unsubstituted cycloalkyl (e.g. $C_3$-$C_8$, $C_4$-$C_8$, or $C_5$-$C_6$), unsubstituted heterocycloalkyl (e.g. 3 to 8 membered, 4 to 8 membered, or 5 to 6 membered), unsubstituted aryl (e.g. $C_6$-$C_{10}$ or $C_6$), or unsubstituted heteroaryl (e.g. 5 to 10 membered, 5 to 9 membered, or 5 to 6 membered).

In embodiments, the polymerized metal organic framework further includes a plurality of additional metal organic framework linkers not bound together by a plurality of covalent linker moieties. In embodiments, the ratio of metal organic framework linkers bound together (e.g., pbdc-xa, based on the number of bdc units) to additional metal organic framework linkers (e.g., bpy) are about 3:1, about 4:1, or about 2:1. In embodiments, the ratio is about 1:1. In embodiments, the ratio is about 5:1. In embodiments, the ratio is about 6:1. In embodiments, the ratio is about 7:1. In embodiments, the ratio is about 8:1. In embodiments, the ratio is about 9:1. In embodiments, the ratio is about 10:1. In embodiments, the ratio is about 15:1. In embodiments, the ratio is about 20:1. In embodiments, the ratio is about 25:1. In embodiments, the ratio is about 30:1. In embodiments, the ratio is about 33:1. In embodiments, the ratio is about 35:1. In embodiments, the ratio is 1:1. In embodiments, the ratio is 5:1. In embodiments, the ratio is 6:1. In embodiments, the ratio is 7:1. In embodiments, the ratio is 8:1. In embodiments, the ratio is 9:1. In embodiments, the ratio is 10:1. In embodiments, the ratio is 15:1. In embodiments, the ratio is 20:1. In embodiments, the ratio is 25:1. In embodiments, the ratio is 30:1. In embodiments, the ratio is 33:1. In embodiments, the ratio is 35:1. In embodiments, the number of metal organic framework linkers bound together (e.g., pbdc-xa, based on the number of bdc units) is greater than additional metal organic framework linkers (e.g., bpy).

In embodiments, the ratio of additional metal organic framework linkers (e.g., bpy) to metal organic framework linkers bound together (e.g., pbdc-xa, based on the number of bdc units) to a metal (e.g., Zn), is about 1:2:2. In embodiments, the ratio is about 1:1:1. In embodiments, the ratio is 1:2:1. In embodiments, the ratio is 2:2:1. In embodiments, the ratio is 1:1:2. In embodiments, the ratio is 3:1:1. In embodiments, the ratio is 3:2:1.

In embodiments, the ratio of metal organic framework linkers to metal is about 4:1, about 3:1, or about 2:1. In embodiments, the ratio is about 1:1. In embodiments, the ratio is about 5:1. In embodiments, the ratio is about 6:1. In embodiments, the ratio is about 7:1. In embodiments, the ratio is about 8:1. In embodiments, the ratio is about 9:1. In embodiments, the ratio is about 10:1. In embodiments, the ratio is about 15:1. In embodiments, the ratio is about 20:1. In embodiments, the ratio is about 25:1. In embodiments, the ratio is about 30:1. In embodiments, the ratio is about 33:1. In embodiments, the ratio is about 35:1. In embodiments, the ratio is 1:1. In embodiments, the ratio is 5:1. In embodiments, the ratio is 6:1. In embodiments, the ratio is 7:1. In embodiments, the ratio is 8:1. In embodiments, the ratio is 9:1. In embodiments, the ratio is 10:1. In embodiments, the ratio is 15:1. In embodiments, the ratio is 20:1. In embodiments, the ratio is 25:1. In embodiments, the ratio is 30:1. In embodiments, the ratio is 33:1. In embodiments, the ratio is 35:1.

In embodiments, the additional metal organic framework linker is substituted or unsubstituted alkylene, substituted or unsubstituted heteroalkylene, substituted or unsubstituted cycloalkylene, substituted or unsubstituted heterocycloalkylene, substituted or unsubstituted arylene, or substituted or unsubstituted heteroarylene.

In embodiments, the additional metal organic framework linker is substituted or unsubstituted alkylene (e.g. $C_1$-$C_8$, $C_1$-$C_6$, or $C_1$-$C_4$), substituted or unsubstituted heteroalkylene (e.g. 2 to 10 membered, 2 to 8 membered, 4 to 8 membered, 2 to 6 membered heteroalklene, or 2 to 4 membered), substituted or unsubstituted cycloalkylene (e.g. $C_3$-$C_8$, $C_4$-$C_8$, or $C_5$-$C_6$), substituted or unsubstituted heterocycloalkylene (e.g. 3 to 8 membered, 4 to 8 membered, or 5 to 6 membered), substituted or unsubstituted arylene (e.g. $C_6$-$C_{10}$ or $C_6$), or substituted or unsubstituted heteroarylene (e.g. 5 to 10 membered, 5 to 9 membered, or 5 to 6 membered). In embodiments, the plurality of additional metal organic framework linkers is an unsubstituted alkylene (e.g. $C_1$-$C_8$, $C_1$-$C_6$, or $C_1$-$C_4$), unsubstituted heteroalkylene (e.g. 2 to 10 membered, 2 to 8 membered, 4 to 8 membered, 2 to 6 membered, or 2 to 4 membered), unsubstituted cycloalkylene (e.g. $C_3$-$C_8$, $C_4$-$C_8$, or $C_5$-$C_6$), unsubstituted heterocycloalkylene (e.g. 3 to 8 membered, 4 to 8 membered, or 5 to 6 membered), unsubstituted arylene (e.g. $C_6$-$C_{10}$ or $C_6$), or unsubstituted heteroarylene (e.g. 5 to 10 membered, 5 to 9 membered, or 5 to 6 membered).

In embodiments, the additional metal organic framework linker is a $R^{12}$-substituted or unsubstituted alkylene (e.g. $C_1$-$C_8$, $C_1$-$C_6$, or $C_1$-$C_4$), $R^{12}$-substituted or unsubstituted heteroalkylene (e.g. 2 to 10 membered, 2 to 8 membered, 4 to 8 membered, 2 to 6 membered, or 2 to 4 membered), $R^{12}$-substituted or unsubstituted cycloalkylene (e.g. $C_3$-$C_8$, $C_4$-$C_8$, or $C_5$-$C_6$), $R^{12}$-substituted or unsubstituted heterocycloalkylene (e.g. 3 to 8 membered, 4 to 8 membered, or 5 to 6 membered), $R^{12}$-substituted or unsubstituted arylene (e.g. $C_6$-$C_{10}$ or $C_6$), or $R^{12}$-substituted or unsubstituted heteroarylene (e.g. 5 to 10 membered, 5 to 9 membered, or 5 to 6 membered). In embodiments, the plurality of additional metal organic framework linkers is substituted or unsubstituted trimethylenedipiperidine. In embodiments, the plurality of additional metal organic framework linkers is substituted or unsubstituted phthalic acid. In embodiments, the plurality of additional metal organic framework linkers is substituted or unsubstituted isophthalic acid. In embodiments, the plurality of additional metal organic framework linkers is substituted or unsubstituted terephthalic acid. In embodiments, the plurality of additional metal organic framework linkers is substituted or unsubstituted trimesic acid. In embodiments, the plurality of additional metal organic framework linkers is tetramethyl ammonium.

$R^{12}$ is independently halogen, —$CF_3$, —$Cl_3$, —$CI_3$, —$CBr_3$, —$CHF_2$, —$CHCl_2$, —$CHI_2$, —$CHBr_2$, —$OCH_2F$, —$OCH_2Cl$, —$OCH_2I$, —$OCH_2Br$, —$OCHF_2$, —$CHCl_2$, —$OCHI_2$, —$OCHBr_2$, —$OCF_3$, —$OCl_3$, —$OCI_3$, —$OCBr_3$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC=(O)$NHNH_2$, —NHC=(O)$NH_2$, —$NHSO_2H$, —NHC=(O)H, —NHC(O)—OH, —NHOH, $R^{13}$-substituted or unsubstituted alkyl (e.g. $C_1$-$C_8$, $C_1$-$C_6$, or $C_1$-$C_4$), $R^{13}$-substituted or unsubstituted heteroalkyl (e.g. 2 to 10 membered, 2 to 8 membered, 4 to 8 membered, 2 to 6 membered, or 2 to 4 membered), $R^{13}$-substituted or unsubstituted cycloalkyl (e.g. $C_3$-$C_8$, $C_4$-$C_8$, or $C_5$-$C_6$), $R^{13}$-substituted or unsubstituted heterocycloalkyl (e.g. 3 to 8 membered, 4 to 8 membered, or 5 to 6 membered), $R^{13}$-substituted or unsubstituted aryl (e.g. $C_6$-$C_{10}$ or $C_6$), or $R^{13}$-substituted or unsubstituted heteroaryl (e.g. 5 to 10 membered, 5 to 9 membered, or 5 to 6 membered). In embodiments, $R^{12}$ is an unsubstituted alkyl (e.g. $C_1$-$C_8$, $C_1$-$C_6$, or $C_1$-$C_4$), unsubstituted heteroalkyl (e.g. 2 to 10 membered, 2 to 8 membered, 4 to 8 membered, 2 to 6 membered, or 2 to 4 membered), unsubstituted cycloalkyl (e.g. $C_3$-$C_8$, $C_4$-$C_8$, or $C_5$-$C_6$), unsubstituted heterocycloalkyl (e.g. 3 to 8 membered, 4 to 8 membered, or 5 to 6 membered), unsubstituted aryl (e.g. $C_6$-$C_{10}$ or $C_6$), or unsubstituted heteroaryl (e.g. 5 to 10 membered, 5 to 9 membered, or 5 to 6 membered).

In embodiments, the additional metal organic framework linker has the formula:

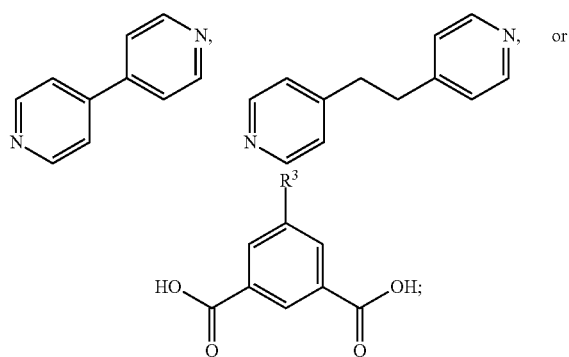

where $R^3$ is hydrogen, halogen, —$CF_3$, —$Cl_3$, —$CI_3$, —$CBr_3$, —$CHF_2$, —$CHCl_2$, —$CHI_2$, —$CHBr_2$, —$OCH_2F$, —$OCH_2Cl$, —$OCH_2I$, —$OCH_2Br$, —$OCHF_2$, —$CHCl_2$, —$OCHI_2$, —$OCHBr_2$, —$OCF_3$, —$OCl_3$, —$OCI_3$, —$OCBr_3$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC=(O)$NHNH_2$, —NHC=(O)$NH_2$, —$NHSO_2H$, —NHC=(O)H, —NHC(O)—OH, —NHOH, substituted or unsubstituted alkyl, or substituted or unsubstituted heteroalkyl. In embodiments, $R^3$ is hydrogen, —OH, —$NO_2$, —$NH_2$, or substituted or unsubstituted $C_1$-$C_4$ alkyl. In embodiments, $R^3$ is —OH, —$NO_2$, —$NH_2$, or unsubstituted methyl. In embodiments, $R^3$ is —OH. In embodiments, $R^3$ is —$NO_2$. In embodiments, $R^3$ is —$NH_2$. In embodiments, $R^3$ is unsubstituted methyl.

In embodiments, $R^3$ is substituted or unsubstituted alkyl (e.g. $C_1$-$C_8$, $C_1$-$C_6$, or $C_1$-$C_4$), substituted or unsubstituted heteroalkyl (e.g. 2 to 10 membered, 2 to 8 membered, 4 to 8 membered, 2 to 6 membered, or 2 to 4 membered). In embodiments, $R^3$ is $R^{14}$-substituted or unsubstituted alkyl (e.g. $C_1$-$C_8$, $C_1$-$C_6$, or $C_1$-$C_4$), or $R^{14}$-substituted or unsubstituted heteroalkyl (e.g. 2 to 10 membered, 2 to 8 membered, 4 to 8 membered, 2 to 6 membered, or 2 to 4 membered). In embodiments, $R^3$ is an unsubstituted alkyl (e.g. $C_1$-$C_8$, $C_1$-$C_6$, or $C_1$-$C_4$), or unsubstituted heteroalkyl (e.g. 2 to 10 membered, 2 to 8 membered, 4 to 8 membered, 2 to 6 membered, or 2 to 4 membered). In embodiments, $R^3$ is an unsubstituted alkyl (e.g. $C_1$-$C_8$, $C_1$-$C_6$, or $C_1$-$C_4$), unsubstituted heteroalkyl (e.g. 2 to 10 membered, 2 to 8 membered, 4 to 8 membered, 2 to 6 membered, or 2 to 4 membered), unsubstituted cycloalkyl (e.g. $C_3$-$C_8$, $C_4$-$C_8$, or $C_5$-$C_6$), unsubstituted heterocycloalkyl (e.g. 3 to 8 membered, 4 to 8 membered, or 5 to 6 membered), unsubstituted aryl (e.g. $C_6$-$C_{10}$ or $C_6$), or unsubstituted heteroaryl (e.g. 5 to 10 membered, 5 to 9 membered, or 5 to 6 membered).

$R^{14}$ is independently halogen, —$CF_3$, —$Cl_3$, —$CI_3$, —$CBr_3$, —$CHF_2$, —$CHCl_2$, —$CHI_2$, —$CHBr_2$, —$OCH_2F$, —$OCH_2Cl$, —$OCH_2I$, —$OCH_2Br$, —$OCHF_2$, —$CHCl_2$, —$OCHI_2$, —$OCHBr_2$, —$OCF_3$, —$OCl_3$, —$OCI_3$, —$OCBr_3$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC=(O)$NHNH_2$, —NHC=(O)$NH_2$, —$NHSO_2H$, —NHC=(O)H, —NHC(O)—OH, —NHOH, $R^{15}$-substituted or unsubstituted alkyl (e.g. $C_1$-$C_8$, $C_1$-$C_6$, or $C_1$-$C_4$), $R^{15}$-substituted or unsubstituted heteroalkyl (e.g. 2 to 10 membered, 2 to 8 membered, 4 to 8 membered, 2 to 6 membered, or 2 to 4 membered), $R^{15}$-substituted or unsubstituted cycloalkyl (e.g. $C_3$-$C_8$, $C_4$-$C_8$, or $C_5$-$C_6$), $R^{15}$-substituted or unsubstituted heterocycloalkyl (e.g. 3 to 8 membered, 4 to 8 membered, or 5 to 6 membered), $R^{15}$-substituted or unsubstituted aryl (e.g. $C_6$-$C_{10}$ or $C_6$), or $R^{15}$-substituted or unsubstituted heteroaryl (e.g. 5 to 10 membered, 5 to 9 membered, or 5 to 6 membered). In embodiments, $R^{14}$ is an unsubstituted alkyl (e.g. $C_1$-$C_8$, $C_1$-$C_6$, or $C_1$-$C_4$), unsubstituted heteroalkyl (e.g. 2 to 10 membered, 2 to 8 membered, 4 to 8 membered, 2 to 6 membered, or 2 to 4 membered), unsubstituted cycloalkyl (e.g. $C_3$-$C_8$, $C_4$-$C_8$, or $C_5$-$C_6$), unsubstituted heterocycloalkyl (e.g. 3 to 8 membered, 4 to 8 membered, or 5 to 6 membered), unsubstituted aryl (e.g. $C_6$-$C_{10}$ or $C_6$), or unsubstituted heteroaryl (e.g. 5 to 10 membered, 5 to 9 membered, or 5 to 6 membered).

In embodiments, the plurality of additional metal organic framework linkers is:

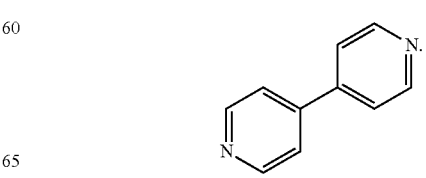

In embodiments, the plurality of additional metal organic framework linkers is:

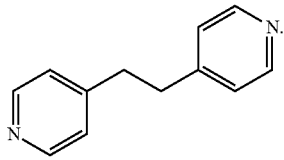 [SMILES: c1cc(CCc2ccncc2)ccn1]

In embodiments, the plurality of additional metal organic framework linkers is:

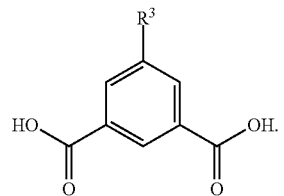

In embodiments, the metal binding ligand moieties which is bound to a metal atom or each of the metal donor atoms which is bound to a metal atom as provided herein can be direct, e.g., by covalent bond or metal ligand bond, or indirect, e.g., by non-covalent bond (e.g. electrostatic interactions (e.g. ionic bond, hydrogen bond, halogen bond), van der Waals interactions (e.g. dipole-dipole, dipole-induced dipole, London dispersion).

In embodiments, the metal binding ligand moieties include a metal donor atom. In embodiments, the metal donor atom is selected from the group oxygen, nitrogen, and sulfur. In embodiments, the metal donor atom is oxygen. In embodiments, the metal donor atom is nitrogen. In embodiments, the metal donor atom is sulfur. In embodiments, the metal donor atom is a heteroatom in a heteroalkyl, heterocycloalkylene, or heteroarylene. In embodiments, the metal donor atom is nitrogen in a heteroalkyl, heterocycloalkylene, or heteroarylene.

In embodiments, the metal binding ligand moieties are independently —COOH, —OH, —NH$_2$, —NO$_2$, —SH, —CN, substituted or unsubstituted heterocycloalkyl, or substituted or unsubstituted heteroaryl. In embodiments, the metal binding ligand moieties are independently —COOH, —OH, —NH$_2$, —SH, —CN, substituted or unsubstituted heterocycloalkyl, or substituted or unsubstituted heteroaryl. In embodiments, the metal binding ligand moieties are independently —COOH. It is understood (e.g., by those of ordinary skill in the art) that metal binding ligand moieties which include hydrogen (e.g., —COOH) may also be written without the hydrogen (e.g., —COO—).

In embodiments, the metal binding ligand moieties are independently —COOH, —NO$_2$, —OH, —NH$_2$, —SH, —CN, substituted or unsubstituted pyridinyl, substituted or unsubstituted piperidinyl, substituted or unsubstituted imidazolyl, substituted or unsubstituted azetidinyl, substituted or unsubstituted aziridinyl, substituted or unsubstituted morpholinyl, substituted or unsubstituted pyrazolyl, substituted or unsubstituted imidazolyl, substituted or unsubstituted oxazolyl, substituted or unsubstituted isoxazolyl, substituted or unsubstituted thiazolyl, substituted or unsubstituted isothiazolyl, or substituted or unsubstituted pyrrolyl.

In embodiments, the metal binding ligand moieties are independently —COOH, —OH, —NH$_2$, —SH, —CN, R$^4$-substituted or unsubstituted heterocycloalkyl, or R$^4$-substituted or unsubstituted heteroaryl. In embodiments, the metal binding ligand moieties are independently —COOH, —OH, —NH$_2$, —SH, —CN, R$^4$-substituted or unsubstituted heterocycloalkyl (e.g., 3 to 6 membered), or R$^4$-substituted or unsubstituted heteroaryl (e.g., 5 to 6 membered). In embodiments, the metal binding ligand moieties are independently —COOH, —OH, —NH$_2$, —SH, —CN, unsubstituted heterocycloalkyl (e.g., 3 to 6 membered), or unsubstituted heteroaryl (e.g., 5 to 6 membered).

In embodiments, the metal binding ligand moieties are independently —COOH, —NO$_2$, —OH, —NH$_2$, —SH, —CN, unsubstituted pyridinyl, unsubstituted piperidinyl, unsubstituted imidazolyl, unsubstituted azetidinyl, unsubstituted aziridinyl, unsubstituted morpholinyl, unsubstituted pyrazolyl, unsubstituted imidazolyl, unsubstituted oxazolyl, unsubstituted isoxazolyl, unsubstituted thiazolyl, unsubstituted isothiazolyl, or unsubstituted pyrrolyl. In embodiments, the metal binding ligand moieties are independently —COOH, —NO$_2$, —OH, —NH$_2$, —SH, —CN, R$^4$-substituted or unsubstituted pyridinyl, R$^4$-substituted or unsubstituted piperidinyl, R$^4$-substituted or unsubstituted imidazolyl, R$^4$-substituted or unsubstituted azetidinyl, R$^4$-substituted or unsubstituted aziridinyl, R$^4$-substituted or unsubstituted morpholinyl, R$^4$-substituted or unsubstituted pyrazolyl, R$^4$-substituted or unsubstituted imidazolyl, R$^4$-substituted or unsubstituted oxazolyl, R$^4$-substituted or unsubstituted isoxazolyl, R$^4$-substituted or unsubstituted thiazolyl, R$^4$-substituted or unsubstituted isothiazolyl, or R$^4$-substituted or unsubstituted pyrrolyl. In embodiments, the metal binding ligand moieties are independently —COOH, —OH, or R$^4$-substituted or unsubstituted pyridinyl.

R$^4$ is independently halogen, —CF$_3$, —Cl$_3$, —CI$_3$, —CBr$_3$, —CHF$_2$, —CHCl$_2$, —CHI$_2$, —CHBr$_2$, —OCH$_2$F, —OCH$_2$Cl, —OCH$_2$I, —OCH$_2$Br, —OCHF$_2$, —CHCl$_2$, —OCHI$_2$, —OCHBr$_2$, —OCF$_3$, —OCl$_3$, —OCI$_3$, —OCBr$_3$, —CN, —OH, —NH$_2$, —COOH, —CONH$_2$, —NO$_2$, —SH, —SO$_3$H, —SO$_4$H, —SO$_2$NH$_2$, —NHNH$_2$, —ONH$_2$, —NHC=(O)NHNH$_2$, —NHC=(O)NH$_2$, —NHSO$_2$H, —NHC=(O)H, —NHC(O)—OH, —NHOH, substituted or unsubstituted alkyl (e.g., C$_1$-C$_8$, C$_1$-C$_6$, or C$_1$-C$_4$), substituted or unsubstituted heteroalkyl (e.g., 2 to 8 membered, 2 to 6 membered, or 2 to 4 membered), substituted or unsubstituted cycloalkyl (e.g., C$_3$-C$_8$, C$_3$-C$_6$, or C$_5$-C$_6$), substituted or unsubstituted heterocycloalkyl (e.g., 3 to 8 membered, 3 to 6 membered, or 5 to 6 membered), substituted or unsubstituted aryl (e.g., C$_6$-C$_{10}$, C$_{10}$, or phenylene), or substituted or unsubstituted heteroaryl (e.g., 5 to 10 membered, 5 to 9 membered, or 5 to 6 membered). In embodiments, R$^4$ is an unsubstituted alkyl (e.g. C$_1$-C$_8$, C$_1$-C$_6$, or C$_1$-C$_4$), unsubstituted heteroalkyl (e.g. 2 to 10 membered, 2 to 8 membered, 4 to 8 membered, 2 to 6 membered, or 2 to 4 membered), unsubstituted cycloalkyl (e.g. C$_3$-C$_8$, C$_4$-C$_8$, or C$_5$-C$_6$), unsubstituted heterocycloalkyl (e.g. 3 to 8 membered, 4 to 8 membered, or 5 to 6 membered), unsubstituted aryl (e.g. C$_6$-C$_{10}$ or C$_6$), or unsubstituted heteroaryl (e.g. 5 to 10 membered, 5 to 9 membered, or 5 to 6 membered).

In embodiments, R$^4$ is independently halogen, —CF$_3$, —Cl$_3$, —CI$_3$, —CBr$_3$, —CHF$_2$, —CHCl$_2$, —CHI$_2$, —CHBr$_2$, —OCH$_2$F, —OCH$_2$Cl, —OCH$_2$I, —OCH$_2$Br, —OCHF$_2$, —CHCl$_2$, —OCHI$_2$, —OCHBr$_2$, —OCF$_3$, —OCl$_3$, —OCI$_3$, —OCBr$_3$, —CN, —OH, —NH$_2$, —COOH, —CONH$_2$, —NO$_2$, —SH, —SO$_3$H, —SO$_4$H, —$SO_2NH_2$, —$NHNH_2$, —$ONH_2$, —NHC=(O)$NHNH_2$, —NHC=(O)$NH_2$, —$NHSO_2H$, —NHC=(O)H, —NHC(O)—OH, —NHOH, substituted or unsubstituted $C_1$-$C_8$ alkyl, substituted or unsubstituted 2 to 8 membered heteroalkyl, substituted or unsubstituted $C_3$-$C_8$ cycloalkyl, substituted or unsubstituted 3 to 6 membered heterocycloalkyl, substituted or unsubstituted phenyl, or substituted or unsubstituted 5 to 6 membered heteroaryl.

In embodiments, $R^4$ is independently halogen, —$CF_3$, —$Cl_3$, —$CI_3$, —$CBr_3$, —$CHF_2$, —$CHCl_2$, —$CHI_2$, —$CHBr_2$, —$OCH_2F$, —$OCH_2Cl$, —$OCH_2I$, —$OCH_2Br$, —$OCHF_2$, —$CHCl_2$, —$OCHI_2$, —$OCHBr_2$, —$OCF_3$, —$OCl_3$, —$OCI_3$, —$OCBr_3$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC=(O)$NHNH_2$, —NHC=(O)$NH_2$, —$NHSO_2H$, —NHC=(O)H, —NHC(O)—OH, —NHOH, $R^5$-substituted or unsubstituted alkyl (e.g., $C_1$-$C_8$, $C_1$-$C_6$, or $C_1$-$C_4$), $R^5$-substituted or unsubstituted heteroalkyl (e.g., 2 to 8 membered, 2 to 6 membered, or 2 to 4 membered), $R^5$-substituted or unsubstituted cycloalkyl (e.g., $C_3$-$C_8$, $C_3$-$C_6$, or $C_5$-$C_6$), $R^5$-substituted or unsubstituted heterocycloalkyl (e.g., 3 to 8 membered, 3 to 6 membered, or 5 to 6 membered), $R^5$-substituted or unsubstituted aryl (e.g., $C_6$-$C_{10}$, $C_{10}$, or phenylene), or $R^5$-substituted or unsubstituted heteroaryl (e.g., 5 to 10 membered, 5 to 9 membered, or 5 to 6 membered).

$R^5$, $R^7$, $R^9$, $R^{11}$, $R^{13}$, $R^{15}$, and $R^{17}$ are independently halogen, —$CF_3$, —$Cl_3$, —$CI_3$, —$CBr_3$, —$CHF_2$, —$CHCl_2$, —$CHI_2$, —$CHBr_2$, —$OCH_2F$, —$OCH_2Cl$, —$OCH_2I$, —$OCH_2Br$, —$OCHF_2$, —$CHCl_2$, —$OCHI_2$, —$OCHBr_2$, —$OCF_3$, —$OCl_3$, —$OCI_3$, —$OCBr_3$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC=(O)$NHNH_2$, —NHC=(O)$NH_2$, —$NHSO_2H$, —NHC=(O)H, —NHC(O)—OH, —NHOH, unsubstituted alkyl (e.g. $C_1$-$C_8$, $C_1$-$C_6$, or $C_1$-$C_4$), unsubstituted heteroalkyl (e.g. 2 to 10 membered, 2 to 8 membered, 4 to 8 membered, 2 to 6 membered, or 2 to 4 membered), unsubstituted cycloalkyl (e.g. $C_3$-$C_8$, $C_4$-$C_8$, or $C_5$-$C_6$), unsubstituted heterocycloalkyl (e.g. 3 to 8 membered, 4 to 8 membered, or 5 to 6 membered), unsubstituted aryl (e.g. $C_6$-$C_{10}$ or $C_6$), or unsubstituted heteroaryl (e.g. 5 to 10 membered, 5 to 9 membered, or 5 to 6 membered).

In embodiments, the polymer composition or the plurality of metal organic framework linkers has a molecular weight from about 4,000 g/mol to about 5,000,000 g/mol. In embodiments, the polymer composition or the plurality of metal organic framework linkers has a molecular weight from about 4,000 g/mol to about 50,000 g/mol. In embodiments, the metal organic framework linker has a molecular weight from about 8,000 g/mol to about 30,000 g/mol. In embodiments, the metal organic framework linker has a molecular weight from about 12,000 g/mol to about 18,000 g/mol.

In embodiments, the polymerized metal organic framework has a molecular weight from about 4,000 g/mol to about 5,000,000 g/mol. In embodiments, the polymerized metal organic framework has a molecular weight from about 4,000 g/mol to about 50,000 g/mol. In embodiments, the polymerized metal organic framework has a molecular weight from about 8,000 g/mol to about 30,000 g/mol. In embodiments, the polymerized metal organic framework has a molecular weight from about 12,000 g/mol to about 18,000 g/mol.

In embodiments, the polymer composition or the plurality of metal organic framework linkers has a molecular weight from about 500, 1,000, 1,500, 2,000, 2,500, 3,000, 3,500, 4,000, 4,500, 5,000, 5,500, 6,000, 6,500, 7,000, 7,500, 8,000, 8,500, 9,000, 9,500, 10,000, 10,500, 11,000, 11,500, 12,000, 12,500, 13,000, 13,500, 14,000, 14,500, 15,000, 15,500, 16,000, 16,500, 17,000, 17500, 18,000, 18,500, 19,000, 19,500, 20,000, 20,500, 21,000, 21,500, 22,000, 22,500, 23,000, 23,500, 24,000, 24,500, 25,000, 25,500, 26,000, 26,500, 27,000, 27,500, 28,000, 28,500, 29,000, 29,500, 30,000, 30,500, 31,000, 31,500, 32,000, 32,500, 33,000 33,500, 34,000, 34,500, 35,000, 35,500, 36,000, 36,500, 37,000, 37,500, 38,000, 38,500, 39,000, 39,500, 40,000.0, 40,500, 41,000, 41,500, 42,000, 42,500, 43,000, 43,500, 44,000, 44,500, 45,000, 45,500, 46,000, 46,500, 47,000, 47,500, 48,000, 48,500, 49,000, 49,500, or about 50,000 g/mol.

In embodiments, the polymer composition or the plurality of metal organic framework linkers has a molecular weight from about 50,000, 100,000, 150,000, 200,000, 250,000, 300,000, 350,000, 400,000, 450,000, 500,000, 550,000, 600,000, 650,000, 700,000, 750,000, 800,000, 850,000, 900,000, 950,000, 1,000,000, 1,050,000, 1,100,000, 1,150,000, 1,200,000, 1,250,000, 1,300,000, 1,350,000, 1,400,000, 1,450,000, 1,500,000, 1,550,000, 1,600,000, 1,650,000, 1,700,000, 1,750,000, 1,800,000, 1,850,000, 1,900,000, 1,950,000, 2,000,000, 2,050,000, 2,100,000, 2,150,000, 2,200,000, 2,250,000, 2,300,000, 2,350,000, 2,400,000, 2,450,000, 2,500,000, 2,550,000, 2,600,000, 2,650,000, 2,700,000, 2,750,000, 2,800,000, 2,850,000, 2,900,000, 2,950,000, 3,000,000, 3,050,000, 3,100,000, 3,150,000, 3,200,000, 3,250,000, 3,300,000, 3,350,000, 3,400,000, 3,450,000, 3,500,000, 3,550,000, 3,600,000, 3,650,000, 3,700,000, 3,750,000, 3,800,000, 3,850,000, 3,900,000, 3,950,000, 4,000,000, 4,050,000, 4,100,000, 4,150,000, 4,200,000, 4,250,000, 4,300,000, 4,350,000, 4,400,000, 4,450,000, 4,500,000, 4,550,000, 4,600,000, 4,650,000, 4,700,000, 4,750,000, 4,800,000, 4,850,000, 4,900,000, 4,950,000, or about 5,000,000 g/mol.

In embodiments, the polymerized metal organic framework has a molecular weight from about 500, 1,000, 1,500, 2,000, 2,500, 3,000, 3,500, 4,000, 4,500, 5,000, 5,500, 6,000, 6,500, 7,000, 7,500, 8,000, 8,500, 9,000, 9,500, 10,000, 10,500, 11,000, 11,500, 12,000, 12,500, 13,000, 13,500, 14,000, 14,500, 15,000, 15,500, 16,000, 16,500, 17,000, 17500, 18,000, 18,500, 19,000, 19,500, 20,000, 20,500, 21,000, 21,500, 22,000, 22,500, 23,000, 23,500, 24,000, 24,500, 25,000, 25,500, 26,000, 26,500, 27,000, 27,500, 28,000, 28,500, 29,000, 29,500, 30,000, 30,500, 31,000, 31,500, 32,000, 32,500, 33,000 33,500, 34,000, 34,500, 35,000, 35,500, 36,000, 36,500, 37,000, 37,500, 38,000, 38,500, 39,000, 39,500, 40,000.0, 40,500, 41,000, 41,500, 42,000, 42,500, 43,000, 43,500, 44,000, 44,500, 45,000, 45,500, 46,000, 46,500, 47,000, 47,500, 48,000, 48,500, 49,000, 49,500, or about 50,000 g/mol.

In embodiments, the polymerized metal organic framework linkers has a molecular weight from about 50,000, 100,000, 150,000, 200,000, 250,000, 300,000, 350,000, 400,000, 450,000, 500,000, 550,000, 600,000, 650,000, 700,000, 750,000, 800,000, 850,000, 900,000, 950,000, 1,000,000, 1,050,000, 1,100,000, 1,150,000, 1,200,000, 1,250,000, 1,300,000, 1,350,000, 1,400,000, 1,450,000, 1,500,000, 1,550,000, 1,600,000, 1,650,000, 1,700,000, 1,750,000, 1,800,000, 1,850,000, 1,900,000, 1,950,000, 2,000,000, 2,050,000, 2,100,000, 2,150,000, 2,200,000, 2,250,000, 2,300,000, 2,350,000, 2,400,000, 2,450,000, 2,500,000, 2,550,000, 2,600,000, 2,650,000, 2,700,000, 2,750,000, 2,800,000, 2,850,000, 2,900,000, 2,950,000, 3,000,000, 3,050,000, 3,100,000, 3,150,000, 3,200,000, 3,250,000, 3,300,000, 3,350,000, 3,400,000, 3,450,000, 3,500,000, 3,550,000, 3,600,000, 3,650,000, 3,700,000, 3,750,000, 3,800,000, 3,850,000, 3,900,000, 3,950,000, 4,000,000, 4,050,000, 4,100,000, 4,150,000, 4,200,000, 4,250,000, 4,300,000, 4,350,000, 4,400,000, 4,450,000, 4,500,000, 4,550,000, 4,600,000, 4,650,000, 4,700,000, 4,750,000, 4,800,000, 4,850,000, 4,900,000, 4,950,000, or about 5,000,000 g/mol.

In embodiments, the metal organic framework linker has a melting temperature of about 150° C. to about 250° C. In embodiments, the metal organic framework linker has a melting temperature of about 160° C. to about 200° C. In embodiments, the metal organic framework linker has a melting temperature of about 200° C. to about 230° C. In embodiments, the metal organic framework linker has a glass transition temperature from about 60° C. to about 100° C. In embodiments, the polymerized metal organic framework has a melting temperature of about 150° C. to about 250° C. In embodiments, the polymerized metal organic framework has a melting temperature of about 160° C. to about 200° C. In embodiments, the polymerized metal organic framework has a melting temperature of about 200° C. to about 230° C. In embodiments, the polymerized metal organic framework has a glass transition temperature from about 60° C. to about 100° C.

In embodiments, n is an integer from 2 to 1000. In embodiments, n is an integer from 2 to 500. In embodiments, n is an integer from 10 to 1000. In embodiments, n is an integer from 10 to 500. In embodiments, n is an integer from 2 to 100. In embodiments, n is an integer from 2 to 50. In embodiments, n is an integer from 20 to 100. In embodiments, n is an integer from 20 to 50. In embodiments, n is 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, 500, 501, 502, 503, 504, 505, 506, 507, 508, 509, 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, 541, 542, 543, 544, 545, 546, 547, 548, 549, 550, 551, 552, 553, 554, 555, 556, 557, 558, 559, 560, 561, 562, 563, 564, 565, 566, 567, 568, 569, 570, 571, 572, 573, 574, 575, 576, 577, 578, 579, 580, 581, 582, 583, 584, 585, 586, 587, 588, 589, 590, 591, 592, 593, 594, 595, 596, 597, 598, 599, 600, 601, 602, 603, 604, 605, 606, 607, 608, 609, 610, 611, 612, 613, 614, 615, 616, 617, 618, 619, 620, 621, 622, 623, 624, 625, 626, 627, 628, 629, 630, 631, 632, 633, 634, 635, 636, 637, 638, 639, 640, 641, 642, 643, 644, 645, 646, 647, 648, 649, 650, 651, 652, 653, 654, 655, 656, 657, 658, 659, 660, 661, 662, 663, 664, 665, 666, 667, 668, 669, 670, 671, 672, 673, 674, 675, 676, 677, 678, 679, 680, 681, 682, 683, 684, 685, 686, 687, 688, 689, 690, 691, 692, 693, 694, 695, 696, 697, 698, 699, 700, 701, 702, 703, 704, 705, 706, 707, 708, 709, 710, 711, 712, 713, 714, 715, 716, 717, 718, 719, 720, 721, 722, 723, 724, 725, 726, 727, 728, 729, 730, 731, 732, 733, 734, 735, 736, 737, 738, 739, 740, 741, 742, 743, 744, 745, 746, 747, 748, 749, 750, 751, 752, 753, 754, 755, 756, 757, 758, 759, 760, 761, 762, 763, 764, 765, 766, 767, 768, 769, 770, 771, 772, 773, 774, 775, 776, 777, 778, 779, 780, 781, 782, 783, 784, 785, 786, 787, 788, 789, 790, 791, 792, 793, 794, 795, 796, 797, 798, 799, 800, 801, 802, 803, 804, 805, 806, 807, 808, 809, 810, 811, 812, 813, 814, 815, 816, 817, 818, 819, 820, 821, 822, 823, 824, 825, 826, 827, 828, 829, 830, 831, 832, 833, 834, 835, 836, 837, 838, 839, 840, 841, 842, 843, 844, 845, 846, 847, 848, 849, 850, 851, 852, 853, 854, 855, 856, 857, 858, 859, 860, 861, 862, 863, 864, 865, 866, 867, 868, 869, 870, 871, 872, 873, 874, 875, 876, 877, 878, 879, 880, 881, 882, 883, 884, 885, 886, 887, 888, 889, 890, 891, 892, 893, 894, 895, 896, 897, 898, 899, 900, 901, 902, 903, 904, 905, 906, 907, 908, 909, 910, 911, 912, 913, 914, 915, 916, 917, 918, 919, 920, 921, 922, 923, 924, 925, 926, 927, 928, 929, 930, 931, 932, 933, 934, 935, 936, 937, 938, 939, 940, 941, 942, 943, 944, 945, 946, 947, 948, 949, 950, 951, 952, 953, 954, 955, 956, 957, 958, 959, 960, 961, 962, 963, 964, 965, 966, 967, 968, 969, 970, 971, 972, 973, 974, 975, 976, 977, 978, 979, 980, 981, 982, 983, 984, 985, 986, 987, 988, 989, 990, 991, 992, 993, 994, 995, 996, 997, 998, 999, or 1,000.

In embodiments, n1 is an integer from 2 to 1000. In embodiments, n1 is an integer from 2 to 500. In embodiments, n1 is an integer from 10 to 1000. In embodiments, n1 is an integer from 10 to 500. In embodiments, n1 is an integer from 2 to 100. In embodiments, n1 is an integer from 2 to 50. In embodiments, n1 is an integer from 20 to 100. In embodiments, n1 is an integer from 20 to 50. In embodiments, n1 is 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, 500, 501, 502, 503, 504, 505, 506, 507, 508, 509, 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, 541, 542, 543, 544, 545, 546, 547, 548, 549, 550, 551, 552, 553, 554, 555, 556, 557, 558, 559, 560, 561, 562, 563, 564, 565, 566, 567, 568, 569, 570, 571, 572, 573, 574, 575, 576, 577, 578, 579, 580, 581, 582, 583, 584, 585, 586, 587, 588, 589, 590, 591, 592, 593, 594, 595, 596, 597, 598, 599, 600, 601, 602, 603, 604, 605, 606, 607, 608, 609, 610, 611, 612, 613, 614, 615, 616, 617, 618, 619, 620, 621, 622, 623, 624, 625, 626, 627, 628, 629, 630, 631, 632, 633, 634, 635, 636, 637, 638, 639, 640, 641, 642, 643, 644, 645, 646, 647, 648, 649, 650, 651, 652, 653, 654, 655, 656, 657, 658, 659, 660, 661, 662, 663, 664, 665, 666, 667, 668, 669, 670, 671, 672, 673, 674, 675, 676, 677, 678, 679, 680, 681, 682, 683, 684, 685, 686, 687, 688, 689, 690, 691, 692, 693, 694, 695, 696, 697, 698, 699, 700, 701, 702, 703, 704, 705, 706, 707, 708, 709, 710, 711, 712, 713, 714, 715, 716, 717, 718, 719, 720, 721, 722, 723, 724, 725, 726, 727, 728, 729, 730, 731, 732, 733, 734, 735, 736, 737, 738, 739, 740, 741, 742, 743, 744, 745, 746, 747, 748, 749, 750, 751, 752, 753, 754, 755, 756, 757, 758, 759, 760, 761, 762, 763, 764, 765, 766, 767, 768, 769, 770, 771, 772, 773, 774, 775, 776, 777, 778, 779, 780, 781, 782, 783, 784, 785, 786, 787, 788, 789, 790, 791, 792, 793, 794, 795, 796, 797, 798, 799, 800, 801, 802, 803, 804, 805, 806, 807, 808, 809, 810, 811, 812, 813, 814, 815, 816, 817, 818, 819, 820, 821, 822, 823, 824, 825, 826, 827, 828, 829, 830, 831, 832, 833, 834, 835, 836, 837, 838, 839, 840, 841, 842, 843, 844, 845, 846, 847, 848, 849, 850, 851, 852, 853, 854, 855, 856, 857, 858, 859, 860, 861, 862, 863, 864, 865, 866, 867, 868, 869, 870, 871, 872, 873, 874, 875, 876, 877, 878, 879, 880, 881, 882, 883, 884, 885, 886, 887, 888, 889, 890, 891, 892, 893, 894, 895, 896, 897, 898, 899, 900, 901, 902, 903, 904, 905, 906, 907, 908, 909, 910, 911, 912, 913, 914, 915, 916, 917, 918, 919, 920, 921, 922, 923, 924, 925, 926, 927, 928, 929, 930, 931, 932, 933, 934, 935, 936, 937, 938, 939, 940, 941, 942, 943, 944, 945, 946, 947, 948, 949, 950, 951, 952, 953, 954, 955, 956, 957, 958, 959, 960, 961, 962, 963, 964, 965, 966, 967, 968, 969, 970, 971, 972, 973, 974, 975, 976, 977, 978, 979, 980, 981, 982, 983, 984, 985, 986, 987, 988, 989, 990, 991, 992, 993, 994, 995, 996, 997, 998, 999, or 1,000.

In embodiments, n1 is an integer from 1 to 20. In embodiments, n1 is an integer from 5 to 12. In embodiments, n1 is an integer from 5 to 8. In embodiments, n1 is an integer from 7 to 8. In embodiments, n1 is 1. In embodiments, n1 is 2. In embodiments, n1 is 3. In embodiments, n1 is 4. In embodiments, n1 is 5. In embodiments, n1 is 6. In embodiments, n1 is 7. In embodiments, n1 is 8. In embodiments, n1 is 9. In embodiments, n1 is 10. In embodiments, n1 is 11. In embodiments, n1 is 12. In embodiments, n1 is 13. In embodiments, n1 is 14. In embodiments, n1 is 15. In embodiments, n1 is 16. In embodiments, n1 is 17. In embodiments, n1 is 18. In embodiments, n1 is 19. In embodiments, n1 is 20.

In embodiments, n2 is an integer from 1 to 20. In embodiments, n2 is an integer from 2 to 8. In embodiments, n2 is 1. In embodiments, n2 is 2. In embodiments, n2 is 3. In embodiments, n2 is 4. In embodiments, n2 is 5. In embodiments, n2 is 6. In embodiments, n2 is 7. In embodiments, n2 is 8. In embodiments, n2 is 9. In embodiments, n2 is 10. In embodiments, n2 is 11. In embodiments, n2 is 12. In embodiments, n2 is 13. In embodiments, n2 is 14. In embodiments, n2 is 15. In embodiments, n2 is 16. In embodiments, n2 is 17. In embodiments, n2 is 18. In embodiments, n2 is 19. In embodiments, n2 is 20.

In embodiments, the polymerized metal organic framework is isostructural with isoreticular metal organic framework-1 (IRMOF-1, MOF-5), Hong Kong University of Science and Technology-1 (HKUST-1), Pillared Paddlewheel, Zeolitic imidazolate framework-71 (ZIF-71), MOF-74, Universitetet i Oslo-66 (UiO-66), or Materiaux de l'Institut Lavoisier-53 (MIL-53). In embodiments, the polymerized metal organic framework is isostructural with isoreticular metal organic framework-1 (IRMOF-1, MOF-5). In embodiments, the polymerized metal organic framework is isostructural with Hong Kong University of Science and Technology-1 (HKUST-1). In embodiments, the polymerized metal organic framework is isostructural with Pillared Paddlewheel. In embodiments, the polymerized metal organic framework is isostructural with Zeolitic imidazolate framework-71 (ZIF-71). In embodiments, the polymerized metal organic framework is isostructural with MOF-74. In embodiments, the polymerized metal organic framework is isostructural with Universitetet i Oslo-66 (UiO-66). In embodiments, the polymerized metal organic framework is isostructural with Materiaux de l'Institut Lavoisier-53 (MIL-53).

In embodiments the polymerized metal organic framework has an average pore diameter from about 6 Å to about 12 Å. In embodiments the polymerized metal organic framework has an average pore diameter from about 6 Å to about 10 Å. In embodiments the polymerized metal organic framework has an average pore diameter of about 6 Å. In embodiments the polymerized metal organic framework has an average pore diameter of about 7 Å. In embodiments the polymerized metal organic framework has an average pore diameter of about 8 Å. In embodiments the polymerized metal organic framework has an average pore diameter of about 9 Å. In embodiments the polymerized metal organic framework has an average pore diameter of about 10 Å. In embodiments the polymerized metal organic framework has an average pore diameter of about 11 Å. In embodiments the polymerized metal organic framework has an average pore diameter of about 12 Å.

In embodiments, the polymerized metal organic framework adheres to a surface (e.g. glass). In embodiments, the polymerized metal organic framework adheres to glass. In embodiments, the polymerized metal organic framework adhere with a preferred orientation. In embodiments, the polymerized metal organic framework adhere along the direction perpendicular to the (110) plane of the cubic unit cell. In embodiments, the polymerized metal organic framework adhere along the direction parallel to the (110) plane of the cubic unit cell.

In embodiments, the polymerized metal organic framework is hydrophilic. In embodiments, the polymerized metal organic framework is hydrophobic. In embodiments, the polymerized metal organic framework is amphiphilic. In embodiments, the polymerized metal organic framework is stable (e.g., maintains structure) upon exposure to water. In embodiments, the polymerized metal organic framework is rigid. In embodiments, the polymerized metal organic framework is flexible. The hydrophobicity or hydrophilicity may be determined by contact angle measurements as described herein.

In embodiments, the polymerized metal organic framework forms a crystal. In embodiments, the polymerized metal organic framework forms a layer on a surface (e.g., film). In embodiments, the polymerized metal organic framework forms a layer on a surface greater than single unit thickness. In embodiments, the layer is less than 100 µm thick. In embodiments, the layer is less than 90 µm thick. In embodiments, the layer is less than 50 µm thick. In embodiments, the layer is less than 30 m thick. In embodiments, the layer is less than 25 µm thick. In embodiments, the layer is less than 20 µm thick. In embodiments, the layer is less than 10 µm thick. In embodiments, the layer is less than 5 µm thick.

In embodiments, the polymerized metal organic framework forms a triclinic, monoclinic, orthorhombic, tetragonal, trigonal, hexagonal, or cubic crystal. In embodiments, the polymerized metal organic framework forms a cubic, prismatic, triclinic, tetragonal, trigonal crystal, or mixtures thereof. In embodiments, the polymerized metal organic framework forms a cubic crystal. In embodiments, the polymerized metal organic framework forms a prismatic crystal. In embodiments, the polymerized metal organic framework forms a triclinic crystal. In embodiments, the polymerized metal organic framework forms a tetragonal crystal. In embodiments, the polymerized metal organic framework forms a trigonal crystal. In embodiments, the polymerized metal organic framework forms a mixture of cubic and prismatic crystals. In embodiments, the polymerized metal organic framework forms spherical structures.

In embodiments, the polymerized metal organic framework has a prism, prismatic, pyramid, pyramidal, pinacoid, or platy crystal face. In embodiments, the polymerized metal organic framework has a prism, prismatic, pyramid, pyramidal, pinacoid, or platy crystal habit. In embodiments, the polymerized metal organic framework has a cubic, prismatic, columnar, hexagonal, rosette, sphenoid, or platy crystal habit. In embodiments, the polymerized metal organic framework has a foliated, lamellar, dendritic, bladed, acicular, lenticular, or tabular crystal habit.

In embodiments, the polymerized metal organic framework has a space group. In embodiments, the polymerized metal organic framework has a Pm-3m, P-1, I4/m, R-3, Im-3m, I4/mmm space group.). In embodiments, the polymerized metal organic framework has a Pm-3m space group. In embodiments, the polymerized metal organic framework has a P-1 space group. In embodiments, the polymerized metal organic framework has a I4/m space group. In embodiments, the polymerized metal organic framework has a R-3 space group. In embodiments, the polymerized metal organic framework has a Im-3m space group. In embodiments, the polymerized metal organic framework has a I4/mmm space group.

III. Methods of Use

In an aspect is provided a method of isolating carbon dioxide from a gas, wherein said method includes contacting a polymerized metal organic framework with a gas including carbon dioxide, and allowing the carbon dioxide within the gas to bind or associate (e.g., adsorb) to the polymerized metal organic framework, thereby isolating carbon dioxide from a gas. In embodiments, the polymerized metal organic framework is as described herein, including embodiments.

In embodiments, the gas further includes nitrogen, methane, hydrogen sulfide, hydrogen chloride, hydrogen fluoride, ammonia, or water. In embodiments, the gas further includes water.

In embodiments, the method preferentially isolates carbon dioxide compared to methane or nitrogen. In embodiments, the method preferentially isolates carbon dioxide compared to methane. In embodiments, the method preferentially isolates carbon dioxide compared to nitrogen.

In embodiments, the amount of carbon dioxide isolated is about 50 to about 200 $cm^3/g$. In embodiments, the amount of carbon dioxide isolated is about 50 to about 150 $cm^3/g$. In embodiments, the amount of carbon dioxide isolated is about 70 to about 150 $cm^3/g$. In embodiments, the amount of carbon dioxide isolated is about 10 to about 30 $cm^3/g$ at 1 bar and 298 K. In embodiments, the amount of carbon dioxide isolated is about 11 to about 26 $cm^3/g$ at 1 bar and 298 K.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

EXAMPLES

Example 1. PolyMOFs: A Class of Interconvertible Polymer-Metal Organic-Framework Hybrid Materials The preparation of porous materials from 1-dimensional polymers is challenging because the packing of polymer chains may result in a dense, non-porous arrangement. Herein this example, we demonstrate the remarkable adaptation of an amorphous, linear, non-porous, flexible organic polymer into a 3-dimensional, highly porous, crystalline solid, as the organic component of a metal organic framework (MOF). In embodiments, a polymer with aromatic dicarboxylic acids in the backbone functioned as a polymer-ligand upon annealing with Zn(II)-generating a polymer-metal organic-framework (polyMOF). These materials uproot the dogma that MOFs must be prepared exclusively from small, rigid ligands. Similarly, polyMOFs contradict conventional polymer chemistry by demonstrating that linear and amorphous polymers can be readily coaxed into a highly crystalline, porous, 3-dimensional structure via coordination chemistry.

Porous materials with well-defined size-selective channels or pores have attracted great attention for a wide range of applications, for example ion exchange, catalysis, gas sorption, and drug delivery. These porous materials include both inorganic and organic materials such as zeolites, metal organic frameworks (MOFs), and covalent organic frameworks (COFs), among others. MOFs occupy a special place amongst porous materials due to their extraordinary surface areas (routinely >2500 m$^2$/g), topological diversity, and high functional tunability. In addition to open framework solids, porous 1-dimensional polymers have also been developed. In general, the preparation of such porous polymers is challenging because the dense and efficient packing of polymer chains, even for polymers with low crystallinity, affords materials with minimal porosity. To obtain porous organic chain polymers, inflexible and contorted building blocks, which cannot pack efficiently, have been utilized to generate microporosity.

Herein, we report an innovative strategy to compel 1-dimensional, non-porous, amorphous polymers into 3-dimensional, highly porous, crystalline metal organic frameworks (MOFs) (FIG. 79). The use of organic polymers as a component of MOFs defines a new subclass of porous materials that we term polymer-MOF hybrids (polyMOFs). Such polyMOFs have the potential to harness the advantages of both polymers and MOFs: The porosity, regularity, and crystallinity of MOFs, with the chemical stability, processability, and structural control of polymers. Furthermore, polyMOFs defy conventional wisdom in both MOF and polymer chemistry by showing that a mostly amorphous, non-porous, flexible, 1-dimensional polymer can be easily converted into a highly crystalline, porous, rigid, 3-dimensional material.

Figure 1:
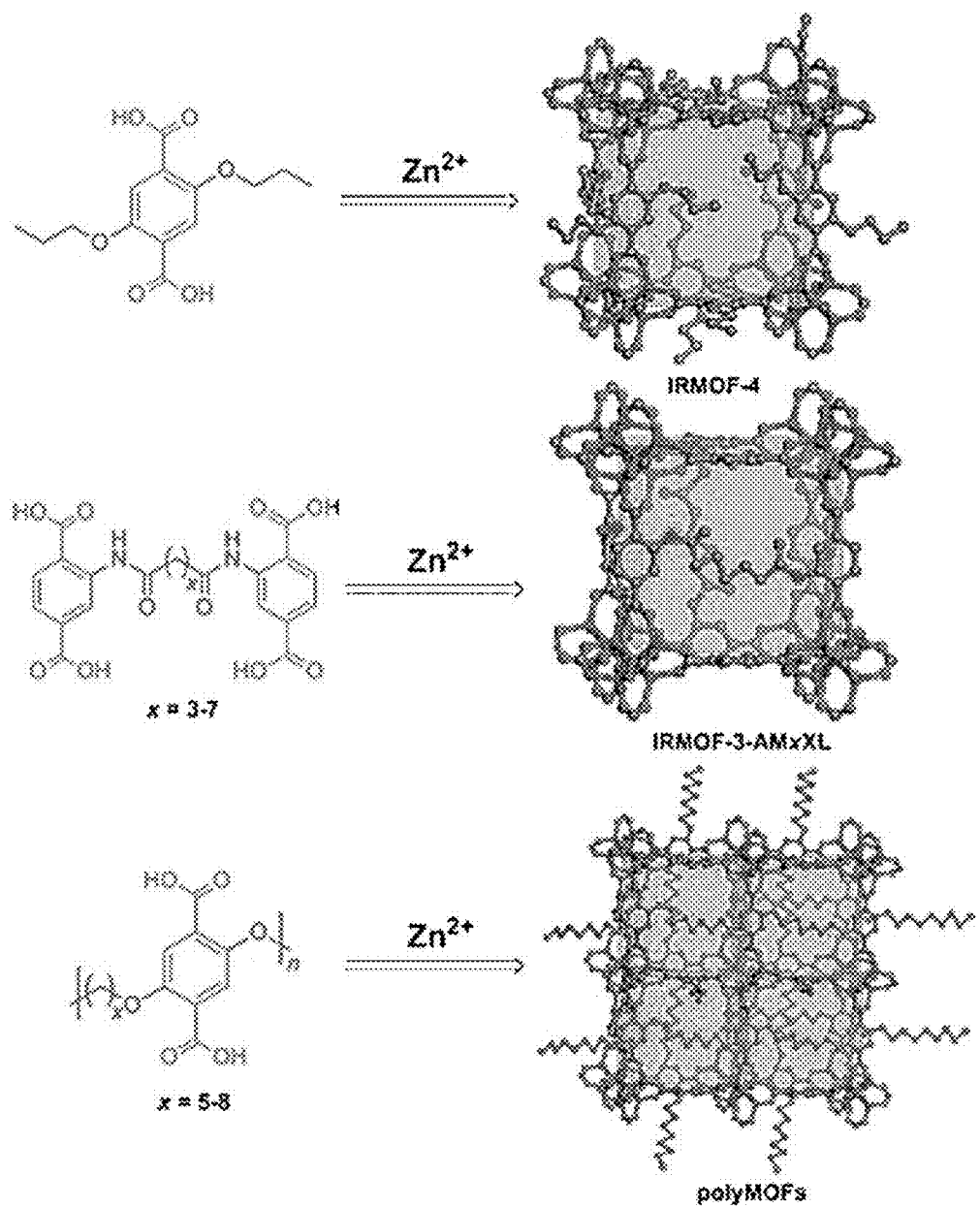
FIG. 1. The evolution of IRMOF derivatives constructed from (top to bottom): an $H_2$bdc ligand derivative, a cross-linked $H_2$bdc ligand, and a polymeric $H_2$bdc 'polymer-ligand'. One polymer chain segment in the bottom image is highlighted for clarity.

There is no reported MOF material, prepared by 'bottom-up' synthesis, that utilizes an amorphous polymer as the organic building block for a MOF. Indeed, the formation of an organized MOF material from such a disorganized precursor would be considered unlikely based on the current view on the synthesis of MOFs, which would predict the formation of an irregular, amorphous, crosslinked solid from a polymer precursor. In addition, from a polymer perspective, a polymer-to-MOF synthesis could be viewed as kinetically and entropically challenging because the unpredictable structure of polymers would seemingly result in chain entanglements and structural irregularities, leading to intractable and amorphous materials. Both chain entanglement and polydispersity are known to hinder the crystallization (self-ordering) of polymers. IRMOF-1 (MOF-5), first described by Yaghi and co-workers in 1999 (H. Li, M. Eddaoudi, M. O'Keeffe, O. M. Yaghi, Nature 1999, 402, 276-279), is a prototypical MOF. Some functional groups, such as halogens, nitro groups, alkyl groups, and others, can be appended to the 1,4-benzenedicarboxylic acid (H$_2$bdc) ligand struts of IRMOF-1 (H. Deng, C. J. Doonan, H. Furukawa, R. B. Ferreira, J. Towne, C. B. Knobler, B. Wang, O. M. Yaghi, Science 2010, 327, 846-850) while maintaining the same structural topology and high porosity (FIG. 1). Recently, our group described a novel presynthetic approach to prepare IRMOF-1 derivatives that utilize cross-linked H$_2$bdc derivatives (FIG. 1).

Figure 4:
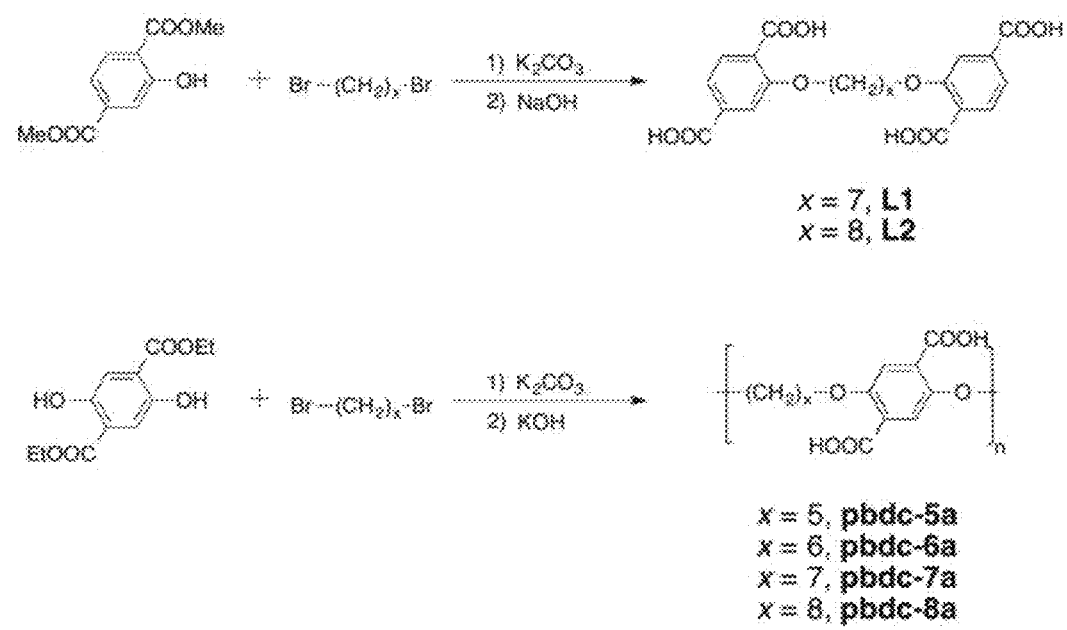
FIG. 4. Synthetic scheme for dimeric (top) and polymer-ligands (bottom).
Figure 5:
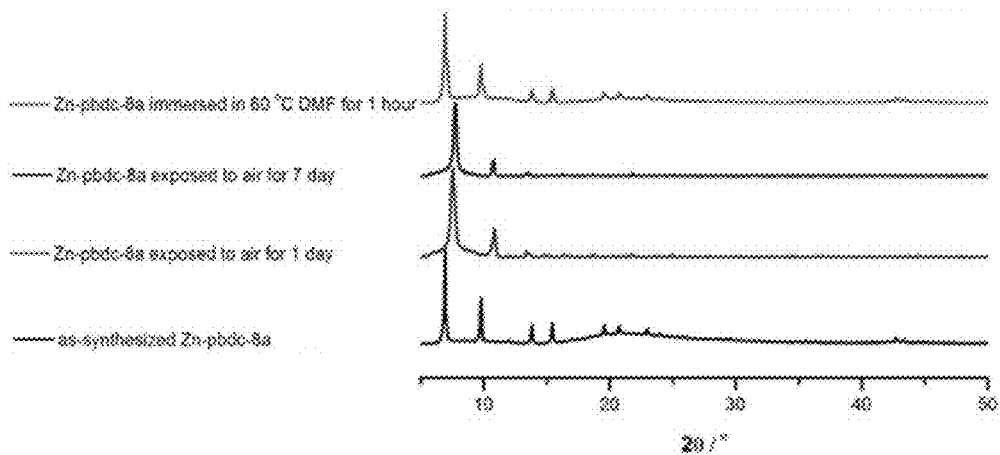
FIG. 5. PXRD patterns of Zn-pbdc-8a (prepared at 80° C.) (black), Zn-pbdc-8a exposed to air for 1 day, Zn-pbdc-8a exposed to air for 7 day, and the air-exposed (7 day) Zn-pbdc-8a immersed in DMF at 60° C. for 1 h.
Figure 6:
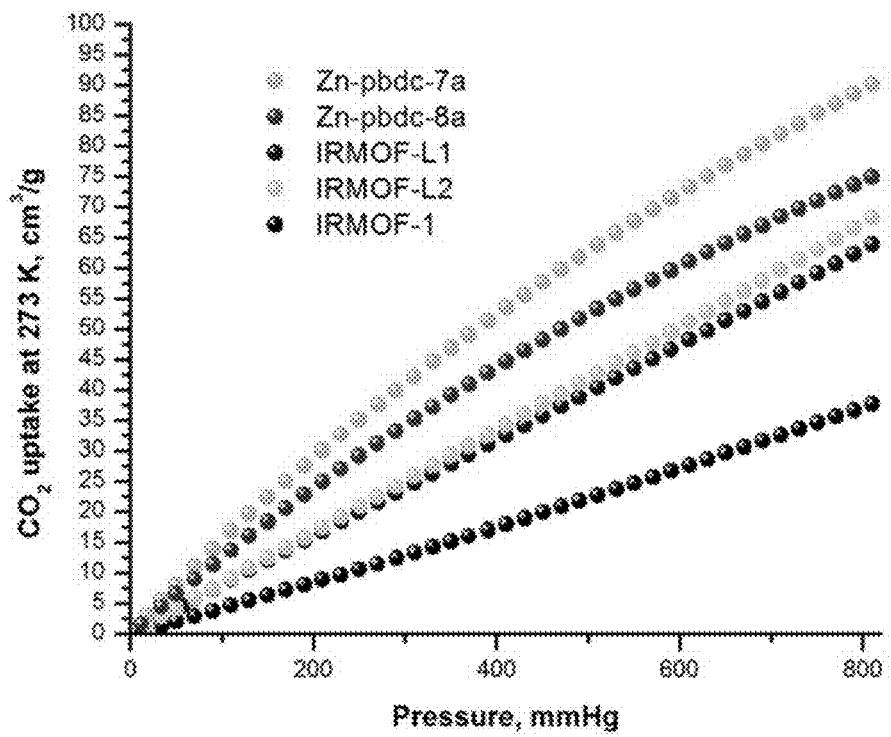
FIG. 6. $CO_2$ adsorption isotherms of Zn-pbdc-7a, Zn-pbdc-8a, IRMOF-L1, IRMOF-L2, and IRMOF-1 at 273K.

A series of polymer precursors (termed 'polymer-ligands') were prepared via step-growth polymerization (FIG. 4). The desired polyethers, containing H$_2$bdc units as part of the polymer chain backbone (FIG. 79), were obtained in two steps. By using linear dibromoalkanes Br(CH$_2$)xBr with different methylene spacers (x=5-8), a series of polyethers having pendent ester functionality (designated as polymeric-bdc-ester, pbdc-xe, x=5-8,) was obtained. Hydrolysis of these polymers afforded the corresponding polyethers containing free carboxylic acid H$_2$bdc units (designated as polymeric-bdc-acid, pbdc-xa, x=5-8, FIG. 79), which were characterized using $^1$H— and $^{13}$C-NMR. Molecular weight values were determined by gel permeation chromatography (GPC), which showed that the polymers possessed molecular weights (M$_w$) ranging from 12,500 g/mol to 17,600 g/mol, with polydispersity index values (PDI) typical of a step-growth polymerization (ranging from ~2.0 to 2.6, Table 1). Varying the solvent ratio (acetone/DMSO) gave polymers of different molecular weights; for example, lower molecular weight pbdc-7a (M$_n$=3,800 g/mol, M$_w$=8,400 g/mol) was obtained using a higher ratio of acetone to DMSO. All experiments described here in this example used the higher molecular weight polymers, unless specified otherwise.

TABLE 1

Thermal and molecular weight data for polymer-ligands.

| Ligands | T$_g$ (° C.) | T$_m$ (° C.)[a] | M$_w$ (g/mol) | M$_n$ (g/mol) | DP[b] | PDI |
|---|---|---|---|---|---|---|
| pbdc-5a | 96 | 229 | 11,700 | 5,900 | 22 | 2.0 |
| pbdc-6a | 93 | 226 | 17,600 | 8,400 | 30 | 2.1 |
| pbdc-7a | 86 | 211 | 13,500 | 5,900 | 20 | 2.3 |
| pbdc-7a[c] | 83 | 206 | 12,000 | 5,200 | 18 | 2.3 |
| pbdc-8a | 77 | 202 | 12,500 | 4,700 | 15 | 2.6 |

[a]DSC analysis afforded melting temperatures on the first heating cycle only. No melting was observed in the second cycle. Crystallization was altogether absent.
[b]Average degree of polymerization (DP) based on M$_n$/(F.W.$_{repeat\ unit}$).
[c]Recovered pbdc-7a from acid-digested polyMOF.

Figure 2:
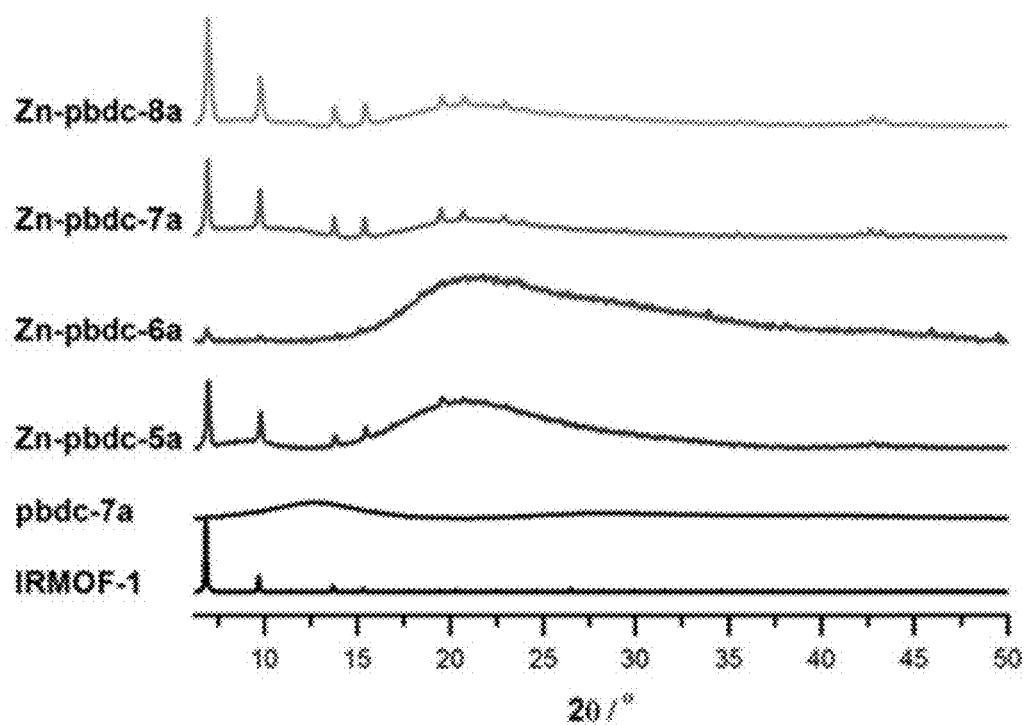
FIG. 2. PXRD patterns for pbdc-7a polymer-ligand, Zn-pbdc-xa polyMOFs (synthesized at 100° C.), and calculated IRMOF-1.

The glass transition temperature (T$_g$) of the polymer-ligands, determined by differential scanning calorimetry (DSC), revealed a clear trend, showing that the T$_g$ decreases from 96° C. to 77° C. with an increasing number of methylene spacers (x=5-8) in the polymer backbone (Table 1). This is consistent with more methylene spacers increasing the conformational freedom of the polymer and diluting its polar fraction, resulting in lower T$_g$ values. Similarly, the measured polymer melting temperatures decreased (from 229 to 202° C.) with an increase in the nonpolar methylene spacer length. Note that melting temperatures were found on the first DSC heating cycle only. Measured heats of fusion ($\Delta$H$_f$=22 to 44 J/g) were 8 to 15% the value of linear polyethylene (289 J/g). In subsequent DSC cooling or heating scans, the lack of observable crystallization or melting events punctuates the low crystallinity of these polymers, which was further corroborated by powder X-ray diffraction (PXRD) (FIG. 2).

A modified version of the typical synthesis for an IRMOF was employed to prepare polyMOF materials. Combining pbdc-xa polymer-ligands with Zn(NO$_3$)$_2$.6H$_2$O in DMF between 60 and 100° C. afforded off-white solids. The topology, structure, and composition of these solids were dependent on which polymer ligand was employed (e.g., x=5-8) and the temperature of the reaction. At the highest temperature employed (100° C.), the powder x-ray diffraction (PXRD) patterns of all of the products (designated as Zn-pbdc-xa) exhibited reflections that showed the formation of an IRMOF-like network (FIG. 2). The PXRD patterns also showed a broad peak centered at 2θ ~22°, indicating the existence of an amorphous phase, the abundance of which was dependent on the polymer composition (e.g., x=5-8). Zn-pbdc-8a and Zn-pbdc-7a had very little amorphous phase, as gauged by PXRD (and scanning electron microscopy, see below), while Zn-pbdc-6a and Zn-pbdc-5a showed a greater amorphous component. Zn-pbdc-6a showed a particularly large amorphous component and only a small IRMOF component.

The morphology and particle size of the resulting materials was determined by SEM. The particle size of the polyMOF samples formed at 100° C. was on the order of 1-10 m. As shown in FIG. 3, the majority of Zn-pbdc-5a particles possess a spherical shape, with only a small number of cubic particles observed. Consistent with the PXRD results, the cubic morphology is typical of IRMOF derivatives, while the spherical particles suggest an amorphous structure. Energy-dispersive X-ray spectroscopy (EDX) revealed the presence of Zn(II) in the spheres, indicating the spheres are comprised of coordination complexes of Zn(II) and pbdc-5a. Similar to Zn-pbdc-5a, Zn-pbdc-6a also displays mixed phases when formed at 100° C. with irregularly shaped solids, consistent with the PXRD pattern. In contrast, Zn-pbdc-7a and Zn-pbdc-8a exhibit very different morphologies. Although both spherical and cubic particles are observed, closer examination shows that the spherical solids are intergrown crystalline superstructures with regular facets. We interpret the polycrystalline, spherical superstructures of Zn-pbdc-7a and Zn-pbdc-8a as the result of many individual crystals growing together and partially sharing polymer-ligands. This likely results from the formation of multiple nucleation sites for IRMOF growth on individual polymer-ligand chains and intergrowth of polymer-ligand chains during coordination to Zn(II).

A representative reaction with pbdc-7a was monitored by $^1$H-NMR in DMF-d$^7$. $^1$H-NMR data revealed the complete consumption of the polymer ligands. The possibility of polymer-ligand degradation during the synthesis process was also excluded. Zn-pbdc-7a was digested in concentrated aqueous $D_2O/DCl$ and then precipitated by adding excess water. GPC and $^1$H-NMR data confirmed that the recovered polymer-ligands remained intact (Table 1).

Although the cubic single crystals in as-synthesized Zn-pbdc-xa powders were too small for routine single-crystal X-ray diffraction (XRD), larger cubic crystals (~20 μm) suitable for XRD could be prepared from lower molecular weight pbdc-7a ($M_n$=3,800 g/mol; see above). XRD data confirmed the IRMOF network of these materials. The position of the heptamethylene linkers between the bdc$^{2-}$ units was not resolved most likely because these linkers are disordered with respect to conformation and occupancy.

Further study revealed that the morphology of polyMOFs could be controlled using different polymer-ligands and by changing the reaction temperature. At a lower temperature of 80° C., rather than forming spheroidal structures, Zn-pbdc-7a and Zn-pbdc-8a produced crystalline films, showing an intergrown network of crystallites. The films were approximately 20 μm thick.

The incorporated unsubstituted alkyl chains of the polymer-ligands may increase the hydrophobicity of the resulting hybrid material. Contact angle measurements with water show that the polymer-ligands pbdc-5a and pbdc-6a are hydrophilic, while pbdc-7a is partially hydrophobic (initial contact angle ~89°, followed by liquid absorption after ~1 min) and pbdc-8a is hydrophobic with a contact angle of 102±2° (with no change over several minutes). A measurement of contact angles for the polyMOF materials was performed revealing that polyMOFs exhibit the same trend as their corresponding polymer-ligands: Zn-pbdc-5a and Zn-pbdc-6a are hydrophilic; Zn-pbdc-7a is partially hydrophobic with initial contact angle of ~92°; and Zn-pbdc-8a is hydrophobic with a contact angle of 112±2°. The increased hydrophobicity was examined with respect to the stability of polyMOFs compared to other IRMOF materials. For example, the PXRD pattern of IRMOF-1 disappears upon exposure to ambient air for 1 day, eventually transforming to a PXRD pattern consistent with MOF-69c. In contrast, the first two characteristic PXRD peaks for Zn-pbdc-8a shift only slightly to higher angle upon exposure to ambient air for 1 day and showed no significant intensity decrease even after a 3 days in air. In addition, the native Zn-pbdc-8a can be regenerated by immersing the crystals in DMF at 60° C. for 1 hour, as verified by PXRD. The regenerated polyMOF retains the original morphology, suggesting neither dissolution nor reformation of the crystallites. By comparison, IRMOF-1 cannot be regenerated via the same procedure after decomposition in air.

Figure 3A:
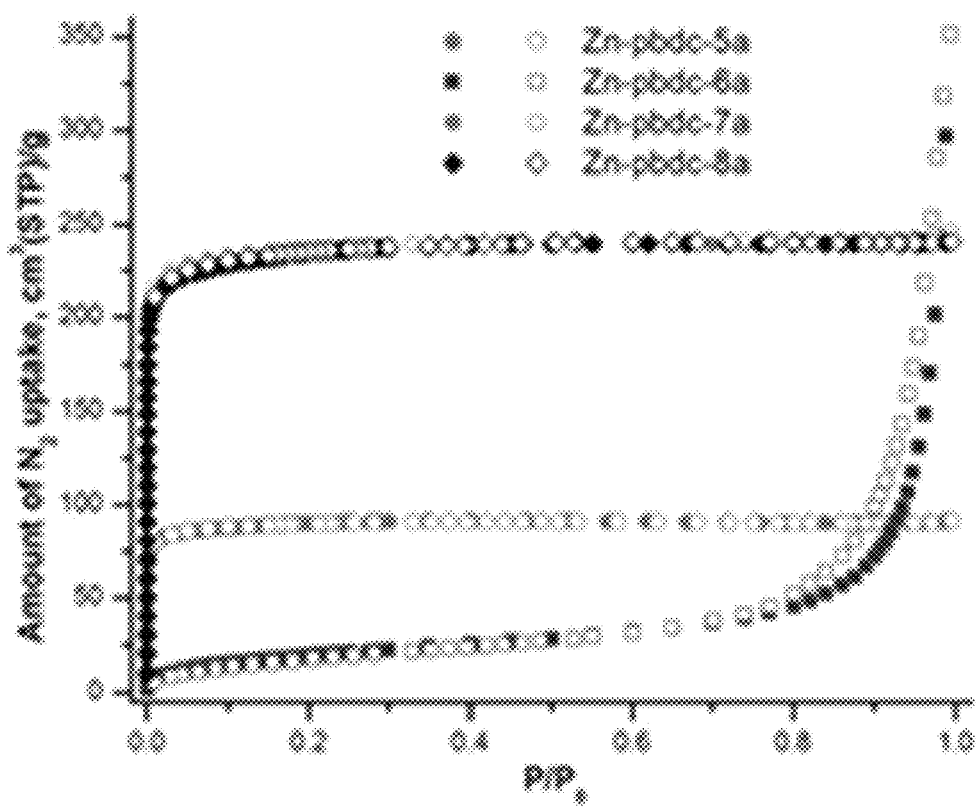
FIGS. 3A-3B: $N_2$ sorption isotherms for polyMOFs (FIG. 3A); $CO_2$ adsorption isotherms at 298K (FIG. 3B). Calculations based on $N_2$ adsorption isotherms reveal that Zn-pbdc-5a, Zn-pbdc-7a, and Zn-pbdc-8a possess Brunauer-Emmett-Teller (BET) surface areas of 232±15, 1104±28, and 856±16 $m^2$/g, respectively. Zn-pbdc-8a, Zn-pbdc-7a, IRMOF-L1, IRMOF-L2, and IRMOF-1 can uptake 41, 49, 30, 35 and 20 $cm^3$/g of $CO_2$ at 1 atm and 298K, respectively.

Just as the polyMOF can inherit the hydrophobicity of the polymer, in certain embodiments, the polyMOF possesses the porosity of the parent IRMOF structure. $N_2$ and $CO_2$ sorption were collected on several samples. The pbdc-xa polymer-ligands are non-porous, presumably due to their amorphous structure and tight packing of polymer chains. In contrast, polyMOF samples Zn-pbdc-5a, Zn-pbdc-7a, and Zn-pbdc-8a exhibit typical type I isotherms at 77 K indicating a uniform microporous structure (FIGS. 3A-3V). Calculations based on $N_2$ adsorption isotherms reveal that Zn-pbdc-5a, Zn-pbdc-7a, and Zn-pbdc-8a possess Brunauer-Emmett-Teller (BET) surface areas of 232±15, 1104±28, and 856±16 m$^2$/g, respectively. Interestingly, Zn-pbdc-6a exhibits a distinctive type II sorption isotherm, indicating the existence of macroporosity, likely generated by particle packing. As such, Zn-pbdc-6a displays a low BET surface area of ~70 m$^2$/g. The relatively low surface areas of Zn-pbdc-5a and Zn-pbdc-6a are consistent with the PXRD and SEM data, and suggest that these two polyMOFs are largely amorphous, unlike Zn-pbdc-7a and Zn-pbdc-8a.

Figure 3B:
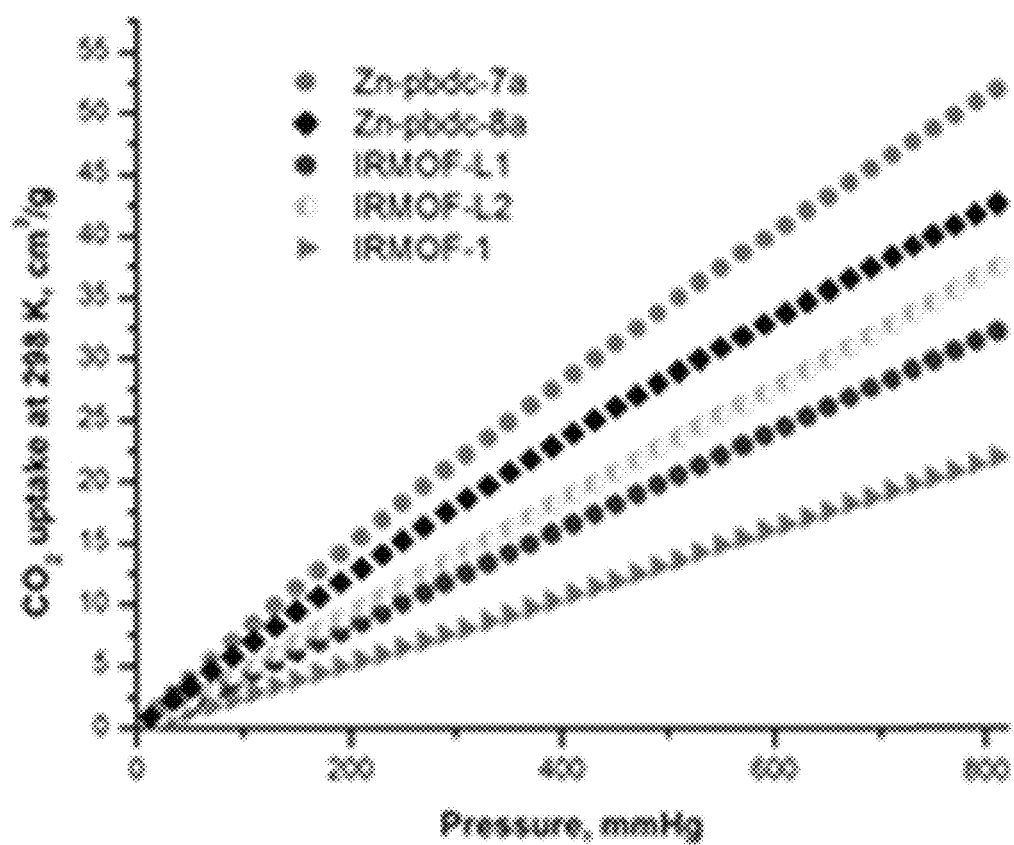
Figure 7:
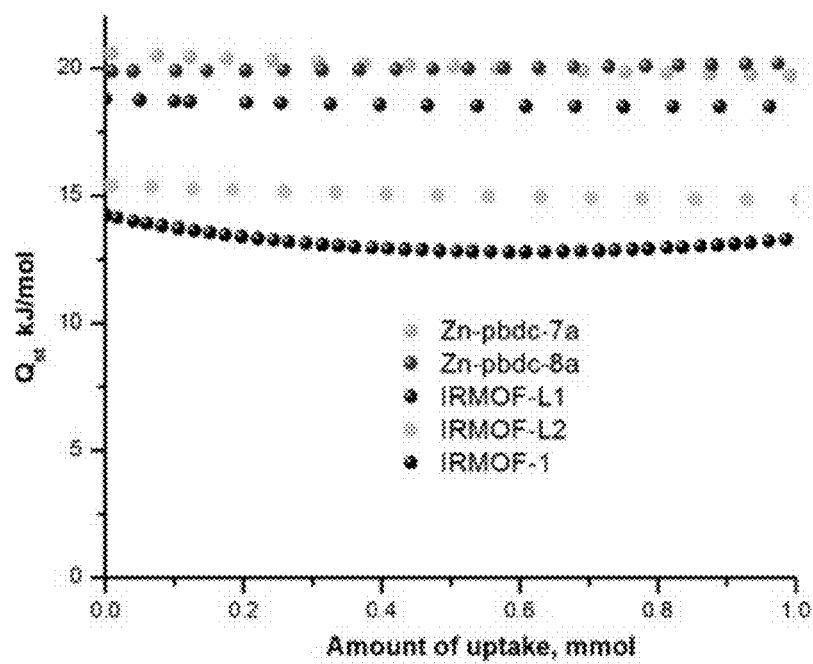
FIG. 7. The isosteric heat ($Q_{st}$) of $CO_2$ adsorption of Zn-pbdc-7a, Zn-pbdc-8a, IRMOF-L1, IRMOF-L2, and IRMOF-1. Virial equation calculations based on $CO_2$ isotherms collected at 273 and 298 K revealed that initial $Q_{st}$ values for Zn-pbdc-8a and Zn-pbdc-7a are 19.9 and 20.6 kJ/mol respectively, which are higher than IRMOF-1 (14.2 kJ/mol) and its derivatives, IRMOF-L1 (17.8 kJ/mol) and IRMOF-L2 (15.4 kJ/mol)
Figure 8:
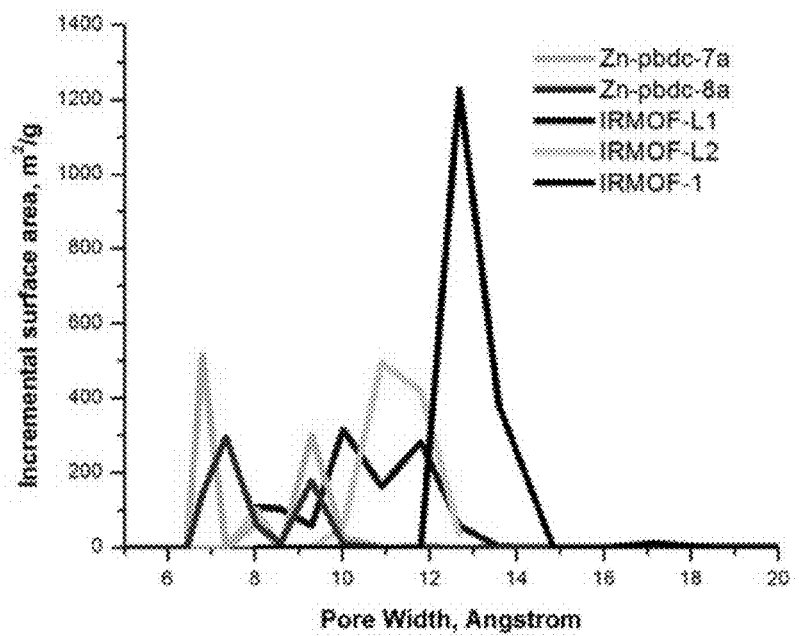
FIG. 8. Pore size distribution of Zn-pbdc-7a, Zn-pbdc-8a, IRMOF-L1, IRMOF-L2, and IRMOF-calculated by DFT methods.
Figure 9:
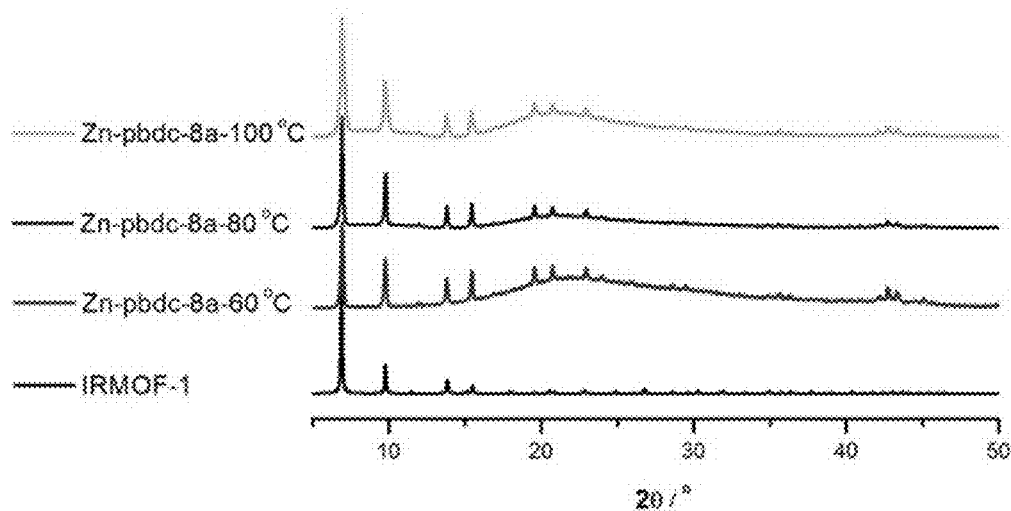
FIG. 9. PXRD patterns of IRMOF-1 (calculated, black) and a representative polyMOF, Zn-pbdc-8a, as synthesized at three different temperatures.

To investigate differences between IRMOFs and polyMOFs, two dimeric $H_2$bdc ligands linked by a single heptamethylene or octamethylene spacer, L1 and L2 (FIG. 4), were synthesized. Using these dimeric ligands, model IRMOFs were prepared, IRMOF-L1 and IRMOF-L2, which contain the same linker length as in Zn-pbdc-7a and Zn-pbdc-8a, respectively, but are not polymeric in nature. IRMOF-L1 and IRMOF-L2 possess IRMOF structures as verified by PXRD. IRMOF-1, IRMOF-L1, and IRMOF-L2 exhibit BET surface areas of 2963±30, 1883±17, and 1817±16 m$^2$/g, respectively. Although polyMOFs exhibited lower surface areas than IRMOF-1, IRMOF-L1, and IRMOF-L2, the polyMOFs were found take up more $CO_2$ (FIG. 3B). Zn-pbdc-8a, Zn-pbdc-7a, IRMOF-L1, IRMOF-L2, and IRMOF-1 can uptake 41, 49, 30, 35 and 20 cm$^3$/g of $CO_2$ at 1 atm and 298K, respectively. This observation suggests that the isosteric heat ($Q_{st}$) of $CO_2$ adsorption of Zn-pbdc-8a and Zn-pbdc-7a is higher than that of IRMOF-1, IRMOF-L1, and IRMOF-L2. Virial equation calculations based on $CO_2$ isotherms collected at 273 and 298 K revealed that initial $Q_{st}$ values for Zn-pbdc-8a and Zn-pbdc-7a are 19.9 and 20.6 kJ/mol respectively, which are higher than IRMOF-1 (14.2 kJ/mol) and its derivatives, IRMOF-L1 (17.8 kJ/mol) and IRMOF-L2 (15.4 kJ/mol) (FIG. 7). The pore size distribution was calculated by density functional theory (DFT) methods from the $N_2$ sorption isotherms (FIG. 8). IRMOF-1 possesses the largest pore size (~13 Å), IRMOF-L1 and IRMOF-L2 possess medium pore size (~11 Å), and Zn-pbdc-7a and Zn-pbdc-8a exhibited the smallest pore sizes (~7 Å and 9 Å). The reduction in pore size most certainly originates from the incorporation of polymer chains (e.g., crosslinks) in the Zn-pbdc-xa frameworks, making the pore widths of the polyMOFs smaller than those of IRMOF-1, IRMOF-L1, and IRMOF-L2. The smaller pore sizes may explain the stronger interactions between $CO_2$ and the polyMOFs, as a decrease in $Q_{st}$ for $CO_2$ has been shown to correlate with increases in pore size.

Within this example, we report a strategy to generate porosity from non-porous, 1-dimesional, amorphous polymeric materials by their transformation into crystalline polyMOF materials via a solvothermal synthesis (annealing) with Zn(II) cations. A series of non-porous polymer-ligands with terephthalate moieties was designed and prepared that upon hydrothermal reaction with Zn(II) cations, forms polycrystalline, hybrid materials with IRMOF networks. PXRD, SEM, and gas sorption data confirm these materials are crystalline, porous, and share the same structure type as IRMOF-1. The incorporation of polymers into MOFs was shown to harness advantages of both materials, including hydrophobicity and permanent porosity. In addition, by selecting certain polymer-ligands at specific annealing temperatures, polyMOF materials exhibit morphologies ranging from spherical superstructures to crystalline films. The formation of polyMOFs from linear organic polymers defies conventional wisdom in both polymer and MOFs fields and opens up the opportunity for the discovery in a new class of materials with emergent properties.

General Methods.

Starting materials and solvents were purchased and used without further purification from commercial suppliers (Sigma-Aldrich, Alfa Aesar, EMD, TCI, Cambridge Isotope Laboratories, Inc.). $^1H$ and $^{13}C$ nuclear magnetic resonance (NMR) spectra were recorded on a Varian VX 500 (500 MHz). Chemical shifts were quoted in parts per million (ppm) referenced to the appropriate solvent peak or 0 ppm for TMS.

General procedure for pbdc-xa (x=5, 6, 7, 8) synthesis (FIG. S1). Diethyl 2,5-dihydroxyterephthalate (1.2 g, 4.7 mmol), the appropriate dibromoalkane (4.75 mmol), and potassium carbonate (2.6 g, 19.0 mmol) were added place in 10 mL of acetone and 23 mL of DMSO. The suspension was stirred and heated at 100° C. for 24 h. After cooling the reaction down to room temperature, 50.0 mL of water was added to the suspension. The polymer was isolated by centrifugation (Beckman Coulter Allegra X-22R Centrifuge, fixed-angle rotor, 6000 rpm for 4 min). The isolated solid (pbdc-xe) was washed with acetone (3×35 mL) and MeOH (3×35 mL), collected by centrifugation, and subsequently oven dried at 60° C. overnight. The polyether yields were on average ~70%. To hydrolyze the pendent ester groups, the polymers (1.0 g) were placed in a 1:1 mixture of water and DMSO (30 mL total) with 4.0 g of KOH. The mixture was heated at 80° C. for 8 h to produce a clear solution. The solution was acidified to a pH value of ~2 with a 1.0 M HCl solution. The resulting precipitate was collected by centrifugation, and subsequently washed with acetone (3×35 mL) and MeOH (3×35 mL) by centrifugation. The isolated polyacid polymers (pbdc-xa) were oven dried at 60° C. overnight. The yields for these hydrolysis reactions were on average ~70%. Lower molecular weight pbdc-7a ($M_n$=3,800 g/mol, $M_w$=8,400 g/mol) was prepared with a solvent modification, where the solvent system for the step-growth polycondensation was 30 mL acetone/3.0 mL DMSO.

NMR Data for Polymer-Ligands:pbdc-5a:

$^1$H-NMR (500 MHz, DMSO-$d_6$): δ 7.27 (s, 2H), 3.98 (t, J=7.5 Hz, 4H); 1.74 (t, J=7.5 Hz, 4H); 1.57 (m, 2H); $^{13}$C-NMR (125 MHz, DMSO-$d_6$): δ 167.4, 150.8, 125.9, 115.8, 69.4, 29.1, 25.5. pbdc-6a: $^1$H-NMR (500 MHz, DMSO-$d_6$): δ 7.27 (s, 2H), 3.98 (t, J=7.5 Hz, 4H); 1.68 (t, J=7.5 Hz, 4H); 1.46 (m, 4H); $^{13}$C-NMR (125 MHz, DMSO-$d_6$): δ 167.4, 150.8, 125.8, 115.8, 69.5, 29.2, 25.6. pbdc-7a: $^1$H-NMR (500 MHz, DMSO-$d_6$): δ 7.25 (s, 2H), 3.97 (t, J=7.5 Hz, 4H); 1.68 (t, J=7.5 Hz, 4H); 1.62-1.25 (m, 6H); $^{13}$C-NMR (125 MHz, DMSO-$d_6$): δ 167.3, 150.8, 125.8, 115.8, 69.6, 29.1, 28.9, 25.8. pbdc-8a: $^1$H-NMR (500 MHz, DMSO-$d_6$): δ 7.25 (s, 2H), 3.96 (t, J=7.5 Hz, 4H); 1.67 (t, J=7.5 Hz, 4H); 1.52-1.20 (m, 8H); $^{13}$C-NMR (125 MHz, DMSO-$d_6$): δ 167.3, 150.8, 125.8, 115.8, 69.5, 29.2, 29.2, 25.8.

Synthesis of L1 and L2

These compounds were prepared according to a literature procedure (FIG. 4). Dimethyl-2-hydroxyterephthalate (0.025 mol), 1,4-dibromoheptane (or 1,4-dibromooctane) (0.01 mol), $K_2CO_3$ (0.03 mol), and tetrabutylammonium bromide (0.40 g) were dissolved in 200 mL of acetone. The mixture was heated at reflux for 18 h under a nitrogen atmosphere and cooled to room temperature. The reaction mixture was poured into 0.50 M aqueous $K_2CO_3$ solution, and the precipitate obtained was thoroughly washed with distilled water. The crude product was recrystallized from a mixture of ethanol and distilled water (1/1, v/v). The ester (0.08 mol) was dissolved in 50 mL of 95% ethanol, and NaOH (1.3 g, 0.03 mol) was added. The mixture was heated at reflux for 6 h, followed by cooling to room temperature. The reaction mixture was poured into ice cold water and the solution was acidified with 5.0 M HCl. The resulting precipitate was collected by filtration and thoroughly washed with distilled water, then dried. The crude product was recrystallized from a mixture of ethanol and THF (2:1 v/v). The product yield was ~30% for both compounds. L1: $^1$H-NMR (500 MHz, DMSO-$d_6$): δ 7.50-7.70 (m, 6H), 4.06 (t, J=7.5 Hz, 4H); 1.58-1.78 (m, 4H); 1.20-1.52 (m, 6H). L2: $^1$H-NMR (500 MHz, DMSO-$d_6$): δ 7.50-7.70 (m, 6H), 4.06 (t, J=7.5 Hz, 4H); 1.52-1.75 (m, 4H); 1.20-1.50 (m, 8H).

General Procedure for Zn-pbdc-xa (x=5, 6, 7, 8) Synthesis.

In a typical reaction, polymer-ligand (0.05 mmol) and $Zn(NO_3)_2 \cdot 6H_2O$ (0.30 mmol) were added to 2.5 mL DMF in a 20 mL glass vial. The vial was placed in an oven under one of three reaction conditions: 60° C. for 48 h, 80° C. for 48 h, or 100° C. for 24 h (see text for details). Off-white crystals were collected by filtration and washed with DMF (3×5 mL).

Gel Permeation Chromatography.

Sample measurements were performed at 40° C. using an Agilent 1260 Infinity Series liquid chromatography system with an internal differential refractive index detector, and two Waters Styragel HR-5E columns (7.8 mm i.d., 300 mm length, guard column 7.8 mm i.d., 25 mm length). A solution of 0.1% potassium triflate (K(OTf)) in HPLC grade hexafluoroisopropanol (HFIP) was used as the mobile phase at a flow rate of 0.5 mL/min. Calibration was performed using narrow polydispersity polymethyl methacrylate (PMMA) standards. 4.0-6.0 mg of polymer were dissolved in 2.0 mL of HFIP for 1 h. The solution was then filtered through 1 Lm membrane before being injected into the GPC instrument.

Gas Adsorption Measurements.

Low-pressure gas adsorption measurements were measured with an ASAP 2020 surface area and pore size analyzer. Before gas sorption tests, Zn-pbdc-xa, IRMOF-1, IRMOF-L1, and IRMOF-L2 were soaked in $CHCl_3$ (refreshed every 24 h) for 5 d. Approximately 50-80 mg of each dried polymer-ligand, Zn-pbdc-xa, IRMOF-1, IRMOF-L1, or IRMOF-L2 were evacuated on a vacuum line for ~1 min at room temperature, and subsequently transferred to a preweighed sample tube and degassed at 105° C. on an ASAP 2020 Adsorption analyzer for 10 h. The sample tube was reweighed to obtain a consistent mass for the degassed sample. BET and Langmuir surface area (m$^2$/g) measurements were collected on three independent samples. UHP grade (99.999%) $N_2$ and $CO_2$ were used for all measurements. The sample temperature was maintained at 77 K (liquid nitrogen bath), 273 K (ice water bath), or 298 K (water bath at room temperature) as appropriate.

Scanning Electron Microscopy-Energy Dispersed X-ray Spectroscopy. polyMOFs were transferred to conductive carbon tape on a sample holder disk, and coated by Ir-sputter coating for 8 sec. A Philips XL ESEM instrument was used for acquiring images using a 10 kV energy source under vacuum. Oxford EDX and using the Inca software package were used to determine elemental mapping of particle surfaces at a working distance of 10 mm.

X-Ray Single-Crystal Diffraction.

A modified synthesis procedure, using a solvent system of 30.0 mL acetone and 3.0 mL of DMSO for the polycondensation reaction was used to produce low molecular weight pbdc-7a polymer-ligand ($M_n$=3,800 g/mol, $M_w$=8,400 g/mol). The as-synthesized pbdc-7a was used to form polyMOFs cubic crystals with a size of around ~20 μm. After several attempts, a suitable single-crystal of Zn-pbdc-7a (~20 μm×20 μm×20 μm) was selected and diffraction data were was collected on a Bruker Apex diffractometer using Mo Kα (λ=0.71073 Å) radiation. Metal atoms were found in the Fourier difference map and refined anisotropically. The alkyl linkers and disordered solvent molecules (DMF) within the framework were treated with the "SQUEEZE" protocol in PLATON to account for electron density [S2,S3]. Zn-pbdc-7a crystallized in the cubic space group Pm-3m with a=b=c=12.760(3) Å; V=2077.6(8) Å$^3$. The structure shows the expected 3-dimentional primitive cubic (pcu) network built from 6-connected tetranuclear [$Zn_4O(COO)_6$] secondary building units (SBUs) linked by terephthalate moieties. The crystal data file of Zn-pbdc-7a was deposited into the Cambridge Crystallographic Data Centre (CCDC) and assigned a number 1050818. The crystal data and structural refine for Zn-pbdc-7a is set forth in Table S12 following.

TABLE S12

Crystal data and structure refinement for Zn-pbdc-7a.

| | |
|---|---|
| Identification code | Zn-pbdc-7a |
| Empirical formula of one unit cell | Zn4C24O19 |
| Formula weight | 854 |
| Temperature/K | 100.0 |
| Crystal system | cubic |
| Space group | Pm-3m |
| a/Å | 12.760(6) |
| b/Å | 12.760(6) |
| c/Å | 12.760(6) |
| α/° | 90.00 |
| β/° | 90.00 |
| γ/° | 90.00 |
| Volume/Å$^3$ | 2077.6(17) |
| Z | 48 |
| $\rho_{calc}$ g/cm$^3$ | 0.682 |
| μ/mm$^{-1}$ | 1.171 |
| F(000) | 416.0 |
| Crystal size/mm$^3$ | 0.02 × 0.02 × 0.02 |
| Radiation | MoKα (λ = 0.71073) |
| 2θ range for data collection/° | 4.52 to 30.46 |
| Index ranges | −9 ≤ h ≤ 7, −9 ≤ k ≤ 9, −9 ≤ l ≤ 9 |
| Reflections collected | 1674 |
| Independent reflections | 123 [$R_{int}$ = 0.1122, $R_{sigma}$ = 0.0342] |
| Data/restraints/parameters | 123/4/18 |
| Completeness | 99% |
| Goodness-of-fit on F$^2$ | 1.719 |
| Final R indexes [I >= 2σ (I)] | $R_1$ = 0.1333, w$R_2$ = 0.3776 |
| Final R indexes [all data] | $R_1$ = 0.1435, w$R_2$ = 0.3843 |
| Largest diff. peak/hole/e Å$^{-3}$ | 0.29/−0.63 |

Differential Scanning Calorimetry.

Theromograms were obtained with a DSC Q1000 from TA instruments. 3-5 mg samples of each species were added to a sealed pan that passed through a heat/cool/heat cycle at 10° C./min. Melting temperatures were only observed and thus, reported, for the first heating cycle. Glass transition temperatures are reported for the second heating cycle, in order to erase the thermal history of the samples. The temperature ranged from −50 to 270° C.

Thermogravimetric Analyses.

Samples were measured under nitrogen with a TGA Q5000 from TA Instruments. About 5-10 mg samples were heated at 20° C./min from 25 to 650° C.

PXRD Analysis.

As-synthesized polyMOFs, IRMOF-1, IRMOF-L1 and IRMOF-L2 samples were isolated by filtration and air-dried for 5 min prior to data collection. The samples were spread on a zero field sample holder. PXRD data were collected at ambient temperature on a Bruker D8 Advance diffractometer at 40 kV, 40 mA for Cu Kα (λ=1.5418 Å), with a scan speed of 1 sec/step, a step size of 0.03° in 2θ, and a 2θ range of ~5 to 500. For all the samples, the experimental backgrounds were not corrected. The stability of Zn-pbdc-8a and IRMOF-1 were studied using PXRD. The samples remained on the sample holder and exposed to air for 1-7 d prior to PXRD data collection. Subsequently, the exposed samples were immersed in 5.0 mL DMF solution and heated in an oven at 60° C. for 1 h. Samples were re-isolated by filtration and air dried for 5 min prior to PXRD data collection.

Contact Angle Measurements.

Contact angle measurements were recorded with a Tantec contact angle meter. The polyMOFs materials were exchanged with CHCl$_3$ for 5 d with fresh solvent replaced every day. The harvested samples were dried under vacuum at 105° C. overnight before analysis. ~30 mg of sample was gently crushed with a mortar and pestle into fine particles and then pressed onto a glass slide with a spatula. A drop of water was slowly placed onto the sample with a microsyringe and the contact angle was measured using contact angle meter. It should be noted that the pbdc-7a polymer-ligand and Zn-pbdc-7a initially gave a water droplet with measurable contact angles (~89° for pbdc-7a and ~92° for Zn-pbdc-7a). However, the samples slowly absorbed water and the droplet completely disappeared after ~1 min.

Example 2. Variations of the Covalent Linker Moieties

There is provided an approach to prepare a series of MOFs isostructural to IRMOF-1 (also referred to herein as MOF-5) by using cross-linked terephthalate (BDC) ligands, which were synthesized by tethering two or three BDC monomer with alkyl or xylene linkers. Based on this example, and without being bound by any theory, it is believed that polymer ligands with cross-linked BDC moieties produce crystalline polymer-MOF hybrid materials isostructural to IRMOF-1.

Synthesis Procedure of Polymer Ligands

Potassium carbonate (2.63 g, 19.03 mmol) was added to a stirred solution of diethyl-5-hydroxyisophthalate (1.208 g, 4.75 mmol) and dibromoalkyl (4.75 mmol) in acetone/dimethyl sulfoxide (33 mL, 10:1). The mixture was heated at 80° C. in oil bath for 24 h. ~50 mL water was added into the suspension solution and the solid was centrifuged. The harvested solid was washed with Acetone and MeOH each for 3 times with centrifugation. The final solid was heated at 70° C. in oven for 12 h.

Hydrolysis: 4 g KOH and 0.9 polymer ester were added into 15 mL water and 10 mL DMSO at 80° C. in oil bath for 8 hour. Solid slowly dissolved to yield a brown or colorless solution. 1M HCl was used to adjust the PH value to be ~2. Solid was harvested by centrifugation. The harvested solid was washed with Acetone and MeOH each for 3 times with centrifugation. The final solid was heated at 70° C. in oven for 12 h.

Scheme 2. Synthesis procedure of polymer-MOF hybrid materials:

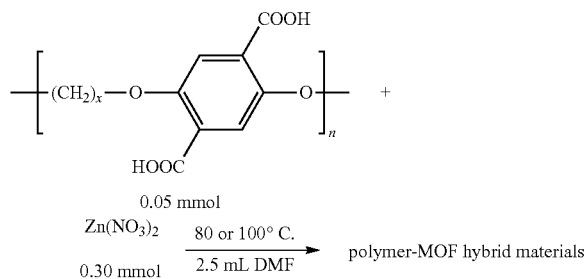

Figure 10:
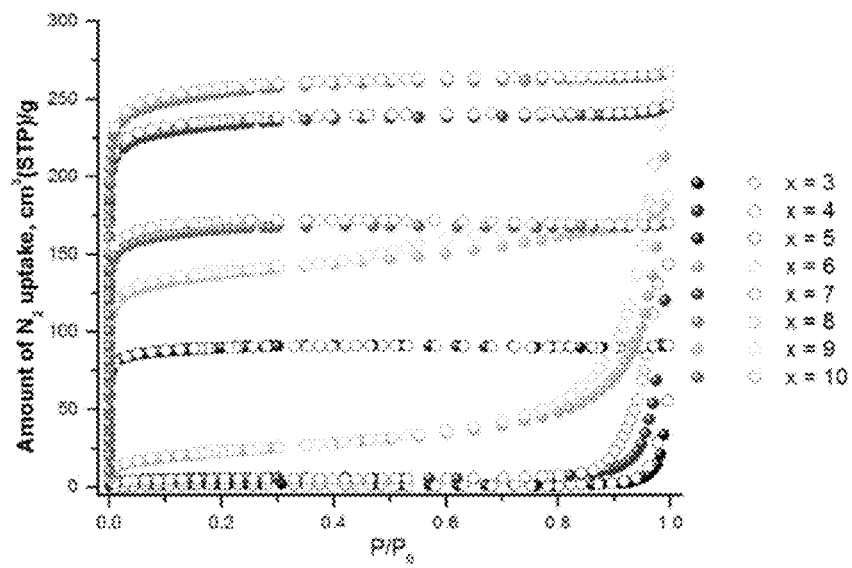
FIG. 10. $N_2$ sorption isotherms demonstrating porosity of exemplary polyMOFs.

A series of polymer ligands were prepared via the condensation polymerization reaction (Scheme 3). A series of polymer-MOF hybrid materials have been prepared based on these polymer ligands. These hybrid materials have been characterized by powder x-ray diffraction (PXRD), single-crystal x-ray diffraction (SCXRD), scanning electron microscope (SEM), thermogravimetric analysis (TGA), $N_2$ sorption (FIG. 10), $CO_2$ sorption, hydrophobicity. SCXRD and PXRD further revealed these materials exhibit a 3-dimentional pcu framework in which 1D chain polymers are fused.

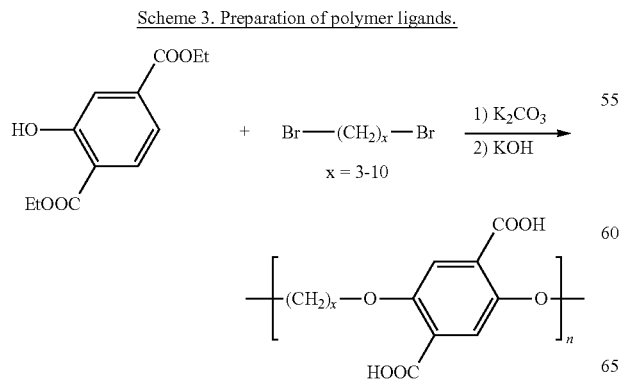

Example 3. PolyMOFs as Water Tolerant Materials for Selective Carbon Dioxide Separations Metallopolymer materials have received increasing attention due to their properties as stimulus-responsive, self-healing, conductive, photo- and electroluminescence, catalysis, and drug delivery materials. Metallopolymer materials are typically amorphous due to the high flexibility and random conformation of the polymer chains. Synthesis of highly crystalline metallopolymers is challenging, but recently polymer-metal organic frameworks (polyMOFs) have been reported as a new class of hybrid metallopolymer material that combines features of both organic polymers and crystalline MOFs. Amorphous, linear, and non-porous polymer ligands were shown to coordinate with metal ions to form highly crystalline, 3-dimensional, porous framework materials. From a synthesis perspective, this approach upends conventional wisdom in both polymer and MOF chemistry, as linear polymers are not easily organized into 3-dimensional, crystalline solids, and MOFs are not readily prepared from long, flexible ligands. polyMOFs show the potential to harness not only the advantage of polymers such as the facile fabrication of films, good processability, and chemical stability, but also the best traits of MOFs including crystallinity, well-determined structures, and permanent porosity. Some related polymer-MOF hybrid materials have been prepared, via postsynthetic modification (PSM), whereby chemical cross-linking of the MOF is achieved through the organic ligands to form polymeric monoliths. Other hybrids of polymers and MOFs have been described where polymerization of polymer chains is performed inside the channels of MOFs. However, only one report of polymer-derived polyMOFs has been described, wherein only analogues of the canonical IRMOF-1 (also referred to herein as MOF-5) were obtained from polyether polymer ligands (pbdc-xa, pbdc=poly(1,4-benzenedicarboxylate), Chart 1) that contain 1,4-benzenedicarboxylic acid ($H_2$bdc) units as part of the polymer backbone, as reported in Example 1.

'Pillaring' ligands

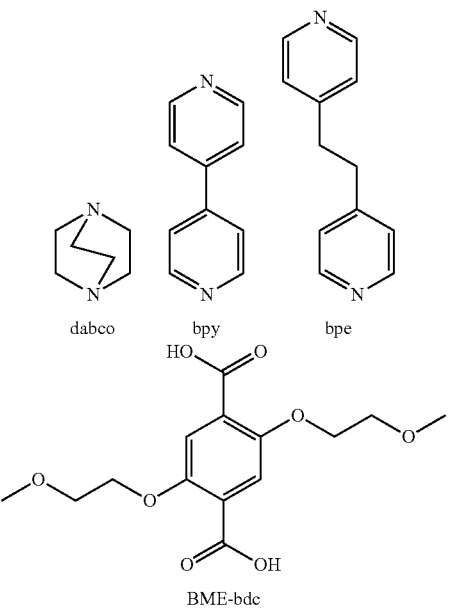

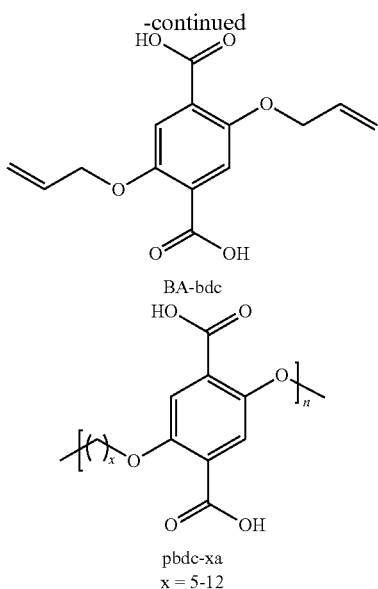

Chart 1.

Exemplary ligands used in this work. 'Pillaring' nitrogen-based ligands are shown in the top row. Exemplary polymer ligands (pbdc-xa) are shown in the bottom row along with monomeric carboxylate ligands.

Substituted H$_2$bdc derivatives have long been employed to prepare MOFs with various network structures. In addition to IRMOF-1 ([Zn$_4$O(bdc)$_3$]$_n$), mixed-ligand systems such as pillared square grid MOFs, including [Zn$_2$(bdc)$_2$(dabco)]$_n$ (dabco=1,4-diazabicyclo[2.2.2]octane, Chart 1) and [Zn$_2$(bdc)$_2$(bpy)]$_n$ (bpy=4,4'-bipyridine), have been widely investigated as well. Fischer et al. (Henke, S.; Fischer, R. A. J. Am. Chem. Soc. 2011, 133, 2064) reported a honeycomb-like network with a formula of [Zn$_2$(BME-bdc)$_2$(bpy)]]$_n$ (BME-bdc=2,5-bis(2-methoxyethoxy)-1,4-benzenedicarboxylate, Chart 1). In MOF 1, BME-bdc and bpy linkers cross-link the Zn(II)-carboxylate secondary-building unit (SBU) chains to form a 3-dimensional structure with honeycomb-like channels. It is noteworthy that MOF 1 exhibited selective uptake for CO$_2$ vs. N$_2$ and CO$_2$ vs. CH$_4$. However, the instability of MOF 1 toward water hindered further studies.

The prior example on polyMOFs suggested that the water-stability of polyMOFs is substantially enhanced relative to the parent MOFs via inherited hydrophobicity from the organic polymer ligands. A potential approach to water-stable derivatives of MOF 1 would be to tether H$_2$bdc moieties together across the pore-space with polymer chains to form polyMOF analogues. In addition to the induced hydrophobicity from polymers, cross-linking by the polymer chains could provide additional connectivity to the framework thereby enhancing the MOF stability. However, no polyMOF analogue of MOF 1 has been reported, nor has a polyMOF with a co-ligand (e.g. bpy) ever been described.

To examine whether polymer ligands could be used to prepare a polyMOF of MOF 1, a series of linear, flexible, chain polymer-ligands (pbdc-xa, x=9-12) were prepared via a slightly modified procedure from that used to prepare pbdc-xa (x=5-8). Both $^1$H— and $^{13}$C NMR verified the composition of the polymers. The molecular weight values of the polymers were determined by using gel permeation chromatography (GPC) on three independently prepared samples. The polymer ligands possessed M$_n$ values (number average molecular weight) ranging from 5,000 g/mol to 7,500 g/mol, M$_w$ values (weight average molecular weight) ranging from 14,200 g/mol to 25,000 g/mol, and polydispersity index values (PDI) ranging from ~2.8 to 3.3 (Table 1). The average degree of polymerization (DP=M/(F. W.$_{repeat\ unit}$)) ranged from 16 to 21. The glass transition temperature (T$_g$) of the polymer-ligands decreased from 74° C. to 63° C. with an increasing number of methylene spacers (x=9-12) between the H$_2$bdc groups in the polymer backbone (Table 1). This is consistent with previous observations that more methylene spacers increase the conformational freedom of the polymer and dilute its polar fraction, resulting in lower T$_g$ values.

We found that 2,5-bis(allyloxy)-1,4-benzenedicarboxylic acid, BA-bdc (Chart 2), can form the isostructural MOF 1' as verified by PXRD. MOF 1' was used as a non-polyMOF (i.e. simple molecular ligand) 'standard' for comparative studies described below.

Figure 11:
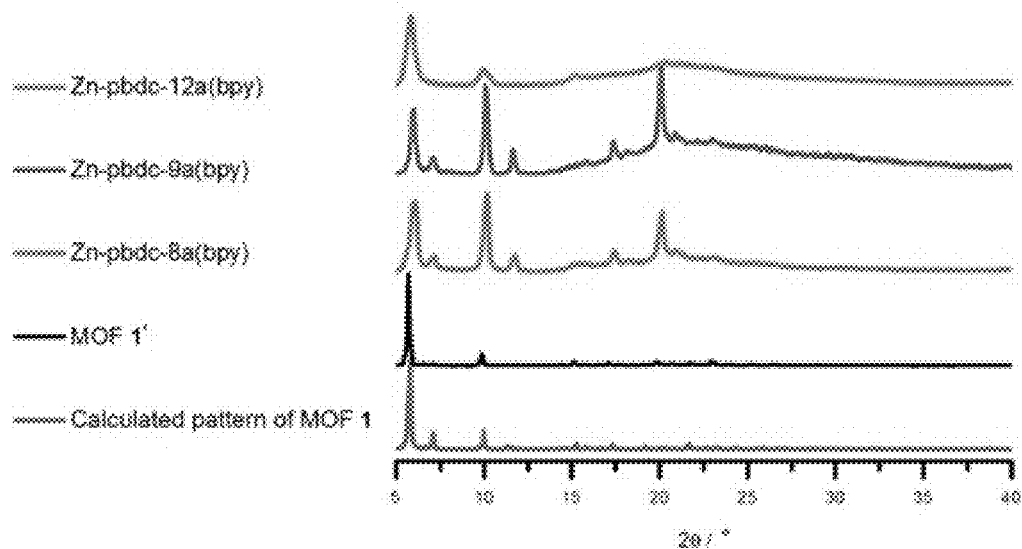
FIG. 11. PXRD patterns of exemplary mixed ligand polyMOFs, Zn-pbdc-8a(bpy), -9a(bpy), -12a(bpy), MOF 1' (prepared from BA-bdc), and a calculated pattern for MOF 1.

Following the same synthesis protocol as MOF 1, pbdc-xa (x=5-12) polymer ligands were examined for their ability to form crystalline polyMOFs analogous to 1. Powder X-ray diffraction (PXRD) patterns revealed that pbdc-5a, -6a, -7a, -10a, and -11a produced mostly amorphous materials with broad peaks centered at 2θ ~22°. However, PXRD data (FIG. 11) revealed that pbdc-8a and -9a generated the desired products with patterns that were broad, but consistent with those of MOF 1. Scanning electron microscopy (SEM) was employed to study the morphology and particle size of new materials. The products of pbdc-5a, -6a, -7a, -10a, and -11a exhibited irregularly shaped solids, consistent with the PXRD pattern indicating largely amorphous materials. Both Zn-pbdc-8a(bpy) and Zn-pbdc-9a(bpy) exhibit regular plate-like particles with a size ~1-3 m. Interestingly, the small plate-like particles were found to pack into uniform films. It is noteworthy that pbdc-12 also produced a crystalline phase; however, some PXRD reflections (e.g. 2θ=4.2° and 11.6°) were absent from the expected pattern based on MOF 1. This suggests that Zn-pbdc-12a(bpy) may exhibit a related, but not identical structure to MOF 1. Additionally, Zn-pbdc-12a(bpy) possesses distinctively spherical particles, which can pack tightly to form uniform films as well.

TABLE 2

Thermal, molecular weight, and contact angle (water) data for exemplary polymer ligands.

| Ligands | T$_g$ ° C. | T$_m$ ° C. | M$_w$ g/mol | M$_n$ g/mol | DP | PDI | Contact Angle |
|---|---|---|---|---|---|---|---|
| pbdc-9a | 74 | 167 | 14,200 | 5,000 | 16 | 2.8 | 113 ± 2° |
| pbdc-10a | 72 | 191 | 22,300 | 6,800 | 20 | 3.3 | 110 ± 1° |
| pbdc-11a | 67 | 164 | 25,000 | 7,500 | 21 | 3.3 | 114 ± 1° |
| pbdc-12a | 63 | 164 | 21,300 | 6,700 | 19 | 3.2 | 120 ± 2° |

The successful preparation of polyMOFs from bpy and pbdc-xa inspired us to explore whether other 'pillaring' linkers, such as dabco and 1,2-bis(4-pyridyl)ethane (bpe), could also form polyMOFs (See Chart 1). Following reported procedures, reactions of dabco, pbdc-xa, and Zn(NO$_3$)$_2$.6H$_2$O in a 1:2:2 stoichiometry did not afford the expected MOF products, ([Zn$_2$(bdc)$_2$(dabco)]$_n$), instead forming IRMOF materials (which do not incorporate the pillar) or amorphous materials. This result can be ascribed to the spatial match limitation in the [Zn$_2$(bdc)$_2$(dabco)]$_n$ structure. An examination of the [Zn$_2$(bdc)$_2$(dabco)]$_n$ structure found the nominal distance between the adjacent bdc moieties is ~7.4 Å (carbon-carbon distance). However, among all of the pbdc-xa (x=5-12) ligands prepared, the shortest bdc distance is ~7.8 Å for pbdc-5a, which is longer than the bdc-bdc distance in $[Zn_2(bdc)_2(dabco)]_n$. This suggests a size mismatch can account for the inability of these polyMOF analogues to form.

Figure 12:
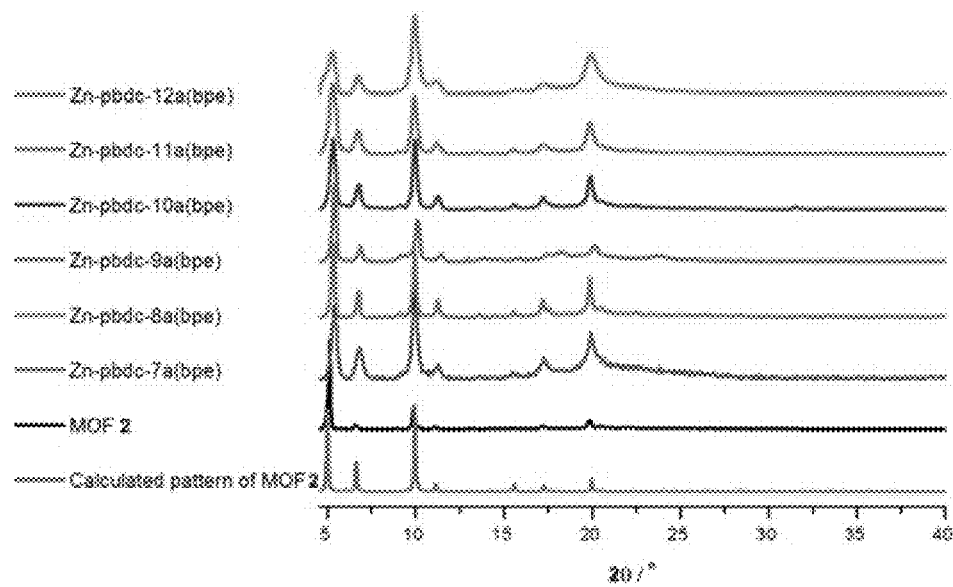
FIG. 12. PXRD patterns for Zn-pbdc-7a(bpe), -8a(bpe), -9a(bpe), -10a(bpe), -11a(bpe), -12a(bpe), MOF 2, and a calculated pattern for MOF 2.

The apparent length mismatch prompted us to try a longer co-ligand linker, bpe, which might better accommodate the alkane spacers in pbdc-xa. Reactions of bpe, pbdc-xa (x=7-12), and $Zn(NO_3)_2 \cdot 6H_2O$ with a 1:2:2 stoichiometry in DMF at 120° C. afforded light yellow powders. PXRD patterns revealed that all products exhibited an unknown crystalline phase (FIG. 12). The morphology and particle size of the resulting materials were determined by SEM. As shown in FIG. 12, the majority of Zn-pbdc-xa(bpe) particles possess a hexagonal shape on the order of <5 μm, indicating a possible hexagonal crystallization space group.

Because the small Zn-pbdc-xa(bpe) particles were not suitable for single crystal X-ray diffraction (XRD), we replaced the polymer ligands with a simple $H_2bdc$ ligand to generate an analogous MOF framework (essentially the reverse process used to design the Zn-pbdc-xa(bpy) derivatives). Under the guideline of this strategy, BA-bdc (Chart 1) was employed to grow MOF crystals under the same synthesis condition as Zn-pbdc-xa(bpe). Brown block crystals with a formula of $[Zn_7(bdc)_6(H_2O)_6(bpe)_2(NO_3)_2]_n$ (2) were harvested. XRD analysis showed that MOF 2 crystallized in the hexagonal R-3m space group. MOF 2 exhibits two kinds of SBUs, a 4-connected $[Zn_2(COO)_3(H_2O)_3N]$ dinuclear SBU and an 8-connected $[Zn_3(COO)_6N_2]$ trinuclear SBU. These two nodes are connected by BA-bdc$^2$ ligands to form a 2-dimensional rhombic-grid layer that is further cross-linked by bpe pillars to generate a 4,8-connected fluorite (flu) network. As shown in FIG. 12, the experimental PXRD pattern of Zn-pbdc-xa (x=7-12) fit very well with the calculated pattern of MOF 2 except for the first two peaks are shifted slightly to higher 2θ values. This may be due to slight differences in the unit cells between the polyMOFs and MOF 2, which could be accommodated as both the polymer ligand and bpe linker are quite flexible.

Figure 15:
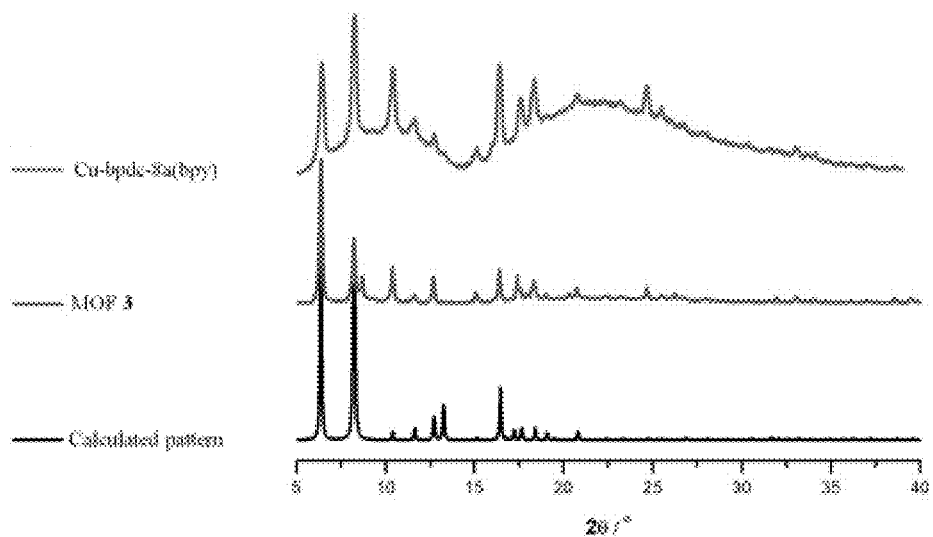
FIG. 15. PXRD patterns of as-synthesized Cu-bpdc-8a (bpy), MOF 3 and calculated pristine MOF based on non-interpenetrated $[Zn_2(bdc)_2(bpy)]_n$.
Figure 16A:
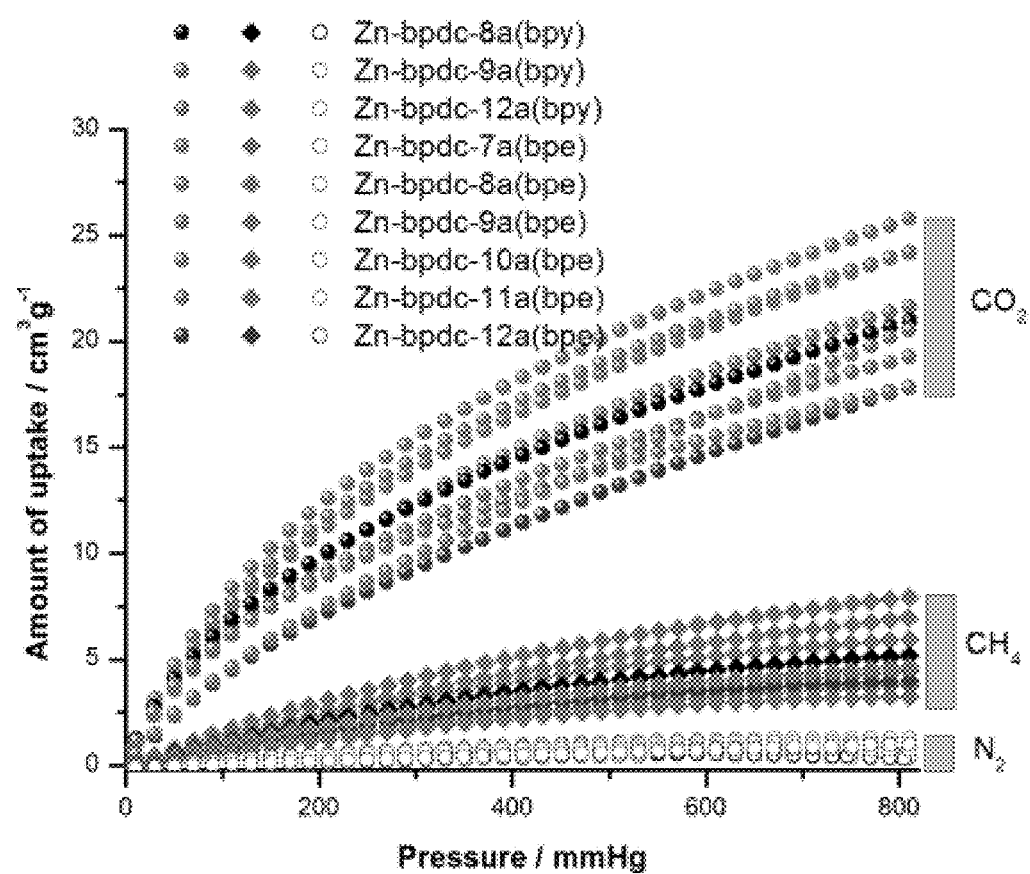
FIGS. 16A-16C. $CO_2$, $CH_4$ and $N_2$ sorption isotherms at 273 K (FIG. 16A) and $CO_2$, $CH_4$, and $N_2$ sorption isotherms at 298 K for polyMOFs (FIG. 16B). $Q_{st}$ of $CO_2$ for polyMOFs (FIG. 16C). For all charts closed circles, closed diamonds, and open circle symbols represent $CO_2$, $CH_4$, and $N_2$ data, respectively.
Figure 16B:
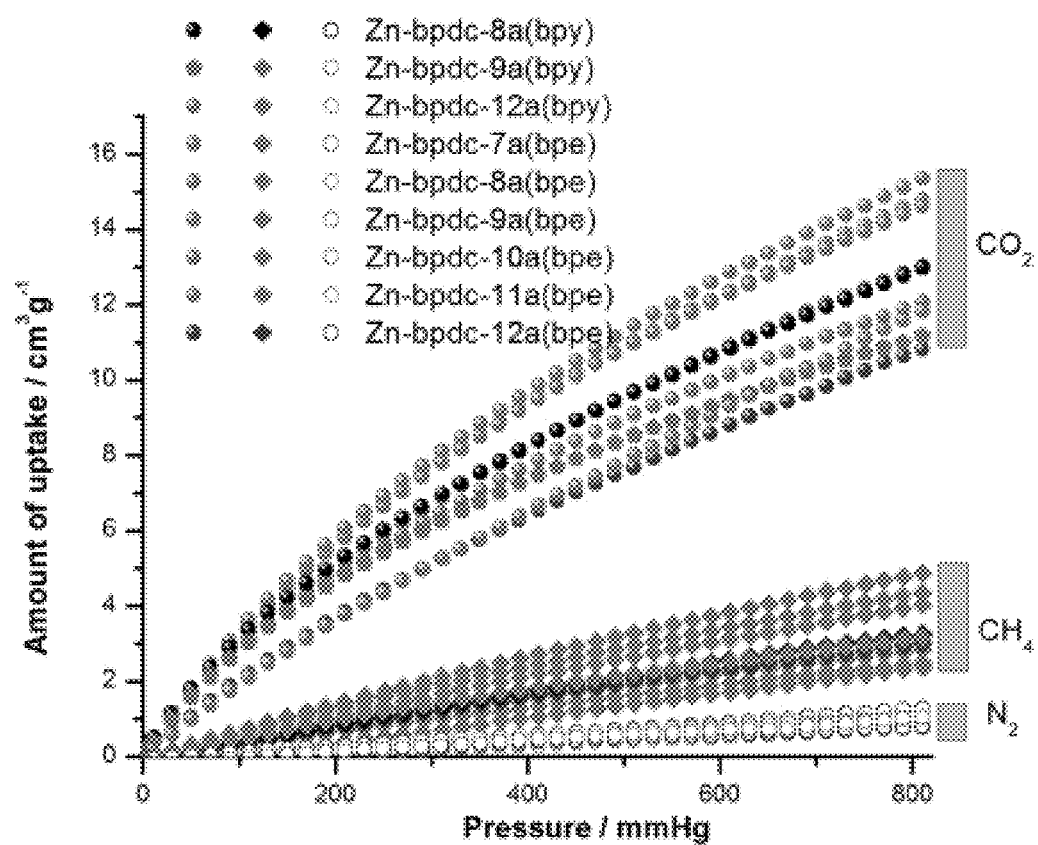
Figure 16C:
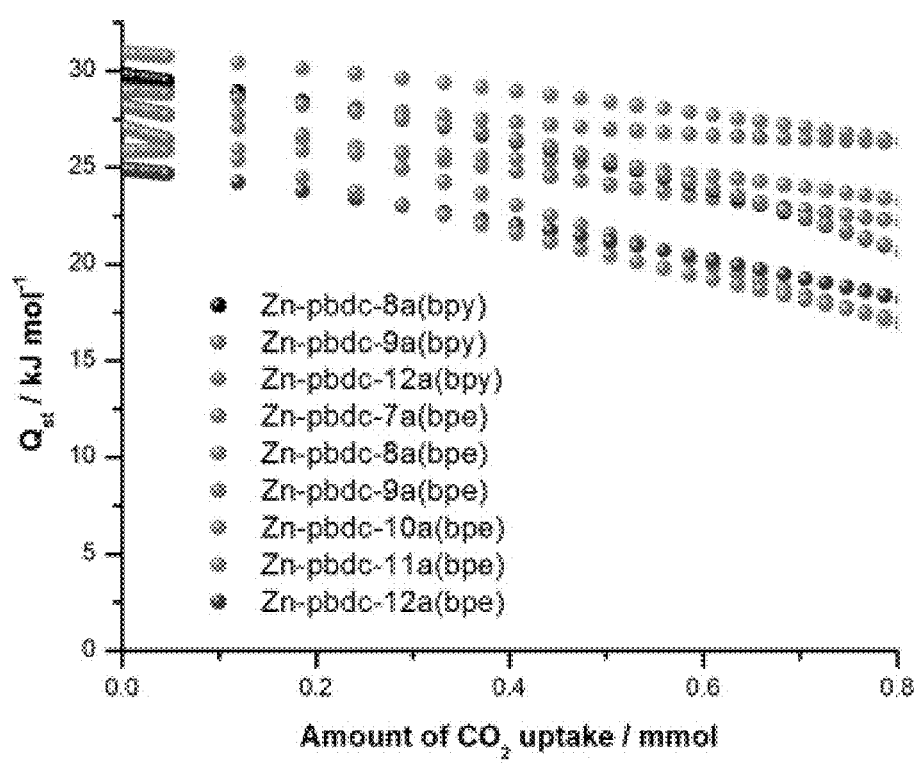
Figure 17:
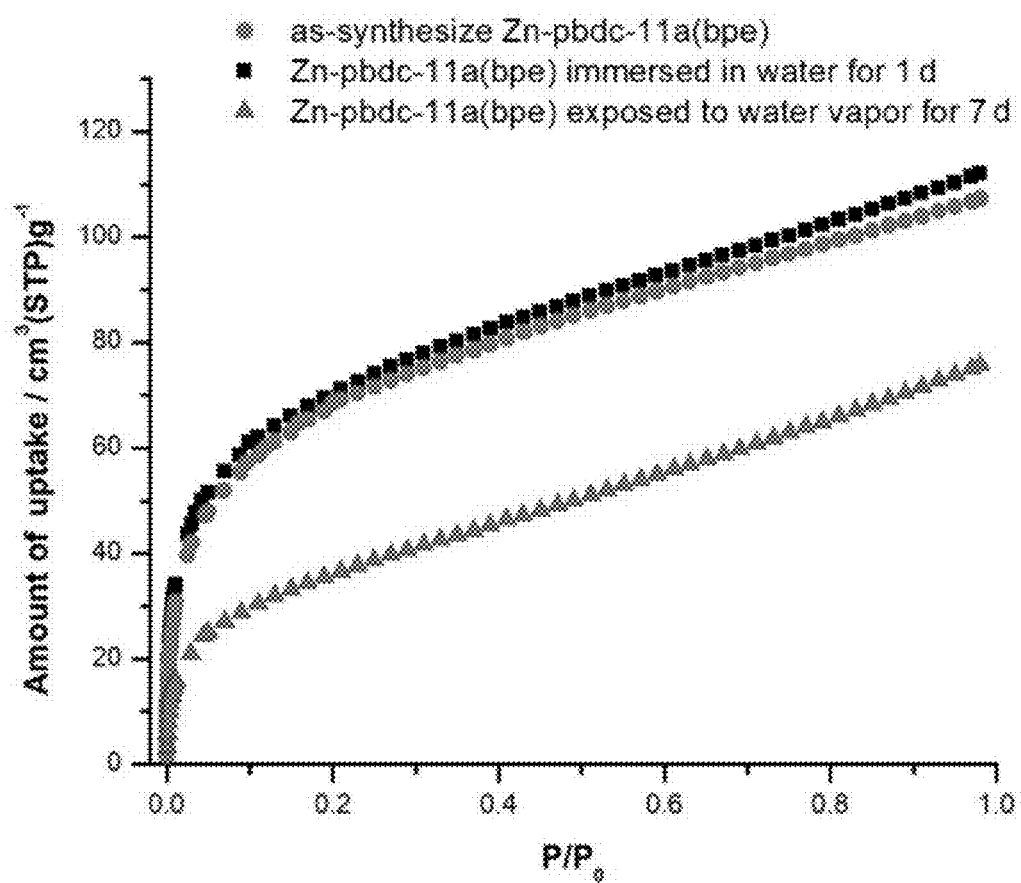
FIG. 17. $CO_2$ adsorption isotherms (at 195 K) for as-synthesized, room temperature water treated and water vapor treated exemplary polyMOF Zn-pbdc-11a(bpe).

To further validate our design methodology, we screened reaction conditions of BA-bdc with 'pillaring' pyridine linkers and different metal salts. Using $Cu(NO_3)_2$, a non-interpenetrated, pillared, squared grid MOF 3, $[Cu_2(BA-bdc)_2(bpy)]_n$, was obtained. The same reaction conditions using pbdc-8a produced an analogous polyMOF, Cu-pbdc-8a(bpy), which shows the same structure as the parent $[Cu_2(BA-bdc)_2(bpy)]_n$. Both SEM and PXRD data verified the high crystallinity of Cu-pbdc-8a(bpy) (FIG. 15). $N_2$ sorption data revealed that Cu-bpdc-8a(bpy) is permanently porous and exhibits a BET surface area of 303±32 m$^2$/g.

To exclude the possibility of polymer ligand degradation during the polyMOF synthesis process, as-synthesized polyMOFs (based on both bpy or bpe) were digested in concentrated aqueous $D_2O/DCl$ and then precipitated by adding excess water. $^1H$ NMR data confirmed that the recovered polymer ligands remained intact. $^1H$ NMR data showed that the ratio of polymer ligand to bpy or bpe was greater than that expected from the known stoichiometry of MOF 1 or 2. $^1H$ NMR of Zn-pbdc-8a(bpy), -9a(bpy), and -12a(bpy) showed that ratios of pbdc-xa (based on the number of bdc units) to bpy are ~3:1, ~4:1 and ~2:1 respectively, while the ratio from the structure of MOF 1 (i.e. based on $[Zn_2(BME-bdc)_2(bpy)]_n$ and MOF 1') should be 2:1. $^1H$ NMR of Zn-pbdc-xa(bpe) (x=7-12) showed a ratio of pbdc-xa (based on the number of bdc units) to bpe ranging from ~4:1 to 5:1, while the ratio based on the composition of MOF 2 should be 3:1 ($[Zn_7(BA-bdc)_6(H_2O)_6(bpe)_2(NO_3)_2]_n$). One possible reason for the apparent excess of polymer in the polyMOFs is that the polymer ligand may create structural defects in the polyMOFs, where the bpy and bpe ligands are absent from some SBUs. Another possibility is perhaps that not all bdc$^2$ groups in pbdc-xa ligands can participate in framework formation, resulting in some bdc$^2$ groups from the pbdc-xa ligands not being coordinated to the SBUs (i.e. dangling bdc$^2$-ligands within the polyMOFs).

MOF 1 is reported to have the potential for the capture of $CO_2$ from flue gases due to its high selectivity for $CO_2$ vs $N_2$. Because polyMOFs can adopt the porosity from the parent MOFs, $N_2$ and $CO_2$ sorption were examined to evaluate the porosity of the polyMOFs prepared here. The solvent-exchanged polyMOF samples were activated at 130° C. for 10 h under vacuum. As shown in FIGS. 13A-13D, Zn-pbdc-8a(bpy), -9a(bpy), and -12a(bpy) exhibited type II $N_2$ sorption isotherms, which are indicative of nonporous or macroporous adsorbents. Macroporosity could originate from the packing of the small polyMOF particles. No BET surface areas were calculated based on $N_2$ sorption due to very low $N_2$ uptake in the low pressure region of the isotherm. In contrast, Zn-pbdc-8a(bpy), -9a(bpy), and -12a(bpy) were able to absorb 91±5, 86±3, and 75±5 cm$^3$/g of $CO_2$, respectively, at 195 K and 1 bar. A $CO_2$ uptake capacity of 156 cm$^3$/g at 195 K and 1 bar was reported for the original MOF 1, and we determined a $CO_2$ uptake capacity of 160±6 cm$^3$/g for MOF 1' prepared from BA-bdc (FIGS. 13A-13D).

Figure 13A:
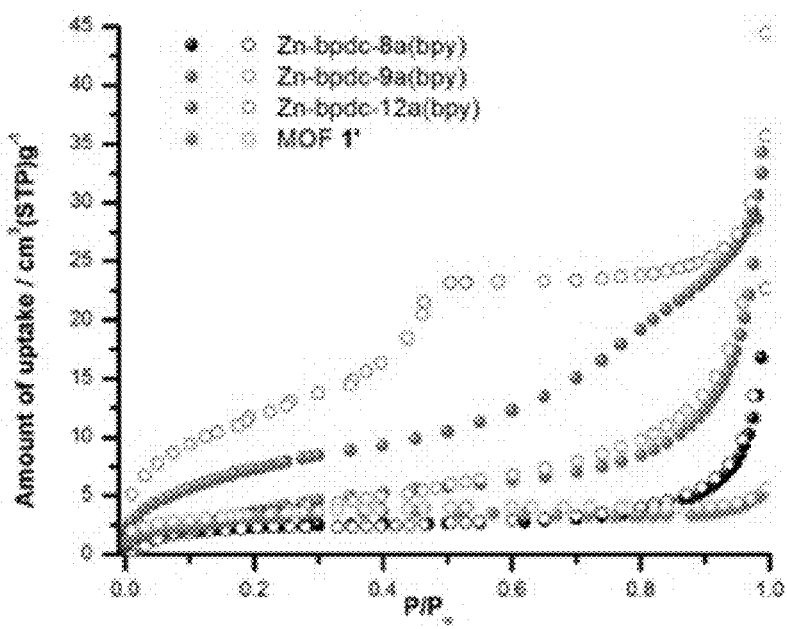
FIGS. 13A-13D. $N_2$ sorption isotherms at 77 K (FIG. 13A and FIG. 13C) and $CO_2$ sorption isotherms at 195 K (FIG. 13B and FIG. 13D) for exemplary polyMOFs. Closed and open symbols represent the adsorption and desorption isotherms curves, respectively.
Figure 13B:
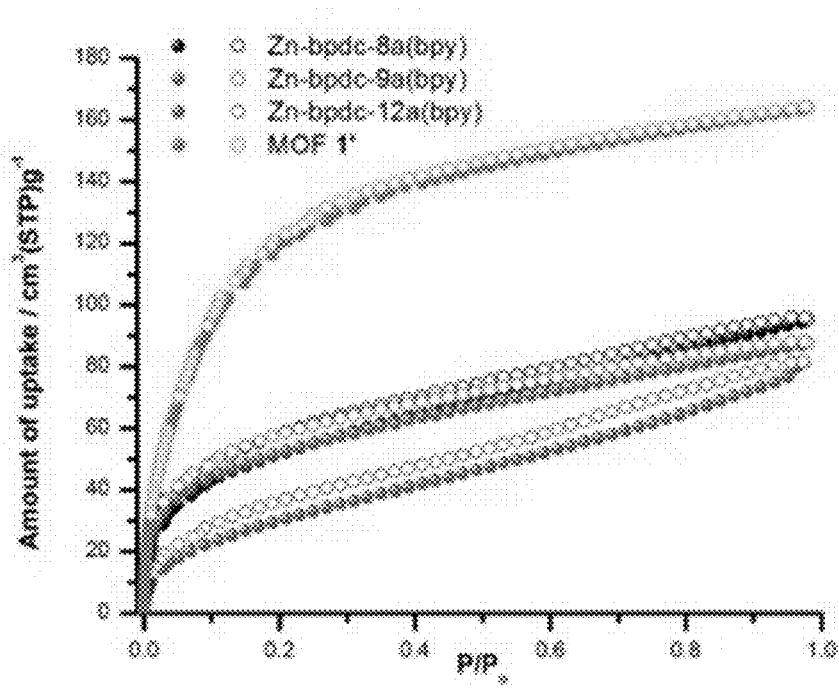
Figure 13C:
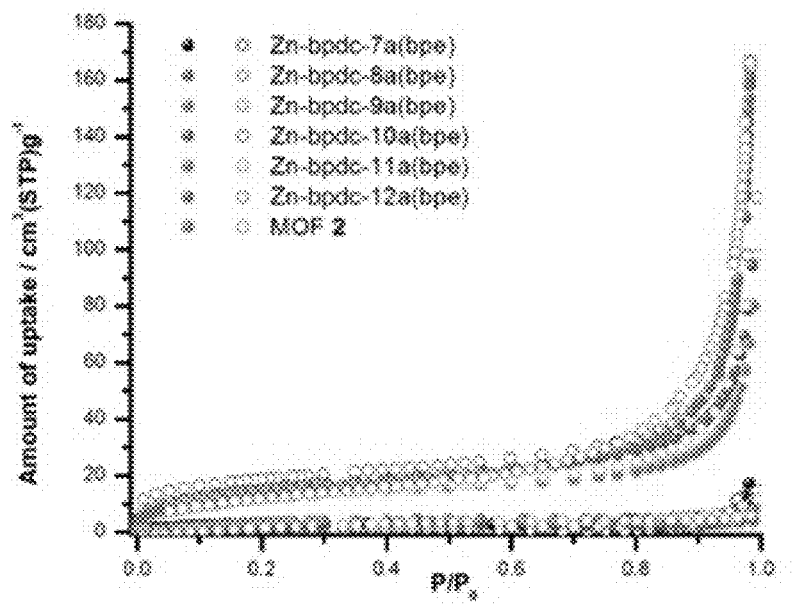
Figure 13D:
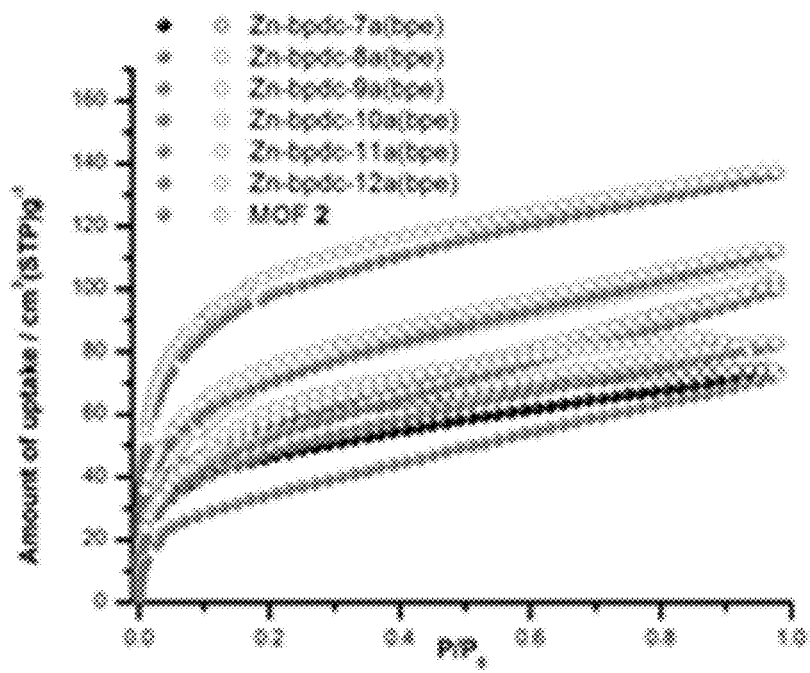
Figure 14:
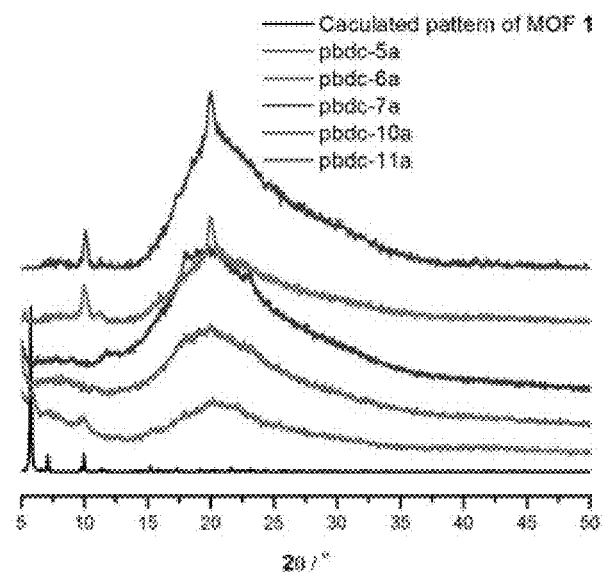
FIG. 14. PXRD patterns for products after reaction of pbdc-xa (x=5, 6, 7, 10, 11) with bpy and $Zn(NO_3)_2$ compared with calculated pattern of pristine MOF 1.

As shown in FIG. 13C, for MOF 2 type polyMOFs, Zn-pbdc-7a(bpe), -8a(bpe), and -9a(bpe) demonstrated no detectable sorption of $N_2$ at 77 K in the low pressure region, while Zn-pbdc-10a(bpe), -11a(bpe), and -12a(bpe) exhibited type II $N_2$ isotherms, again perhaps due to macrovoids between adjacent small particles (particle size <2 μm). For $CO_2$ sorption, Zn-pbdc-7a(bpe), -8a(bpe), -9a(bpe), -10a(bpe), -11a(bpe), and -12a(bpe) possess $CO_2$ uptakes of 72±2, 97±5, 80±4, 140±5, 106±5, and 105±6 cm$^3$/g, respectively, at 195 K and 1 bar (FIG. 13D). In contrast, the parent MOF 2 activated under the same conditions as Zn-pbdc-xa(bpe) possessed a relatively low $CO_2$ uptake capacity of 45±5 cm$^3$/g at 195 K and 1 bar. PXRD revealed that MOF 2 decomposed after activation indicated by the complete disappearance of PXRD peaks after activation. Decreasing the activation temperature to room temperature resulted in an increase of $CO_2$ uptake to 72±6 cm$^3$/g for MOF 2 (FIG. 13D). However, PXRD analysis revealed that MOF 2 transformed into an unknown crystalline phase after activation at room temperature.

The observed selective adsorption of polyMOFs can be attributed to a kinetic sieving effect, where the small windows limit the diffusion of larger $N_2$ molecules (3.64 Å) into pores resulting in reduced adsorption, while smaller $CO_2$ molecules (3.30 Å) are allowed to enter into the pores of the polyMOFs. Attempts to quantitatively evaluate the $CO_2/N_2$ separation performance at 273 K and 298 K for these polyMOFs were not successful because $N_2$ sorption tests were unable to produce smooth isotherm curves due to the extremely low $N_2$ uptake (e.g. <1 cm$^3$/g at 1 bar and 298K). Methane uptake was also quite low in these polyMOFs. However, these polyMOFs can absorb significant amounts (11-26 cm$^3$/g) of $CO_2$ at 1 bar and 298 K (or 273 K). The zero-coverage isosteric heat ($Q_{st}$) of $CO_2$ adsorption for polyMOFs range from 24.9 to 30.9 kJ/mol, which are higher than other reported polyMOFs (Zn-bpdc-7a and Zn-bpdc-8a) and some common MOFs such as IRMOF-1, IRMOF-3, and UMCM-1. The conclusion from these measurements is that all tested polyMOFs demonstrate relatively high $CO_2$ sorption but very low $N_2$ sorption, making them promising materials for $CO_2/N_2$ separation, such as those sought in flue gas applications.

Although MOF 1 possesses ultrahigh selectivity for $CO_2$ vs $N_2$ and $CO_2$ vs $CH_4$, its instability toward water is limiting for real-world applications. Fischer and co-workers reported that MOF 1 transformed to an unknown phase after exposure to a water-saturated atmosphere. Along the same line, we observed that MOF 1' transformed to a new phase after immersion in water for 1 day at room temperature. Similarly, PXRD revealed that MOF 2 was moisture sensitive and its structure decomposed upon exposure to atmospheric moisture or water for 1 day. As stated earlier, polyMOF variants are expected to have improved water stability compared with their parent MOFs because of polymer hydrophobicity. Contact angle measurements of polymer ligands with water (Table 1) showed that pbdc-9a, -10a, -11a, and -12a were hydrophobic with contact angles of 113±2°, 110±1°, 114±1°, and 120±2°, respectively. Contact angles of the resulting polyMOF samples were also measured to determine if they inherited hydrophobicity from the polymer ligands. Surprisingly, Zn-pbdc-8a(bpy), Zn-pbdc-9a(bpy), Zn-pbdc-7a(bpe), Zn-pbdc-8a(bpe), and Zn-pbdc-9a(bpe) were all relatively hydrophilic, while Zn-pbdc-12a(bpy), Zn-pbdc-10a(bpe), Zn-pbdc-11a(bpe), and Zn-pbdc-12a(bpe) were hydrophobic with contact angles of 111±1°, 114±1°, 115±1°, and 119±1°, respectively. These findings may best be attributed to the competition between the hydrophobic (e.g. polymer ligand) and hydrophilic (SBU) components of the polyMOFs.

Hydrophobicity alone does not ensure water-stability; therefore, PXRD patterns, SEM, and gas sorption experiments were performed for all polyMOFs after exposure to water. PolyMOF samples were immersed in water at room temperature or boiling for one day. Water-exposed samples were solvent-exchanged with methanol for 5 days and then activated at 130° C. for 10 h under vacuum. Except for Zn-pbdc-7a(bpe), which lost crystallinity after water-treatment, all other polyMOFs retain their crystallinity after water treatment (both room temperature and boiling) as confirmed by PXRD. SEM data revealed all water-treated polyMOFs retained their original morphology, suggesting there was no dissolution or degradation of the original phase. As summarized in Table 3, $CO_2$ sorption data revealed that Zn-pbdc-11a(bpe), Zn-pbdc-12a(bpe), and Zn-pbdc-12a(bpy) exhibited very similar $CO_2$ uptake values before and after water treatment, while the other polyMOF materials lost some porosity after exposure to water. Overall, Zn-pbdc-12a(bpy), Zn-pbdc-11a(bpe), and Zn-pbdc-12a(bpe) show exceptional water stability, while the remaining polyMOFs show significantly improved water resistance compared to their parent materials.

Because water vapor is a major component of industrial flue gas (~10%), water vapor treatment was also tested to evaluate the stability of Zn-pbdc-12a(bpy), Zn-pbdc-11a(bpe), and Zn-pbdc-12a(bpe), which showed the highest stability to liquid water. PXRD, SEM, and $CO_2$ sorption data were obtained for these polyMOFs exposed to 90% relative humidity at 25° C. for 7 days. Both PXRD and SEM data revealed Zn-pbdc-12a(bpy), Zn-pbdc-11a(bpe), and Zn-pbdc-12a(bpe) retained their crystallinity and original morphology under the aforementioned conditions. $CO_2$ sorption data revealed Zn-pbdc-11a(bpe) lost some capacity, giving a lower uptake of 75 $cm^3/g$ at 195 K. Zn-pbdc-12a(bpe) and Zn-pbdc-12a(bpy) exhibited $CO_2$ uptakes of 98 and 78 $cm^3/g$, respectively-very close to their uptake values (Table 3) prior to water vapor treatment. For comparison, MOF 1' and MOF 2 were treated under the same conditions as the aforementioned polyMOFs. PXRD revealed that MOF 1' retained crystallinity, while MOF 2 did not, further demonstrating the ability of polyMOFs to form analogues of MOFs that are sensitive to either water liquid or vapor.

TABLE 3

Contact angles and $CO_2$ uptake of polyMOFs.

| polyMOFs | Contact angle (°) | $CO_2$ Uptake $(cm^3/g)$ [a] | $CO_2$ Uptake $(cm^3/g)$ [b] |
|---|---|---|---|
| Zn-pbdc-8a(bpy) | 0 | 91 ± 5 | 70 ± 5 |
| Zn-pbdc-9a(bpy) | 0 | 86 ± 3 | 72 ± 4 |
| Zn-pbdc-12a(bpy) | 119 ± 1 | 75 ± 5 | 78 ± 3 |
| Zn-pbdc-7a(bpe) | 0 | 72 ± 2 | 40 ± 7 |
| Zn-pbdc-8a(bpe) | 0 | 97 ± 5 | 70 ± 1 |
| Zn-pbdc-9a(bpe) | 0 | 80 ± 4 | 61 ± 5 |
| Zn-pbdc-10a(bpe) | 111 ± 1 | 140 ± 5 | 102 ± 6 |
| Zn-pbdc-11a(bpe) | 114 ± 1 | 106 ± 5 | 101 ± 5 |
| Zn-pbdc-12a(bpe) | 115 ± 1 | 105 ± 6 | 106 ± 5 |
| MOF 1 | N/A | 156 | N/A |
| MOF 1' | 0 | 160 ± 6 | N/A [c] |
| MOF 2 | 110 ± 1 | 72 ± 6 | N/A [c] |

[a] As-synthesized polyMOFs prior to water treatment (195 K and 1 bar);
[b] polyMOFs after room temperature water treatment (195 K and 1 bar);
[c] $CO_2$ uptake was not tested because MOF 1' and MOF 2 are not stable after liquid water treatment.

In summary, we report a mixed ligand strategy, which uses both polymer ligands (e.g., metal organic framework linkers bound together by a plurality of covalent linker moieties) and simple pillaring pyridine linkers (e.g., metal organic framework linkers not bound together by a plurality of covalent linker moieties), to prepare new polyMOFs. We also demonstrate that polyMOFs with other metal ions (eg., Zn, Cu) can be prepared, indicating that our polyMOF approach can be generalized to other metal ions. This finding demonstrates that polyMOFs are compatible with a variety of MOF architectures besides that of the well-studied IRMOF-1. Gas sorption studies revealed that these new materials demonstrated relatively high $CO_2$ sorption, but very low $N_2$ uptake, making them promising materials to separate $CO_2$ from industrial flue gases. Although the parent MOFs are generally unstable to water, the polyMOFs demonstrated excellent water stability. The enhanced water stability is attributed to the incorporation of the hydrophobic polymer ligands, as well as the cross-linking of the MOF lattice by the polymer chains. These findings suggest that polyMOFs may be a general strategy for enabling or improving existing MOFs that need to be made more durable for real-world applications.

General Experimental Methods.

Starting materials and solvents were purchased and used without further purification from commercial suppliers (Sigma-Aldrich, Alfa Aesar, EMD, TCI, Cambridge Isotope Laboratories, Inc.). $^1H$ and $^{13}C$ nuclear magnetic resonance (NMR) spectra were recorded on a Varian VX-500. Chemical shifts were quoted in parts per million (ppm) referenced to the appropriate solvent peak or 0 ppm for TMS.

General procedure for pbdc-xa (x=9, 10, 11, 12) synthesis. Diethyl 2,5-dihydroxyterephthalate (1.2 g, 4.7 mmol), the appropriate dibromoalkane (4.7 mmol), and potassium carbonate (2.6 g, 19.0 mmol) were added place in 33 mL of DMSO. The suspension was stirred and heated at 100° C. for 24 h. After cooling the reaction down to room temperature (RT), 50 mL of water was added to the suspension. The polymer was isolated by centrifugation (Beckman Coulter Allegra X-22R Centrifuge, fixed-angle rotor, 6000 rpm for 4 min). The isolated solid (pbdc-xe) was washed with acetone (3×35 mL) and MeOH (3×35 mL), collected by centrifugation, and subsequently oven dried at 60° C. overnight. The polyether yields were on average ~70%. To hydrolyze the pendent ester groups, the polymers (1.0 g) were placed in a 1:1 mixture of water and DMSO (30 mL total) with 4.0 g of KOH. The mixture was heated at 80° C. for 8 h to produce a clear solution. The solution was acidified to a pH value of ~2 with a 1.0 M HCl solution. The resulting precipitate was collected by centrifugation, and subsequently washed with acetone (3×35 mL) and MeOH (3×35 mL) by centrifugation. The isolated polyacid polymers (pbdc-xa) were oven dried at 60° C. overnight. The yields for these hydrolysis reactions were on average ~50%.

NMR Data for Polymer-Ligands: pbdc-9a:
$^1$H NMR (500 MHz, DMSO-$d_6$): δ 7.25 (s, 2H), 3.96 (t, J=7.5 Hz, 4H); 1.66 (t, J=7.5 Hz, 4H); 1.40-1.28 (m, 10H); $^{13}$C NMR (125 MHz, DMSO-$d_6$): δ 167.29, 150.88, 125.89, 115.93, 69.60, 29.48, 29.18, 29.14, 25.82. pbdc-10a: $^1$H NMR (500 MHz, DMSO-$d_6$): δ 7.25 (s, 2H), 3.96 (t, J=7.5 Hz, 4H); 1.66 (t, J=7.5 Hz, 4H); 1.40-1.27 (m, 12H); $^{13}$C NMR (125 MHz, DMSO-$d_6$): δ 167.28, 150.88, 125.91, 115.79, 69.61, 29.46, 29.21, 29.18, 25.81. pbdc-11a: $^1$H NMR (500 MHz, DMSO-$d_6$): δ 7.25 (s, 2H), 3.95 (t, J=7.5 Hz, 4H); 1.65 (t, J=7.5 Hz, 4H); 1.39-1.25 (m, 14H); $^{13}$C NMR (125 MHz, DMSO-$d_6$): δ 167.29, 150.87, 125.92, 115.95, 69.59, 29.50, 29.40, 29.19, 29.16, 25.80. pbdc-12a: $^1$H NMR (500 MHz, DMSO-$d_6$): δ 7.25 (s, 2H), 3.95 (t, J=7.5 Hz, 4H); 1.65 (t, J=7.5 Hz, 4H); 1.39-1.25 (m, 16H); $^{13}$C NMR (125 MHz, DMSO-$d_6$): δ 167.27, 150.88, 125.89, 115.96, 69.59, 29.52, 29.48, 29.20, 29.16, 25.80.

Synthesis of MOF 1(BA-bdc)

BA-bdc (2,5-bis(allyloxy)-1,4-benzenedicarboxylic acid) (0.05 mmol), 4,4'-bipyridine (0.05 mmol), and Zn(NO$_3$)$_2$·6H$_2$O (0.05 mmol) were added to 2.0 mL DMF and 0.1 mL EtOH mixture in a 20 mL glass vial. The vial was placed in an oven at 85° C. for 48 h. White prism crystals were collected by filtration and washed with DMF (3×5 mL).

General procedure for Zn-pbdc-xa(bpy) (x=8, 9, 12) synthesis. In a typical reaction, polymer ligand (0.05 mmol), 4,4'-bipyridine (0.05 mmol), and Zn(NO$_3$)$_2$·6H$_2$O (0.05 mmol) were added to 2.0 mL DMF and 0.1 mL EtOH mixture in a 20 mL glass vial. The vial was placed in an oven at 85° C. for 48 h. Off-white powders were collected by filtration and washed with DMF (3×5 mL).

Synthesis of MOF 2

BA-bdc (0.05 mmol), 1,2-Bis(4-pyridyl)ethane (0.025 mmol) and Zn(NO$_3$)$_2$·6H$_2$O (0.05 mmol) were added to 2.0 mL DMF mixture in a 20 mL glass vial. The vial was placed in an oven at 120° C. for 24 h. Brown block crystals were collected by filtration and washed with DMF (3×5 mL).

General procedure for Zn-pbdc-xa(bpe) (x=7, 8, 9, 10, 11, 12) synthesis. In a typical reaction, polymer ligand (0.05 mmol), 1,2-Bis(4-pyridyl)ethane (0.025 mmol) and Zn(NO$_3$)$_2$·6H$_2$O (0.05 mmol) were added to 2.0 mL DMF mixture in a 20 mL glass vial. The vial was placed in an oven at 120° C. for 24 h. Light yellow powders were collected by filtration and washed with DMF (3×5.0 mL).

Gel Permeation Chromatography.

Sample measurements were performed at 40° C. using an Agilent 1260 Infinity Series liquid chromatography system with an internal differential refractive index detector, and two Waters Styragel HR-5E columns (7.8 mm i.d., 300 mm length, guard column 7.8 mm i.d., 25 mm length). A solution of 0.1% potassium triflate (K(OTf)) in HPLC grade hexafluoroisopropanol (HFIP) was used as the mobile phase at a flow rate of 0.5 mL/min. Calibration was performed using narrow polydispersity polymethyl methacrylate (PMMA) standards. 4.0-6.0 mg of polymer were dissolved in 2.0 mL of HFIP for 1 h. The solution was then filtered through 1 m membrane before being injected into the GPC instrument.

Gas Adsorption Measurements.

Low-pressure gas adsorption measurements were measured with an ASAP 2020 surface area and pore size analyzer. Before gas sorption tests, as-synthesized polyMOFs were soaked in CHCl$_3$ (refreshed every 24 h) for 5 d and the water-exposed polyMOFs were soaked in MeOH (refreshed every 24 h) for 5 d (MeOH instead of CHCl$_3$ is used because CHCl$_3$ cannot exchange H$_2$O). Approximately 50-80 mg of each polyMOFs were transferred to preweighed sample tubes and evacuated on a vacuum line for ~1 h at room temperature, and subsequently degassed at 130° C. on an ASAP 2020 Adsorption analyzer for 10 h. The sample tube was reweighed to obtain a consistent mass for the degassed sample. UHP grade (99.999%) N$_2$ and CO$_2$ were used for all measurements. The sample temperature was maintained at 77 K (liquid nitrogen bath), 195 K (acetone-dry ice bath), 273 K (ice water bath) or 298 K (water bath at room temperature) as appropriate.

Scanning Electron Microscopy-Energy Dispersed X-ray Spectroscopy. polyMOFs were transferred to conductive carbon tape on a sample holder disk, and coated by Ir-sputter coating for 8 sec. A Philips XL ESEM instrument was used for acquiring images using a 7.5 kV energy source under vacuum.

X-Ray Single-Crystal Diffraction.

A suitable single crystal of MOF 2 (~20 m×20 m×20 m) was selected and diffraction data were was collected on a Bruker Apex diffractometer using Mo Kα (λ=0.71073 Å) radiation. Metal atoms were found in the Fourier difference map and refined anisotropically. The allyloxy dangling groups, counter ions and disordered solvent molecules (DMF) within the framework were treated with the "SQUEEZE" protocol in PLATON to account for electron density. MOF 2 crystallized in the trigonal space group R-3m with a b 17.784(4) c=53.140(5) Å; a==90°; y=120°; V=14555(5) Å$^3$. The crystal data file of MOF 2 was deposited into the Cambridge Crystallographic Data Centre (CCDC) and assigned a number 1428600.

Differential Scanning Calorimetry.

Theromograms were obtained with a DSC Q1000 from TA instruments. 3-5 mg samples of each species were added to a sealed pan that passed through a heat/cool/heat cycle at 10° C./min. Melting temperatures were only observed and thus, reported, for the first heating cycle. Glass transition temperatures are reported for the second heating cycle, in order to erase the thermal history of the samples. The temperature ranged from −50 to 270° C.

Thermogravimetric Analyses.

Samples were measured under nitrogen with a TGA Q5000 from TA Instruments. About 5-10 mg samples were heated at 20° C./min from 25 to 650° C.

MOF Aging Experiment.

Liquid water treatment: each polyMOFs were immersed into room temperature water or boiling water for 1 day. Water vapor treatment: each polyMOF was aged in an HD-205 Associated Environmental Systems environmental chamber set to 25° C. at 90% relative humidity (RH). Each sample was aged for 7 days and then analyzed.

PXRD Analysis.

As-synthesized polyMOFs and liquid water treated polyMOFs were isolated by filtration and air-dried for 5 min prior to data collection. The samples were spread on a zero field sample holder. PXRD data were collected at ambient temperature on a Bruker D8 Advance diffractometer at 40 kV, 40 mA for Cu Kα ($\lambda$=1.5418 Å), with a scan speed of 1 sec/step, a step size of 0.03° in 2θ, and a 2θ range of ~5 to 50. Experimental pattern backgrounds were not corrected. The polyMOFs samples, MOF 1 and MOF 2 after water-vapor treatment for 7 d at room temperature were analyzed using a Rigaku Miniflex 600 X-ray powder diffractometer with a D/Tex detector. Samples were scanned at 40 kV and 15 mA, using Cu Kα radiation ($\lambda$=1.54 Å), and a scan rate of 5° min$^{-1}$ over a 2θ range of 5 to 500. Zero-background discs were used to minimize background scattering. For all PXRD data, backgrounds were not subtracted.

Contact Angle Measurements.

Contact angle measurements were recorded with a Tantec contact angle meter. ~30 mg of polyMOFs sample after gas sorption tests was gently crushed with a mortar and pestle into fine particles and then pressed onto a glass slide with a spatula. A drop of water was slowly placed onto the sample with a microsyringe and the contact angle was measured using contact angle meter.

Example 4. Poly(Isophthalic Acid)(Ethylene Oxide) as a Macromolecular Modulator for Metal-Organic Polyhedra In this example, disclosed is a new strategy was developed by using a polymer-ligand, poly(isophthalic acid)(ethylene oxide), to modulate the growth of metal-organic polyhedra (MOP) crystals. This macromolecular modulator can effectively control the crystal habit of several different $Cu_{24}L_{24}$ (L=isophthalic acid derivatives) MOPs. The polymer also directed the formation of MOP structures under reaction conditions that only produce metal organic frameworks (MOFs) in the absence of modulator. Moreover, the polymer also enabled the deposition of MOP crystals on glass surfaces. This macromolecular modulator strategy provides an innovative approach to control the morphology and assembly of MOP particles.

The design and applications of supramolecular architectures based on self-assembly of metal ions and organic building blocks have attracted considerable attention. Supramolecular nanocages are potentially useful for a variety of applications such as selective guest inclusion, gas storage, catalysts, drug delivery, sensing, and nanoscale reaction vessels. Metal organic polyhedra (MOPs) are discrete metal organic molecular assemblies that feature tailorable internal cavities, rigid molecular structures, and rich chemical functionality. Unlike MOFs, which may be infinite porous networks connected by metal ligand coordination, MOPs crystallize by the close-packing of discrete cage-liked molecules, analogous to small molecule crystallization.

In addition to controlling crystal growth, it is desirable to develop an effective method of converting MOP molecules into coatings and films for various applications. Several reports described that MOPs can be confined inside silica mesopores, mixed-matrix membranes, MOFs, and on plasmonic substrates. These reports rely mostly on soluble MOP molecules that can be solution processed in a postsynthetic fashion. Alternatively, it would be advantageous to develop a strategy to organize MOPs in an in situ, one-pot reaction.

Herein this example, we report a metal coordinating polymer (i.e. polymer-ligand) that can act as a modulator for controlling the morphology and assembly of MOP crystals. This approach was derived from our recent discovery of polymer-metal organic-frameworks (polyMOFs). The polymer modulator is constructed from 1,3-benzenedicarboxylic acid derivatives (e.g. isophthalic acid, $H_2$m-bdc) linked by ethylene oxide spacers, where the isophthalic acid component recapitulates the building block of the MOP. The resulting poly(isophthalic acid)(ethylene oxide) polymer 1 (Chart 2) can coordinate to metal ions and results in the growth of crystals with uniform size and morphology in the micrometer size regime. Control experiments demonstrate that both the coordinating ability of the isophthalic acid and the ethylene oxide linkages are required to elicit this templating effect. In addition, the polymer can be used to support a film of MOP crystals on the surface of glass. This work provides insight into a promising, new route to control the growth and assembly of these metal organic supramolecular cages.

Chart 2.

Polymers and Control Compounds Synthesized in This Work for Study as Coordinating Modulators.

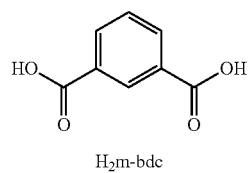

$H_2$m-bdc

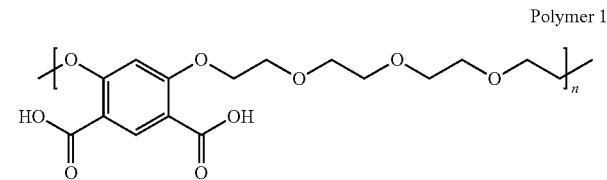

Polymer 1

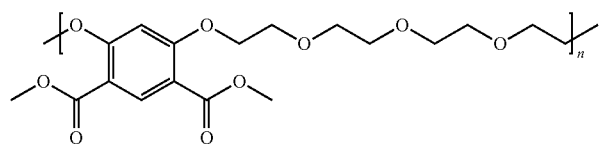

Polymer 1'

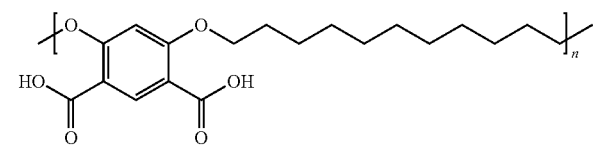

Polymer 2

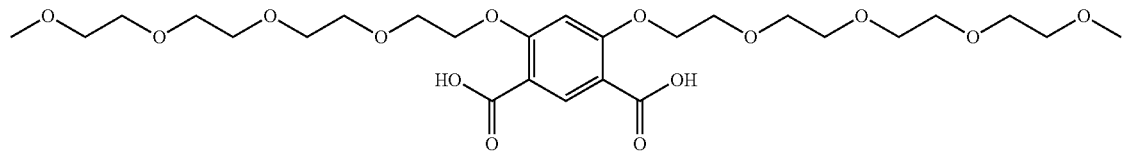

Compound 3

General Experimental Information. Starting materials and solvents were purchased and used without further purification from commercial suppliers (Sigma-Aldrich, Alfa Aesar, EMD, TCI, and others). Chromatography was performed using a CombiFlash Rf200 automated system from TeledyneISCO (Lincoln, USA). $^1$H and $^{13}$C nuclear magnetic resonance (NMR) spectra were collected on Varian Mercury spectrometers running at 400 and 500 MHz, respectively. Chemical shifts were quoted in parts per million (ppm) referenced to the appropriate solvent peak. Electrospray ionization mass spectrometry (ESI-MS) was performed at the Molecular Mass Spectrometry Facility (MMSF) in the Department of Chemistry & Biochemistry at the University of California, San Diego. Fourier transform infrared spectroscopy (FT-IR) was performed on a Bruker ALPHA FT-IR spectrometer.

Gel Permeation Chromatography. Gel Permeation Chromatography (GPC) measurements were performed at 40° C. using an Agilent 1260 Infinity Series liquid chromatography system with an internal differential refractive index detector, and two Waters Styragel HR-5E columns (7.8 mm i.d., 300 mm length, guard column 7.8 mm i.d., 25 mm length). A solution of 0.1% potassium triflate (KOTf) in HPLC grade hexafluoroisopropanol (HFIP) was used as the mobile phase at a flow rate of 0.5 mL/min. Calibration was performed using narrow polydispersity polymethyl methacrylate (PMMA) standards. 4.0-6.0 mg of polymer were dissolved in 2.0 mL of HFIP for 1 h. The solution was then filtered through 1 m membrane before being injected into the GPC instrument.

Single-crystal X-ray Diffraction Analysis. Single-crystal X-ray diffraction (XRD) data was collected on a Bruker Apex diffractometer using Mo Kα (λ=0.71073 Å) radiation. Metal atoms were found in the Fourier difference map and refined anisotropically. The disordered solvent molecules within the cavities were treated with the "SQUEEZE" protocol in PLATON to account for electron density.[35] The crystal data files of MOP-H, —OH, —$NO_2$, and polyMOP-H, —OH, —$NO_2$, —$CH_3$, —$NH_2$ were deposited into the Cambridge Crystallographic Data Centre (CCDC) and assigned numbers 1478732-1478739.

Analysis by $^1$H NMR. MOP, MOF, and polyMOP samples (~5 mg) were digested with sonication in 500 μL of DMSO-$d_6$ and 5 μL of 35% DCl in $D_2O$ prior to collecting $^1$H NMR spectra. 1H NMR spectrum of digested polyMOP-OH, —$NO_2$, —$CH_3$, and —$NH_2$. These spectra show that the molar ratio of $H_2$m-bdc ligand to polymer 1 is: ~20:1 for polyMOP-OH, ~25:1 for polyMOP-$NO_2$, ~16:1 for polyMOP-$CH_3$, and ~25:1 for polyMOP-$NH_2$. $^1$H NMR spectrum of digested MOP-H that shows the molar ratio of $H_2$m-bdc to polymer 2 is ~33:1. $^1$H NMR spectrum of digested polyMOP-H that shows the molar ratio of $H_2$m-bdc to polymer 1 is ~25:1.

Powder X-ray Diffraction Analysis. MOP, MOF, and polyMOP samples (~15-30 mg) were isolated by filtration and air-dried (~1 min) before powder X-ray diffraction (PXRD) analysis. PXRD data were collected at ambient temperature on a Bruker D8 Advance diffractometer using a LynxEye detector at 40 kV and 40 mA for Cu Kα (λ=1.5418 Å), with a scan speed of 0.1 s/step, a step size of 0.02 in 2θ, and a 2θ range of 5-40°.

Gas Sorption Analysis. All gases used were of 99.999% purity. For all samples, the mother liquor was decanted and the resulting crystals were washed with N,N-dimethylformamide (3×10 mL, DMF), EtOH (3×10 mL), and $CH_2Cl_2$ (3×10 mL). The crystals were stored in $CH_2Cl_2$ until needed. ~50-100 mg of MOP, MOF, or polyMOP sample (soaking in $CH_2Cl_2$) was transferred to a pre-weighed sample tube and evacuated on a vacuum line for 10 min at room temperature. The sample was then degassed at 80° C. on a Micromeritics ASAP 2020 Adsorption analyzer for a minimum of 10 h. The sample tube was re-weighed to obtain a consistent mass of the degassed sample. The samples were measured for $N_2$ (77 K and 298 K) and $CO_2$ (195 K and 298 K) adsorption.

Preparation of Compounds 1-3.

The $H_2$m-bdc derivative polymers 1 and 2 were prepared by step-growth polymerization (Chart 1) via Williamson ether synthesis. Dimethyl 4,6-dihydroxy-isophthalate was combined with dibrominated ethylene oxide, 1,11-dibromoundecane, or 2-[2-[2-(2-methoxyethoxy)ethoxy]ethoxy] ethyl bromide to form the ester precursors of 1-3. The hydrolysis of the ester groups afforded polymers 1 and 2, and a similar synthetic approach was used to produce compound 3. Both $^1$H and $^{13}$C NMR analysis verified the composition of all compounds. The molecular weight values of polymers 1, 1' (the methyl ester precursor of 1, Chart 1), and 2 were determined by gel permeation chromatography (GPC). The number-average molecular weight ($M_n$) and weight-average molecular weight ($M_w$) was 9,667 and 17,756 Da for polymer 1; 12,200 and 22,243 Da for polymer 1'; 4,000 and 9,900 Da for polymer 2. The polydispersity index (PDI) values were 1.8, 1.8, and 2.5 for polymer 1, 1', and 2, and are typical for step-growth polymerization. The average degree of polymerization (DP=$M_n$/(F.$W_{repeat\ unit}$)) was 27 for polymer 1, 31 for polymer 1', and 12 for polymer 2. The lower DP of polymer 2 was due to poor solubility of its ester precursor in organic solvents that hindered further step-growth polymerization.

MOP-H and Polymer-1-Modulated MOP-H (polyMOP-H).

Figure 18:
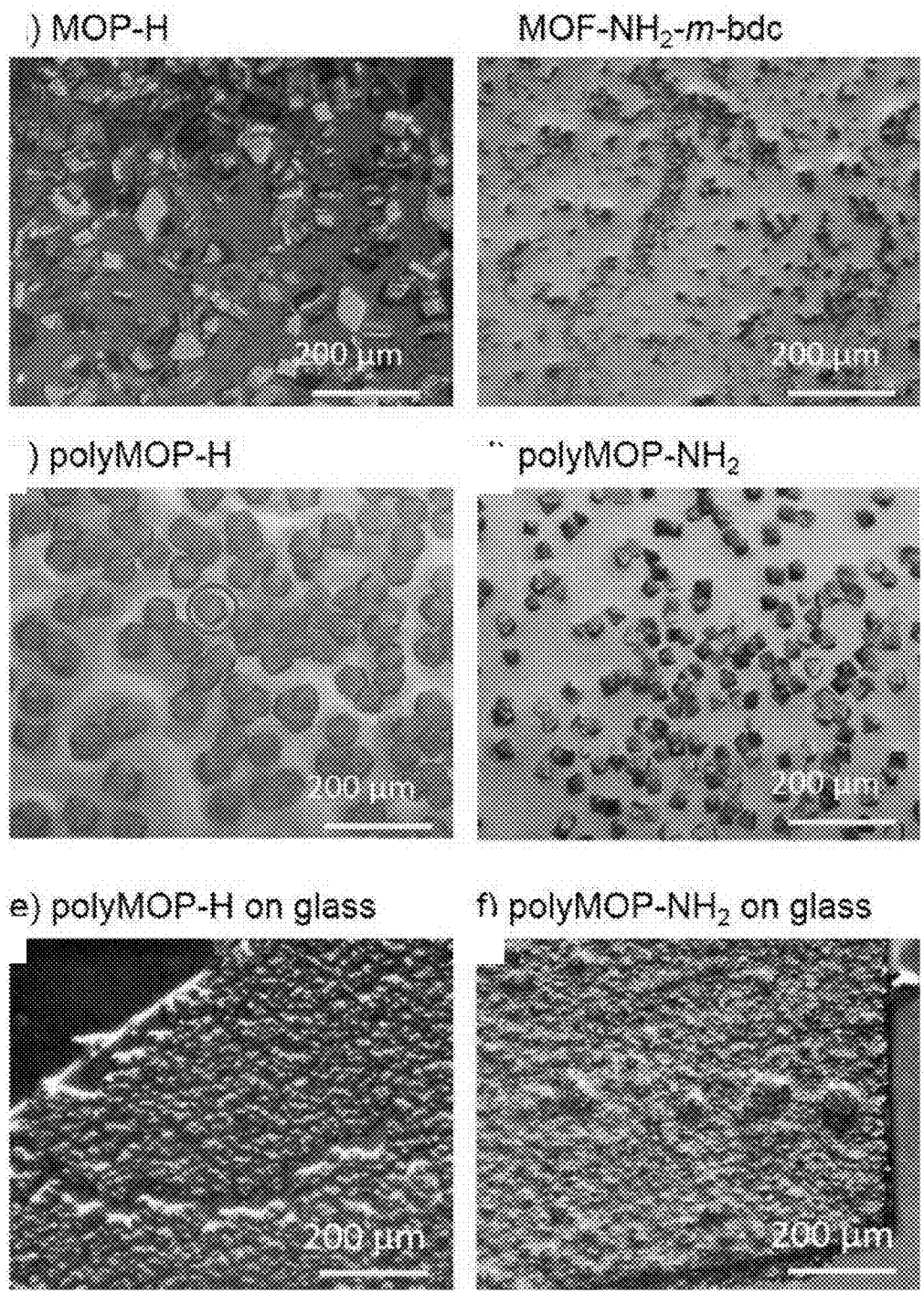
FIG. 18. Optical images of as-synthesized MOP-H (small cubic c-MOP-H crystals are circled), MOF-NH2-m-bdc, polyMOP-H (large cubic c-MOP-H crystal is circled), polyMOP-NH2, and polyMOP-H and polyMOP-NH2 deposited on the surface of glass.

MOP-1 (also referred to herein as MOP-H), is a prototypical truncated cuboctahedron MOP composed of 24 m-bdc and 24 Cu(II) ions. A 1:1 equivalent (0.04 mmol) of Cu$(NO_3)_2$·5$H_2O$ and $H_2$m-bdc was dissolved in 0.75 mL DMF/0.25 mL EtOH and heated at 80° C. in an oven for 16 h, affording a mixture of prismatic (majority) and tiny cubic (minority) crystals (FIG. 18). The smaller, cubic crystals (~5×5×5 m$^3$) were not suitable for single-crystal X-ray diffraction (XRD) analysis. XRD of the larger prismatic MOP-H crystal (~100×100×20 m$^3$) revealed a structure [$Cu_{24}$(m-bdc)$_{24}$($S)_{24}$](S=terminal solvent molecule) identical to that previously reported for a-MOP-H (a=anorthic=triclinic). Additionally, crystals with a close-packed, body-centered cubic cell (c-MOP-H [$Cu_{24}$(m-bdc)$_{24}$($H_2O$)$_{24}$]) were obtained after soaking the as-synthesized a-MOP-H crystals in the mother liquor for 3 months (as a result of complete hydration). Therefore, the PXRD pattern of our as-synthesized MOP-H displays an impure phase as a result of incomplete hydration, leading to a mixture of a-MOP-H and c-MOP-H.

In order to control the morphology of MOP-H crystals, polymer 1 was added as a modulator. Using the same reaction conditions (0.75 mL DMF/0.25 mL EtOH at 80° C. for 16 h) the molar ratio between $H_2$m-bdc and polymer 1 was explored, while keeping the 1:1 molar stoichiometry of Cu($NO_3$)·2.5$H_2O$ to total organic ligands ($H_2$m-bdc and polymer 1) constant. At a molar ratio 6:1 of $H_2$m-bdc to polymer 1, the formation of blue crystals with a highly uniform cubic morphology and size were obtained (~40× 40×40 μm$^3$). The morphology of crystals was transformed from prismatic (without modulator) to cubic (with polymer 1). At other ratios ranging from 2:1 to 20:1 of $H_2$m-bdc to polymer 1, poorly crystalline solids and mixtures of prismatic and cubic crystals were obtained (Table S1). The structure from a single-crystal XRD analysis of the cubic crystals obtained from the 6:1 ratio of $H_2$m-bdc to polymer 1 revealed a close-packing of discrete MOPs ([$Cu_{24}$(m-bdc)$_{24}$(S)$_{24}$]), identical to that of c-MOP-H. The PXRD pattern of polyMOP-H confirmed that a pure phase was obtained with all the characteristic peaks of the simulated pattern from XRD analysis from polyMOP-H. After thoroughly washing the isolated crystals with DMF and EtOH, the incorporation of polymer 1 was verified by $^1$H NMR analysis of digested polyMOP-H in DMSO-$d_6$ with the addition of a small amount of concentrated DCl/$D_2O$ solution. The NMR analysis indicated that the actual molar ratio of $H_2$m-bdc to polymer 1 was ~25:1. The XRD analysis cannot resolve such a trace amount of polymer, and the close-packing of nanocages is not expected to accommodate the tetra(ethylene oxide) spacer. Therefore, it is hypothesized that the effective growth and packing of the MOP molecules to form the uniform cubic morphology is largely modulated by polymer 1 at the external crystal surfaces.

To examine the role that polymer 1 played in this modulation strategy, we searched for other modulators that might give a similar result. Tetraethylene glycol (TEG), polyethylene glycol with an average molecular weight 400 Da (PEG-400), and polyethylene glycol with average molecular weight of 4,000 Da (PEG-4,000) were investigated as modulators (Table S1).

TABLE S1

Reactions to explore conditions for preparing uniform cubic MOP-H crystals. Reactions include Cu($NO_3$)$_2$·5$H_2O$ (9.5 mg, 4.1 × 10$^{-2}$ mmol) and 0.75 mL DMF/0.25 mL EtOH at 80° C. for 16 h. Products were characterized by PXRD and $^1$H NMR.

| $H_2$m-bdc | Polymers | Additives | Results |
|---|---|---|---|
| 4.5 mg, 2.7 × 10$^{-2}$ mmol | Polymer 1 (4.8 mg, 1.4 × 10$^{-2}$ mmol) | — | Cubic crystals with no clear shape; m-bdc:1 = 2:1 |
| 5.1 mg, 3.1 × 10$^{-2}$ mmol | Polymer 1 (3.6 mg, 1.0 × 10$^{-2}$ mmol) | — | Cubic crystals with non-uniform size; m-bdc:1 = 8:1 |
| 6.5 mg, 3.9 × 10$^{-2}$ mmol | Polymer 1 (0.7 mg, 2.0 × 10$^{-3}$ mmol) | — | A mixture of cubic and prismatic crystals; m-bdc:1 = 25:1 |
| 4.5 mg, 2.7 × 10$^{-2}$ mmol | Polymer 1' (5.4 mg, 1.4 × 10$^{-2}$ mmol) | — | A mixture of cubic and prismatic crystals; no polymer incorporated |
| 5.1 mg, 3.1 × 10$^{-2}$ mmol | Polymer 1' (3.9 mg, 1.0 × 10$^{-2}$ mmol) | — | A mixture of cubic and prismatic crystals; no polymer incorporated |
| 5.8 mg, 3.5 × 10$^{-2}$ mmol | Polymer 1' (2.3 mg, 6.0 × 10$^{-3}$ mmol) | — | A mixture of cubic and prismatic crystals; no polymer incorporated |
| 6.5 mg, 3.9 × 10$^{-2}$ mmol | Polymer 1' (0.8 mg, 2.0 × 10$^{-3}$ mmol) | — | A mixture of cubic and prismatic crystals; no polymer incorporated |
| 4.5 mg, 2.7 × 10$^{-2}$ mmol | Polymer 2 (4.9 mg, 1.4 × 10$^{-2}$ mmol) | — | A mixture of cubic and prismatic crystals; m-bdc:2 = 25:1 |
| 5.8 mg, 3.5 × 10$^{-2}$ mmol | Polymer 2 (2.0 mg, 6.0 × 10$^{-3}$ mmol) | — | A mixture of cubic and prismatic crystals; m-bdc:2 = 33:1 |
| 6.5 mg, 3.9 × 10$^{-2}$ mmol | Polymer 2 (0.7 mg, 2.0 × 10$^{-3}$ mmol) | — | A mixture of cubic and prismatic crystals; m-bdc:2 = 33:1 |
| 5.1 mg, 3.1 × 10$^{-2}$ mmol | — | Compound 3 (5.8 mg, 1.0 × 10$^{-2}$ mmol) | A mixture of cubic and prismatic crystals; no additive incorporated |
| 5.8 mg, 3.5 × 10$^{-2}$ mmol | — | Compound 3 (3.5 mg, 6.0 × 10$^{-3}$ mmol) | A mixture of cubic and prismatic crystals; no additive incorporated |
| 6.5 mg, 3.9 × 10$^{-2}$ mmol | — | Compound 3 (1.2 mg, 2.0 × 10$^{-3}$ mmol) | A mixture of cubic and prismatic crystals; no additive incorporated |
| 6.8 mg, 4.1 × 10$^{-2}$ mmol | — | Tetraethylene glycol (8.0 mg, 4.1 × 10$^{-2}$ mmol) | A mixture of cubic and prismatic crystals; no additive incorporated |
| 6.8 mg, 4.1 × 10$^{-2}$ mmol | — | Tetraethylene glycol (2.6 mg, 1.4 × 10$^{-2}$ mmol) | A mixture of cubic and prismatic crystals; no additive incorporated |

TABLE S1-continued

Reactions to explore conditions for preparing uniform cubic MOP-H crystals. Reactions include Cu(NO$_3$)$_2$·2.5H$_2$O (9.5 mg, 4.1 × 10$^{-2}$ mmol) and 0.75 mL DMF/0.25 mL EtOH at 80° C. for 16 h. Products were characterized by PXRD and $^1$H NMR.

| H$_2$m-bdc | Polymers | Additives | Results |
|---|---|---|---|
| 6.8 mg, 4.1 × 10$^{-2}$ mmol | — | Tetraethylene glycol (1.4 mg, 7.0 × 10$^{-3}$ mmol) | A mixture of cubic and prismatic crystals; no additive incorporated |
| 6.8 mg, 4.1 × 10$^{-2}$ mmol | — | Tetraethylene glycol (0.4 mg, 2.0 × 10$^{-3}$ mmol) | A mixture of cubic and prismatic crystals; no additive incorporated |
| 6.8 mg, 4.1 × 10$^{-2}$ mmol | PEG-400$^a$ (8.0 mg, 2.0 × 10$^{-2}$ mmol) | — | A mixture of cubic and prismatic crystals; no polymer incorporated |
| 6.8 mg, 4.1 × 10$^{-2}$ mmol | PEG-400 (2.6 mg, 7.0 × 10$^{-3}$ mmol) | — | A mixture of cubic and prismatic crystals; no polymer incorporated |
| 6.8 mg, 4.1 × 10$^{-2}$ mmol | PEG-400 (1.4 mg, 4.0 × 10$^{-3}$ mmol) | — | A mixture of cubic and prismatic crystals; no polymer incorporated |
| 6.8 mg, 4.1 × 10$^{-2}$ mmol | PEG-400 (0.4 mg, 1.0 × 10$^{-3}$ mmol) | — | A mixture of cubic and prismatic crystals; no polymer incorporated |
| 6.8 mg, 4.1 × 10$^{-2}$ mmol | PEG-4,000$^b$ (8.0 mg, 2.0 × 10$^{-3}$ mmol) | — | A mixture of cubic and prismatic crystals; no polymer incorporated |
| 6.8 mg, 4.1 × 10$^{-2}$ mmol | PEG-4,000 (2.6 mg, 7.0 × 10$^{-4}$ mmol) | — | A mixture of cubic and prismatic crystals; no polymer incorporated |
| 6.8 mg, 4.1 × 10$^{-2}$ mmol | PEG-4,000 (1.4 mg, 4.0 × 10$^{-4}$ mmol) | — | A mixture of cubic and prismatic crystals; no polymer incorporated |
| 6.8 mg, 4.1 × 10$^{-2}$ mmol | PEG-4,000 (0.4 mg, 1.0 × 10$^{-4}$ mmol) | — | A mixture of cubic and prismatic crystals; no polymer incorporated |
| 6.8 mg, 4.1 × 10$^{-2}$ mmol | PVP$^c$ (0.5 mg, 1.3 × 10$^{-5}$ mmol) | TMDP$^d$ (1.0 mg, 5.0 × 10$^{-3}$ mmol) | A mixture of cubic and prismatic crystals; no polymer incorporated |
| 6.8 mg, 4.1 × 10$^{-2}$ mmol | PVP (1.0 mg, 2.5 × 10$^{-5}$ mmol) | TMDP (1.0 mg, 5.0 × 10$^{-3}$ mmol) | A mixture of cubic and prismatic crystals; no polymer incorporated |
| 6.8 mg, 4.1 × 10$^{-2}$ mmol | PVP (0.5 mg, 1.3 × 10$^{-5}$ mmol) | TMDP (2.1 mg, 1.0 × 10$^{-2}$ mmol) | A mixture of cubic and prismatic crystals; no polymer incorporated |
| 6.8 mg, 4.1 × 10$^{-2}$ mmol | PVP (1.0 mg, 2.5 × 10$^{-5}$ mmol) | TMDP (2.1 mg, 1.0 × 10$^{-2}$ mmol) | A mixture of cubic and prismatic crystals; no polymer incorporated |
| 6.8 mg, 4.1 × 10$^{-2}$ mmol | PVP (0.5 mg, 1.3 × 10$^{-5}$ mmol) | N(CH$_3$)$_4$NO$_3$ (0.7 mg, 5.0 × 10$^{-3}$ mmol) | A mixture of cubic and prismatic crystals; no polymer incorporated |
| 6.8 mg, 4.1 × 10$^{-2}$ mmol | PVP (1.0 mg, 2.5 × 10$^{-5}$ mmol) | N(CH$_3$)$_4$NO$_3$ (0.7 mg, 5.0 × 10$^{-3}$ mmol) | A mixture of cubic and prismatic crystals; no polymer incorporated |
| 6.8 mg, 4.1 × 10$^{-2}$ mmol | PVP (0.5 mg, 1.3 × 10$^{-5}$ mmol) | N(CH$_3$)$_4$NO$_3$ (1.4 mg, 1.0 × 10$^{-2}$ mmol) | A mixture of cubic and prismatic crystals; no polymer incorporated |
| 6.8 mg, 4.1 × 10$^{-2}$ mmol | PVP (1.0 mg, 2.5 × 10$^{-5}$ mmol) | N(CH$_3$)$_4$NO$_3$ (1.4 mg, 1.0 × 10$^{-2}$ mmol) | A mixture of cubic and prismatic crystals; no polymer incorporated |
| 6.8 mg, 4.1 × 10$^{-2}$ mmol | — | TMDP (1.0 mg, 5.0 × 10$^{-3}$ mmol) | A mixture of cubic and prismatic crystals; no additive incorporated |
| 6.8 mg, 4.1 × 10$^{-2}$ mmol | — | TMDP (2.1 mg, 1.0 × 10$^{-2}$ mmol) | A mixture of cubic and prismatic crystals; no additive incorporated |
| 6.8 mg, 4.1 × 10$^{-2}$ mmol | — | TMDP (4.2 mg, 2.0 × 10$^{-2}$ mmol) | A mixture of cubic and prismatic crystals; no additive incorporated |
| 6.8 mg, 4.1 × 10$^{-2}$ mmol | PVP (0.5 mg, 1.3 × 10$^{-5}$ mmol) | — | A mixture of cubic and prismatic crystals; no polymer incorporated |
| 6.8 mg, 4.1 × 10$^{-2}$ mmol | PVP (1.0 mg, 2.5 × 10$^{-5}$ mmol) | — | A mixture of cubic and prismatic crystals; no polymer incorporated |
| 6.8 mg, 4.1 × 10$^{-2}$ mmol | PVP (2.0 mg, 5.0 × 10$^{-5}$ mmol) | — | A mixture of cubic and prismatic crystals; no polymer incorporated |

TABLE S1-continued

Reactions to explore conditions for preparing uniform cubic MOP-H crystals. Reactions include $Cu(NO_3)_2 \cdot 2H_2O$ (9.5 mg, $4.1 \times 10^{-2}$ mmol) and 0.75 mL DMF/0.25 mL EtOH at 80° C. for 16 h. Products were characterized by PXRD and $^1$H NMR.

| $H_2$m-bdc | Polymers | Additives | Results |
|---|---|---|---|
| 6.8 mg, $4.1 \times 10^{-2}$ mmol | — | $N(CH_3)_4NO_3$ (0.7 mg, $5.0 \times 10^{-3}$ mmol) | A mixture of cubic and prismatic crystals; no additive incorporated |
| 6.8 mg, $4.1 \times 10^{-2}$ mmol | — | $N(CH_3)_4NO_3$ (1.4 mg, $1.0 \times 10^{-2}$ mmol) | A mixture of cubic and prismatic crystals; no additive incorporated |
| 6.8 mg, $4.1 \times 10^{-2}$ mmol | — | $N(CH_3)_4NO_3$ (2.8 mg, $2.0 \times 10^{-2}$ mmol) | A mixture of cubic and prismatic crystals; no additive incorporated |

[a]PEG-400 = polyethylene glycol, average molecular weight 400 Da;
[b]PEG-4000 = polyethylene glycol, average molecular weight 4000 Da;
[c]PVP = polyvinylpyrrolidone, average molecular weight 40,000 Da;
[d]TMDP = 4,4'-trimethylenedipiperidine Keeping the reaction condition unchanged (0.04 mmol of $Cu(NO_3) \cdot 2.5H_2O$ and $H_2$m-bdc in a solution of 0.75 mL DMF/0.25 mL EtOH at 80° C. for 16 h), the aforementioned PEG polymers were added as modulators. Regardless of length, these PEG polymers without m-bdc groups all gave similar results. From the microscopic images, these polymers increased the abundance of cubic crystals compared to the product of modulator-free MOP-H synthesis, but these PEG-only polymers still exhibited a complex mixture of prismatic and cubic crystals, which was confirmed by PXRD analysis. The size of the cubic crystals with PEG-only modulators did increase slightly (about 2-fold, ~10×10×10 m$^3$). The PEG polymers were unable to provide the high degree of uniform control and large crystal size enhancement observed with polymer 1 under these experimental conditions. Among these ethylene oxide-based additives (polymer 1, TEG, PEG-400, and PEG-4,000), polymer 1 exclusively produced crystals with uniform size and cubic morphology. This suggests that coordination of polymer 1 to the MOP-H molecules is essential for modulation. Other modulators and additives such as polyvinylpyrrolidone, 4,4'-trimethylenedipiperidine, and tetramethylammonium nitrate were also unable to control the size and morphology of MOP-H crystals under these experimental conditions (Table S1).

We also synthesized polymer 1', polymer 2, and compound 3 (Chart 2) as modulators for control experiments. Under the same reaction conditions, molar ratios of 3:1, 6:1, 10:1 of $H_2$m-bdc to additives were explored (Table S1). Use of polymer 1' as a modulator, which has the metal binding carboxylate groups blocked as methyl esters, resulted in a mixture of tiny prismatic and cubic crystals. The trace of polymer 1' was not observed in the in the $^1$H NMR spectra of the digested product. Thus, the requirement of carboxylate groups for effective crystal modulation was verified in these experimental conditions.

Polymer 2 is an analogue of polymer 1 containing a purely alkyl (e.g. all methylene) instead of a PEG spacer. Polymer 2 was incorporated into the MOP crystals, as determined by $^1$H NMR analysis of digested samples.

Compound 3 was prepared as a model of the monomer repeat unit of polymer 1. Use of compound 3 as a modulator resulted in a mixture of prismatic and cubic crystals and a mixed phase was confirmed by PXRD analysis. Importantly, compound 3 was not found in the $^1$H NMR spectra of the digested MOP product.

polyMOPs from 5-Substituted $H_2$m-bdc Derivatives.

The successful control of the morphology of polyMOP-H crystals was generalized with other MOPs. Formation of MOPs with $H_2$m-bdc derivatives 5-hydroxyisophthalic acid (5-OH—$H_2$m-bdc), 5-nitroisophthalic acid (5-NO$_2$—$H_2$m-bdc), 5-methylisophthalic acid (5-CH$_3$—$H_2$m-bdc), and 5-aminoisophthalic acid (5-NH$_2$—$H_2$m-bdc) were investigated with polymer 1. The molar ratio of these $H_2$m-bdc derivatives to polymer 1 was set to 10:1 for the synthesis of these polyMOPs. For all polyMOP samples described below, the $^1$H NMR spectra of the digested polyMOPs confirmed that between a 16:1 to 25:1 molar ratio of derivatized m-bdc ligand to polymer 1 was incorporated into these crystals. Control experiments carried out under the same reaction conditions without adding modulator or with other additives (e.g., PEG-4000) were also performed.

MOP-OH and polyMOP-OH were synthesized in a solution of N,N-diethylformamide (DEF) and MeOH at 80° C. for 16 h. The MOP-OH crystals formed truncated octahedra with non-uniform sizes. In contrast, polyMOP-OH presented octahedral blue crystals of highly uniform size (~30× 30×30 m$^3$). As expected, the XRD structure determination showed that MOP-OH and polyMOP-OH possessed the same nanocage structure as that of MOP-H. PXRD analysis verified the phase purity of MOP-OH and polyMOP-OH. With MOP-OH, polymer 1 served to produced crystals of a highly uniform size distribution.

Both MOP-NO$_2$ and polyMOP-NO$_2$ crystalized from a solution of DMF and MeOH at 60° C. after 2 d, and both displayed a prismatic crystal morphology (~20×20×10 µm$^3$). Their single-crystal XRD structures showed the same cage structure as MOP-H. The phase purity of these materials was confirmed by their PXRD patterns.

Use of 5-CH$_3$—$H_2$m-bdc in a solution of DMF and MeOH at 60° C. for 2 d without modulator produced tiny crystallites and PXRD indicated these crystals consisted of a reported MOF $[Cu(5-CH_3\text{-m-bdc})(H_2O)]_n$, which we denote here as MOF-CH$_3$-m-bdc. Under the same reaction conditions, but with polymer 1 as a modulator, blue prismatic crystals were obtained of uniform size (~20×20×10 m$^3$). The XRD structure determination of polyMOP-CH$_3$ showed the same cage structure as that of MOP-H with a composition of $[Cu_{24}(5\text{-}CH_3\text{-m-bdc})_{24}(S)_{24}]$ (S=solvent). The PXRD pattern of polyMOP-CH$_3$ matched that simulated from the XRD structure, indicating phase purity.

Importantly, no example of a MOP has been reported using 5-$CH_3$—$H_2$m-bdc, as only MOFs have been obtained from this ligand, demonstrating that polymer 1 is modulating and directing not only the crystal habit, but also the formation of a MOP over that of a MOF.

Figure 19A:
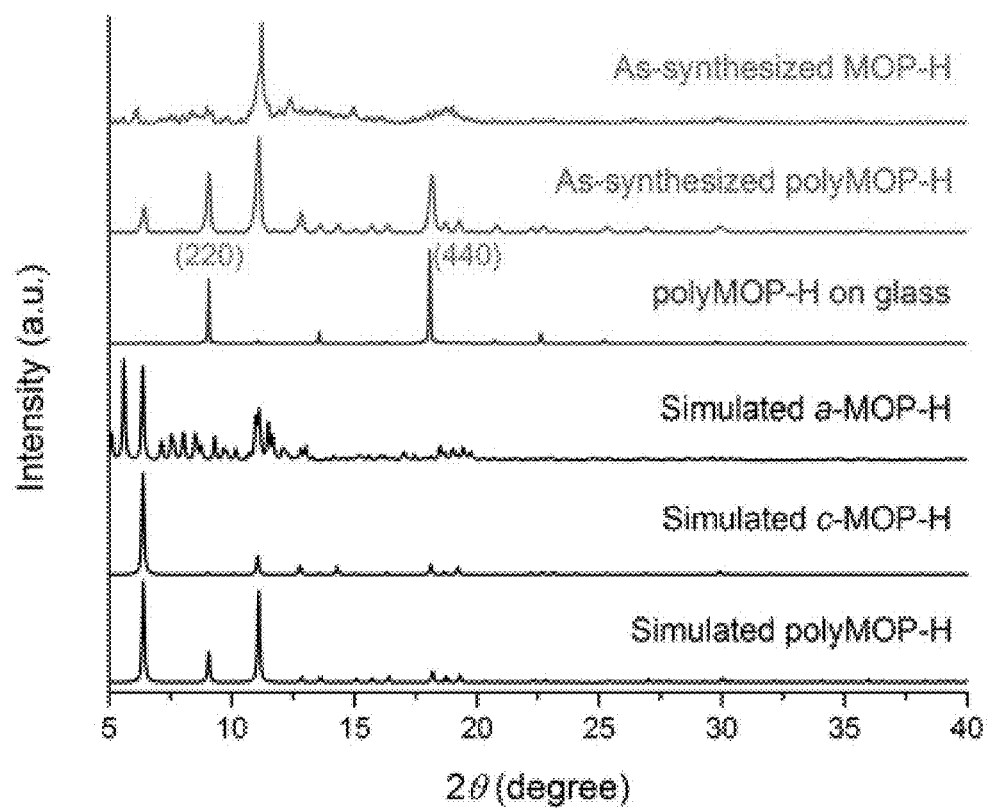
FIGS. 19A-19B. PXRD patterns of materials synthesized from (FIG. 19A) $H_2$m-bdc and (FIG. 19B) 5-$NH_2$—$H_2$m-bdc.
Figure 19B:
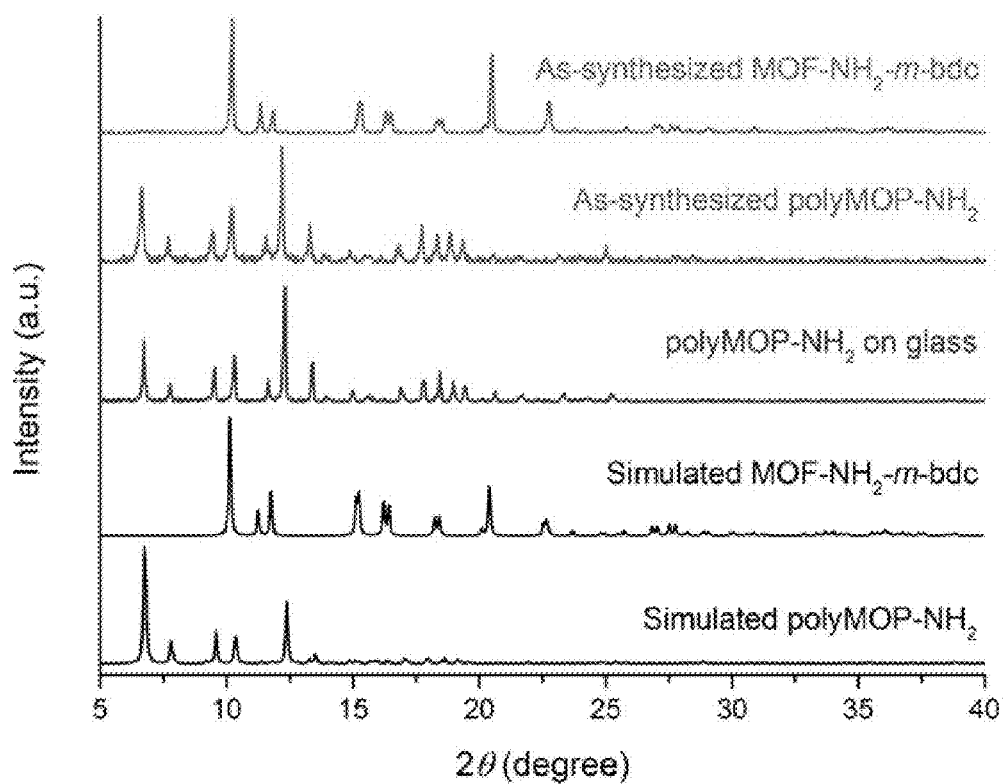

Without polymer 1, the products synthesized from 5-$NH_2$—$H_2$m-bdc, from a solution of DMF and MeOH at 60° C. for 2 d, were tiny crystallites (FIG. 18) with PXRD patterns (FIGS. 19A-19B) consistent with a previously reported MOF, [Cu(5-$NH_2$-m-bdc)(DMF)]$_n$ (denoted here as MOF-$NH_2$-m-bdc). In the presence of polymer 1, under the same reaction condition, uniform green octahedral crystals were obtained of polyMOP-$NH_2$ (~30×30×30 µm$^3$, FIG. 18). The compound obtained resembles a MOP previously reported (MOF-15) that also contained the 5-$NH_2$-m-bdc ligand and Cu(II). The crystal structure of MOP-15 was composed of close-packed [Cu$_{24}$(5-$NH_2$-m-bdc)$_{24}$(S)$_{24}$] cages. The single crystal structure of polyMOP-$NH_2$ [Cu$_{24}$(5-$NH_2$-m-bdc)$_{24}$(S)$_{24}$][Cu$_{0.5}$(S')(S")]$_8$ (where S, S', S" represent solvent molecules) possesses the same MOP cages, but with the MOP molecules connected via an octahedral Cu(R—$NH_2$)$_2$(S')$_2$(S")$_2$ center. In embodiments, each MOP molecule uses 8 amino groups to coordinate to 8 different Cu(II) ions to form a 3-dimensional infinite network. The phase purity of the bulk material was confirmed by PXRD analysis. Taken together, polymer 1 was able to drive the formation of polyMOP-$CH_3$ and polyMOP-$NH_2$, toward the formation of MOP structures under conditions that normally favor the formation of MOFs.

Deposition of polyMOPs on Glass. Immobilization of MOPs on surfaces has been largely achieved in two steps: synthesis and isolation of soluble MOPs, followed by the slow evaporation of the MOP-containing solution directly onto a substrate. During the course of our experiments, it became apparent that polyMOP crystals tended to adhere to the surface of the glass scintillation vials. It was hypothesized that polymer 1 could mediate the adhesion of polyMOP crystals onto glass substrates. Thus, by including small pieces of glass (~0.75×0.75 cm$^2$) in the reaction vial, polyMOPs affixed to glass could be readily isolated. Moreover, making the reaction mixture somewhat more concentrated, a dense packing of polyMOP crystals could be formed on the glass slides (Table S2).

TABLE S2

Reaction conditions with Cu(NO$_3$)$_2$·2.5H$_2$O (9.5 mg, 4.1 × 10$^{-2}$ mmol) for deposition of crystals on a glass surface. All products were characterized by PXRD.

| | H$_2$m-bdc Derivatives | Polymer 1 | Reaction Conditions | Results |
|---|---|---|---|---|
| MOP-H | H$_2$m-bdc<br>6.8 mg, 4.1 × 10$^{-2}$ mmol | — | DMF/EtOH<br>0.56 mL/0.19 mL<br>80° C., 16 h | No deposition |
| MOP-OH | 5-OH—H$_2$m-bdc<br>7.5 mg, 4.1 × 10$^{-2}$ mmol | — | DEF/MeOH<br>0.56 mL/0.19 mL<br>80° C., 16 h | No deposition |
| MOP-NO$_2$ | 5-NO$_2$—H$_2$m-bdc<br>8.7 mg, 4.1 × 10$^{-2}$ mmol | — | DMF/MeOH<br>0.30 mL/0.45 mL<br>60° C., 2 d | A layer of crystals |
| MOF-CH$_3$-m-bdc | 5-CH$_3$—H$_2$m-bdc<br>7.4 mg, 4.1 × 10$^{-2}$ mmol | — | DMF/MeOH<br>0.30 mL/0.30 mL<br>60° C., 2 d | A layer of crystals |
| MOF-NH$_2$-m-bdc | 5-NH$_2$—H$_2$m-bdc<br>7.4 mg, 4.1 × 10$^{-2}$ mmol | — | DMF/MeOH<br>0.56 mL/0.19 mL<br>60° C., 2 d | No deposition |
| polyMOP-H | H$_2$m-bdc<br>5.8 mg, 3.5 × 10$^{-2}$ mmol | 1.9 mg,<br>6.0 × 10$^{-3}$ mmol | DMF/EtOH<br>0.56 mL/0.19 mL<br>80° C., 16 h | A layer of crystals |
| polyMOP-OH | 5-OH—H$_2$m-bdc<br>6.8 mg, 3.7 × 10$^{-2}$ mmol | 1.2 mg,<br>3.7 × 10$^{-3}$ mmol | DEF/MeOH<br>0.56 mL/0.19 mL<br>80° C., 16 h | A layer of crystals |
| polyMOP-NO$_2$ | 5-NO$_2$—H$_2$m-bdc<br>7.9 mg, 3.7 × 10$^{-2}$ mmol | 1.2 mg,<br>3.7 × 10$^{-3}$ mmol | DMF/MeOH<br>0.30 mL/0.45 mL<br>60° C., 2 d | A layer of crystals |
| polyMOP-CH$_3$ | 5-CH$_3$—H$_2$m-bdc<br>6.8 mg, 3.7 × 10$^{-2}$ mmol | 1.2 mg,<br>3.7 × 10$^{-3}$ mmol | DMF/MeOH<br>0.30 mL/0.30 mL<br>60° C., 2 d | A layer of crystals |
| polyMOP-NH$_2$ | 5-NH$_2$—H$_2$m-bdc<br>6.8 mg, 3.7 × 10$^{-2}$ mmol | 1.2 mg,<br>3.7 × 10$^{-3}$ mmol | DMF/MeOH<br>0.56 mL/0.19 mL<br>60° C., 2 d | A layer of crystals |

For example, polyMOP-H was synthesized by heating a solution containing 0.04 mmol of Cu(NO$_3$)$_2$.2.5H$_2$O, 0.035 mmol of H$_2$m-bdc, and 0.006 mmol of polymer 1 in 0.75 mL DMF/0.25 mL EtOH at 80° C. for 16 h. To form films of polyMOP-H on glass a solution containing 0.04 mmol of Cu(NO$_3$)$_2$.2.5H$_2$O, 0.035 mmol of H$_2$m-bdc, and 0.006 mmol of polymer 1 in 0.56 mL DMF/0.19 mL EtOH at 80° C. for 16 h was required. Due to the aggregation/film formation, the crystals comprising these films were small and their morphology could not be clearly observed under optical microscope (unlike the modulated polyMOPs described above). The deposition of polyMOP-H, —OH, —NO$_2$, —CH$_3$, and —NH$_2$ was achieved on glass under solvothermal conditions, resulting in a thin layer of crystals. The identities of these deposited polyMOPs were confirmed by their PXRD patterns. These films were firmly attached to the glass surface while gently washing with the supernatant solution, but could be removed by mechanical stress (e.g. scratching the film surface).

Interestingly, the PXRD pattern of deposited polyMOP-H displayed two intense peaks at 2θ=9.1 and 18.10. These peaks matches the Miller index plane (hkl)=(220) and (440)

of a cubic unit cell, respectively, parallel with the (110) plane. Thus, in this film, the discrete MOP molecules show a pronounced preference for packing along the direction perpendicular to the (110) plane of the cubic unit cell. Preferred orientation of MOP crystals of the common truncated cuboctahedral $Cu_{24}L_{24}$ MOPs, as reported here, has never been observed. Among polyMOPs studied here, preferred orientation was observed for polyMOP-H.

Control experiments showed that only MOP-$NO_2$ and MOF-$CH_3$-m-bdc could be deposited on the surface of glass as a thin layer of crystals without the aid of polymer 1 (Table S2). For the other substituted MOP molecules (—H, —OH, —$NH_2$) polymer 1 was essential for the deposition of MOP films on the surface of glass using a one-pot solvothermal reaction. Overall, polymer 1 possessed the unique ability to effectively confine discrete MOP molecules with various functional groups onto the surface of glass using one-pot solvothermal conditions, providing a general route to the processing of these metal organic cage materials.

Figure 20A:
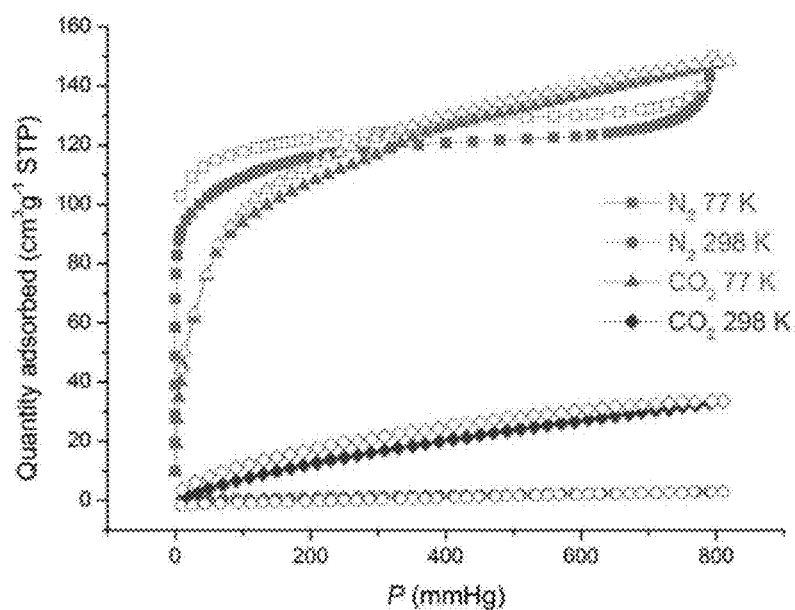
FIGS. 20A-20B. $N_2$ (77 K; 298 K) and $CO_2$ (195 K, 298 K) sorption isotherms of activated.
Figure 20B:
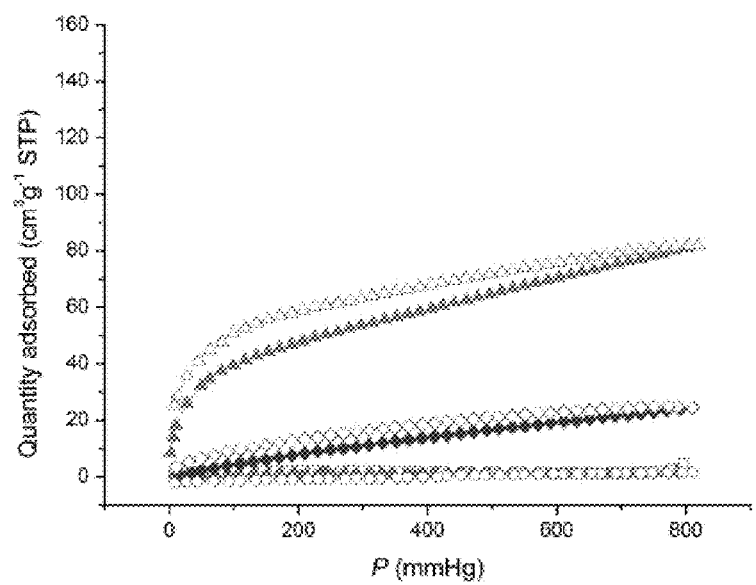
Figure 21:
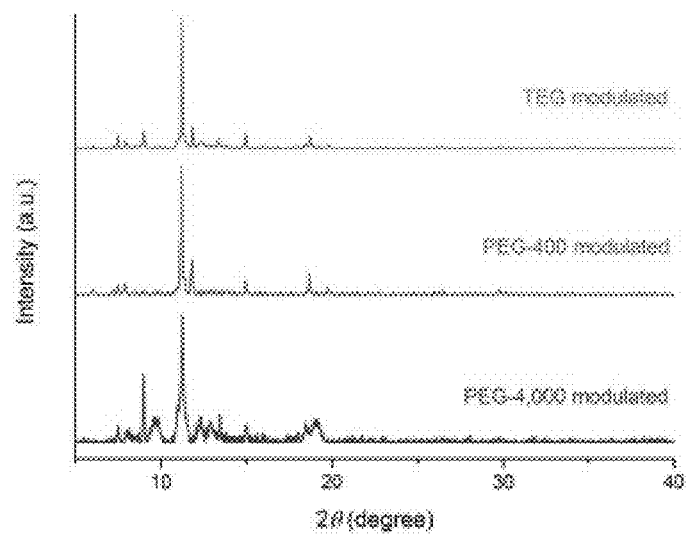
FIG. 21. PXRD patterns of products using TEG, PEG-400, and PEG-4000 ($2.0 \times 10^3$ mmol) as modulators under identical reaction conditions (0.75 mL DMF/0.25 mL EtOH at 80° C. for 16 h).
Figure 22A:
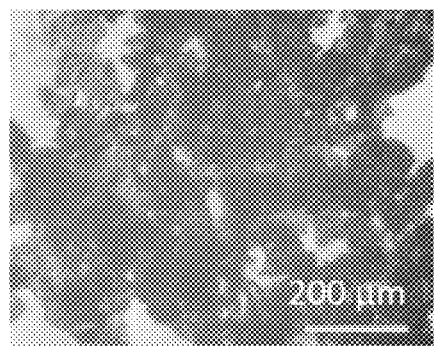
FIGS. 22A-22C. Optical images of products using polymer 1' (FIG. 22A), polymer 2 (FIG. 22B), and compound 3 (FIG. 22C) as modulators under identical reaction conditions (0.75 mL DMF/0.25 mL EtOH at 80° C. for 16 h).
Figure 22B:
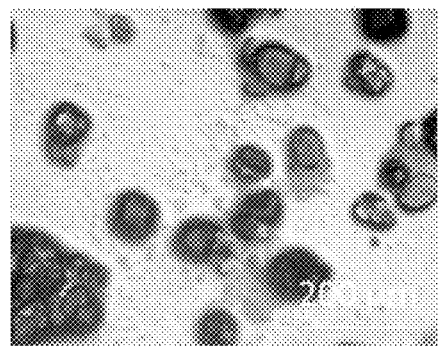
Figure 22C:
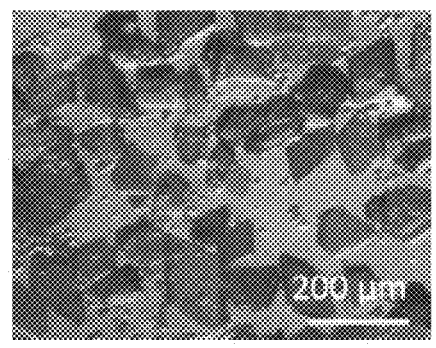
Figure 23A:
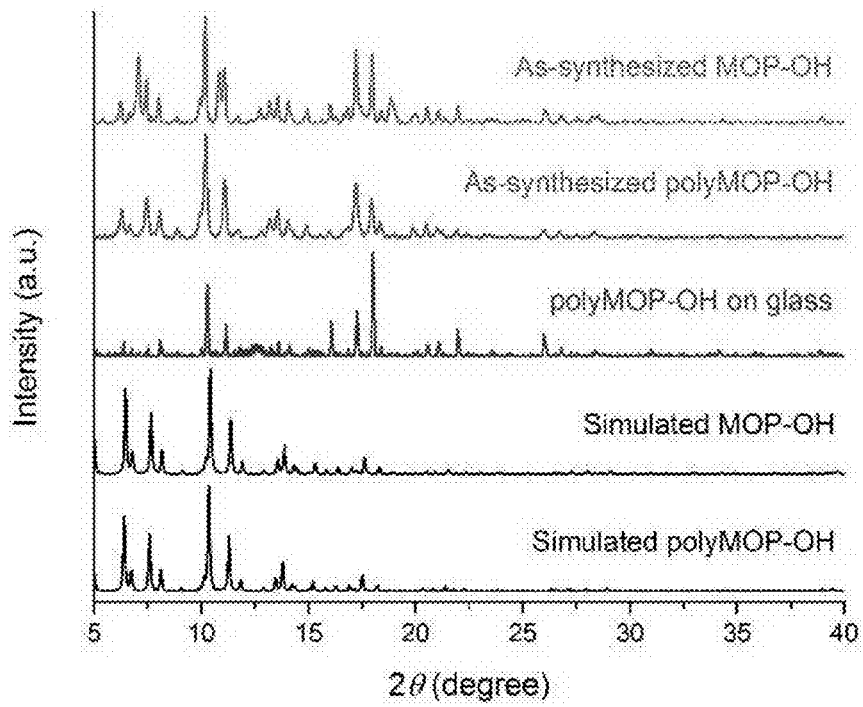
FIGS. 23A-23C. PXRD patterns of materials synthesized from 5-OH—$H_2$m-bdc, 5-$NO_2$—$H_2$m-bdc, and 5-$CH_3$—$H_2$m-bdc as free-standing crystals and as films on glass.
Figure 23B:
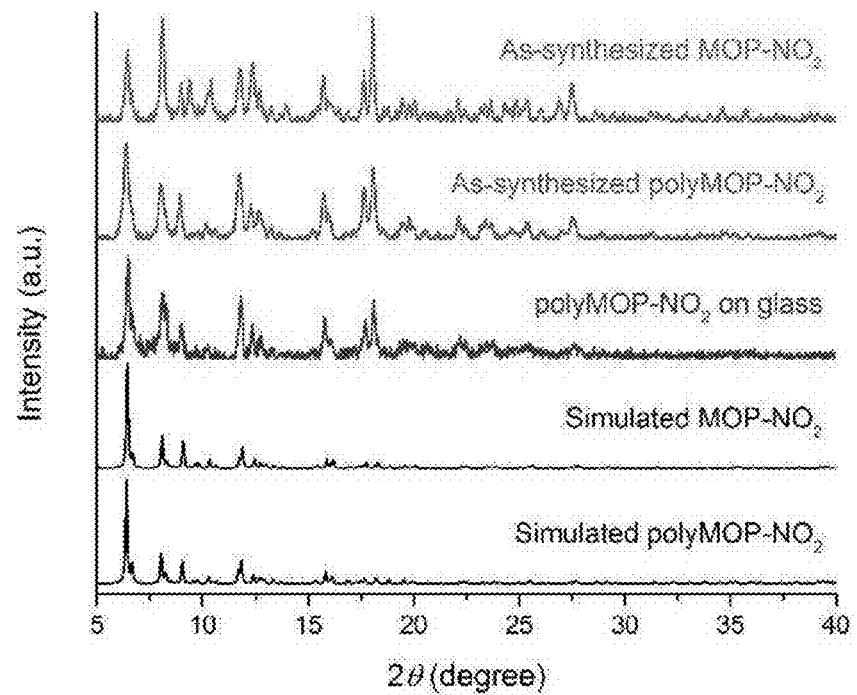
Figure 23C:
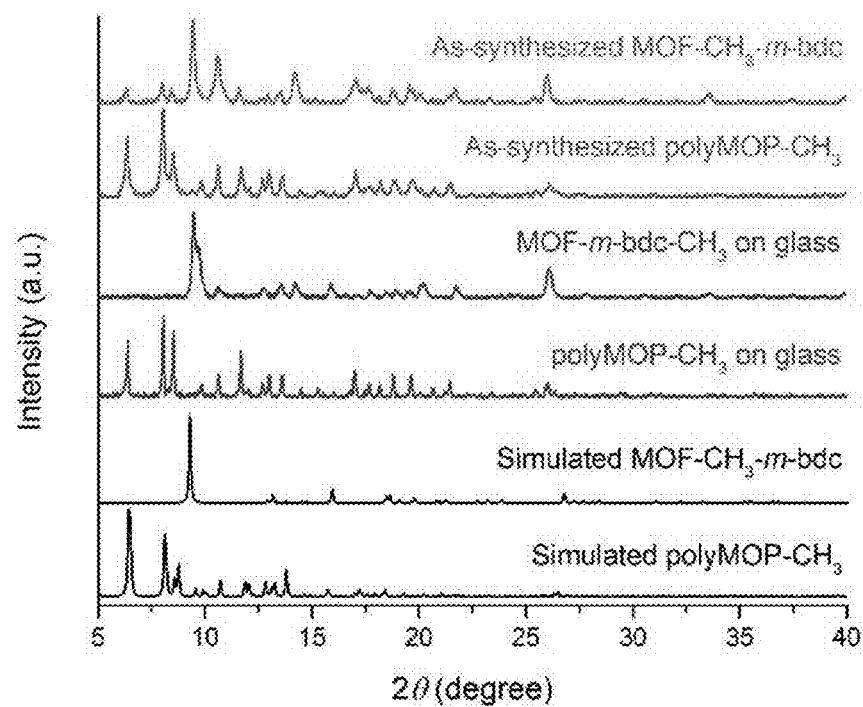
Figure 24:
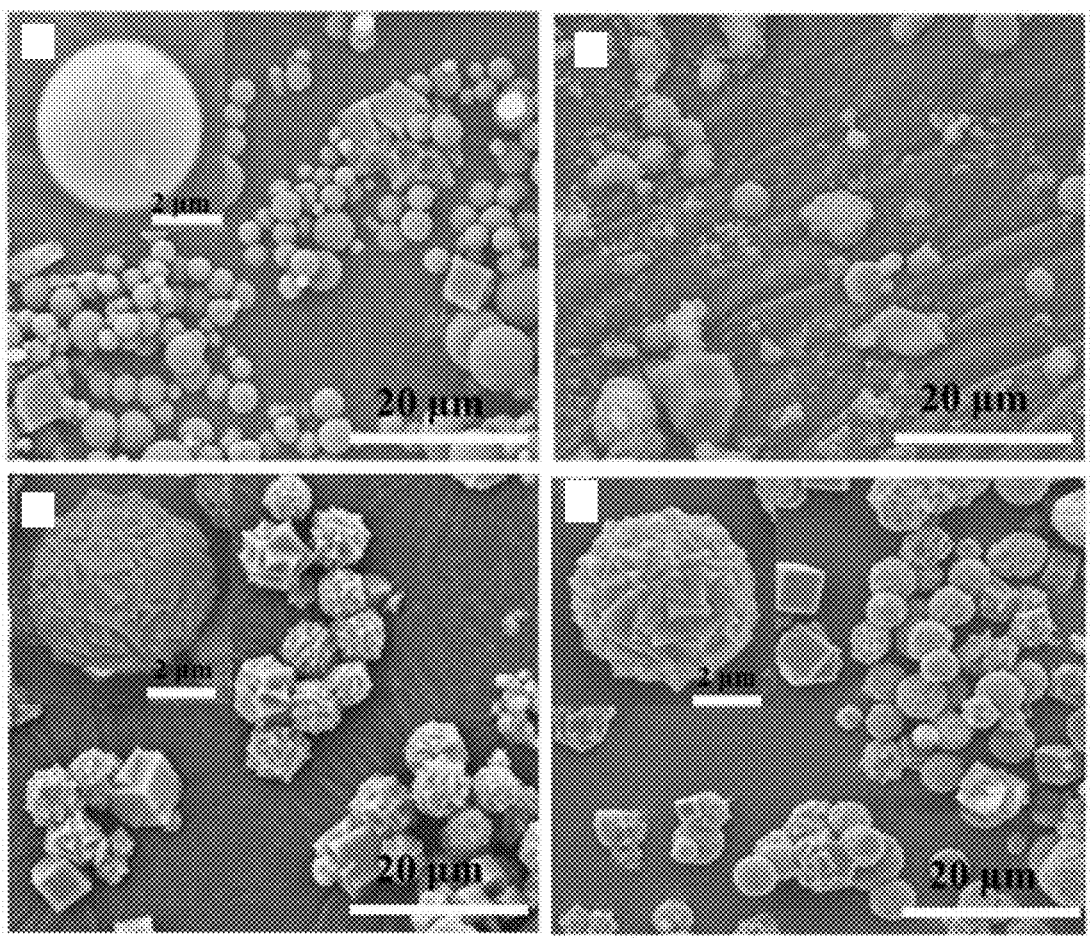
Figure 25:
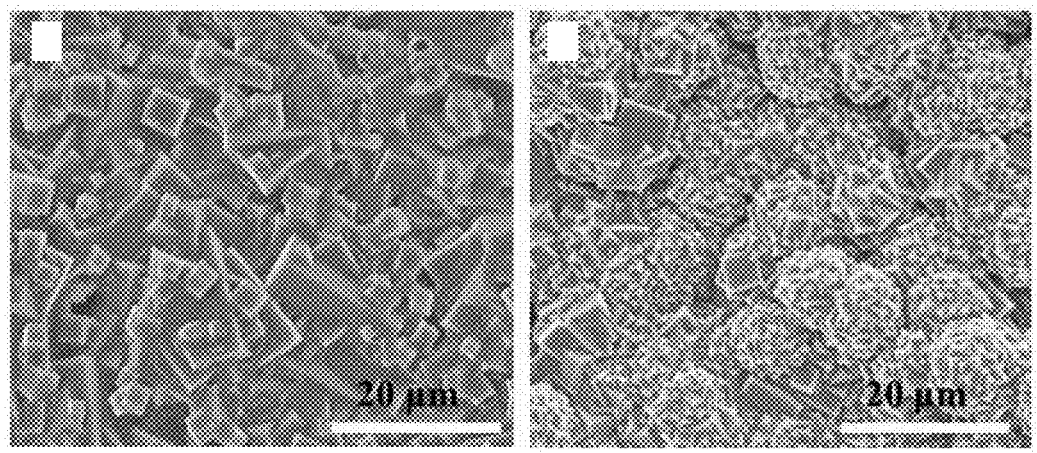
Figure 26:
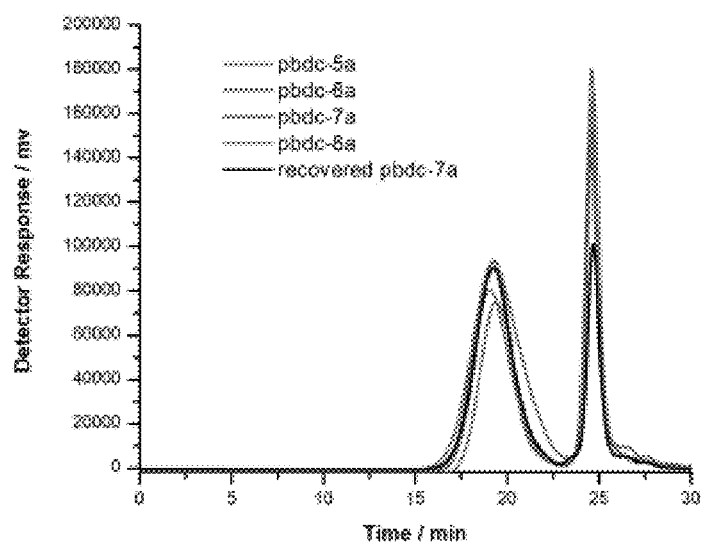
FIG. 26. GPC traces of polymer-ligands (acid form, pbdc-xa) obtained using a refractive index (RI) detector. Peaks centered around 25 min are ascribed to the solvent eluent.
Figure 27:
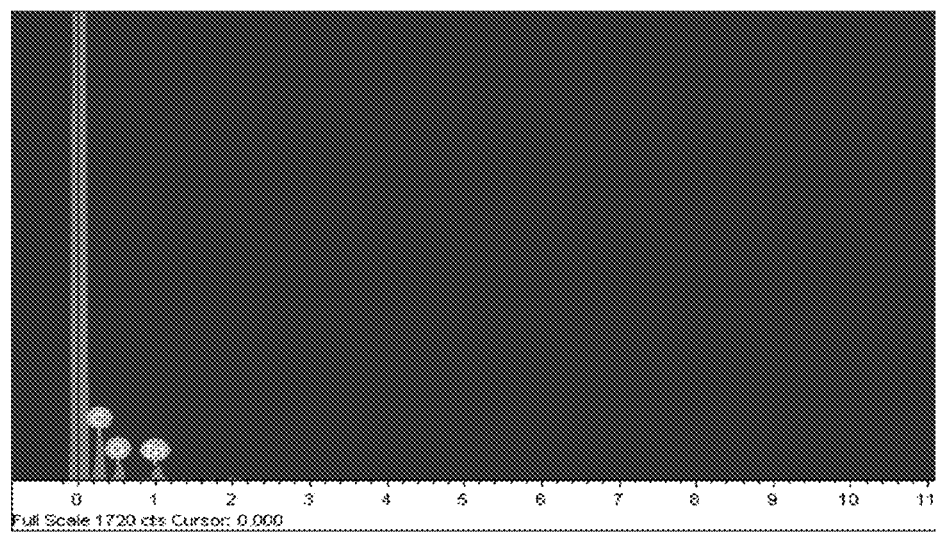
Figure 28A:
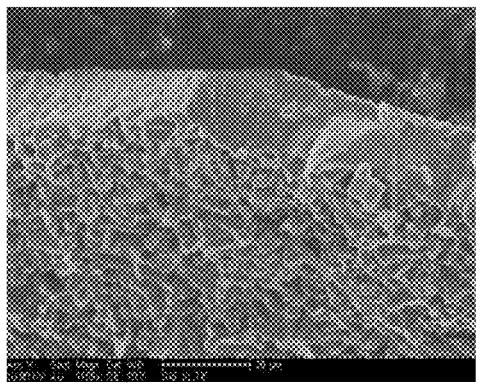
FIGS. 28A-28B. SEM images (side views) of Zn-pbdc-7a film (FIG. 28A) and Zn-pbdc-8a film (FIG. 28B).
Figure 28B:
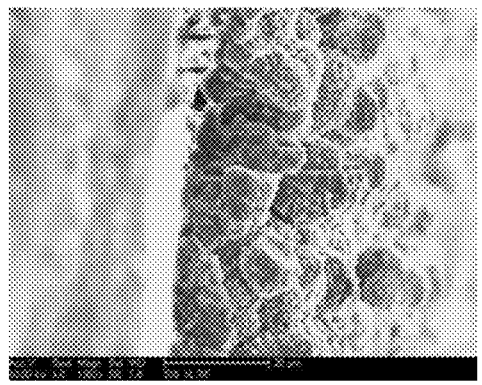
Figure 29:
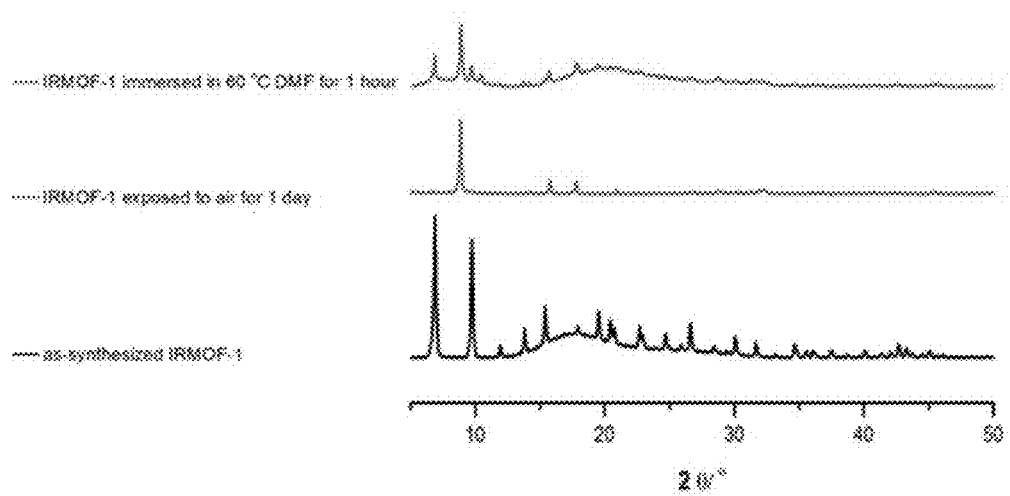
FIG. 29. PXRD patterns of as-synthesized IRMOF-1, IRMOF-1 exposed to air for 1 day and air-exposed IRMOF-1 immersed in DMF at 60° C. for 1 h.
Figure 30:
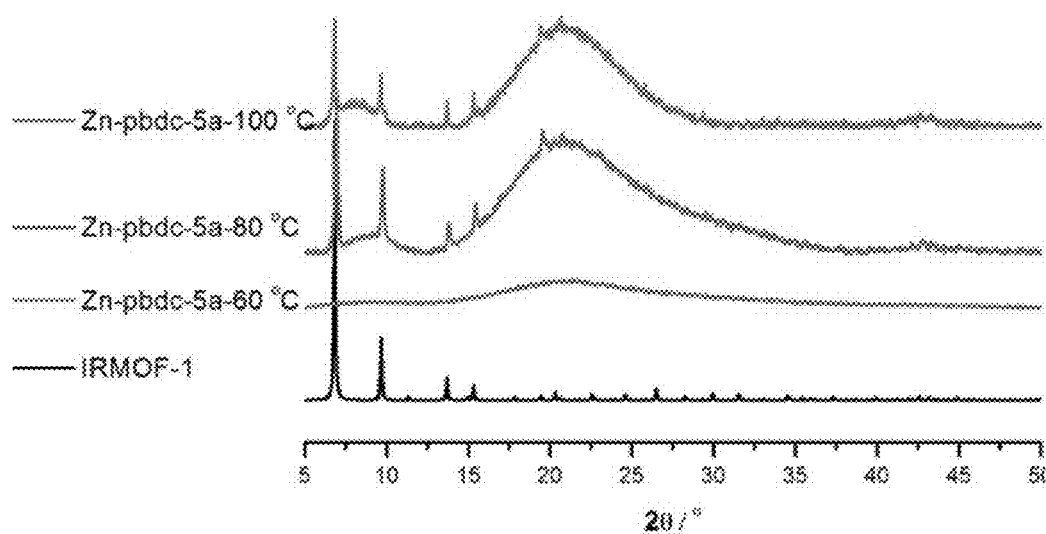
FIG. 30. PXRD patterns of IRMOF-1 (calculated) and Zn-pbdc-5a synthesized at three different temperatures.
Figure 31A:
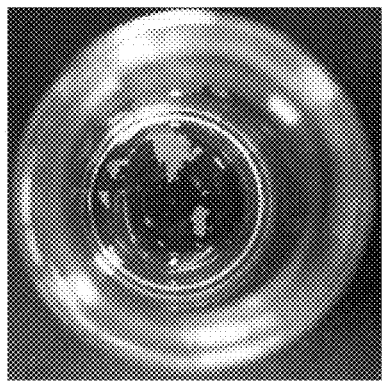
FIGS. 31A-31B. Films of Zn-pbdc-8a (prepared at 80° C.) immersed in 5.0 mL of DMF in a glass vial. Before incubating at 60° C.
Figure 31B:
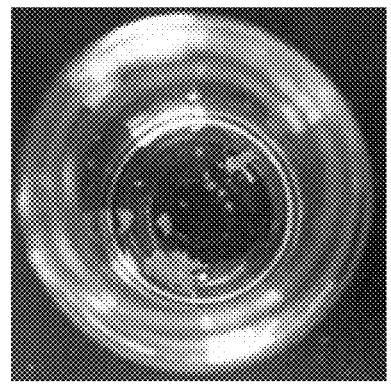
Figure 32:
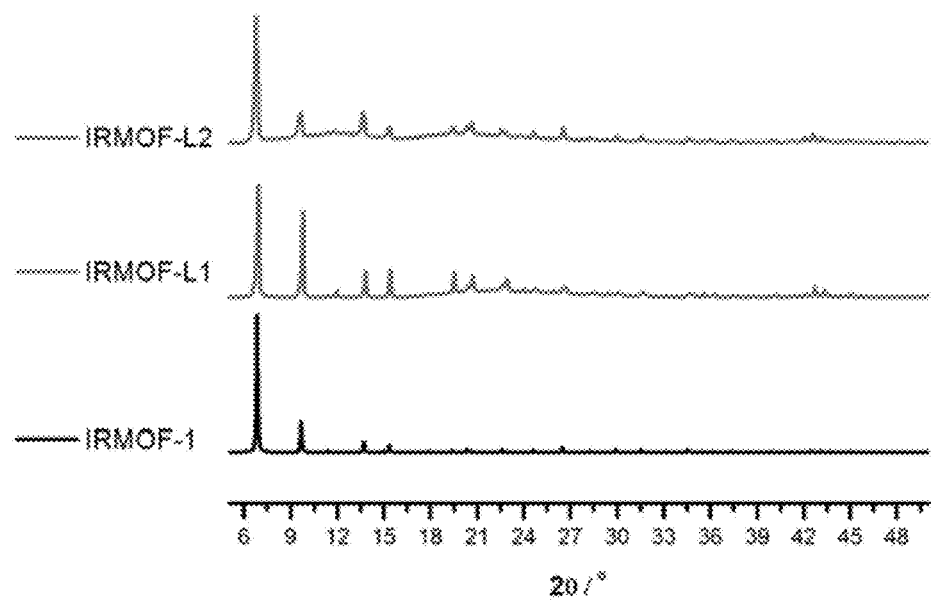
FIG. 32. PXRD patterns of IRMOF-1 (calculated), IRMOF-L1, and IRMOF-L2.
Figure 33:
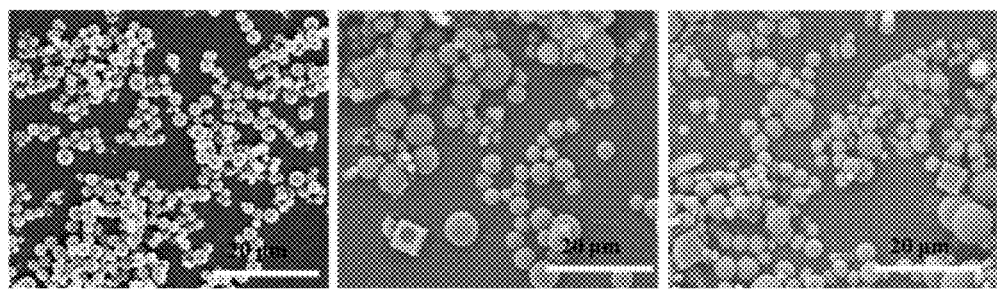
FIG. 33. The morphology of Zn-pbdc-5a prepared at (from left to right): 60° C., 80° C., and 100° C.
Figure 34:
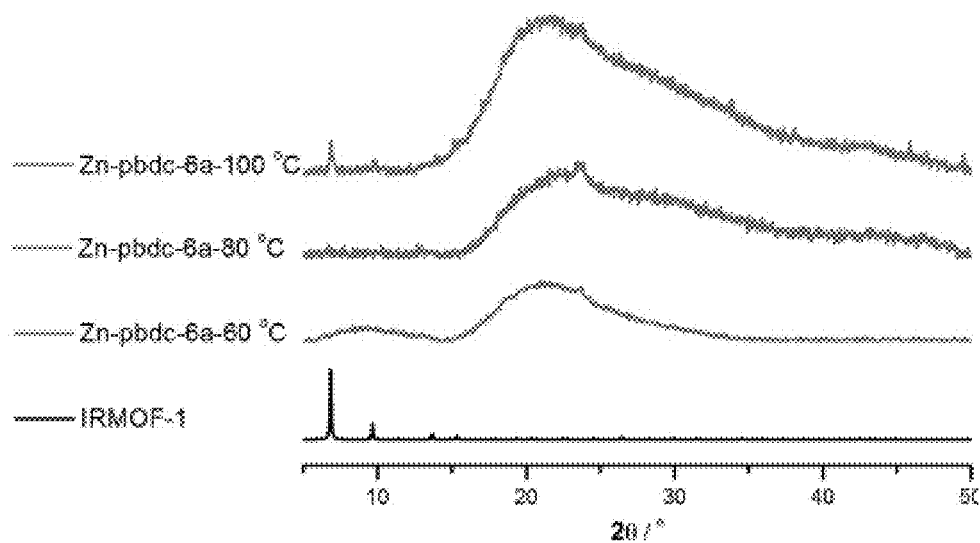
FIG. 34. PXRD patterns of IRMOF-1 (calculated) and Zn-pbdc-6a synthesized at three different temperatures.
Figure 35:
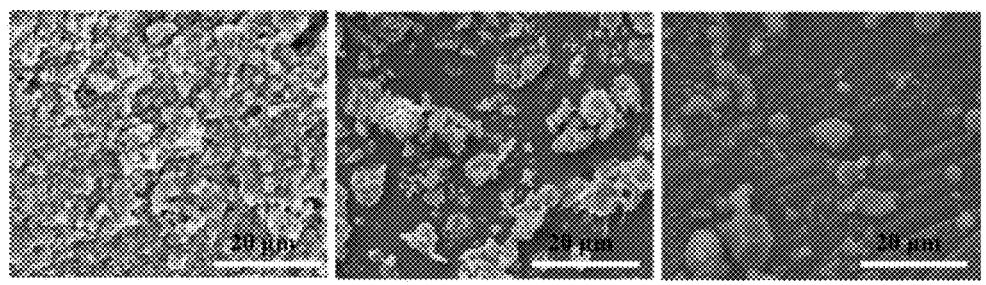
FIG. 35. The morphology of Zn-pbdc-6a prepared at (from left to right): 60° C., 80° C., and 100° C.
Figure 36:
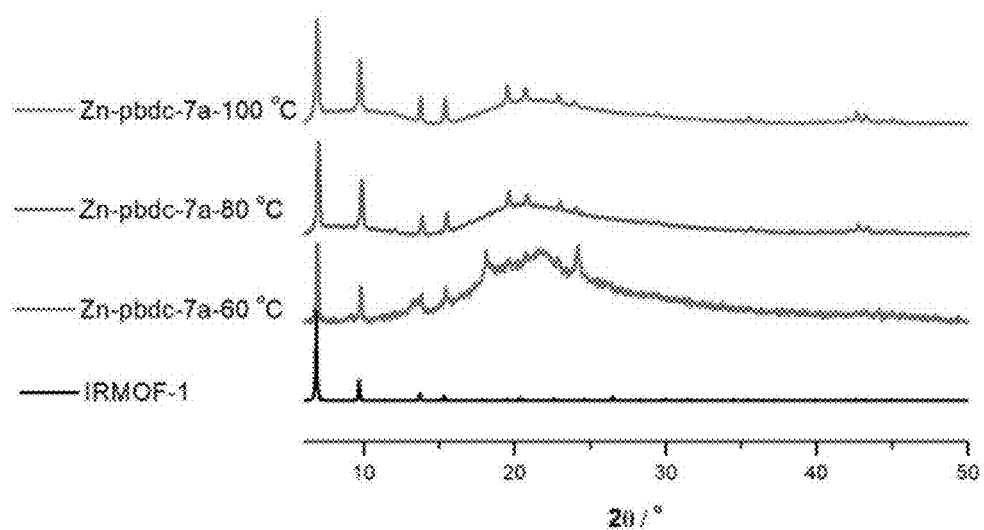
FIG. 36. PXRD patterns of IRMOF-1 (calculated) and Zn-pbdc-7a synthesized at three different temperatures.
Figure 37:
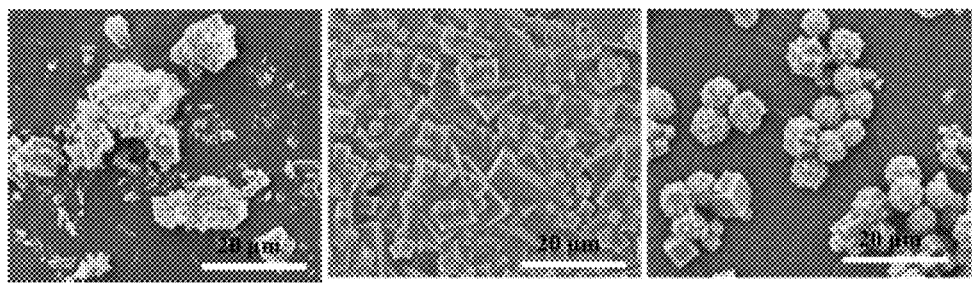
FIG. 37. The morphology of Zn-pbdc-7a prepared at (from left to right): 60° C., 80° C., and 100° C.
Figure 38:
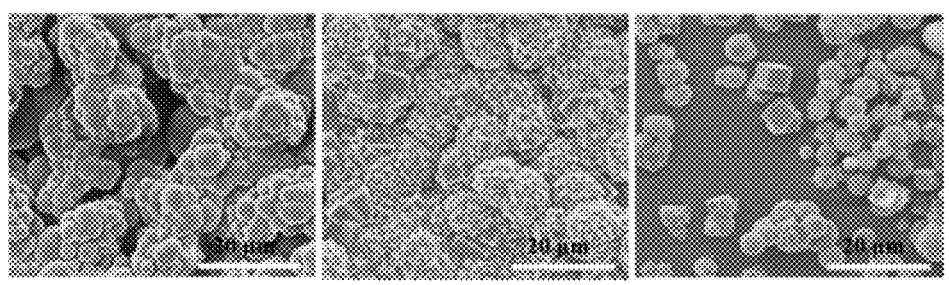
FIG. 38. The morphology of Zn-pbdc-8a prepared at (from left to right): 60° C., 80° C., and 100° C.
Figure 39:
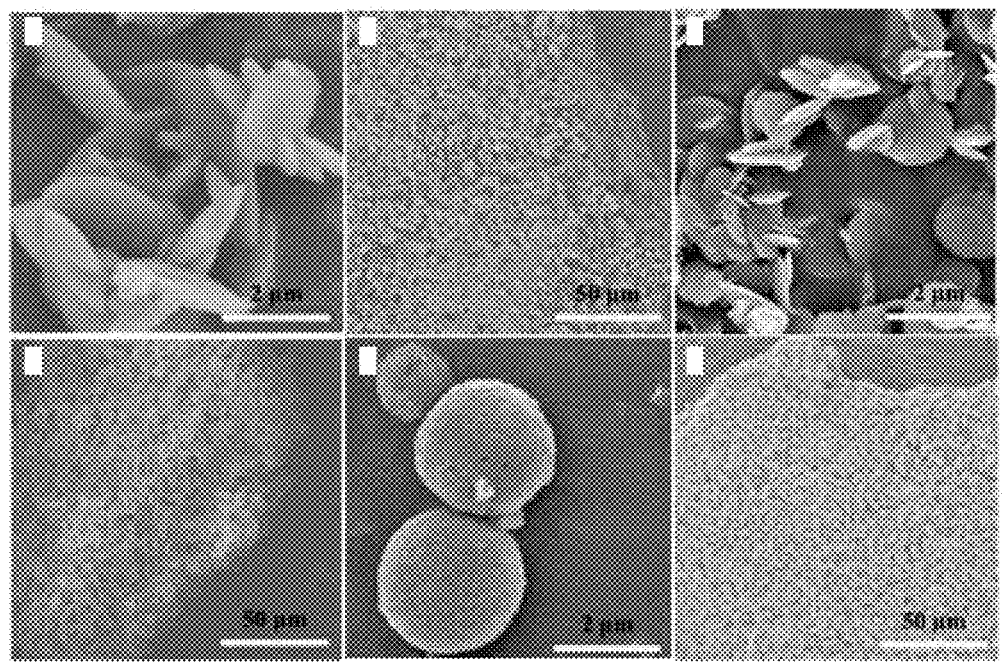
FIG. 39. SEM images of Zn-pbdc-8a(bpy) (top left, top middle); Zn-pbdc-9a (top right, bottom left); and Zn-pbdc-12a(bpy) (bottom middle, bottom right).
Figure 40:
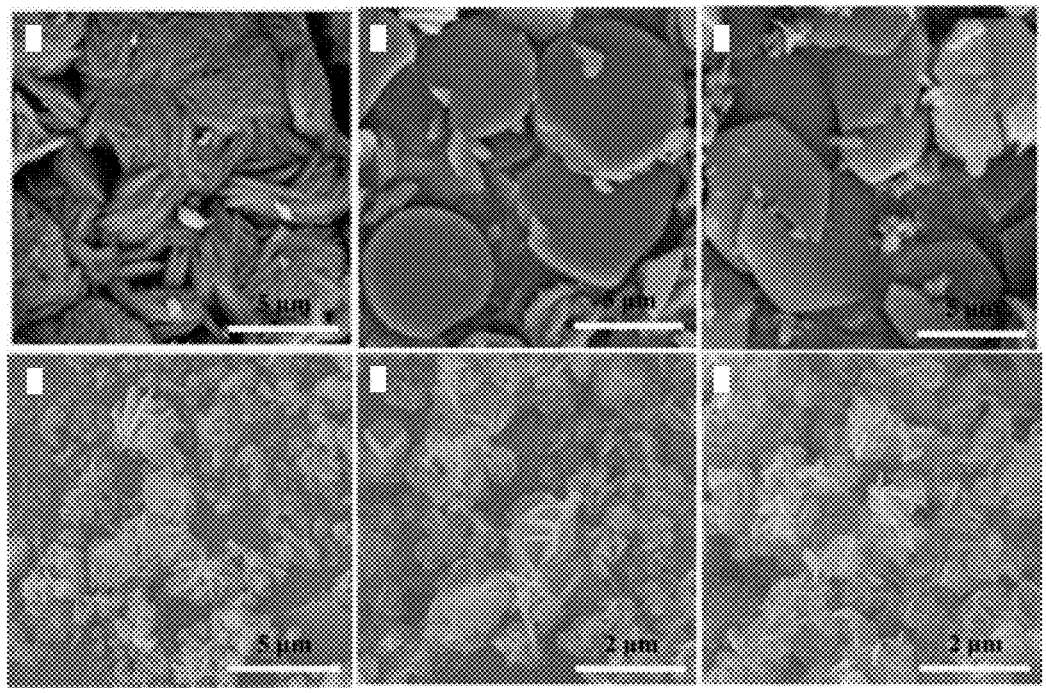
FIG. 40. SEM images of Zn-pbdc-7a(bpe) (top left), -8a(bpe) (top middle), -9a(bpe) (top right), -10a(bpe) (bottom left), 11a(bpe) (bottom middle), and -12a(bpe) (bottom right).
Figure 41:
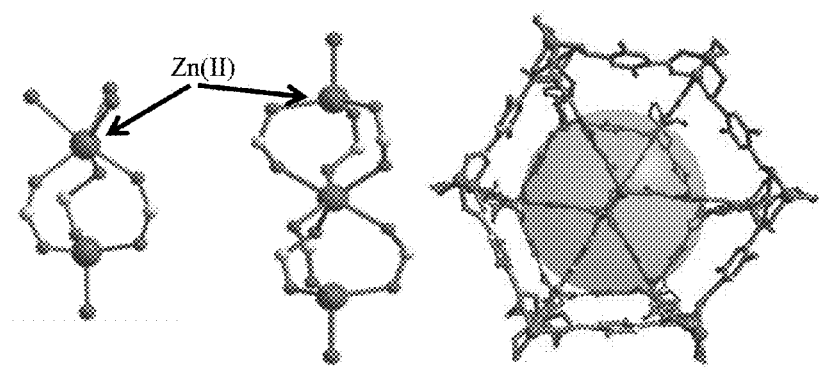
FIG. 41. The two types of examples of the SBUs exhibited in these polyMOFs (e.g., MOF 2). (Zn(II) ions are big dark spheres); and the packing diagram of MOF 2 along the c-axis direction. The large sphere in the middle represents the free pore space in the framework.
Figure 42:
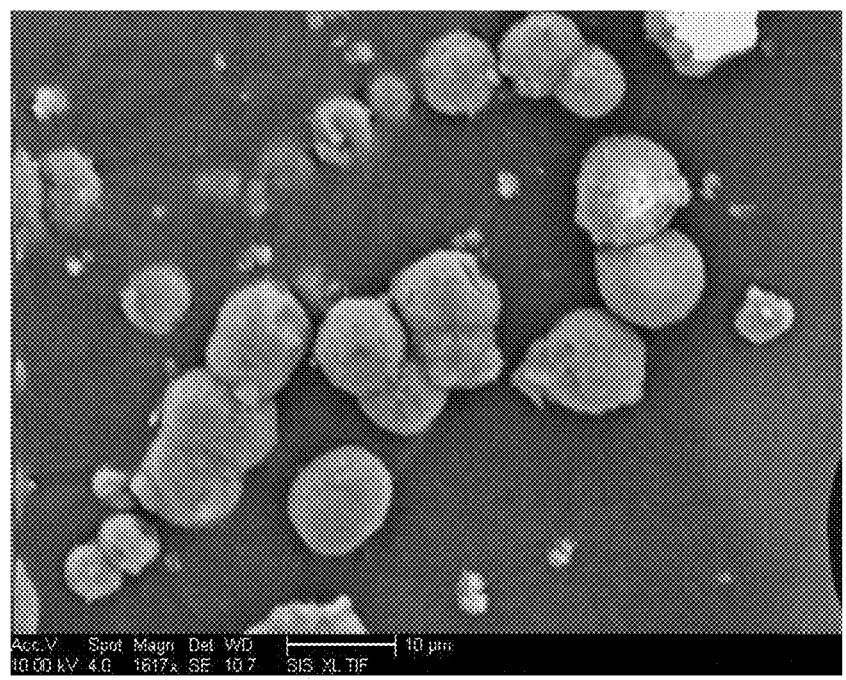
FIG. 42. SEM image for the product after reaction of pbdc-5a with bpy and $Zn(NO_3)_2$.
Figure 43:
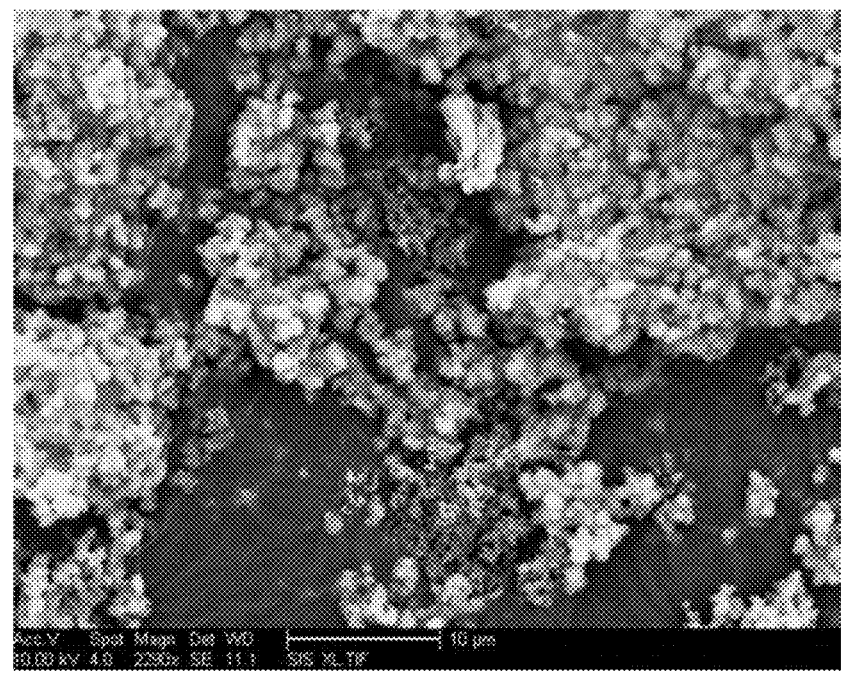
FIG. 43. SEM image for the product after reaction of pbdc-6a with bpy and $Zn(NO_3)_2$.
Figure 44:
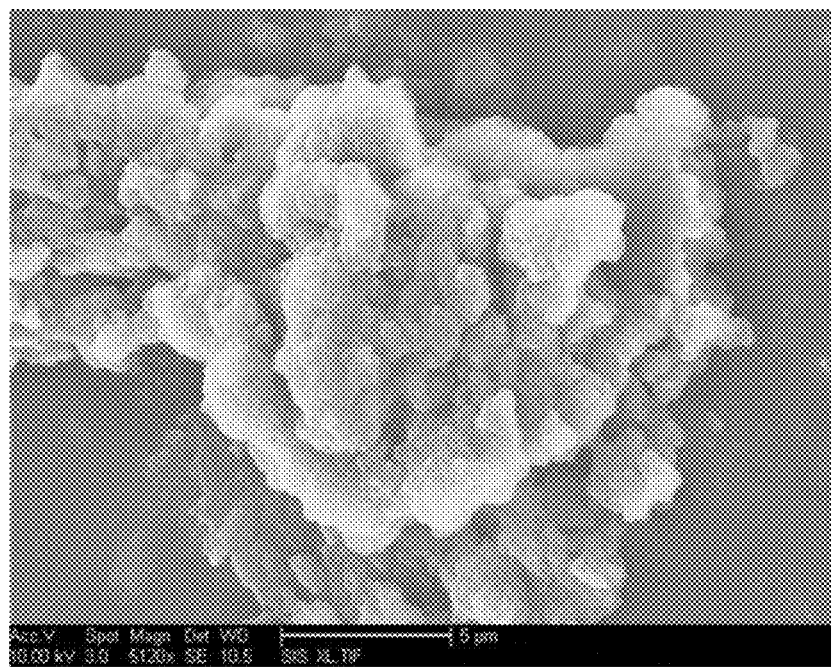
FIG. 44. SEM image for the product after reaction of pbdc-7a with bpy and $Zn(NO_3)_2$.
Figure 45:
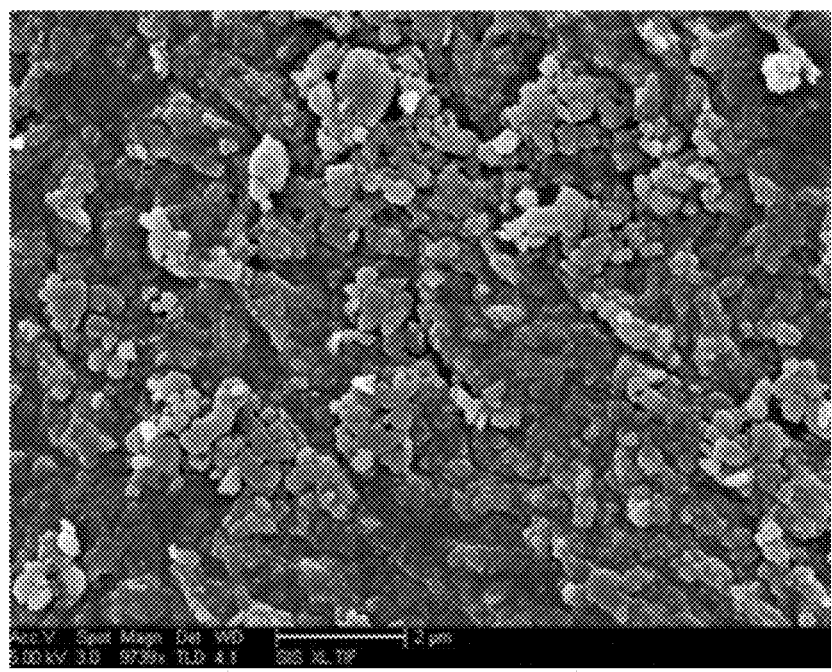
FIG. 45. SEM image for the product after reaction of pbdc-10a with bpy and $Zn(NO_3)_2$.
Figure 46:
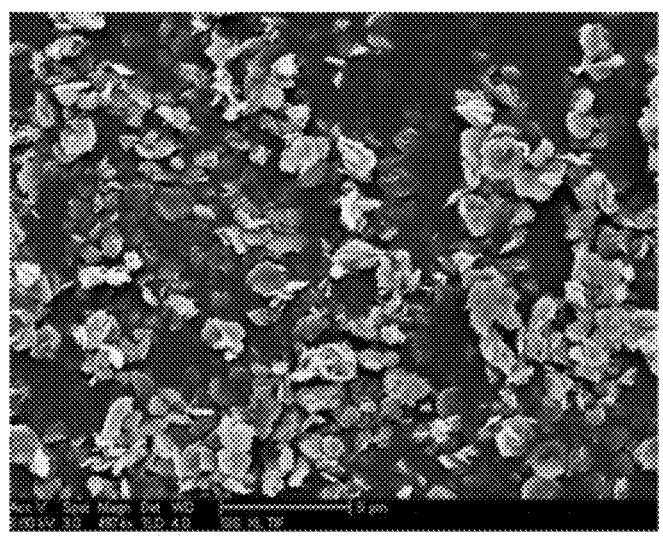
FIG. 46. SEM image for the product after reaction of pbdc-11a with bpy and $Zn(NO_3)_2$.
Figure 47:
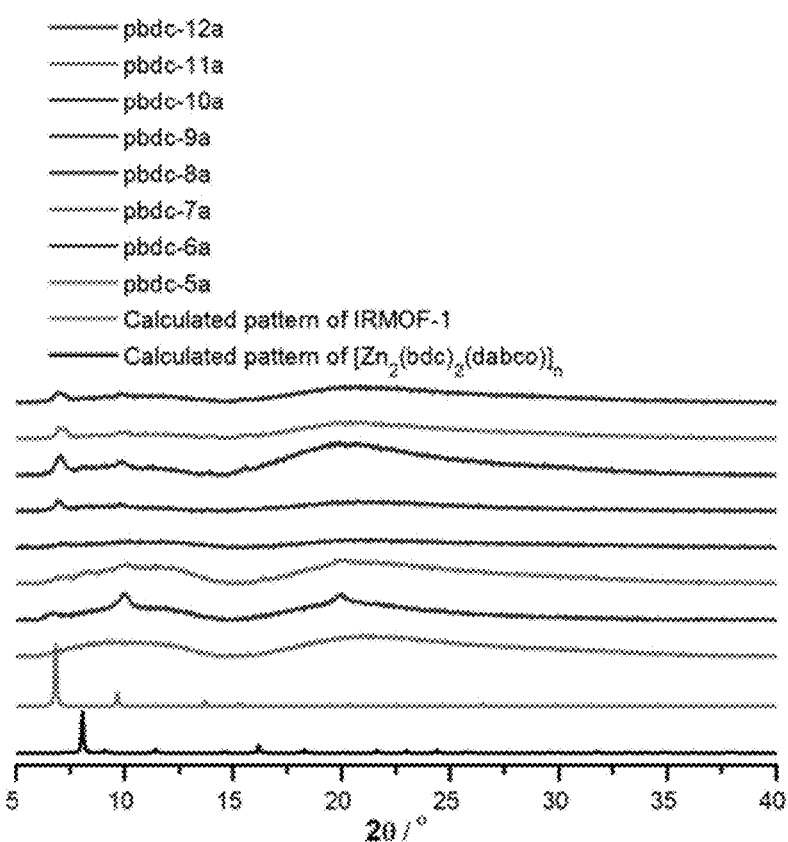
FIG. 47. PXRD patterns for products of pbdc-xa (x=5-12) combined with dabco and $Zn(NO_3)_2$ compared with calculated patterns of pristine IRMOF-1 and $[Zn_2(bdc)_2(dabco)]_n$.
Figure 50:
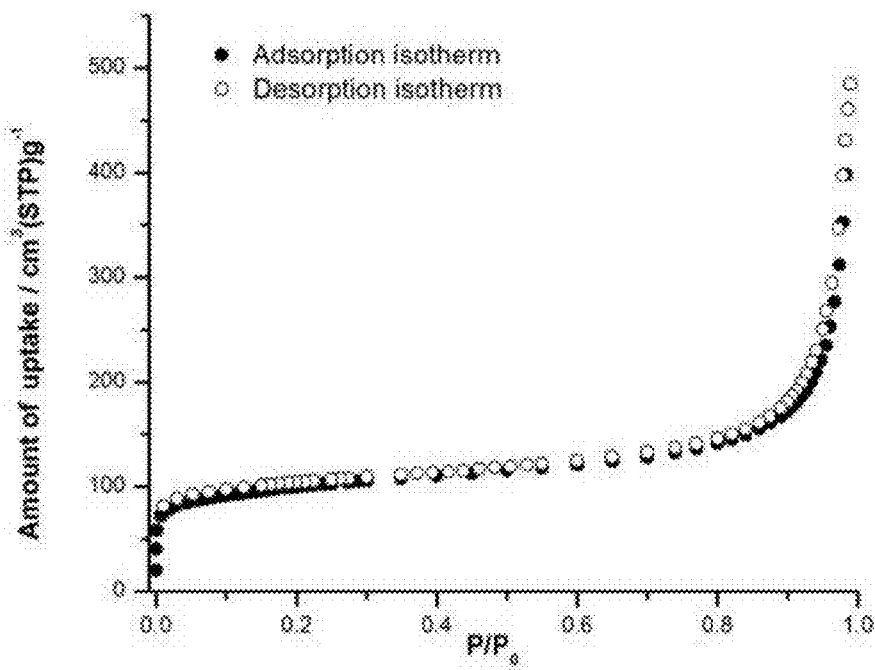
FIG. 50. $N_2$ sorption isotherm of Cu-bpdc-8a(bpy).
Figure 51:
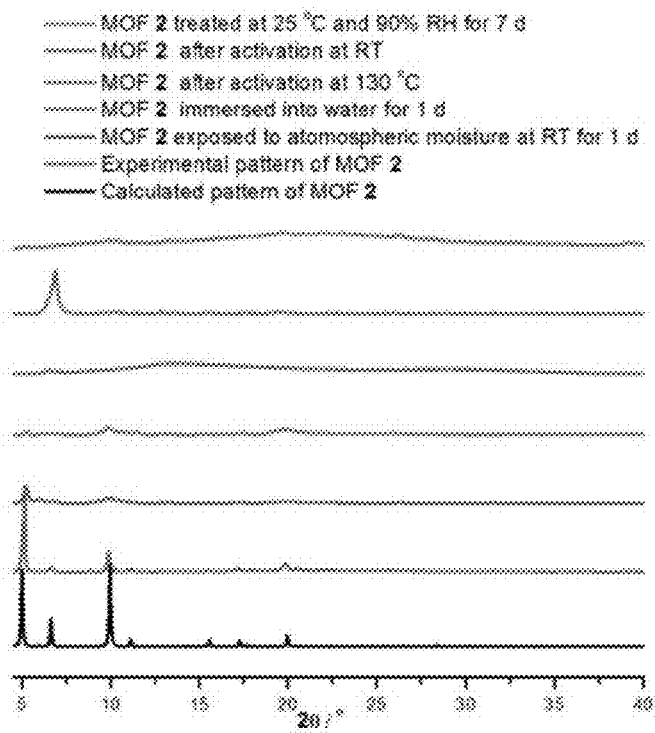
FIG. 51. PXRD patterns of MOF 2. The order of the key corresponds with the order in the PXRD patterns (i.e., the calculated pattern of MOF 2 is the bottom of the key and lowest in the graph).
Figure 52:
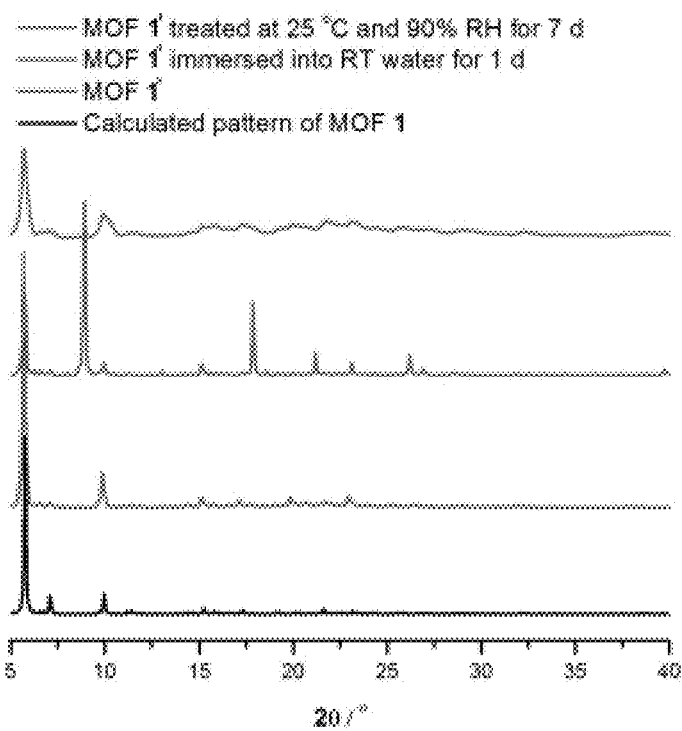
FIG. 52. PXRD patterns of MOF 1'.
Figure 53:
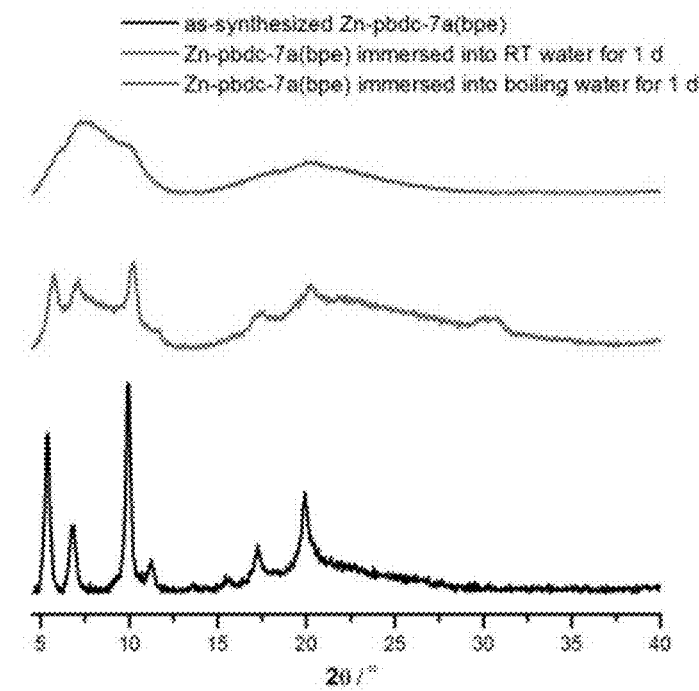
FIG. 53. PXRD patterns of as-synthesized and water-treated Zn-pbdc-7a(bpe).
Figure 54:
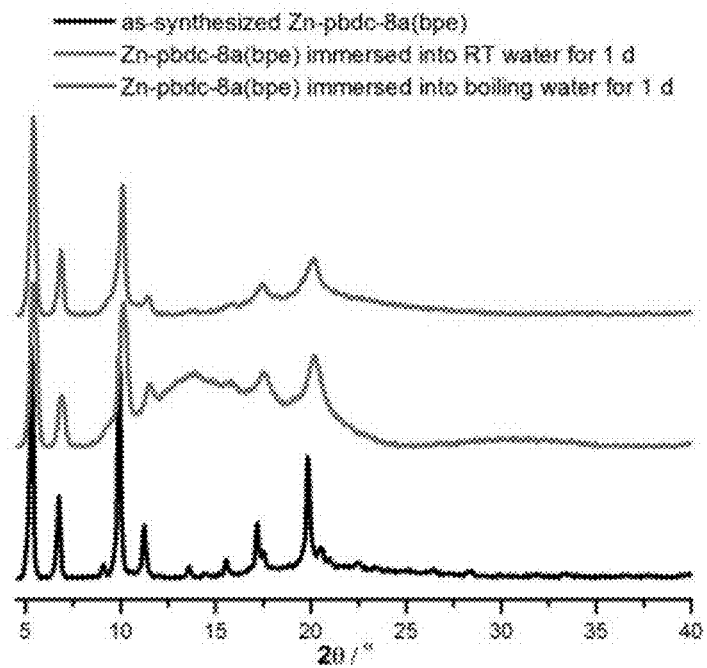
FIG. 54. PXRD patterns of as-synthesized and water-treated Zn-pbdc-8a(bpe).
Figure 55:
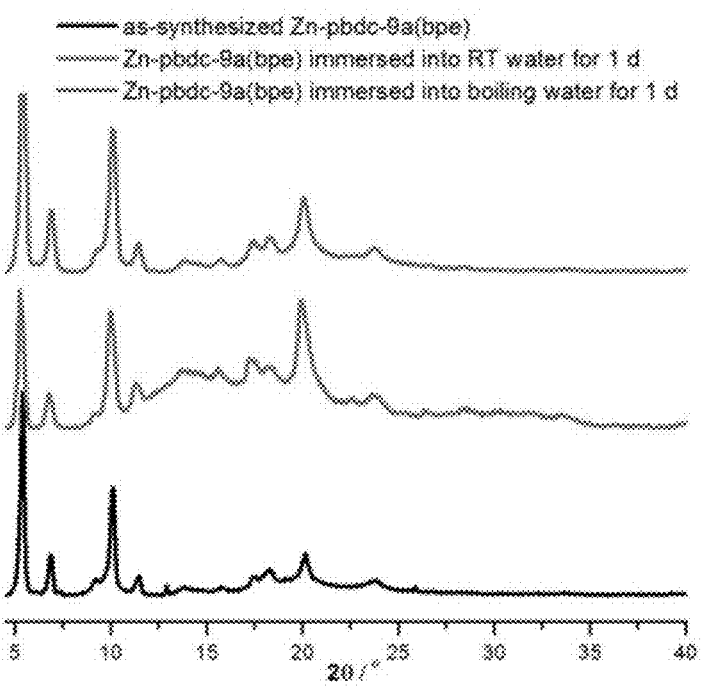
FIG. 55. PXRD patterns of as-synthesized and water-treated Zn-pbdc-9a(bpe).
Figure 56:
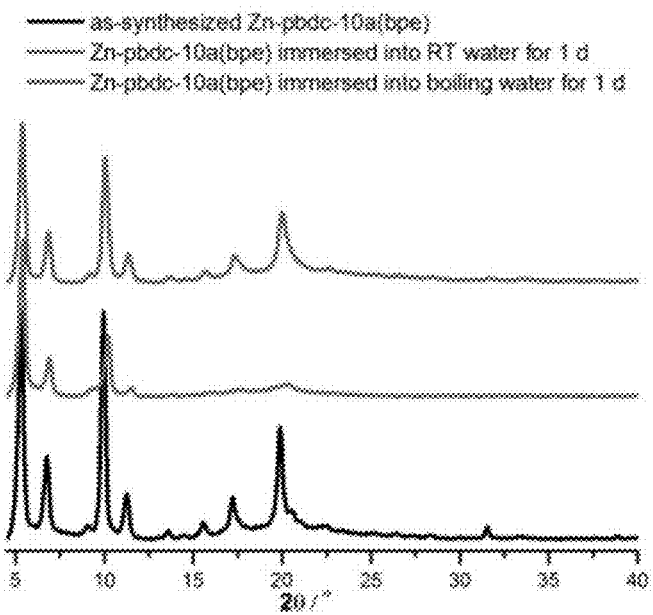
FIG. 56. PXRD patterns of as-synthesized and water-treated Zn-pbdc-10a(bpe).
Figure 57:
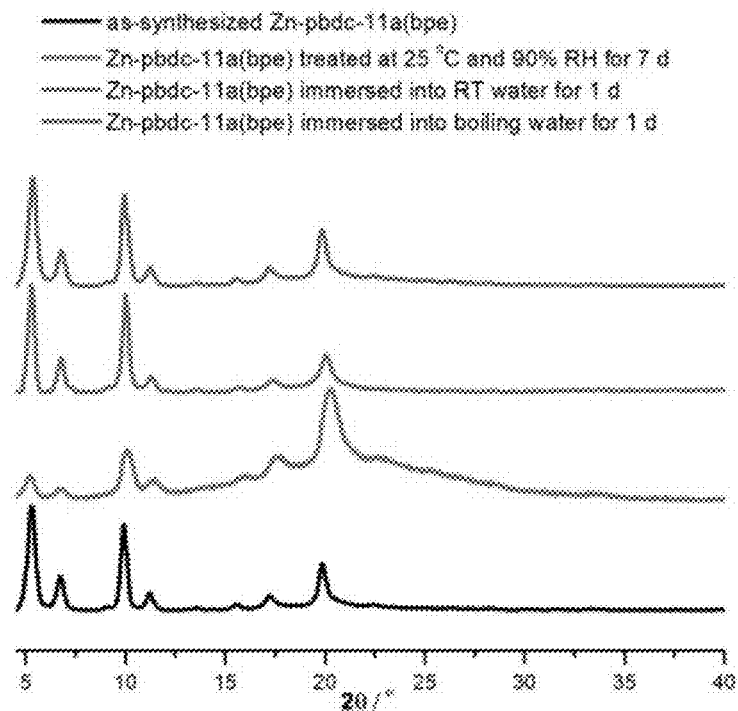
FIG. 57. PXRD patterns of as-synthesized and water-treated Zn-pbdc-11a(bpe).
Figure 58:
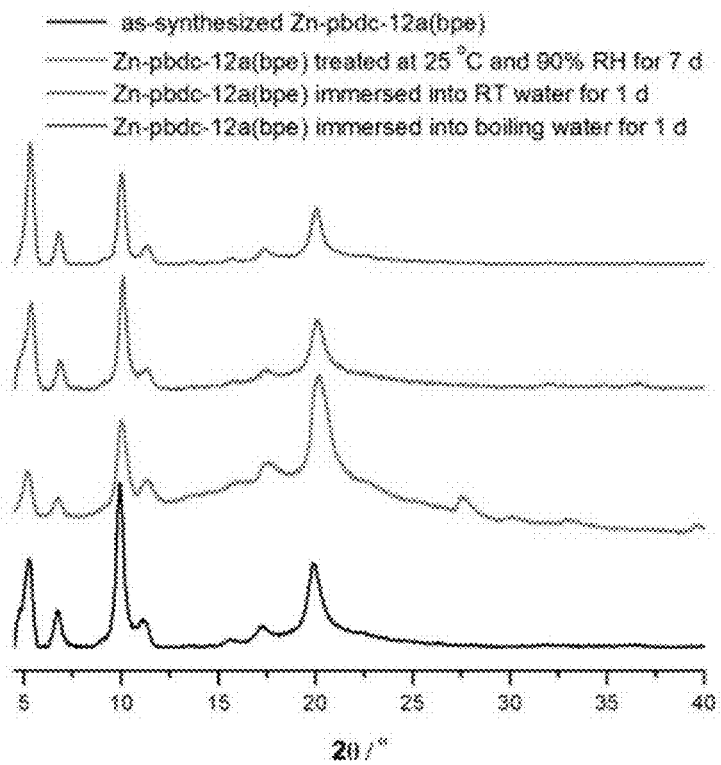
FIG. 58. PXRD patterns of as-synthesized and water-treated Zn-pbdc-12a(bpe).
Figure 59:
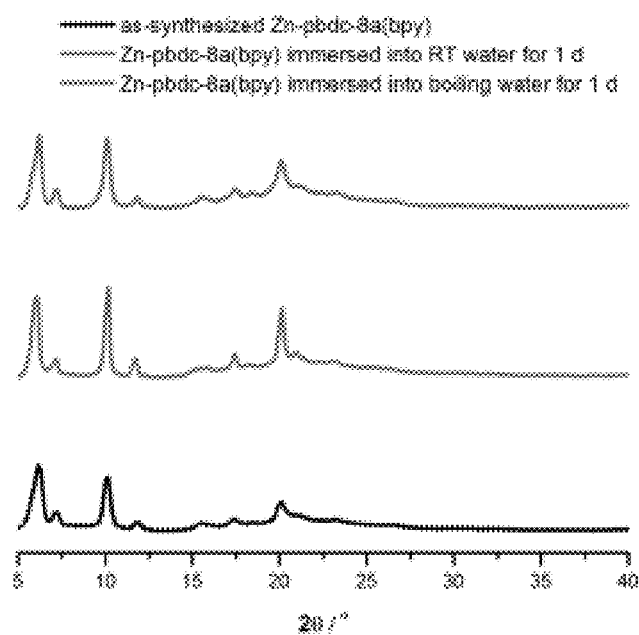
FIG. 59. PXRD patterns of as-synthesized and water-treated Zn-pbdc-8a(bpy).
Figure 60:
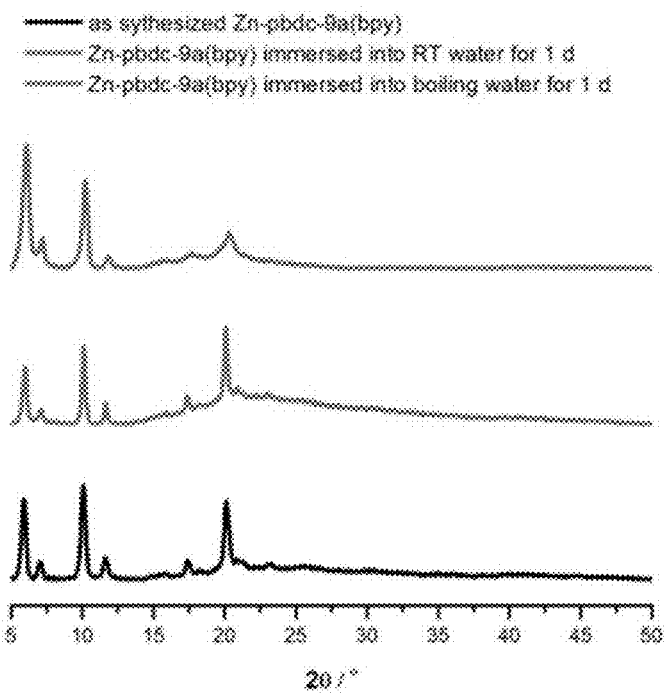
FIG. 60. PXRD patterns of as-synthesized and water-treated Zn-pbdc-9a(bpy).
Figure 61:
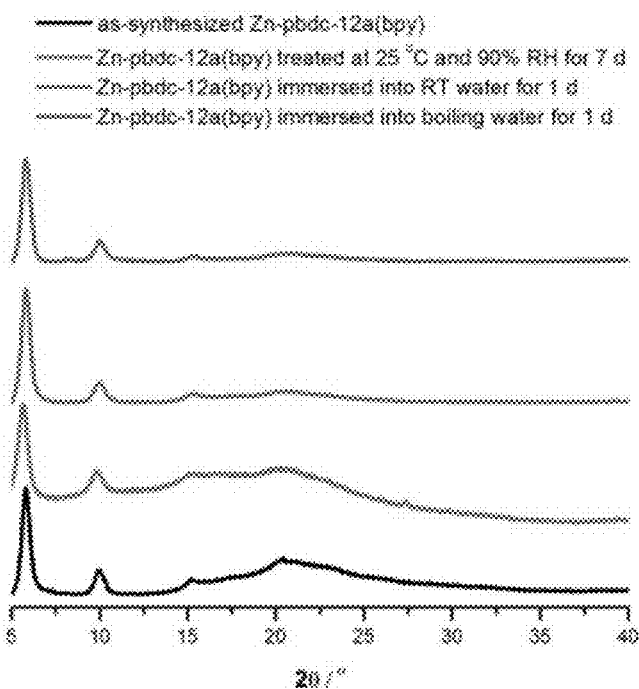
FIG. 61. PXRD patterns of as-synthesized and water-treated Zn-pbdc-12a(bpy).
Figure 62A:
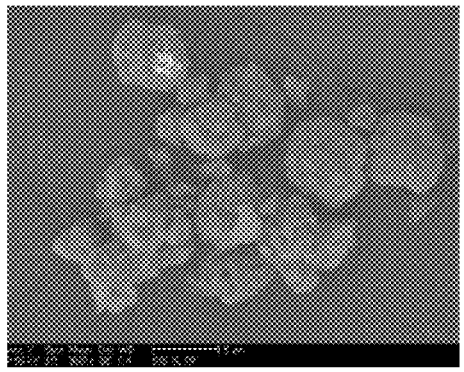
FIGS. 62A-62B. SEM images of Zn-pbdc-7a(bpe) treated with water at room temperature for 1 d (FIG. 62A); Zn-pbdc-7a(bpe) treated with boiling water for 1 d (FIG. 62B).
Figure 62B:
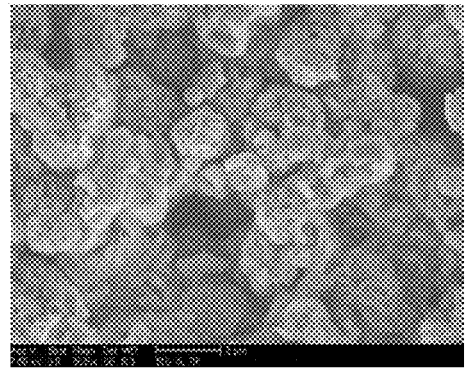
Figure 63A:
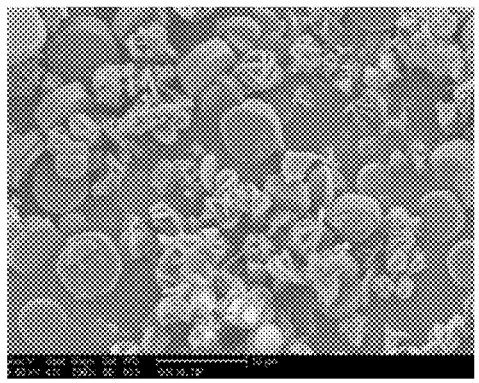
FIGS. 63A-63B. SEM images of Zn-pbdc-8a(bpe) treated with water at room temperature for 1 d (FIG. 63A); Zn-pbdc-8a(bpe) treated with boiling water for 1 d (FIG. 63B).
Figure 63B:
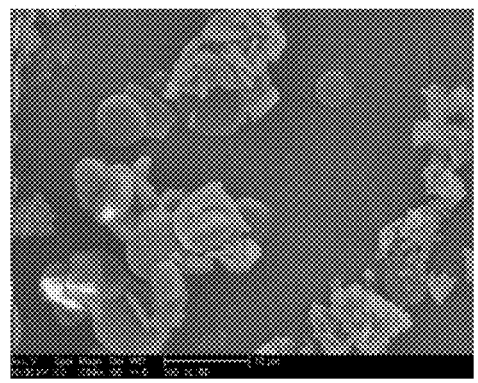
Figure 64A:
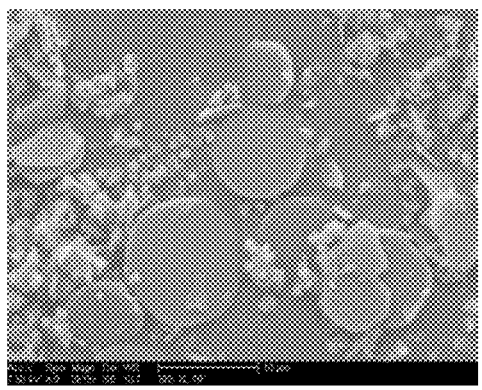
FIGS. 64A-64B. SEM images of Zn-pbdc-9a(bpe) treated with water at room temperature for 1 d (FIG. 64A); Zn-pbdc-9a(bpe) treated with boiling water for 1 d (FIG. 64B).
Figure 64B:
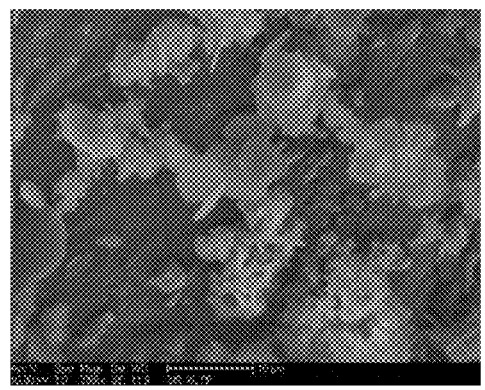
Figure 65A:
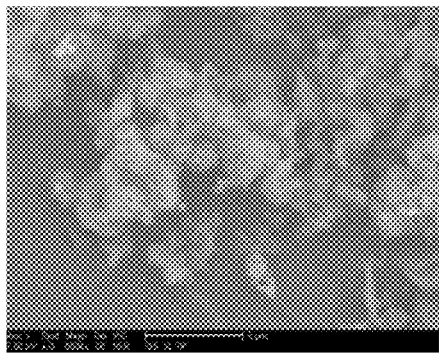
FIG. 65A-65B. SEM images of Zn-pbdc-10a(bpe) treated with water at room temperature for 1 d (FIG. 65A); Zn-pbdc-10a(bpe) treated with boiling water for 1 d (FIG. 65B).
Figure 65B:
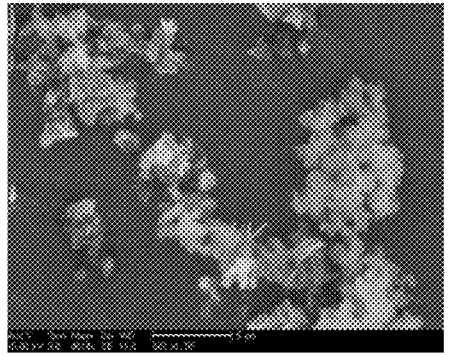
Figure 66A:
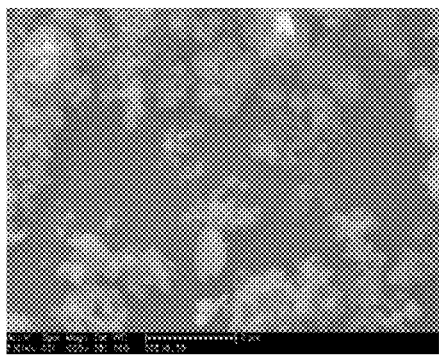
FIGS. 66A-66C. SEM images of Zn-pbdc-11a(bpe) treated with water at room temperature for 1 d (FIG. 66A); Zn-pbdc-11a(bpe) treated with boiling water for 1 d (FIG. 66B); Zn-pbdc-11a(bpe) exposed to 90% relative humidity at room temperature for 7 d (FIG. 66C).
Figure 66B:
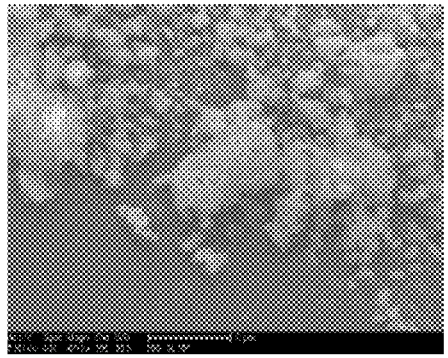
Figure 66C:
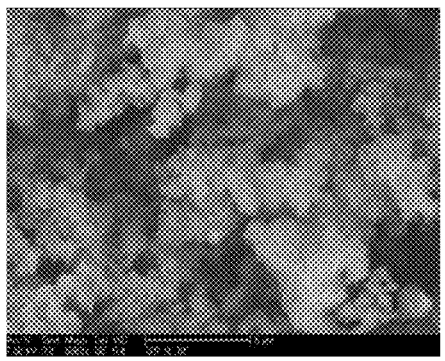

Gas Sorption Studies. $N_2$ (77 K and 298 K) and $CO_2$ (195 K and 298 K) gas sorption studies were performed on all porous materials synthesized in this work. After solvent exchange with EtOH and $CH_2Cl_2$ for 3 d, all MOP, MOF, and polyMOP samples were activated at 80° C. for 10 h in order to activate the samples for gas sorption analysis. Because the crystals of MOPs and polyMOPs were composed of close-packed discrete MOP molecules, removing solvent from the crystals results in loss of bulk crystallinity as confirmed by PXRD analysis, but the intrinsic porosities of these MOPs is retained. Generally, accessibility of the cavities was restricted by the close-packed structures, and all samples displayed selective adsorption of $CO_2$ (3.30 Å) over $N_2$ (3.64 Å) at 298 K (FIGS. 20A-20B). At low temperature, MOPs and polyMOPs exhibited very distinct adsorption behaviors. polyMOP-$CH_3$ and polyMOP-$NH_2$ lacked a modulator-free MOP counterpart (because they form MOFs in the absence of polymer 1), but behaved similar to other polyMOPs reported here.

At 195 K and 1 atm, the $CO_2$ capacities of MOP-H, —OH, —$NO_2$ were 140, 100, 80 $cm^3$ $g^{-1}$, while that of polyMOP-H, —OH, —$NO_2$, —$CH_3$, —$NH_2$ were 80, 65, 80, 75, 70 $cm^3$ $g^{-1}$. The largest difference was between MOP-H and polyMOP-H (42% reduction). At 77 K and 1 atm, the $N_2$ adsorptions were dramatically changed from 140, 100, 130 $cm^3$ $g^{-1}$ for MOP-H, —OH, —$NO_2$ to essentially zero for all polyMOPs. It may be that if polymer 1 is coordinated to the surface of polyMOP crystals then the polymer may block the accessible windows for gas sorption, and thus the permeation for $CO_2$ and $N_2$ are affected differently. However, the persistent $CO_2$ capacity for the polyMOPs indicates that the cavities are not fully occupied or occluded by polymer 1.

In this study, we designed and synthesized a poly (isophthalic acid)(ethylene oxide) polymer 1 and used it as a coordinative modulator for MOP synthesis. This strategy has not been previously reported in MOP chemistry and was shown to be general for a series of substituted MOPs. Several interesting findings were achieved with this polymer modulator. First, the prototypical MOP-H, which normally manifests as two different crystal phases with irregular sized crystals, was reduced to a single, cubic crystal phase with a much larger, uniform crystal size (polyMOP-H). Similar morphology control was observed for polyMOP-OH, —$NO_2$, —$CH_3$, and —$NH_2$. Second, the polymer modulator was able to divert the synthesis of MOFs in favor of a MOP architecture for polyMOP-$CH_3$ and polyMOP-$NH_2$. Third, the polymer modulator enabled the formation of robust polyMOP films on glass, and in one case (polyMOP-H) a strong preferred orientation was exhibited. Overall, these findings provide a new strategy for modulating the crystal growth and processing of supramolecular nanocages. Thus, this work gives polymer materials a new role in porous materials chemistry.

General Experimental Methods.

Starting materials and solvents were purchased and used without further purification from commercial suppliers (Sigma-Aldrich, Alfa Aesar, EMD, TCI, and others). Chromatography was performed using a CombiFlash Rf 200 automated system from TeledyneISCO (Lincoln, USA). $^1H$ and $^{13}C$ nuclear magnetic resonance (NMR) spectra were collected on Varian Mercury spectrometers running at 400 and 500 MHz, respectively. Chemical shifts are quoted in parts per million (ppm) referenced to the appropriate solvent peak or 0 ppm for TMS. Electrospray ionization mass spectrometry (ESI-MS) was performed at the Molecular Mass Spectrometry Facility (MMSF) in the Department of Chemistry & Biochemistry at the University of California, San Diego. ~5-10 mg of dried material was used for thermogravimetric analysis (TGA) measurements. Samples were analyzed under a stream of dinitrogen (80 mL/min) using a Mettler Toledo TGA/DSC 1 STAR$^e$ System running from 30 to 500° C. with a ramping rate of 5° C./min.

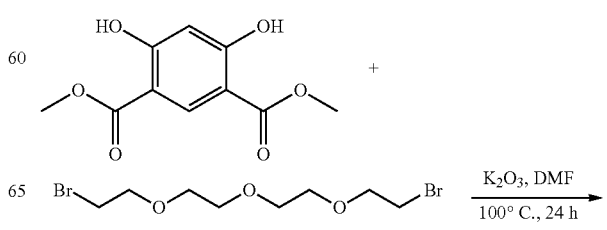

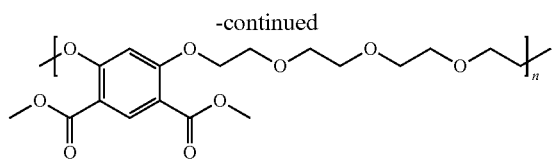

Synthesis of Polymer 1'

Dimethyl 4,6-dihydroxy-isophthalate[1] (500 mg, 2.2 mmol), 1-bromo-2-[2-[2-(2-bromoethoxy)ethoxy]ethoxy]ethane[2] (700 mg, 2.2 mmol), and $K_2CO_3$ (1.2 g, 8.8 mmol) were added into 10 mL of DMF. The suspension was stirred for overnight and then heated at 100° C. for 24 h. After cooling down, 20 mL of DMF was added to the mixture and the solid was separated from solution by centrifugation. The collected solution was dried in vacuo by rotary evaporation to give oily product. The oil was washed by acetone (3×5 mL) and dried in a 60° C. oven. Yield: 608 mg (72%). $^1$H NMR (400 MHz, DMSO-$d_6$): δ 8.15 (s, 1H, ArH), 6.73 (s, 1H, ArH), 4.23 (t, 4H, $CH_2$, J=4.8 Hz), 3.75 (t, 4H, $CH_2$, J=4.8 Hz), 3.72 (s, 6H, $CH_3$), 3.62 (t, 4H, $CH_2$, J=4.8 Hz), 3.52 (t, 4H, $CH_2$, J=4.8 Hz). FT-IR: $\tilde{v}$=2948 (m), 2872 (m), 1715 (s), 1604 (s), 1563 (m), 1507 (w), 1433 (m), 1350 (w), 1284 (s), 1228 (s), 1191 (s), 1099 (s), 1046 (s), 975 (m), 812 (m), 772 (m), 695 (m), 614 (w) cm$^{-1}$. GPC: $M_n$=12,200 Da, $M_w$=22,243 Da, PDI=1.8, degree of polymerization=31.

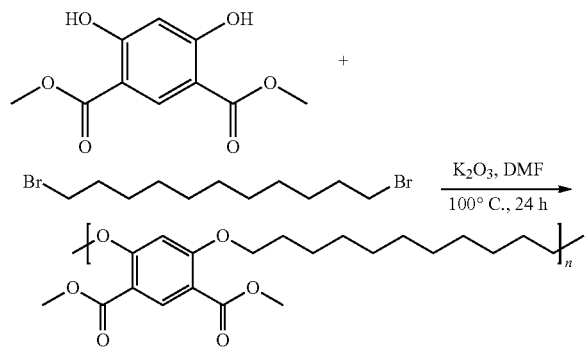

Synthesis of Polymer 2'

Dimethyl 4,6-dihydroxy-isophthalate (500 mg, 2.2 mmol), 1,11-dibromoundecane (690 mg, 2.2 mmol), and $K_2CO_3$ (1.2 g, 8.8 mmol) were added into 10 mL of DMF. The suspension was stirred for overnight and then heated at 100° C. for 24 h. After cooling down, 50 mL of water was added to the mixture and the precipitate was washed with water and methanol (MeOH), then isolated by centrifugation. The residue was dried in a 60° C. oven to obtain solid product. Yield: 518 mg (62%). $^1$H NMR (400 MHz, DMSO-$d_6$): δ 8.16 (s, 1H, ArH), 6.53 (s, 1H, ArH), 3.98 (br t, 4H, $CH_2$), 3.66 (s, 6H, $CH_3$), 1.58 (br t, 4H, $CH_2$), 1.32 (br t, 4H, $CH_2$), 1.14 (m, 10H, $CH_2$). FT-IR: $\tilde{v}$=2922 (m), 2852 (m), 1701 (s), 1604 (s), 1562 (m), 1507 (w), 1447 (m), 1460 (m), 1420 (m), 1390 (m), 1288 (s), 1224 (s), 1190 (s), 1104 (s), 999 (s), 820 (m), 773 (m), 691 (m), 617 (m) cm$^{-1}$. Due to the low solubility of polymer in organic solvents, the GPC result is not available.

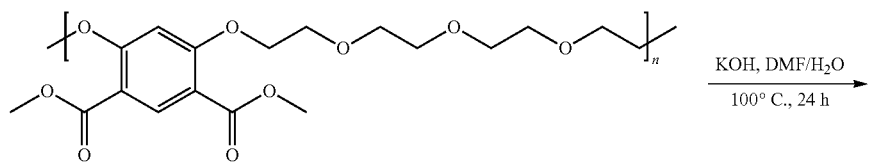

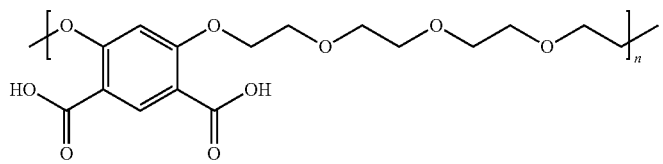

Synthesis of Polymer 1

The ester precursor (600 mg, 1.6 mmol) were placed in a 1:1 mixture of water and DMF (30 mL total) with 1.0 g of KOH. The mixture was heated at 100° C. for 24 h to produce a clear solution. After cooling down, the solution was acidified to a pH value of ~2 with a 1.0 M HCl solution. Solvents were removed by rotary evaporation and more 1.0 M HCl solution was added to the resulting mixture. The mixture was filtered and washed with water, then dried at 80° C. in vacuo to obtain offwhite solids. Yield: 540 mg (95%). $^1$H NMR (400 MHz, DMSO-$d_6$): δ 8.18 (s, 1H, ArH), 6.74 (s, 1H, ArH), 4.25 (t, 4H, $CH_2$, J=4.8 Hz), 3.77 (t, 4H, $CH_2$, J=4.8 Hz), 3.61 (t, 4H, $CH_2$, J=4.8 Hz), 3.51 (t, 4H, $CH_2$, J=4.8 Hz). $^{13}$C NMR (125 MHz, DMSO-$d_6$): 165.8, 162.5, 136.0, 112.2, 99.0, 70.1, 69.9, 68.8, 68.7. FT-IR: $\tilde{v}$=3265 (m), 2870 (m), 1708 (s), 1605 (s), 1567 (m), 1499 (w), 1447 (m), 1348 (m), 1282 (s), 1104 (s), 1067 (s), 1034 (s), 943 (m), 910 (m), 843 (m), 774 (w), 728 (w), 646 (m), 617 (m) cm$^{-1}$. GPC: $M_n$=9,667 Da, $M_w$=17,756 Da, PDI=1.8, degree of polymerization=27.

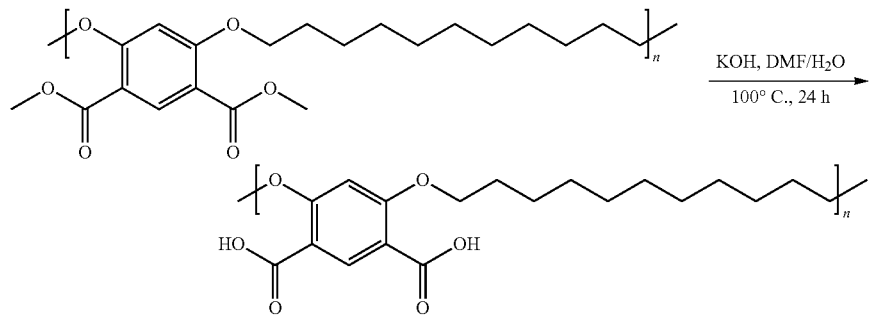

Synthesis of Polymer 2

The ester precursor (500 mg, 1.3 mmol) were placed in a 1:1 mixture of water and DMF (100 mL total) with 4.0 g of KOH. The mixture was heated at 100° C. for 2 d to produce a clear solution. The solution was acidified to a pH value of ~2 with a 1.0 M HCl solution. The mixture was concentrated by rotary evaporation, then added 10 mL of 1.0 M HCl solution. The resulting precipitate was collected by centrifugation, and subsequently washed with water (3×20 mL) and MeOH (3×20 mL). The isolated polyacid polymers were dried at 60° C. oven overnight. Yield: 380 mg (83%). $^1$H NMR (400 MHz, DMSO-$d_6$): δ 8.18 (s, 1H, ArH), 6.64 (s, 1H, ArH), 4.09 (t, 4H, $CH_2$, J=6.0 Hz), 1.69 (t, 4H, $CH_2$, J=6.0 Hz), 1.42 (t, 4H, $CH_2$, J=6.0 Hz), 1.25 (m, 10H, $CH_2$, J=4.8 Hz). $^{13}$C NMR (125 MHz, DMSO-$d_6$): 166.0, 162.8, 136.2, 111.7, 98.1, 68.5, 29.1, 29.0, 28.8, 28.5, 25.4. FT-IR: $\tilde{v}$=2923 (m), 2852 (m), 1686 (s), 1602 (s), 1560 (m), 1461 (m), 1401 (m), 1278 (s), 1243 (s), 1208 (s), 1106 (s), 1070 (s), 992 (m), 945 (m), 819 (m), 775 (w), 722 (w), 668 (w), 611 (w) cm$^{-1}$. GPC: $M_n$=4,000 Da, $M_w$=9,900 Da, PDI=2.5, degree of polymerization=12.

was purified by silica gel column chromatography (MeOH/$CH_2Cl_2$ gradient: 0 to 20/80) and the solvent was removed under vacuum by rotary evaporation. Water (50 mL) and KOH (500 mg) were added to the resulting solid and the solution was heated to reflux overnight. After cooling down to room temperature, the solution was acidified with 1M HCl solution to pH-2 in an ice bath. Water was removed by rotary evaporation. The mixture was dissolved in ethyl acetate and filtered, then the solution was dried to obtain oil product. Yield: 488 mg (96%). $^1$H NMR (400 MHz, DMSO-$d_6$): δ 8.18 (s, 1H, ArH), 6.78 (s, 1H, ArH), 4.28 (t, 4H, $CH_2$, J=4.8 Hz), 3.79 (t, 4H, $CH_2$, J=4.8 Hz), 3.63 (t, 4H, $CH_2$, J=4.8 Hz), 3.50 (m, 16H, $CH_2$), 3.41 (q, 4H, $CH_2$, J=3.2 Hz), 3.22 (t, 6H, $CH_3$, J=3.2 Hz). $^{13}$C NMR (125 MHz, DMSO-$d_6$): 165.8, 162.5, 136.0, 112.2, 99.1, 71.3, 70.1, 69.9, 69.8, 69.8, 69.6, 68.8, 68.7, 58.1. FT-IR: $\tilde{v}$=3398 (s), 2928 (m), 2778 (m), 1708 (s), 1606 (s), 1567 (m), 1467 (m), 1350 (m), 1285 (m), 1249 (m), 1201 (m), 1074 (s), 1022 (s), 946 (m), 888 (m), 845 (m), 542 (m) cm$^{-1}$. ESI-MS: [M-H]$^-$ 577.11.

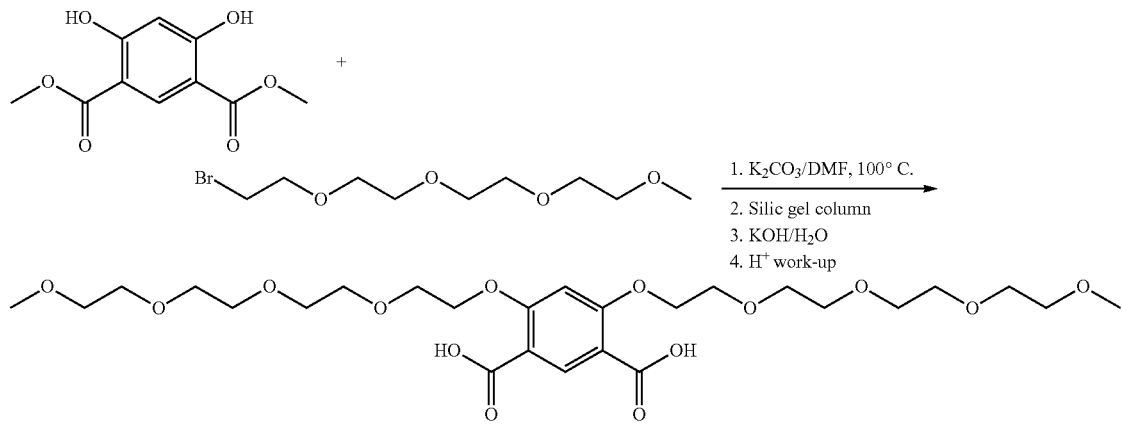

Synthesis of Compound 3 (4,6-Bis[2-[2-[2-(2-methoxyethoxy)ethoxy]ethoxy]ethoxyl]isophthalic acid)

4,6-dihydroxy-isophthalate (200 mg, 0.88 mmol), $K_2CO_3$ (486 mg, 3.5 mmol), and 2-[2-[2-(2-methoxyethoxy)ethoxy]ethoxy]ethyl bromide (950 mg, 3.5 mmol) were dissolved in 10 mL of DMF. The mixture was heated at 100° C. overnight and was then filtered to remove $K_2CO_3$. DMF in the mixture was removed in vacuo by rotary evaporation. The remainder

Synthesis of MOP-H [$Cu_{24}$(m-bdc)$_{24}$(S)$_{24}$]

(S=terminal solvent molecule) $Cu(NO_3)_2 \cdot 2.5H_2O$ (9.5 mg, 4.1×10$^{-2}$ mmol) and isophthalic acid ($H_2$m-bdc, 6.8 mg, 4.1×10$^{-2}$ mmol) were dissolved in 0.75 mL of DMF and 0.25 mL of ethanol (EtOH) in a 4 mL scintillation vial. The vial was placed in a sand bath in a preheated isothermal oven at 80° C. for 16 h. The isolated product (52% based on Cu) was washed with DMF (3×5 mL) and EtOH (3×5 mL), and then air-dried for 5 min. FT-IR: $\tilde{v}$=1606 (s), 1535 (s), 1482

(m), 1442 (m), 1382 (s), 1276 (m), 1161 (w), 1078 (w), 1039 (w), 739 (s), 719 (s), 660 (m), 485 (m) cm$^{-1}$.

Synthesis of MOP-OH [Cu$_{24}$(5-OH-m-bdc)$_{24}$(S)$_{24}$]

Cu(NO$_3$)$_2$·2.5H$_2$O (9.5 mg, 4.1×10$^{-2}$ mmol) and 5-hydroxyisophthalic acid (5-OH—H$_2$m-bdc, 7.5 mg, 4.1×10$^{-2}$ mmol) were dissolved in 0.75 mL of N,N-diethylformamide (DEF) and 0.25 mL of MeOH in a 4 mL scintillation vial. The vial was placed in a sand bath in a preheated isothermal oven at 80° C. for 16 h. The isolated product (36% based on Cu) was washed with DEF (3×5 mL) and CH$_2$Cl$_2$ (3×5 mL), and then air-dried for 5 min. FT-IR: $\tilde{v}$=1610 (s), 1573 (s), 1508 (m), 1376 (s), 1273 (m), 1210 (m), 1127 (w), 1001 (m), 979 (m), 899 (w), 809 (m), 770 (s), 731 (s), 481 (m) cm$^{-1}$.

Synthesis of MOP-NO$_2$ [Cu$_{24}$(5-NO$_2$-m-bdc)$_{24}$(S)$_{24}$]

Cu(NO$_3$)$_2$·2.5H$_2$O (9.5 mg, 4.1×10$^{-2}$ mmol) and 5-nitroisophthalic acid (5-NO$_2$—H$_2$m-bdc, 8.7 mg, 4.1×10$^{-2}$ mmol) were dissolved in 0.40 mL of DMF and 0.60 mL of MeOH in a 4 mL scintillation vial. The vial was placed in a sand bath in a preheated isothermal oven at 60° C. for 2 d. The isolated product (55% based on Cu) was washed with DMF (3×5 mL) and MeOH (3×5 mL), and then air-dried for 5 min. FT-IR: $\tilde{v}$=3088 (w), 1625 (m), 1534 (m), 1459 (m), 1375 (s), 1341 (s), 1086 (m), 1038 (w), 925 (m), 782 (m), 723 (s), 480 (m) cm$^{-1}$.

Synthesis of MOF-CH$_3$-m-bdc [Cu(5-CH$_3$-m-bdc)(H$_2$O)]$_n$

Cu(NO$_3$)$_2$·2.5H$_2$O (9.5 mg, 4.1×10$^{-2}$ mmol) and 5-methylisophthalic acid (5-CH$_3$—H$_2$m-bdc, 7.4 mg, 4.1×10$^{-2}$ mmol) were dissolved in 0.40 mL of DMF and 0.40 mL of MeOH in a 4 mL scintillation vial. The vial was placed in a sand bath in a preheated isothermal oven at 60° C. for 2 d. The isolated product (55% based on Cu) was washed with DMF (3×5 mL) and MeOH (3×5 mL), and then air-dried for 5 min. FT-IR: $\tilde{v}$=3416 (m), 1627 (s), 1588 (s), 1420 (m), 1375 (m), 1249 (m), 1113 (w), 792 (m), 770 (s), 731 (s), 495 (m) cm$^{-1}$.

Synthesis of MOF-NH$_2$-m-bdc [Cu(5-NH$_2$-m-bdc)(DMF)]$_n$

Cu(NO$_3$)$_2$·2.5H$_2$O (9.5 mg, 4.1×10$^{-2}$ mmol) and 5-aminoisophthalic acid (5-NH$_2$—H$_2$m-bdc, 7.4 mg, 4.1×10$^{-2}$ mmol) were dissolved in 0.75 mL of DMF and 0.25 mL of MeOH in a 4 mL scintillation vial. The vial was placed in a sand bath in a preheated isothermal oven at 60° C. for 2 d. The isolated product (51% based on Cu) was washed with DMF (3×5 mL) and MeOH (3×5 mL), and then air-dried for 5 min. FT-IR: $\tilde{v}$=3440 (m), 3353 (m), 1657 (m), 1579 (s), 1480 (m), 1418 (m), 1388 (s), 1250 (m), 1150 (w), 1103 (m), 1060 (w), 1000 (m), 896 (m), 784 (s), 727 (s), 669 (m), 526 (m), 480 (s) cm$^{-1}$.

Synthesis of polyMOP-H [Cu$_{24}$(m-bdc)$_{24}$(S)$_{24}$]

Cu(NO$_3$)$_2$·2.5H$_2$O (9.5 mg, 4.1×10$^{-2}$ mmol), isophthalic acid (H$_2$m-bdc, 5.8 mg, 3.5×10$^{-2}$ mmol), and polymer 1 (2.0 mg, 5.6×10$^{-3}$ mmol) were dissolved in 0.75 mL of DMF and 0.25 mL of EtOH in a 4 mL scintillation vial. The vial was placed in a sand bath in a preheated isothermal oven at 80° C. for 16 h. The isolated product (43% based on Cu) was washed with DMF (3×5 mL) and EtOH (3×5 mL), and then air-dried for 5 min. FT-IR: $\tilde{v}$=1604 (s), 1534 (s), 1481 (m), 1438 (m), 1375 (m), 1276 (m), 1160 (m), 1076 (m), 1039 (w), 935 (w), 825 (w), 717 (s), 659 (m), 487 (m) cm$^{-1}$.

Synthesis of polyMOP-OH [Cu$_{24}$(5-OH-m-bdc)$_{24}$(S)$_{24}$]

Cu(NO$_3$)$_2$·2.5H$_2$O (9.5 mg, 4.1×10$^{-2}$ mmol), 5-hydroxyisophthalic acid (5-OH—H$_2$m-bdc, 6.8 mg, 3.7×10$^{-2}$ mmol), and polymer 1 (1.2 mg, 3.5×10$^3$ mmol) were dissolved in 0.75 mL of DEF and 0.25 mL of MeOH in a 4 mL scintillation vial. The vial was placed in a sand bath in a preheated isothermal oven at 80° C. for 16 h. The isolated product (36% based on Cu) was washed with DMF (3×5 mL) and CH$_2$Cl$_2$ (3×5 mL), and then air-dried for 5 min. FT-IR: $\tilde{v}$=1625 (s), 1588 (s), 1388 (s), 1268 (m), 1209 (m), 1122 (m), 1002 (m), 977 (m), 776 (s), 734 (s), 670 (m), 646 (m), 486 (m) cm$^{-1}$.

Synthesis of polyMOP-NO$_2$ [Cu$_{24}$(5-NO$_2$-m-bdc)$_{24}$(S)$_{24}$]

Cu(NO$_3$)$_2$·2.5H$_2$O (9.5 mg, 4.1×10$^{-2}$ mmol), 5-nitroisophthalic acid (5-NO$_2$—H$_2$m-bdc, 7.9 mg, 3.7×10$^{-2}$ mmol), and polymer 1 (1.2 mg, 3.5×10$^{-3}$ mmol) were dissolved in 0.40 mL of DMF and 0.60 mL of MeOH in a 4 mL scintillation vial. The vial was placed in a sand bath in a preheated isothermal oven at 60° C. for 2 d. The isolated product (59% based on Cu) was washed with DMF (3×5 mL) and MeOH (3×5 mL), and then air-dried for 5 min. FT-IR: $\tilde{v}$=3089 (w), 1624 (s), 1532 (s), 1457 (m), 1343 (s), 1083 (m), 924 (m), 782 (m), 724 (s), 468 (m) cm$^{-1}$.

Synthesis of polyMOP-CH$_3$ [Cu$_{24}$(5-CH$_3$-m-bdc)$_{24}$(S)$_{24}$]

Cu(NO$_3$)$_2$·2.5H$_2$O (9.5 mg, 4.1×10$^{-2}$ mmol), 5-methylisophthalic acid (5-CH$_3$—H$_2$m-bdc, 6.8 mg, 3.7×10$^{-2}$ mmol), and polymer 1 (1.2 mg, 3.5×10$^{-3}$ mmo) were dissolved in 0.40 mL of DMF and 0.40 mL of MeOH in a 4 mL scintillation vial. The vial was placed in a sand bath in a preheated isothermal oven at 60° C. for 2 d. The isolated product (55% based on Cu) was washed with DMF (3×5 mL) and MeOH (3×5 mL), and then air-dried for 5 min. FT-IR: $\tilde{v}$=2916 (w), 1610 (m), 1541 (s), 1422 (s), 1371 (s), 1276 (m), 1112 (w), 933 (w), 769 (s), 727 (s), 495 (m) cm$^1$.

Synthesis of polyMOP-NH$_2$ [Cu$_{24}$(5-NH$_2$-m-bdc)$_{24}$(S)$_{24}$][Cu$_{0.5}$(H$_2$O)(OH)]$_8$ Cu(NO$_3$)$_2$·2.5H$_2$O (9.5 mg, 4.1×10$^{-2}$ mmol), 5-aminoisophthalic acid (5-NH$_2$—H$_2$m-bdc, 6.8 mg, 3.7×10$^{-2}$ mmol), and polymer 1 (1.2 mg, 3.5×10$^{-3}$ mmol) were dissolved in 0.75 mL of DMF and 0.25 mL of MeOH in a 4 mL scintillation vial. The vial was placed in a sand bath in a preheated isothermal oven at 60° C. for 2 d. The isolated product (61% based on Cu) was washed with DMF (3×5 mL) and MeOH (3×5 mL), and then air-dried for 5 min. FT-IR: $\tilde{v}$=3258 (w), 3119 (w), 1619 (m), 1546 (s), 1476 (m), 1364 (s), 1103 (m), 1001 (m), 957 (m), 772 (s), 725 (s), 670 (m), 457 (m) cm$^{-1}$.

TABLE S3

Control experiments with $Cu(NO_3)_2 \cdot 2.5H_2O$ (9.5 mg, 4.1 × $10^{-2}$ mmol) and PEG-4000 for deposition of crystals on a glass surface. All products were characterized by PXRD.

| $H_2$m-bdc Derivatives | PEG-4000 | Reaction Conditions | Results |
|---|---|---|---|
| $H_2$m-bdc<br>5.8 mg, 3.5 × $10^{-2}$ mmol | 9.0 mg, 2.3 × $10^{-3}$ mmol<br>1.5 mg, 3.8 × $10^{-4}$ | DMF/EtOH<br>0.56 mL/0.19 mL<br>80° C., 16 h | MOP-H<br>No deposition |
| 5-OH—$H_2$m-bdc<br>7.5 mg, 3.7 × $10^{-2}$ mmol | 9.0 mg, 2.3 × $10^{-3}$ mmol<br>1.5 mg, 3.8 × $10^{-4}$ | DEF/MeOH<br>0.56 mL/0.19 mL<br>80° C., 16 h | MOP-OH<br>No deposition |
| 5-$NO_2$—$H_2$m-bdc<br>8.7 mg, 3.7 × $10^{-2}$ mmol | 9.0 mg, 2.3 × $10^{-3}$ mmol<br>1.5 mg, 3.8 × $10^{-4}$ | DMF/MeOH<br>0.30 mL/0.45 mL<br>60° C., 2 d | MOP-$NO_2$<br>A layer of crystals |
| 5-$CH_3$—$H_2$m-bdc<br>7.4 mg, 3.7 × $10^{-2}$ mmol | 9.0 mg, 2.3 × $10^{-3}$ mmol<br>1.5 mg, 3.8 × $10^{-4}$ | DMF/MeOH<br>0.30 mL/0.30 mL<br>60° C., 2 d | MOF-$CH_3$-m-bdc<br>A layer of crystals |
| 5-$NH_2$—$H_2$m-bdc<br>7.4 mg, 3.7 × $10^{-2}$ mmol | 9.0 mg, 2.3 × $10^{-3}$ mmol<br>1.5 mg, 3.8 × $10^{-4}$ | DMF/MeOH<br>0.56 mL/0.19 mL<br>60° C., 2 d | MOF-$NH_2$-m-bdc<br>No deposition |

TABLE S4

Crystallographic Data for MOP-H.

| | |
|---|---|
| Identification code | MOP-H |
| Empirical formula | $C_{196}Cu_{24}O_{120}$ |
| Formula weight | 5799.16 |
| Temperature/K | 296.15 |
| Crystal system | Triclinic |
| Space group | P-1 |
| a/Å | 24.3070(19) |
| b/Å | 24.5206(18) |
| c/Å | 25.3072(18) |
| α/° | 118.393(2) |
| β/° | 111.787(2) |
| γ/° | 93.769(2) |
| Volume/Å$^3$ | 11767.2(16) |
| Z | 1 |
| $\rho_{calc}$ g/cm$^3$ | 0.8183 |
| μ/mm$^{-1}$ | 1.109 |
| F(000) | 2841.8 |
| Radiation | Mo Kα (λ = 0.71073) |
| 2θ range for data collection/° | 2.06 to 47.66 |
| Index ranges | −27 ≤ h ≤ 27, −27 ≤ k ≤ 27, −28 ≤ l ≤ 19 |
| Reflections collected | 114820 |
| Independent reflections | 35288 [$R_{int}$ = 0.0871, $R_{sigma}$ = 0.1679] |
| Data/restraints/parameters | 35288/72/1530 |
| Goodness-of-fit on F$^2$ | 0.8030 |
| Final R indexes [I > 2σ (I)] | $R_1$ = 0.0603, $wR_2$ = 0.1582 |
| Final R indexes [all data] | $R_1$ = 0.1153, $wR_2$ = 0.1721 |
| Largest diff. peak/hole/e Å$^{-3}$ | 1.83/−0.99 |

TABLE S5

Crystallographic Data for MOP-OH.

| | |
|---|---|
| Identification code | MOP-OH |
| Empirical formula | $C_{192}Cu_{24}O_{144}$ |
| Formula weight | 6135.12 |
| Temperature/K | 296(2) |
| Crystal system | Tetragonal |
| Space group | I4/m |
| a/Å | 27.401(11) |
| b/Å | 27.401(11) |
| c/Å | 35.409(14) |
| α/° | 90 |
| β/° | 90 |
| γ/° | 90 |
| Volume/Å$^3$ | 26585(18) |
| Z | 2 |
| $\rho_{calc}$ g/cm$^3$ | 0.7664 |
| μ/mm$^{-1}$ | 0.987 |
| F(000) | 6020.2 |
| Radiation | Mo Kα (λ = 0.71073) |
| 2θ range for data collection/° | 2.98 to 31.1 |
| Index ranges | −15 ≤ h ≤ 20, −20 ≤ k ≤ 16, −26 ≤ l ≤ 20 |
| Reflections collected | 9448 |
| Independent reflections | 3090 [$R_{int}$ = 0.0934, $R_{sigma}$ = 0.1160] |
| Data/restraints/parameters | 3097/234/411 |
| Goodness-of-fit on F$^2$ | 0.9139 |
| Final R indexes [I > 2σ (I)] | $R_1$ = 0.0529, $wR_2$ = 0.1339 |
| Final R indexes [all data] | $R_1$ = 0.0808, $wR_2$ = 0.1406 |
| Largest diff. peak/hole/e Å$^{-3}$ | 0.44/−0.57 |

TABLE S6

Crystallographic Data for MOP-$NO_2$.

| | |
|---|---|
| Identification code | MOP-$NO_2$ |
| Empirical formula | $C_{192}Cu_{24}N_{24}O_{168}$ |
| Formula weight | 6855.36 |
| Temperature/K | 100(2) |
| Crystal system | Trigonal |
| Space group | R-3 |
| a/Å | 36.076(2) |
| b/Å | 36.076(2) |
| c/Å | 29.2307(19) |
| α/° | 90 |
| β/° | 90 |
| γ/° | 120 |
| Volume/Å$^3$ | 32946(3) |
| Z | 3 |
| $\rho_{calc}$ g/cm$^3$ | 1.0365 |
| μ/mm$^{-1}$ | 1.206 |
| F(000) | 10111.2 |
| Radiation | Mo Kα (λ = 0.71073) |
| 2θ range for data collection/° | 1.9 to 33.08 |
| Index ranges | −28 ≤ h ≤ 28, −25 ≤ k ≤ 28, −23 ≤ l ≤ 23 |
| Reflections collected | 23188 |
| Independent reflections | 3936 [$R_{int}$ = 0.0625, $R_{sigma}$ = 0.0523] |
| Data/restraints/parameters | 3936/360/606 |
| Goodness-of-fit on F$^2$ | 1.022 |
| Final R indexes [I > 2σ (I)] | $R_1$ = 0.0797, $wR_2$ = 0.2159 |
| Final R indexes [all data] | $R_1$ = 0.0989, $wR_2$ = 0.2353 |
| Largest diff. peak/hole/e Å$^{-3}$ | 1.33/−0.67 |

TABLE S7

Crystallographic Data for polyMOP-H.

| | |
|---|---|
| Identification code | polyMOP-H |
| Empirical formula | $C_{192}H_{96}Cu_{24}O_{120}$ |
| Formula weight | 5847.89 |
| Temperature/K | 296.15 |
| Crystal system | Cubic |
| Space group | Im-3m |
| a/Å | 27.570(2) |
| b/Å | 27.570(2) |
| c/Å | 27.570(2) |
| α/° | 90 |
| β/° | 90 |
| γ/° | 90 |
| Volume/Å$^3$ | 20957(3) |
| Z | 2 |
| $\rho_{calc}$ g/cm$^3$ | 0.9267 |
| μ/mm$^{-1}$ | 1.245 |
| F(000) | 5827.7 |
| Radiation | Mo Kα (λ = 0.71073) |
| 2θ range for data collection/° | 2.08 to 46.56 |
| Index ranges | −21 ≤ h ≤ 30, −29 ≤ k ≤ 30, −30 ≤ l ≤ 30 |
| Reflections collected | 33648 |
| Independent reflections | 1496 [$R_{int}$ = 0.0955, $R_{sigma}$ = 0.0355] |
| Data/restraints/parameters | 1496/12/73 |
| Goodness-of-fit on F$^2$ | 0.9908 |
| Final R indexes [I > 2σ (I)] | $R_1$ = 0.0618, $wR_2$ = 0.1657 |
| Final R indexes [all data] | $R_1$ = 0.0828, $wR_2$ = 0.1773 |
| Largest diff. peak/hole/e Å$^{-3}$ | 0.76/−2.10 |

TABLE S8

Crystallographic Data for polyMOP-OH.

| | |
|---|---|
| Identification code | polyMOP-OH |
| Empirical formula | $C_{200}Cu_{24}O_{145}$ |
| Formula weight | 6247.20 |
| Temperature/K | 100(2) |
| Crystal system | Tetragonal |
| Space group | I4/m |
| a/Å | 27.571(4) |
| b/Å | 27.571(4) |
| c/Å | 35.456(5) |
| α/° | 90 |
| β/° | 90 |
| γ/° | 90 |
| Volume/Å$^3$ | 26952(6) |
| Z | 2 |
| $\rho_{calc}$ g/cm$^3$ | 0.7697 |
| μ/mm$^{-1}$ | 0.975 |
| F(000) | 6132.3 |
| Radiation | Mo Kα (λ = 0.71073) |
| 2θ range for data collection/° | 2.08 to 39.78 |
| Index ranges | −19 ≤ h ≤ 25, −24 ≤ k ≤ 25, −26 ≤ l ≤ 33 |
| Reflections collected | 16595 |
| Independent reflections | 5033 [$R_{int}$ = 0.0535, $R_{sigma}$ = 0.0841] |
| Data/restraints/parameters | 5033/234/422 |
| Goodness-of-fit on F$^2$ | 0.9157 |
| Final R indexes [I > 2σ (I)] | $R_1$ = 0.0661, $wR_2$ = 0.1831 |
| Final R indexes [all data] | $R_1$ = 0.0911, $wR_2$ = 0.1935 |
| Largest diff. peak/hole/e Å$^{-3}$ | 0.61/−0.73 |

TABLE S9

Crystallographic Data for polyMOP-NO$_2$.

| | |
|---|---|
| Identification code | polyMOP-NO$_2$ |
| Empirical formula | $C_{297}Cu_{36}N_{36}O_{252}$ |
| Formula weight | 6565.56 |
| Temperature/K | 100(2) |
| Crystal system | Trigonal |
| Space group | R-3 |
| a/Å | 36.173(7) |
| b/Å | 36.173(7) |
| c/Å | 29.289(6) |
| α/° | 90 |
| β/° | 90 |
| γ/° | 120 |
| Volume/Å$^3$ | 33190(11) |
| Z | 2 |
| $\rho_{calc}$ g/cm$^3$ | 1.0397 |
| μ/mm$^{-1}$ | 1.198 |
| F(000) | 10188.0 |
| Radiation | Mo Kα (λ = 0.71073) |
| 2θ range for data collection/° | 2.26 to 40 |
| Index ranges | −34 ≤ h ≤ 34, −34 ≤ k ≤ 34, −28 ≤ l ≤ 28 |
| Reflections collected | 13020 |
| Independent reflections | 6892 [$R_{int}$ = 0.0633, $R_{sigma}$ = 0.1531] |
| Data/restraints/parameters | 6699/336/601 |
| Goodness-of-fit on F$^2$ | 1.02 |
| Final R indexes [I > 2σ (I)] | $R_1$ = 0.0857, $wR_2$ = 0.1988 |
| Final R indexes [all data] | $R_1$ = 0.1442, $wR_2$ = 0.2186 |
| Largest diff. peak/hole/e Å$^{-3}$ | 1.23/−0.82 |

TABLE S10

Crystallographic Data for polyMOP-CH$_3$.

| | |
|---|---|
| Identification code | polyMOP-CH$_3$ |
| Empirical formula | $C_{36}Cu_4O_{20}$ |
| Formula weight | 1006.57 |
| Temperature/K | 100.0 |
| Crystal system | Trigonal |
| Space group | R-3 |
| a/Å | 35.660(3) |
| b/Å | 35.660(3) |
| c/Å | 30.219(3) |
| α/° | 90 |
| β/° | 90 |
| γ/° | 120 |
| Volume/Å$^3$ | 33279(5) |
| Z | 18 |
| $\rho_{calc}$ g/cm$^3$ | 0.9040 |
| μ/mm$^{-1}$ | 1.178 |
| F(000) | 8885.7 |
| Radiation | Mo Kα (λ = 0.71073) |
| 2θ range for data collection/° | 1.88 to 30.04 |
| Index ranges | −25 ≤ h ≤ 12, 0 ≤ k ≤ 26, 0 ≤ l ≤ 21 |
| Reflections collected | 2974 |
| Independent reflections | 2974 [$R_{int}$ = 0.0000, $R_{sigma}$ = 0.0485] |
| Data/restraints/parameters | 2974/330/540 |
| Goodness-of-fit on F$^2$ | 1.026 |
| Final R indexes [I > 2σ (I)] | $R_1$ = 0.0713, $wR_2$ = 0.1872 |
| Final R indexes [all data] | $R_1$ = 0.0921, $wR_2$ = 0.2031 |
| Largest diff. peak/hole/e Å$^{-3}$ | 0.89/−0.42 |

TABLE S11

Crystallographic Data for polyMOP-NH$_2$.

| | |
|---|---|
| Identification code | polyMOP-NH$_2$ |
| Empirical formula | $C_{192}Cu_{28}N_{24}O_{132}$ |
| Formula weight | 6533.56 |
| Temperature/K | 100(2) |
| Crystal system | Tetragonal |
| Space group | I4/mmm |
| a/Å | 26.217(2) |
| b/Å | 26.217(2) |
| c/Å | 44.813(5) |
| α/° | 90 |
| β/° | 90 |
| γ/° | 90 |
| Volume/Å$^3$ | 30801(5) |
| Z | 2 |

TABLE S11-continued

Crystallographic Data for polyMOP-NH$_2$.

| | |
|---|---|
| $\rho_{calc}$ g/cm$^3$ | 0.7044 |
| μ/mm$^{-1}$ | 0.987 |
| F(000) | 6398.7 |
| Radiation | Mo Kα (λ = 0.71073) |
| 2θ range for data collection/° | 2.86 to 41.66 |
| Index ranges | −26 ≤ h ≤ 13, −25 ≤ k ≤ 24, −44 ≤ l ≤ 26 |
| Reflections collected | 33610 |
| Independent reflections | 4507 [R$_{int}$ = 0.0630, R$_{sigma}$ = 0.0501] |
| Data/restraints/parameters | 4507/69/235 |
| Goodness-of-fit on F$^2$ | 0.979 |
| Final R indexes [I > 2σ (I)] | R$_1$ = 0.0967, wR$_2$ = 0.2659 |
| Final R indexes [all data] | R$_1$ = 0.1303, wR$_2$ = 0.2954 |
| Largest diff. peak/hole/e Å$^{-3}$ | 1.69/−0.58 |

EMBODIMENTS

Terms defined herein refer only to aspects and embodiments within this section.

The following definitions are provided to facilitate understanding of certain terms used frequently herein and are not meant to limit the scope of the present disclosure. The abbreviations used herein have their conventional meaning within the chemical and biological arts. The chemical structures and formulae set forth herein are constructed according to the standard rules of chemical valency known in the chemical arts.

Where substituent groups are specified by their conventional chemical formulae, written from left to right, they equally encompass the chemically identical substituents that would result from writing the structure from right to left, e.g., —CH$_2$O— is equivalent to —OCH$_2$—.

The term "alkyl," by itself or as part of another substituent, means, unless otherwise stated, a straight (i.e., unbranched) or branched carbon chain (or carbon), or combination thereof, which may be fully saturated, mono- or polyunsaturated and can include di- and multivalent radicals, having the number of carbon atoms designated (i.e., C$_1$-C$_{10}$ means one to ten carbons). Alkyl is not cyclized. Examples of saturated hydrocarbon radicals include, but are not limited to, groups such as methyl, ethyl, n-propyl, isopropyl, n-butyl, t-butyl, isobutyl, sec-butyl, (cyclohexyl)methyl, homologs and isomers of, for example, n-pentyl, n-hexyl, n-heptyl, n-octyl, and the like. An unsaturated alkyl group is one having one or more double bonds or triple bonds (e.g. alkene, alkyne). Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. An alkoxy is an alkyl attached to the remainder of the molecule via an oxygen linker (—O—).

The term "alkylene," by itself or as part of another substituent, means, unless otherwise stated, a divalent radical derived from an alkyl, as exemplified, but not limited by, —CH$_2$CH$_2$CH$_2$CH$_2$—. Typically, an alkyl (or alkylene) group will have from 1 to 24 carbon atoms, with those groups having 10 or fewer carbon atoms being preferred in the present invention. A "lower alkyl" or "lower alkylene" is a shorter chain alkyl or alkylene group, generally having eight or fewer carbon atoms. The term "alkenylene," by itself or as part of another substituent, means, unless otherwise stated, a divalent radical derived from an alkene.

The term "heteroalkyl," by itself or in combination with another term, means, unless otherwise stated, a stable straight or branched chain, or combinations thereof, including at least one carbon atom and at least one heteroatom selected from the group consisting of O, N, P, Si, and S, and wherein the nitrogen and sulfur atoms may optionally be oxidized, and the nitrogen heteroatom may optionally be quaternized. Heteroalkyl is not cyclized. The heteroatom(s) O, N, P, S, and Si may be placed at any interior position of the heteroalkyl group or at the position at which the alkyl group is attached to the remainder of the molecule. Examples include, but are not limited to: —CH$_2$—CH$_2$—O—CH$_3$, —CH$_2$—CH$_2$—NH—CH$_3$, —CH$_2$—CH$_2$—N(CH$_3$)—CH$_3$, —CH$_2$—S—CH$_2$—CH$_3$, —CH$_2$—CH$_2$—S(O)—CH$_3$, —CH$_2$—CH$_2$—S(O)$_2$—CH$_3$, —CH=CH—O—CH$_3$, —Si(CH$_3$)$_3$, —CH$_2$—CH=N—OCH$_3$, —CH=CH—N(CH$_3$)—CH$_3$, —O—CH$_3$, —O—CH$_2$—CH$_3$, and —CN. Up to two or three heteroatoms may be consecutive, such as, for example, —CH$_2$—NH—OCH$_3$ and —CH$_2$—O—Si(CH$_3$)$_3$.

Similarly, the term "heteroalkylene," by itself or as part of another substituent, means, unless otherwise stated, a divalent radical derived from heteroalkyl, as exemplified, but not limited by, —CH$_2$—CH$_2$—S—CH$_2$—CH$_2$— and —CH$_2$—S—CH$_2$—CH$_2$—NH—CH$_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —C(O)$_2$R'— represents both —C(O)$_2$R'— and —R'C(O)$_2$—. As described above, heteroalkyl groups, as used herein, include those groups that are attached to the remainder of the molecule through a heteroatom, such as —C(O)R', —C(O)NR', —NR'R", —OR', —SR', and/or —SO$_2$R'. Where "heteroalkyl" is recited, followed by recitations of specific heteroalkyl groups, such as —NR'R" or the like, it will be understood that the terms heteroalkyl and —NR'R" are not redundant or mutually exclusive. Rather, the specific heteroalkyl groups are recited to add clarity. Thus, the term "heteroalkyl" should not be interpreted herein as excluding specific heteroalkyl groups, such as —NR'R" or the like.

The terms "cycloalkyl" and "heterocycloalkyl," by themselves or in combination with other terms, mean, unless otherwise stated, cyclic versions of "alkyl" and "heteroalkyl," respectively. Additionally, for heterocycloalkyl, a heteroatom can occupy the position at which the heterocycle is attached to the remainder of the molecule. Cycloalkyl and heterocycloalkyl are non-aromatic. Examples of cycloalkyl include, but are not limited to, cyclopropyl, cyclobutyl, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like. A "cycloalkylene" and a "heterocycloalkylene," alone or as part of another substituent, means a divalent radical derived from a cycloalkyl and heterocycloalkyl, respectively.

The terms "halo" or "halogen," by themselves or as part of another substituent, mean, unless otherwise stated, a fluorine, chlorine, bromine, or iodine atom. Additionally, terms such as "haloalkyl" are meant to include monohaloalkyl and polyhaloalkyl. For example, the term "halo(C$_1$-C$_4$)alkyl" includes, but is not limited to, fluoromethyl, difluoromethyl, trifluoromethyl, 2,2,2-trifluoroethyl, 4-chlorobutyl, 3-bromopropyl, and the like.

The term "acyl" means, unless otherwise stated, —C(O)R where R is a substituted or unsubstituted alkyl, substituted or unsubstituted cycloalkyl, substituted or unsubstituted heteroalkyl, substituted or unsubstituted heterocycloalkyl, substituted or unsubstituted aryl, or substituted or unsubstituted heteroaryl.

The term "aryl" means, unless otherwise stated, a polyunsaturated, aromatic, hydrocarbon substituent, which can be a single ring or multiple rings (preferably from 1 to 3 rings) that are fused together (i.e., a fused ring aryl) or linked covalently. A fused ring aryl refers to multiple rings fused together wherein at least one of the fused rings is an aryl ring. The term "heteroaryl" refers to aryl groups (or rings) that contain at least one heteroatom such as N, O, or S, wherein the nitrogen and sulfur atoms are optionally oxidized, and the nitrogen atom(s) are optionally quaternized. Thus, the term "heteroaryl" includes fused ring heteroaryl groups (i.e., multiple rings fused together wherein at least one of the fused rings is a heteroaromatic ring). A 5,6-fused ring heteroarylene refers to two rings fused together, wherein one ring has 5 members and the other ring has 6 members, and wherein at least one ring is a heteroaryl ring. Likewise, a 6,6-fused ring heteroarylene refers to two rings fused together, wherein one ring has 6 members and the other ring has 6 members, and wherein at least one ring is a heteroaryl ring. And a 6,5-fused ring heteroarylene refers to two rings fused together, wherein one ring has 6 members and the other ring has 5 members, and wherein at least one ring is a heteroaryl ring. A heteroaryl group can be attached to the remainder of the molecule through a carbon or heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below. An "arylene" and a "heteroarylene," alone or as part of another substituent, mean a divalent radical derived from an aryl and heteroaryl, respectively. Non-limiting examples of heteroaryl groups include pyridinyl, pyrimidinyl, thiophenyl, thienyl, furanyl, indolyl, benzoxadiazolyl, benzodioxolyl, benzodioxanyl, thianaphthanyl, pyrrolopyridinyl, indazolyl, quinolinyl, quinoxalinyl, pyridopyrazinyl, quinazolinonyl, benzoisoxazolyl, imidazopyridinyl, benzofuranyl, benzothienyl, benzothiophenyl, phenyl, naphthyl, biphenyl, pyrrolyl, pyrazolyl, imidazolyl, pyrazinyl, oxazolyl, isoxazolyl, thiazolyl, furylthienyl, pyridyl, pyrimidyl, benzothiazolyl, purinyl, benzimidazolyl, isoquinolyl, thiadiazolyl, oxadiazolyl, pyrrolyl, diazolyl, triazolyl, tetrazolyl, benzothiadiazolyl, isothiazolyl, pyrazolopyrimidinyl, pyrrolopyrimidinyl, benzotriazolyl, benzoxazolyl, or quinolyl. The examples above may be substituted or unsubstituted and divalent radicals of each heteroaryl example above are non-limiting examples of heteroarylene.

A fused ring heterocyloalkyl-aryl is an aryl fused to a heterocycloalkyl. A fused ring heterocycloalkyl-heteroaryl is a heteroaryl fused to a heterocycloalkyl. A fused ring heterocycloalkyl-cycloalkyl is a heterocycloalkyl fused to a cycloalkyl. A fused ring heterocycloalkyl-heterocycloalkyl is a heterocycloalkyl fused to another heterocycloalkyl. Fused ring heterocycloalkyl-aryl, fused ring heterocycloalkyl-heteroaryl, fused ring heterocycloalkyl-cycloalkyl, or fused ring heterocycloalkyl-heterocycloalkyl may each independently be unsubstituted or substituted with one or more of the substituents described herein.

The term "oxo," as used herein, means an oxygen that is double bonded to a carbon atom.

Each of the above terms (e.g., "alkyl," "heteroalkyl," "aryl," and "heteroaryl") includes both substituted and unsubstituted forms of the indicated radical. Preferred substituents for each type of radical are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) can be one or more of a variety of groups selected from, but not limited to, —OR', =O, =NR', =N—OR', —NR'R", —SR', -halogen, —SiR'R"R'", —OC(O)R', —C(O)R', —CO$_2$R', —CONR'R", —OC(O)NR'R", —NR"C(O)R', —NR'—C(O)NR"R'", —NR"C(O)$_2$R', —NR—C(NR'R"R'")=NR"", —NR—C(NR'R")=NR'", —S(O)R', —S(O)$_2$R', —S(O)$_2$NR'R", —NRSO$_2$R', —NR'NR"R'", —ONR'R", —NR'C(O)NR"NR'"R"", —CN, —NO$_2$, monophosphate (or derivatives thereof), diphosphate (or derivatives thereof), triphosphate (or derivatives thereof), in a number ranging from zero to (2m'+1), where m' is the total number of carbon atoms in such radical. R, R', R", R'", and R"" each preferably independently refer to hydrogen, substituted or unsubstituted heteroalkyl, substituted or unsubstituted cycloalkyl, substituted or unsubstituted heterocycloalkyl, substituted or unsubstituted aryl (e.g., aryl substituted with 1-3 halogens), substituted or unsubstituted heteroaryl, substituted or unsubstituted alkyl, alkoxy, or thioalkoxy groups, or arylalkyl groups. When a compound of the invention includes more than one R group, for example, each of the R groups is independently selected as are each R', R", R'", and R"" group when more than one of these groups is present. When R' and R" are attached to the same nitrogen atom, they can be combined with the nitrogen atom to form a 4-, 5-, 6-, or 7-membered ring. For example, —NR'R" includes, but is not limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like).

Similar to the substituents described for the alkyl radical, substituents for the aryl and heteroaryl groups are varied and are selected from, for example: —OR', —NR'R", —SR', -halogen, —SiR'R"R'", —OC(O)R', —C(O)R', —CO$_2$R', —CONR'R", —OC(O)NR'R", —NR"C(O)R', —NR'—C(O)NR"R'", —NR"C(O)$_2$R', —NR—C(NR'R"R'")=NR"", —NR—C(NR'R")=NR'", —S(O)R', —S(O)$_2$R', —S(O)$_2$NR'R", —NRSO$_2$R', —NR'NR"R'", —ONR'R", —NR'C(O)NR"NR'"R"", —CN, —NO$_2$, —R', —N$_3$, —CH(Ph)$_2$, fluoro(C$_1$-C$_4$)alkoxy, and fluoro(C$_1$-C$_4$)alkyl, monophosphate (or derivatives thereof), diphosphate (or derivatives thereof), triphosphate (or derivatives thereof), in a number ranging from zero to the total number of open valences on the aromatic ring system; and where R', R", R'", and R"" are preferably independently selected from hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl. When a compound of the invention includes more than one R group, for example, each of the R groups is independently selected as are each R", R"', and R"" groups when more than one of these groups is present.

Two or more substituents may optionally be joined to form aryl, heteroaryl, cycloalkyl, or heterocycloalkyl groups. Such so-called ring-forming substituents are typically, though not necessarily, found attached to a cyclic base structure. In one embodiment, the ring-forming substituents are attached to adjacent members of the base structure. For example, two ring-forming substituents attached to adjacent members of a cyclic base structure create a fused ring structure. In embodiments, the ring-forming substituents are attached to a single member of the base structure. For example, two ring-forming substituents attached to a single member of a cyclic base structure create a spirocyclic structure. In yet another embodiment, the ring-forming substituents are attached to non-adjacent members of the base structure.

Two of the substituents on adjacent atoms of the aryl or heteroaryl ring may optionally form a ring of the formula -T-C(O)—(CRR')$_q$—U—, wherein T and U are independently —NR—, —O—, —CRR'—, or a single bond, and q is an integer of from 0 to 3. Alternatively, two of the substituents on adjacent atoms of the aryl or heteroaryl ring may optionally be replaced with a substituent of the formula -A-(CH$_2$)$_r$—B—, wherein A and B are independently —CRR'—, —O—, —NR—, —S—, —S(O)—, —S(O)$_2$—, —S(O)$_2$NR'—, or a single bond, and r is an integer of from 1 to 4. One of the single bonds of the new ring so formed may optionally be replaced with a double bond. Alternatively, two of the substituents on adjacent atoms of the aryl or heteroaryl ring may optionally be replaced with a substituent of the formula —(CRR')$_s$—X'—(C"R"R"')$_d$—, where s and d are independently integers of from 0 to 3, and X' is —O—, —NR'—, —S—, —S(O)—, —S(O)$_2$—, or —S(O)$_2$NR'—. The substituents R, R', R", and R"' are preferably independently selected from hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl.

As used herein, the terms "heteroatom" or "ring heteroatom" are meant to include, oxygen (O), nitrogen (N), sulfur (S), phosphorus (P), and silicon (Si).

A "substituent group," as used herein, means a group selected from the following moieties:
(A) oxo, halogen, —CF$_3$, —CN, —OH, —NH$_2$, —COOH, —CONH$_2$, —NO$_2$, —SH, —SO$_2$Cl, —SO$_3$H, —SO$_4$H, —SO$_2$NH$_2$, —NHNH$_2$, —ONH$_2$, —NHC(O)NHNH$_2$, —NHC(O) NH$_2$, —NHSO$_2$H, —NHC═(O)H, —NHC(O)—OH, —NHOH, —OCF$_3$, —OCHF$_2$, —NHSO$_2$CH$_3$, —N$_3$, unsubstituted alkyl, unsubstituted heteroalkyl, unsubstituted cycloalkyl, unsubstituted heterocycloalkyl, unsubstituted aryl, unsubstituted heteroaryl, monophosphate (or derivatives thereof), diphosphate (or derivatives thereof), or triphosphate (or derivatives thereof), and
(B) alkyl, heteroalkyl, cycloalkyl, heterocycloalkyl, aryl, heteroaryl, monophosphate (or derivatives thereof), diphosphate (or derivatives thereof), or triphosphate (or derivatives thereof), substituted with at least one substituent selected from:
(i) oxo, halogen, —CF$_3$, —CN, —OH, —NH$_2$, —COOH, —CONH$_2$, —NO$_2$, —SH, —SO$_2$Cl, —SO$_3$H, —SO$_4$H, —SO$_2$NH$_2$, —NHNH$_2$, —ONH$_2$, —NHC(O)NHNH$_2$, —NHC(O) NH$_2$, —NHSO$_2$H, —NHC═(O)H, —NHC(O)—OH, —NHOH, —OCF$_3$, —OCHF$_2$, —NHSO$_2$CH$_3$, —N$_3$, unsubstituted alkyl, unsubstituted heteroalkyl, unsubstituted cycloalkyl, unsubstituted heterocycloalkyl, unsubstituted aryl, unsubstituted heteroaryl, monophosphate (or derivatives thereof), diphosphate (or derivatives thereof), or triphosphate (or derivatives thereof), and
(ii) alkyl, heteroalkyl, cycloalkyl, heterocycloalkyl, aryl, heteroaryl, monophosphate (or derivatives thereof), diphosphate (or derivatives thereof), or triphosphate (or derivatives thereof), substituted with at least one substituent selected from:
(a) oxo, halogen, —CF$_3$, —CN, —OH, —NH$_2$, —COOH, —CONH$_2$, —NO$_2$, —SH, —SO$_2$Cl, —SO$_3$H, —SO$_4$H, —SO$_2$NH$_2$, —NHNH$_2$, —ONH$_2$, —NHC(O)NHNH$_2$, —NHC(O) NH$_2$, —NHSO$_2$H, —NHC═(O)H, —NHC(O)—OH, —NHOH, —OCF$_3$, —OCHF$_2$, —NHSO$_2$CH$_3$, —N$_3$, unsubstituted alkyl, unsubstituted heteroalkyl, unsubstituted cycloalkyl, unsubstituted heterocycloalkyl, unsubstituted aryl, unsubstituted heteroaryl, monophosphate (or derivatives thereof), diphosphate (or derivatives thereof), or triphosphate (or derivatives thereof), and
(b) alkyl, heteroalkyl, cycloalkyl, heterocycloalkyl, aryl, heteroaryl, monophosphate (or derivatives thereof), diphosphate (or derivatives thereof), or triphosphate (or derivatives thereof), substituted with at least one substituent selected from: oxo, halogen, —CF$_3$, —CN, —OH, —NH$_2$, —COOH, —CONH$_2$, —NO$_2$, —SH, —SO$_2$Cl, —SO$_3$H, —SO$_4$H, —SO$_2$NH$_2$, —NHNH$_2$, —ONH$_2$, —NHC(O)NHNH$_2$, —NHC(O) NH$_2$, —NHSO$_2$H, —NHC═(O)H, —NHC(O)—OH, —NHOH, —OCF$_3$, —OCHF$_2$, —NHSO$_2$CH$_3$, —N$_3$, unsubstituted alkyl, unsubstituted heteroalkyl, unsubstituted cycloalkyl, unsubstituted heterocycloalkyl, unsubstituted aryl, unsubstituted heteroaryl, monophosphate (or derivatives thereof), diphosphate (or derivatives thereof), and triphosphate (or derivatives thereof).

A "size-limited substituent" or "size-limited substituent group," as used herein, means a group selected from all of the substituents described above for a "substituent group," wherein each substituted or unsubstituted alkyl is a substituted or unsubstituted $C_1$-$C_{20}$ alkyl, each substituted or unsubstituted heteroalkyl is a substituted or unsubstituted 2 to 20 membered heteroalkyl, each substituted or unsubstituted cycloalkyl is a substituted or unsubstituted $C_3$-$C_8$ cycloalkyl, each substituted or unsubstituted heterocycloalkyl is a substituted or unsubstituted 3 to 8 membered heterocycloalkyl, each substituted or unsubstituted aryl is a substituted or unsubstituted $C_6$-$C_{10}$ aryl, and each substituted or unsubstituted heteroaryl is a substituted or unsubstituted 5 to 10 membered heteroaryl.

A "lower substituent" or "lower substituent group," as used herein, means a group selected from all of the substituents described above for a "substituent group," wherein each substituted or unsubstituted alkyl is a substituted or unsubstituted $C_1$-$C_8$ alkyl, each substituted or unsubstituted heteroalkyl is a substituted or unsubstituted 2 to 8 membered heteroalkyl, each substituted or unsubstituted cycloalkyl is a substituted or unsubstituted $C_3$-$C_7$ cycloalkyl, each substituted or unsubstituted heterocycloalkyl is a substituted or unsubstituted 3 to 7 membered heterocycloalkyl, each substituted or unsubstituted aryl is a substituted or unsubstituted $C_6$-$C_{10}$ aryl, and each substituted or unsubstituted heteroaryl is a substituted or unsubstituted 5 to 9 membered heteroaryl.

In embodiments, each substituted group described in the compounds herein is substituted with at least one substituent group. More specifically, In embodiments, each substituted alkyl, substituted heteroalkyl, substituted cycloalkyl, substituted heterocycloalkyl, substituted aryl, substituted heteroaryl, substituted alkylene, substituted heteroalkylene, substituted cycloalkylene, substituted heterocycloalkylene, substituted arylene, and/or substituted heteroarylene described in the compounds herein are substituted with at least one substituent group. In other embodiments, at least one or all of these groups are substituted with at least one size-limited substituent group. In other embodiments, at least one or all of these groups are substituted with at least one lower substituent group.

In other embodiments of the compounds herein, each substituted or unsubstituted alkyl may be a substituted or unsubstituted $C_1$-$C_{20}$ alkyl, each substituted or unsubstituted heteroalkyl is a substituted or unsubstituted 2 to 20 membered heteroalkyl, each substituted or unsubstituted cycloalkyl is a substituted or unsubstituted $C_3$-$C_8$ cycloalkyl, each substituted or unsubstituted heterocycloalkyl is a substituted or unsubstituted 3 to 8 membered heterocycloalkyl, each substituted or unsubstituted aryl is a substituted or unsubstituted $C_6$-$C_{10}$ aryl, and/or each substituted or unsubstituted heteroaryl is a substituted or unsubstituted 5 to 10 membered heteroaryl. In embodiments herein, each substituted or unsubstituted alkylene is a substituted or unsubstituted $C_1$-$C_{20}$ alkylene, each substituted or unsubstituted heteroalkylene is a substituted or unsubstituted 2 to 20 membered heteroalkylene, each substituted or unsubstituted cycloalkylene is a substituted or unsubstituted $C_3$-$C_8$ cycloalkylene, each substituted or unsubstituted heterocycloalkylene is a substituted or unsubstituted 3 to 8 membered heterocycloalkylene, each substituted or unsubstituted arylene is a substituted or unsubstituted $C_6$-$C_{10}$ arylene, and/or each substituted or unsubstituted heteroarylene is a substituted or unsubstituted 5 to 10 membered heteroarylene.

In embodiments, each substituted or unsubstituted alkyl is a substituted or unsubstituted $C_1$-$C_8$ alkyl, each substituted or unsubstituted heteroalkyl is a substituted or unsubstituted 2 to 8 membered heteroalkyl, each substituted or unsubstituted cycloalkyl is a substituted or unsubstituted $C_3$-$C_7$ cycloalkyl, each substituted or unsubstituted heterocycloalkyl is a substituted or unsubstituted 3 to 7 membered heterocycloalkyl, each substituted or unsubstituted aryl is a substituted or unsubstituted $C_6$-$C_{10}$ aryl, and/or each substituted or unsubstituted heteroaryl is a substituted or unsubstituted 5 to 9 membered heteroaryl. In embodiments, each substituted or unsubstituted alkylene is a substituted or unsubstituted $C_1$-$C_8$ alkylene, each substituted or unsubstituted heteroalkylene is a substituted or unsubstituted 2 to 8 membered heteroalkylene, each substituted or unsubstituted cycloalkylene is a substituted or unsubstituted $C_3$-$C_7$ cycloalkylene, each substituted or unsubstituted heterocycloalkylene is a substituted or unsubstituted 3 to 7 membered heterocycloalkylene, each substituted or unsubstituted arylene is a substituted or unsubstituted $C_6$-$C_{10}$ arylene, and/or each substituted or unsubstituted heteroarylene is a substituted or unsubstituted 5 to 9 membered heteroarylene. In embodiments, the compound is a chemical species set forth in the Examples section below.

Certain complexes and compounds of the present invention can exist in unsolvated forms as well as solvated forms, including hydrated forms. In general, the solvated forms are equivalent to unsolvated forms and are encompassed within the scope of the present invention. Certain compounds of the present invention may exist in multiple crystalline or amorphous forms. In general, all physical forms are equivalent for the uses contemplated by the present invention and are intended to be within the scope of the present invention.

Certain compounds of the present invention possess asymmetric carbon atoms (optical or chiral centers) or double bonds; the enantiomers, racemates, diastereomers, tautomers, geometric isomers, stereoisometric forms that may be defined, in terms of absolute stereochemistry, as (R)- or (S)- or, as (D)- or (L)- for amino acids, and individual isomers are encompassed within the scope of the present invention. The compounds of the present invention do not include those which are known in art to be too unstable to synthesize and/or isolate. The present invention is meant to include compounds in racemic and optically pure forms. Optically active (R)- and (S)-, or (D)- and (L)-isomers may be prepared using chiral synthons or chiral reagents, or resolved using conventional techniques. When the compounds described herein contain olefinic bonds or other centers of geometric asymmetry, and unless specified otherwise, it is intended that the compounds include both E and Z geometric isomers.

As used herein, the term "isomers" refers to compounds having the same number and kind of atoms, and hence the same molecular weight, but differing in respect to the structural arrangement or configuration of the atoms.

The term "tautomer," as used herein, refers to one of two or more structural isomers which exist in equilibrium and which are readily converted from one isomeric form to another.

It will be apparent to one skilled in the art that certain compounds of this invention may exist in tautomeric forms, all such tautomeric forms of the compounds being within the scope of the invention.

Unless otherwise stated, structures depicted herein are also meant to include all stereochemical forms of the structure; i.e., the R and S configurations for each asymmetric center. Therefore, single stereochemical isomers as well as enantiomeric and diastereomeric mixtures of the present compounds are within the scope of the invention.

Unless otherwise stated, structures depicted herein are also meant to include compounds which differ only in the presence of one or more isotopically enriched atoms. For example, compounds having the present structures except for the replacement of a hydrogen by a deuterium or tritium, or the replacement of a carbon by $^{13}$C- or $^{14}$C-enriched carbon are within the scope of this invention.

The compounds of the present invention may also contain unnatural proportions of atomic isotopes at one or more of the atoms that constitute such compounds. For example, the compounds may be radiolabeled with radioactive isotopes, such as for example tritium ($^3$H), iodine-125 ($^{125}$I), or carbon-14 ($^{14}$C). All isotopic variations of the compounds of the present invention, whether radioactive or not, are encompassed within the scope of the present invention.

The symbol "⌇" denotes the point of attachment of a chemical moiety to the remainder of a molecule or chemical formula.

The terms "a" or "an," as used in herein means one or more. In addition, the phrase "substituted with a[n]," as used herein, means the specified group may be substituted with one or more of any or all of the named substituents. For example, where a group, such as an alkyl or heteroaryl group, is "substituted with an unsubstituted $C_1$-$C_{20}$ alkyl, or unsubstituted 2 to 20 membered heteroalkyl," the group may contain one or more unsubstituted $C_1$-$C_{20}$ alkyls, and/or one or more unsubstituted 2 to 20 membered heteroalkyls.

Moreover, where a moiety is substituted with an R substituent, the group may be referred to as "R-substituted." Where a moiety is R-substituted, the moiety is substituted with at least one R substituent and each R substituent is optionally different. Where a particular R group is present in the description of a chemical genus, a Roman alphabetic symbol may be used to distinguish each appearance of that particular R group. For example, where multiple $R^{13}$ substituents are present, each $R^{13}$ substituent may be distinguished as $R^{13A}$, $R^{13B}$, $R^{13C}$, $R^{13D}$, etc., wherein each of $R^{13A}$, $R^{13B}$, $R^{3C}$, $R^{13D}$, etc. is defined within the scope of the definition of $R^{13}$ and optionally differently.

Descriptions of compounds of the present invention are limited by principles of chemical bonding known to those skilled in the art. Accordingly, where a group may be substituted by one or more of a number of substituents, such substitutions are selected so as to comply with principles of chemical bonding and to give compounds which are not inherently unstable and/or would be known to one of ordinary skill in the art as likely to be unstable under ambient conditions, such as aqueous, neutral, and several known physiological conditions. For example, a heterocycloalkyl or heteroaryl is attached to the remainder of the molecule via a ring heteroatom in compliance with principles of chemical bonding known to those skilled in the art thereby avoiding inherently unstable compounds.

Compositions.

In a first aspect, there is provided a polymer-metal organic framework hybrid (polyMOF) composition comprising a metal organic framework (MOF) and having the formula $[Zn_4O(M)_x]_n$, wherein M is a monomer, wherein the monomer is a terephthalate having a plurality of linkers covalently bonded thereto, x is greater than 2, and n is greater than 1.

In embodiments, the linkers covalently bound to the terephthalate are alkylene functionalities. In embodiments, the linkers are $C_1$-$C_{10}$ alkylene linkers, e.g., $C_1$, $C_2$, $C_3$, $C_4$, $C_5$, $C_6$, $C_7$, $C_8$, $C_9$ or $C_{10}$. In embodiments, a linker is covalently bound to the terephthalate functionality through an ether bond.

Methods.

In another aspect, there is provided a method for fabricating a polymer-metal organic framework hybrid (polyMOF) composition comprising a metal organic framework (MOF). The method includes contacting an amorphous polymer with a metal ion under conditions suitable to afford said polyMOF.

In embodiments, the amorphous polymer has the formula [alk-O-Ter-O-]$_n$ wherein "alk" is an alkylene linker has disclosed herein, "Ter" is a terephthalate monomer core, and n is greater than 1. In embodiments, alk is a $C_1$-$C_{10}$ alkylene linker. In embodiments, n is 2 or 3.

In embodiments, the metal ion is zinc cation. In embodiments, the metal ion is Zn(II).

Embodiment P1

A polymer-metal organic framework hybrid (polyMOF) composition including a metal organic framework (MOF) and having the formula $[Zn4O(M)x]_n$, wherein M is a monomer cross-linked terephthalate monomer core having a plurality of linkers covalently bonded thereto, x is greater than 1, and n is greater than 1.

Embodiment P2

The polyMOF according to Embodiment 1, wherein said plurality of linkers are alkyl chain linkers or xylene linkers.

Embodiment P3

The polyMOF according to Embodiment 1, said polyMOF exhibiting a crystalline framework.

Embodiment P4

The polyMOF according to Embodiment 3, wherein said polyMOF is isostructural with isoreticular metal organic framework-1 (IRMOF-1).

Embodiment P5

A method for fabricating a polymer-metal organic framework hybrid (polyMOF) composition including a metal organic framework (MOF), said method including contacting an amorphous polymer with a metal ion under conditions suitable to afford said polyMOF.

Embodiment P6

The method according to Embodiment 5, wherein said metal ion is Zn.

ADDITIONAL EMBODIMENTS

Embodiment 1

A polymerized metal organic framework comprising a plurality of metal organic framework linkers bound together by a plurality of covalent linker moieties, wherein the metal organic framework linkers comprise at least 2 metal binding ligand moieties or at least 2 metal donor atoms; and each of the metal binding ligand moieties is bound to a metal atom or each of the metal donor atoms is bound to a metal atom.

Embodiment 2

The polymerized metal organic framework of Embodiment 1, wherein said plurality of metal organic framework linkers and said plurality of covalent linker moieties together form an unbranched polymer.

Embodiment 3

The polymerized metal organic framework of Embodiments 1 or 2, wherein the metal binding ligand moieties comprise a metal donor atom.

Embodiment 4

The polymerized metal organic framework of any one of Embodiments 1 to 3, wherein the metal donor atom is selected from the group oxygen, nitrogen, and sulfur.

Embodiment 5

The polymerized metal organic framework of any one of Embodiments 1 to 4, wherein the metal binding ligand moieties are independently —COOH, —OH, —NH$_2$, —SH, —CN, substituted or unsubstituted heterocycloalkyl, or substituted or unsubstituted heteroaryl.

Embodiment 6

The polymerized metal organic framework of any one of Embodiments 1 to 4, wherein the metal binding ligand moieties are independently —COOH, —OH, —NH₂, —SH, —CN, substituted or unsubstituted pyridinyl, substituted or unsubstituted piperidinyl, substituted or unsubstituted imidazolyl, substituted or unsubstituted azetidinyl, substituted or unsubstituted aziridinyl, substituted or unsubstituted morpholinyl, substituted or unsubstituted pyrazolyl, substituted or unsubstituted imidazolyl, substituted or unsubstituted oxazolyl, substituted or unsubstituted isoxazolyl, substituted or unsubstituted thiazolyl, substituted or unsubstituted isothiazolyl, or substituted or unsubstituted pyrrolyl.

Embodiment 7

The polymerized metal organic framework of any one of Embodiments 1 to 4, wherein the metal binding ligand moieties are independently —COOH.

Embodiment 8

The polymerized metal organic framework of any one of Embodiments 1 to 7, wherein the metal atom is selected from the group consisting of Li, Na, Rb, Mg, Ca, Sr, Ba, Sc, Ti, Zr, Ta, Cr, Mo, W, Mn, Fe, Ru, Os, Co, Ni, Pd, Pt, Cu, Au, Zn, Al, Ga, In, Si, Ge, Sn, Bi, Cd, Mn, Tb, Gd, Ce, La, and Cr.

Embodiment 9

The polymerized metal organic framework of any one of Embodiments 1 to 7, wherein the metal atom is Zn, Cu, Ti, V, Cr, Mn, or Fe.

Embodiment 10

The polymerized metal organic framework of any one of Embodiments 1 to 7, wherein the metal atom is Zn or Cu.

Embodiment 11

The polymerized metal organic framework of any one of Embodiments 1 to 10, wherein each metal organic framework linker has the formula:

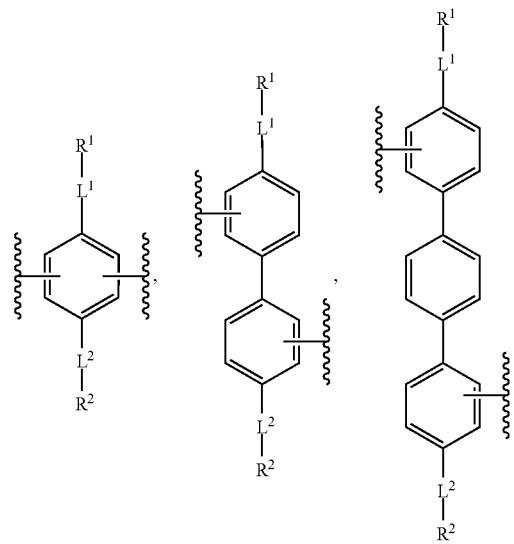

-continued

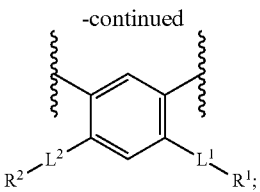

wherein $L^1$ and $L^2$ are independently a bond, substituted or unsubstituted alkylene, or substituted or unsubstituted heteroalkylene attached to the metal binding ligand moiety; and $R^1$ and $R^2$ are independently a metal binding ligand moiety.

Embodiment 12

The polymerized metal organic framework of any one of Embodiments 1 to 10, wherein each metal organic framework linker has the formula:

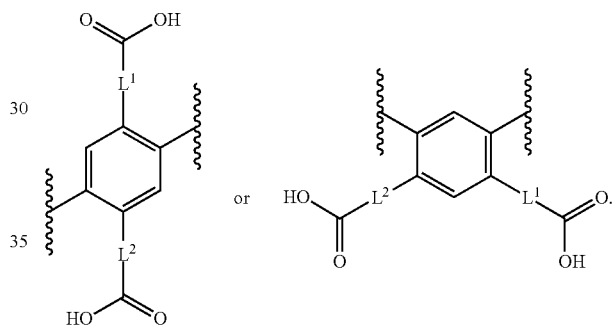

Embodiment 13

The polymerized metal organic framework of any one of Embodiments 1 to 10, wherein each metal organic framework linker has the formula

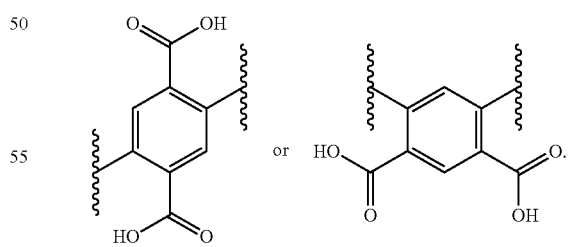

Embodiment 14

The polymerized metal organic framework of any one of Embodiments 1 to 10, wherein each metal organic framework linker has the formula:

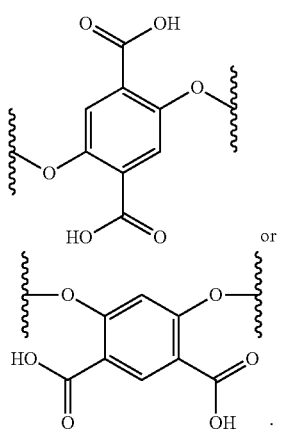

Embodiment 15

The polymerized metal organic framework of any one of Embodiments 1 to 14, wherein the covalent linker moiety comprises a polymer.

Embodiment 16

The polymerized metal organic framework of Embodiment 15, wherein the polymer is a block copolymer.

Embodiment 17

The polymerized metal organic framework of any one of Embodiments 1 to 16, wherein the covalent linker moiety is a substituted or unsubstituted alkylene, substituted or unsubstituted heteroalkylene, substituted or unsubstituted cycloalkylene, substituted or unsubstituted heterocycloalkylene, substituted or unsubstituted arylene, or substituted or unsubstituted heteroarylene.

Embodiment 18

The polymerized metal organic framework of any one of Embodiments 1 to 14, wherein the covalent linker moiety is —O(CH$_2$)$_{n1}$—, —O(CH$_2$CH$_2$)$_{n1}$—, —O[(C$_6$H$_4$)]$_{n1}$—, —[CH$_2$(C$_6$H$_4$)]$_{n1}$—, —[(C$_6$H$_4$)]$_{n1}$—, or —O[CH$_2$(C$_6$H$_4$)CH$_2$]$_{n1}$—; n1 is an integer from 1 to 100.

Embodiment 19

The polymerized metal organic framework of any one of Embodiments 1 to 14, wherein the covalent linker moiety is —O(CH$_2$)$_{n1}$—; wherein n1 is an integer from 1 to 100.

Embodiment 20

The polymerized metal organic framework of any one of Embodiments 1 to 14, wherein the covalent linker moiety is —O(CH$_2$CH$_2$)$_{n1}$—; wherein n1 is an integer from 1 to 100.

Embodiment 21

The polymerized metal organic framework of any one of Embodiments 1 to 14, wherein the covalent linker moiety is —O[CH$_2$(C$_6$H$_4$)CH$_2$]$_{n1}$—; wherein n1 is an integer from 1 to 100.

Embodiment 22

The polymerized metal organic framework of any one of Embodiments 1 to 21, wherein the plurality of metal organic framework linker has a molecular weight from about 4,000 g/mol to about 5,000,000 g/mol.

Embodiment 23

The polymerized metal organic framework of any one of Embodiments 1 to 21, wherein the plurality of metal organic framework linker has a molecular weight from about 4,000 g/mol to about 50,000 g/mol.

Embodiment 24

The polymerized metal organic framework of any one of Embodiments 1 to 21, wherein the plurality of metal organic framework linker has a molecular weight from about 8,000 g/mol to about 30,000 g/mol.

Embodiment 25

The polymerized metal organic framework of any one of Embodiments 1 to 21, wherein the plurality of metal-organic framework linker has a molecular weight from about 12,000 g/mol to about 18,000 g/mol.

Embodiment 26

The polymerized metal organic framework of any one of Embodiments 1 to 10, having the formula:

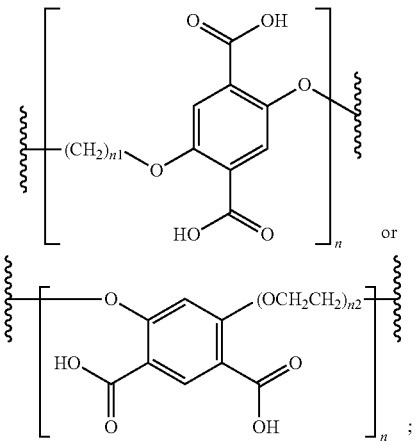

wherein, n1 and n2 are independently an integer from 1 to 20 and n is an integer from 2 to 1000.

Embodiment 27

The polymerized metal organic framework of Embodiment 26, wherein n1 is from 5 to 12.

Embodiment 28

The polymerized metal organic framework of Embodiment 26, wherein n1 is from 5 to 8.

Embodiment 29

The polymerized metal organic framework of Embodiment 26, wherein n1 is 7 or 8.

Embodiment 30

The polymerized metal organic framework of Embodiment 26, wherein n2 is from 2 to 8.

Embodiment 31

The polymerized metal organic framework of Embodiment 26, wherein n2 is 4.

Embodiment 32

The polymerized metal organic framework of any one of Embodiments 1 to 31, wherein the polymerized metal organic framework further comprises a plurality of additional metal organic framework linkers not bound together by a plurality of covalent linker moieties.

Embodiment 33

The polymerized metal organic framework of any one of Embodiments 1 to 31, wherein the plurality of additional metal organic framework linkers is substituted or unsubstituted alkylene, substituted or unsubstituted heteroalkylene, substituted or unsubstituted cycloalkylene, substituted or unsubstituted heterocycloalkylene, substituted or unsubstituted arylene, or substituted or unsubstituted heteroarylene.

Embodiment 34

The polymerized metal organic framework of any one of Embodiments 1 to 31, wherein the plurality of additional metal organic framework linkers is

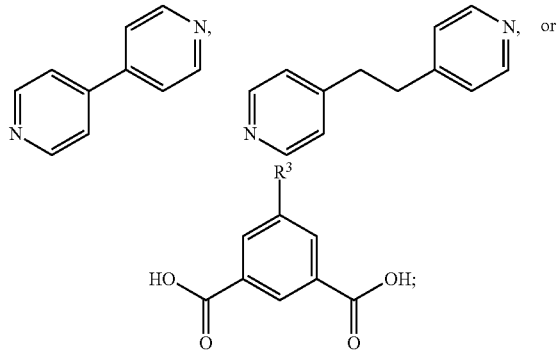

where $R^3$ is hydrogen halogen, —CF$_3$, —Cl$_3$, —CI$_3$, —CBr$_3$, —CHF$_2$, —CHCl$_2$, —CHI$_2$, —CHBr$_2$, —OCH$_2$F, —OCH$_2$Cl, —OCH$_2$I, —OCH$_2$Br, —OCHF$_2$, —OCHCl$_2$, —OCHI$_2$, —OCHBr$_2$, —OCF$_3$, —OCl$_3$, —OCI$_3$, —OCBr$_3$, —CN, —OH, —NH$_2$, —COOH, —CONH$_2$, —NO$_2$, —SH, —SO$_3$H, —SO$_4$H, —SO$_2$NH$_2$, —NHNH$_2$, —ONH$_2$, —NHC=(O)NHNH$_2$, —NHC=(O)NH$_2$, —NHSO$_2$H, —NHC=(O)H, —NHC(O)—OH, —NHOH, substituted or unsubstituted alkyl, or substituted or unsubstituted heteroalkyl.

Embodiment 35

The polymerized metal organic framework of Embodiment 34, wherein $R^3$ is hydrogen, —OH, —NO$_2$, —NH$_2$, or unsubstituted methyl.

Embodiment 36

The polymerized metal organic framework of any one of Embodiments 1 to 35, wherein said polymerized metal organic framework is isostructural with isoreticular metal organic framework-1 (IRMOF-1, MOF-5), Hong Kong University of Science and Technology-1 (HKUST-1), Pillared Paddlewheel, Zeolitic imidazolate framework-71 (ZIF-71), MOF-74, Universitetet i Oslo-66 (UiO-66), or Materiaux de l'Institut Lavoisier-53 (MIL-53).

Embodiment 37

The polymerized metal organic framework of any one of Embodiments 1 to 35, wherein said polymerized metal organic framework is isostructural with IRMOF-1.

Embodiment 38

A polymer composition comprising a plurality of ligands bound together by a plurality of polymerized monomers, wherein the ligands comprise at least 2 metal binding ligand moieties or at least 2 metal donor atoms.

Embodiment 39

The polymer composition of Embodiment 38, wherein the plurality of ligands has the formula:

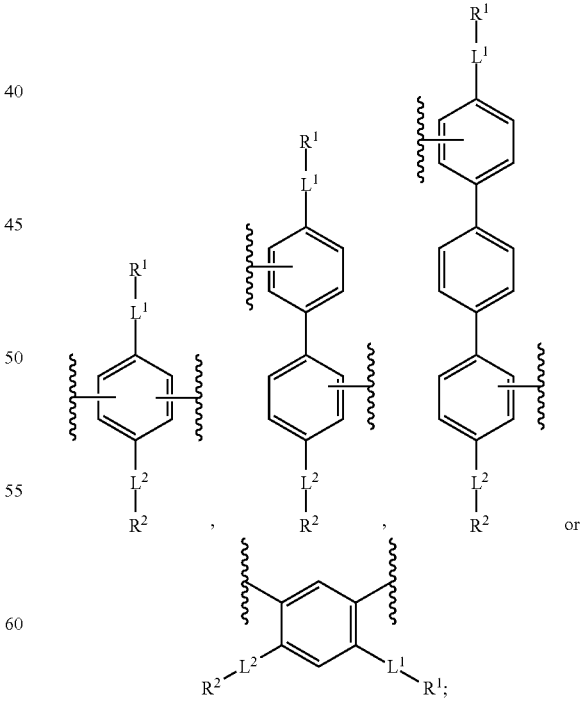

wherein $L^1$ and $L^2$ are independently a bond, substituted or unsubstituted alkylene, or substituted or unsubstituted heteroalkylene;

and $R^1$ and $R^2$ are independently a metal binding ligand moiety.

Embodiment 40

The polymer composition of Embodiment 38 or Embodiment 39, wherein the metal binding ligand moieties are independently —COOH, —OH, —NH$_2$, —SH, —CN, substituted or unsubstituted pyridinyl, substituted or unsubstituted piperidinyl, substituted or unsubstituted imidazolyl, substituted or unsubstituted azetidinyl, substituted or unsubstituted aziridinyl, substituted or unsubstituted morpholinyl, substituted or unsubstituted pyrazolyl, substituted or unsubstituted imidazolyl, substituted or unsubstituted oxazolyl, substituted or unsubstituted isoxazolyl, substituted or unsubstituted thiazolyl, substituted or unsubstituted isothiazolyl, or substituted or unsubstituted pyrrolyl.

Embodiment 41

The polymer composition of Embodiment 38 or Embodiment 39, wherein the metal binding ligand moieties are independently —COOH.

Embodiment 42

The polymer composition of Embodiment 38 or Embodiment 39, wherein the ligand has the formula:

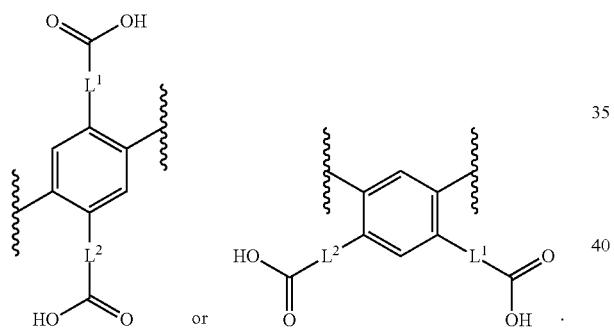

Embodiment 43

The polymer composition of Embodiment 38 or Embodiment 39 wherein the ligand has the formula:

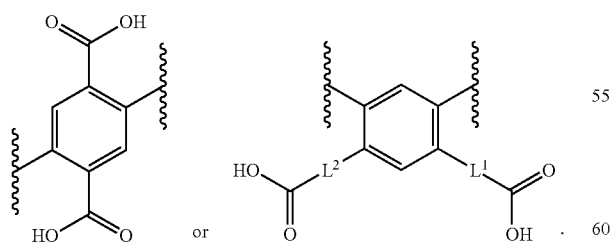

Embodiment 44

The polymer composition of Embodiment 38 or Embodiment 39 wherein the ligand has the formula:

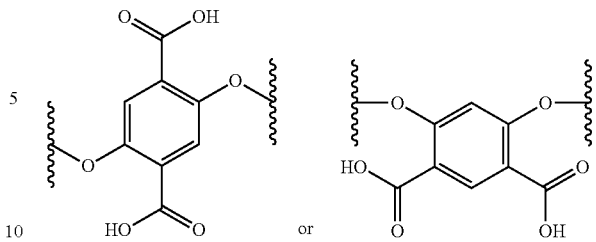

Embodiment 45

The polymer composition of Embodiment 38 or Embodiment 39 wherein the ligand has the formula:

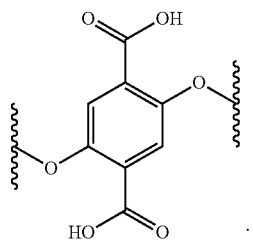 [SMILES: *Oc1cc(C(=O)O)c(O*)cc1C(=O)O]

Embodiment 46

The polymer composition of Embodiment 38 or Embodiment 39 wherein the ligand has the formula:

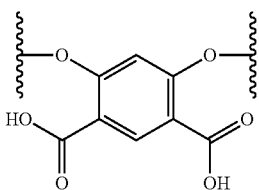

Embodiment 47

The polymer composition of any one of Embodiments 38 to 46, wherein the covalent linker moiety is a substituted or unsubstituted alkylene, substituted or unsubstituted heteroalkylene, substituted or unsubstituted cycloalkylene, substituted or unsubstituted heterocycloalkylene, substituted or unsubstituted arylene, or substituted or unsubstituted heteroarylene.

Embodiment 48

The polymer composition of any one of Embodiments 38 to Embodiment 43, wherein the covalent linker moiety is —O(CH$_2$)$_{n1}$—, —O(CH$_2$CH$_2$)$_{n1}$—, —O[(C$_6$H$_4$)]$_{n1}$—, —[CH$_2$(C$_6$H$_4$)]$_{n1}$—, —[(C$_6$H$_4$)]$_{n1}$—, or —O[CH$_2$(C$_6$H$_4$)CH$_2$]$_{n1}$—; n1 is an integer from 1 to 100.

Embodiment 49

The polymer composition of any one of Embodiments 38 to 43, wherein the covalent linker moiety is —O(CH$_2$)$_{n1}$—.

Embodiment 50

The polymer composition of any one of Embodiments 38 to 43, wherein the covalent linker moiety is —O(CH$_2$CH$_2$)$_{n1}$—.

Embodiment 51

The polymer composition of any one of Embodiments 38 to 43, wherein the covalent linker moiety is —O[CH$_2$(C$_6$H$_4$)CH$_2$]$_{n1}$—.

Embodiment 52

The polymer composition of any one of Embodiments 38 to 51, wherein the polymer composition has a molecular weight from about 4,000 g/mol to about 50,000 g/mol.

Embodiment 53

The polymer of any one of Embodiments 38 to 51, wherein the polymer composition has a molecular weight from about 8,000 g/mol to about 30,000 g/mol.

Embodiment 54

The polymer composition of any one of Embodiments 38 to 51, wherein the polymer composition has a molecular weight from about 12,000 g/mol to about 18,000 g/mol.

Embodiment 55

The polymer composition of any one of Embodiments 38 to 54, wherein the polymer composition has a melting temperature of about 150° C. to about 250° C.

Embodiment 56

The polymer composition of any one of Embodiments 38 to 54, wherein the polymer composition has a melting temperature of about 160° C. to about 200° C.

Embodiment 57

The polymer composition of any one of Embodiments 38 to 54, wherein the polymer composition has a melting temperature of about 200° C. to about 230° C.

Embodiment 58

The polymer composition of any one of Embodiments 38 to 57, wherein the glass transition temperature of the polymer composition is from about 60° C. to about 100° C.

Embodiment 59

The polymer composition of any one of Embodiments 38 to 43, having the formula

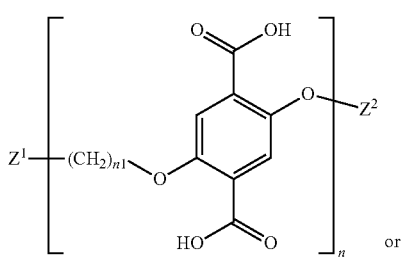

or

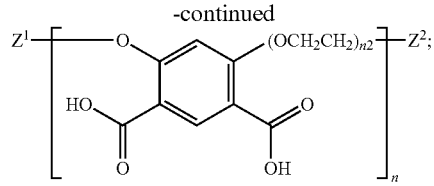

wherein, n1 and n2 are independently an integer from 1 to 20 and n is an integer from 2 to 1000; and $Z^1$ and $Z^2$ are independently a terminal moiety.

Embodiment 60

The polymer composition of Embodiment 59, wherein n1 is from 5 to 12.

Embodiment 61

The polymer composition of Embodiment 59, wherein n1 is from 5 to 8.

Embodiment 62

The polymer composition of Embodiment 59, wherein n1 is 7 or 8.

Embodiment 63

The polymer composition of Embodiment 59, wherein n2 is from 2 to 8.

Embodiment 64

The polymer composition of Embodiment 59, wherein n2 is 4.

Embodiment 65

The polymer composition of Embodiment 38, wherein the metal binding ligand moieties are independently —COOH, —OH, —NH$_2$, —SH, —CN, unsubstituted heterocycloalkyl, or unsubstituted heteroaryl.

Embodiment 66

A method of isolating carbon dioxide from a gas, wherein said method comprises contacting a polymerized metal organic framework with a gas comprising carbon dioxide, and allowing the carbon dioxide within the gas to bind or adsorb to the polymerized metal organic framework, thereby isolating carbon dioxide from a gas.

What is claimed is:

1. A polymerized metal organic framework comprising a plurality of metal organic framework linkers covalently bound together by a plurality of covalent linker moieties, wherein each metal organic framework linker comprises at least 2 metal binding ligand moieties or at least 2 metal donor atoms; and each of the metal binding ligand moieties is bound to a metal atom or each of the metal donor atoms is bound to a metal atom.

2. The polymerized metal organic framework of claim 1, wherein said polymerized metal organic framework is isostructural with isoreticular metal organic framework-1 (IR-MOF-1, MOF-5), Hong Kong University of Science and Technology-1 (HKUST-1), Pillared Paddlewheel, Zeolitic imidazolate framework-71 (ZIF-71), MOF-74, Universitetet i Oslo-66 (UiO-66), or Matériaux de l'Institut Lavoisier-53 (MIL-53).

3. The polymerized metal organic framework of claim 1, wherein said plurality of metal organic framework linkers and said plurality of covalent linker moieties together form an unbranched polymer.

4. The polymerized metal organic framework of claim 1, wherein the metal donor atom is selected from the group consisting of oxygen, nitrogen, and sulfur.

5. The polymerized metal organic framework of claim 1, wherein the metal binding ligand moieties are independently —COOH, —OH, —NH$_2$, —SH, —CN, substituted or unsubstituted heterocycloalkyl, or substituted or unsubstituted heteroaryl.

6. The polymerized metal organic framework of claim 1, wherein the metal binding ligand moieties are COOH.

7. The polymerized metal organic framework of claim 1, wherein the metal atom is selected from the group consisting of Li, Na, Rb, Mg, Ca, Sr, Ba, Sc, Ti, Zr, Ta, Mo, W, Fe, Ru, Os, Co, Ni, Pd, Pt, Cu, Au, Zn, Al, Ga, In, Si, Ge, Sn, Bi, Cd, Mn, Tb, Gd, Ce, La, and Cr.

8. The polymerized metal organic framework of claim 1, wherein each metal organic framework linker has the formula:

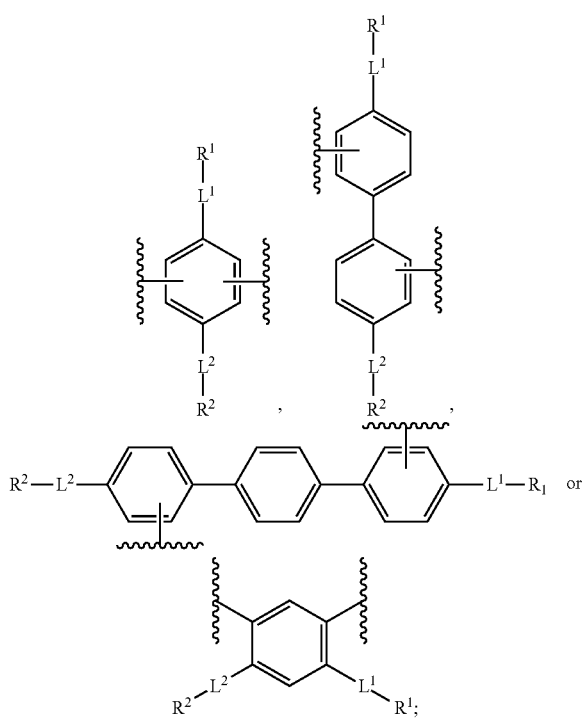

wherein L$^2$ and L$^2$ are independently a bond, substituted or unsubstituted alkylene, or substituted or unsubstituted heteroalkylene;

R$^1$ and R$^2$ are independently a metal binding ligand moiety.

9. The polymerized metal organic framework of claim 1, wherein each metal organic framework linker has the formula:

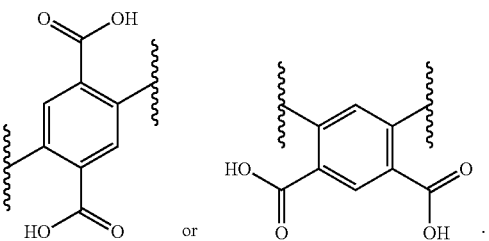 [SMILES: *c1cc(C(=O)O)c(*)cc1C(=O)O ; "or" ; *c1cc(*)c(C(=O)O)cc1C(=O)O ; "."]

10. The polymerized metal organic framework of claim 1, wherein each of the plurality of covalent linker moieties is a substituted or unsubstituted alkylene, substituted or unsubstituted heteroalkylene, substituted or unsubstituted cycloalkylene, substituted or unsubstituted heterocycloalkylene, substituted or unsubstituted arylene, or substituted or unsubstituted heteroarylene.

11. The polymerized metal organic framework of claim 1, wherein the covalent linker moiety is —O(CH$_2$)$_{n1}$—, —O(CH$_2$CH$_2$)$_{n1}$—, —O[(C$_6$H$_4$)]$_{n1}$—, —[CH$_2$(C$_6$H$_4$)]$_{n1}$—, —[(C$_6$H$_4$)]$_{n1}$—, or —O[CH$_2$(C$_6$H$_4$)CH$_2$]$_{n1}$—; and n1 is an integer from 1 to 100.

12. The polymerized metal organic framework of claim 1, wherein the covalent linker moiety is —O(CH$_2$)$_{n1}$—; and n1 is an integer from 1 to 100.

13. The polymerized metal organic framework of claim 1, wherein the plurality of metal organic framework linkers has a molecular weight from about 4,000 g/mol to about 5,000,000 g/mol.

14. The polymerized metal organic framework of claim 1, having the formula:

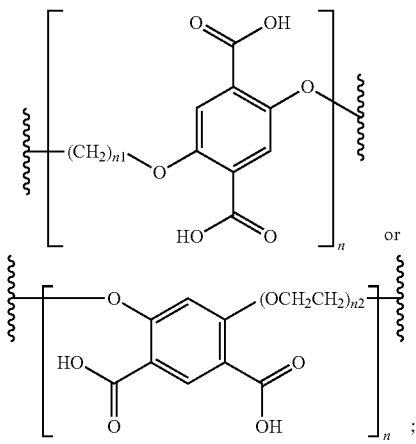

wherein, n1 and n2 are independently an integer from 1 to 20 and n is an integer from 2 to 1000.

15. The polymerized metal organic framework of claim 14, wherein n1 is from 5 to 8.

16. The polymerized metal organic framework of claim 14, wherein n2 is from 2 to 8.

17. The polymerized metal organic framework of claim 14, wherein n2 is 4.

18. The polymerized metal organic framework of claim 1, wherein the polymerized metal organic framework further comprises a plurality of additional metal organic framework linkers not bound together by a plurality of covalent linker moieties.

19. The polymerized metal organic framework of claim 18, wherein the plurality of additional metal organic framework linkers has the formula:

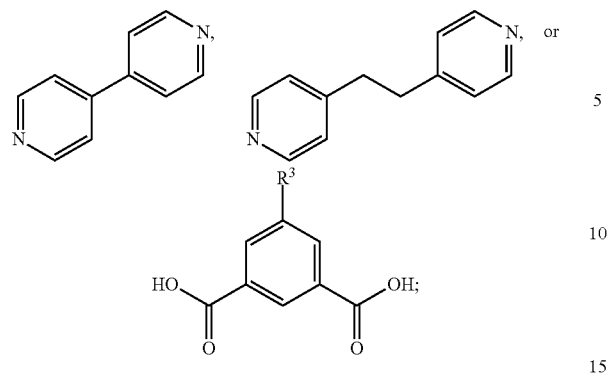
where R³ is hydrogen, halogen, —CF₃, —CCl₃, —CI₃, —CBr₃, —CHF₂, —CHCl₂, —CHI₂, —CHBr₂, —OCH₂F, —OCH₂Cl, —OCH₂I, —OCH₂Br, —OCHF₂, —OCHCl₂, —OCHI₂, —OCHBr₂, —OCF₃, —OCCl₃, —OCI₃, —OCBr₃, —CN, —OH, —NH₂, —COOH, —CONH₂, —NO₂, —SH, —SO₃H, —SO₄H, —SO₂NH₂, —NHNH₂, —ONH₂, —NHC=(O)NHNH₂, —NHC=(O)NH₂, —NHSO₂H, —NHC=(O)H, —NHC(O)—OH, —NHOH, substituted or unsubstituted alkyl, or substituted or unsubstituted heteroalkyl.
* * * * *